United States Patent [19]
Knowles et al.

[11] Patent Number: 6,085,978
[45] Date of Patent: Jul. 11, 2000

[54] HOLOGRAPHIC LASER SCANNERS OF MODULAR CONSTRUCTION AND METHOD AND APPARATUS FOR DESIGNING AND MANUFACTURING THE SAME

[75] Inventors: C. Harry Knowles, Morristown, N.J.; LeRoy Dickson, Morgan Hill, Calif.; Thomas Amundsen, Turnersville; Thomas J. Carullo, Marlton, both of N.J.; John Groot, San Jose, Calif.

[73] Assignee: Metrologic Instruments, Inc., Blackwood, N.J.

[21] Appl. No.: 08/854,832

[22] Filed: May 12, 1997

Related U.S. Application Data

[63] Continuation-in-part of application No. 08/726,522, Oct. 7, 1996, which is a continuation of application No. 08/573,949, Dec. 18, 1995, abandoned, which is a continuation-in-part of application No. 08/615,054, Mar. 12, 1996, and application No. 08/476,069, Jun. 7, 1995, Pat. No. 5,591,953, and application No. 08/561,479, Nov. 20, 1995, Pat. No. 5,661, 292, which is a continuation of application No. 08/293,695, Aug. 19, 1994, Pat. No. 5,468,951, and application No. 08/293,493, Aug. 19, 1994, Pat. No. 5,525,789, and application No. 08/475,376, Jun. 7, 1995, Pat. No. 5,637,852, and application No. 08/439,224, May 11, 1995, Pat. No. 5,627, 359, and application No. 08/292,237, Aug. 17, 1994, Pat. No. 5,808,285.

[51] Int. Cl.[7] ........................................... G06K 7/10
[52] U.S. Cl. ..................... 235/462.01; 235/472.01
[58] Field of Search ................ 235/462.01, 462.15, 235/462.43, 462.42, 462.47, 462.45, 472.01

[56] References Cited

U.S. PATENT DOCUMENTS

| | | |
|---|---|---|
| 4,026,630 | 5/1977 | Wollenmann . |
| 4,113,343 | 9/1978 | Pole et al. . |
| 4,243,293 | 1/1981 | Kramer . |

(List continued on next page.)

FOREIGN PATENT DOCUMENTS

| | | |
|---|---|---|
| 0731 417 A2 | 11/1996 | European Pat. Off. . |
| 3421-705 A1 | 4/1986 | Germany . |
| 53-75950 | 7/1978 | Japan . |
| 54-104849 | 8/1979 | Japan . |
| 56-47019 | 4/1981 | Japan . |
| 57-192920 | 11/1982 | Japan . |

OTHER PUBLICATIONS

"Holoscan Model 2100 Scanner—A Multi-function Bar Code Scanner for the Industrial Market," by Holoscan, Inc., 2 pages, circa 1994.

"Disk Options for the Model 2100 Holographic Scanner (Raster)"—Specification Sheets, Holoscan, Inc., 9 pages, circa 1994.

"Holographic Bar Code Scanning" by LeRoy D. Dickson, Holoscan, Inc., 16 pages, circa 1994.

"Three–Terminal Adaptive Nematic Liquid–Crystal Lens Device," by Nabell A. Riza and Michael C. DeJule, Optical Society of America, Optics Letter vol. 19, No. 14, Jul. 15, 1994, 3 pages.

IBM Technical Disclosure Bulletin, vol. 29, No. 7, Dec. 1986 entitled "Dual–Purpose Holographic Optical Element for a Scanner," 2 pages.

IBM Technical Disclosure Bulletin, vol. 27, No. 5, Oct. 1984 entitled "Chromatic Correction for a Laser Diode/Holographic Deflector" by G.T. Sincerbox, 2 pages.

IBM Technical Disclosure Bulletin, vol. 26, No. 12, May 1984 entitled "Aberrant Holographic Focusing Element for Post–Objective Holographic Deflector" by L.D. Dickson, 2 pages.

(List continued on next page.)

Primary Examiner—Thien M. Le
Attorney, Agent, or Firm—Thomas J. Perkowski, Esq., P.C.

[57] ABSTRACT

A holographic laser scanners of ultra-compact and modular design capable of reading bar and other types of graphical indicia within a large scanning volume using holographic optical elements and visible laser diodes, and also a method of designing and operating the same for use in diverse applications.

7 Claims, 157 Drawing Sheets

U.S. PATENT DOCUMENTS

| | | |
|---|---|---|
| 4,333,006 | 6/1982 | Gorin et al. . |
| 4,364,627 | 12/1982 | Haines . |
| 4,378,142 | 3/1983 | Ono . |
| 4,415,224 | 11/1983 | Dickson . |
| 4,416,505 | 11/1983 | Dickson . |
| 4,428,643 | 1/1984 | Kay . |
| 4,429,946 | 2/1984 | Haines . |
| 4,548,463 | 10/1985 | Cato et al. . |
| 4,591,236 | 5/1986 | Broockman et al. . |
| 4,591,242 | 5/1986 | Broockman et al. . |
| 4,610,500 | 9/1986 | Kramer . |
| 4,748,316 | 5/1988 | Dickson . |
| 4,753,502 | 6/1988 | Ono . |
| 4,758,058 | 7/1988 | Cato et al. . |
| 4,790,612 | 12/1988 | Dickson . |
| 4,794,237 | 12/1988 | Ferrante . |
| 4,800,256 | 1/1989 | Broockman et al. . |
| 4,904,034 | 2/1990 | Narayan et al. . |
| 4,957,336 | 9/1990 | Hasegawa et al. . |
| 4,973,112 | 11/1990 | Kramer . |
| 5,124,537 | 6/1992 | Chandler et al. . |
| 5,148,008 | 9/1992 | Takenaka . |
| 5,162,929 | 11/1992 | Roddy et al. . |
| 5,206,491 | 4/1993 | Katoh et al. . |
| 5,216,230 | 6/1993 | Nakazawa . |
| 5,306,889 | 4/1994 | Marom et al. . |
| 5,357,101 | 10/1994 | Plesko . |
| 5,361,158 | 11/1994 | Tang . |
| 5,422,744 | 6/1995 | Katz et al. . |
| 5,471,326 | 11/1995 | Hall et al. . |
| 5,483,075 | 1/1996 | Smith et al. . |
| 5,498,862 | 3/1996 | Edler . |
| 5,504,595 | 4/1996 | Marom et al. . |
| 5,550,655 | 8/1996 | Kayashima et al. . |
| 5,555,130 | 9/1996 | Marom et al. . |
| 5,557,093 | 9/1996 | Knowles et al. . |

OTHER PUBLICATIONS

IBM Technical Disclosure Bulletin, vol. 27, No. 4A, Sep. 1984, entitled, "Hand–Held Holographic Scanner Having Highly Visible Locator Beam," by R.T. Cato, 2 pages.

IBM Technical Disclosure Bulletin, vol. 23, No. 9, Feb. 1991, entitled "Correction of Astigmatism for Off–Axis Reconstruction Beam Holographic Deflector" by L.D. Dickson, 2 pages.

Fujitsu Scientific & Technical Journal, vol. 15, No. 4, Dec. 1979, pp. 59–76 entitled "Hologram Scanner for POS Bar Code Symbol Reader."

The Bell System Technical Journal, vol. 48, No. 9, Nov. 1969 entitled "Coupled Wave Theory for Thick Hologram Gratings," pp. 2909–2917.

Fujitsu SlimScan™ Holographic Slot Scanner, Fujitsu Systems of America, 4 pages, circa 1991.

Photon, Inc. publication entitled "BeamScan Models 1180, 1280, 2180 Precise Measures of Beam Size and Profiles," circa 1994.

IBM Journal of Research and Development, vol. 26, No. 2, Mar. 1982, entitled Holography in the IBM Supermarket Scanner, by L.D. Dickson, G.T. Sincerbox and A.D. Wolfheimer.

PCT International Search Report in International Application No. PCT/US96/20525, Published on Dec. 18, 1996.

Warehouse Sortation

Container Loading

Bulk Package Loading

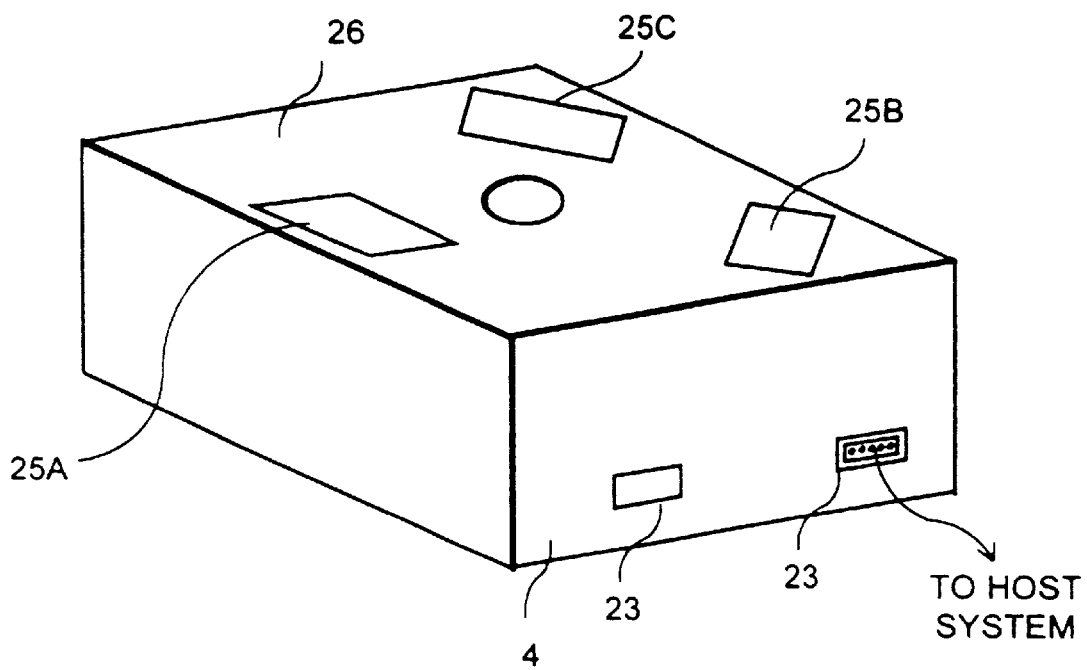
F I G. 2E

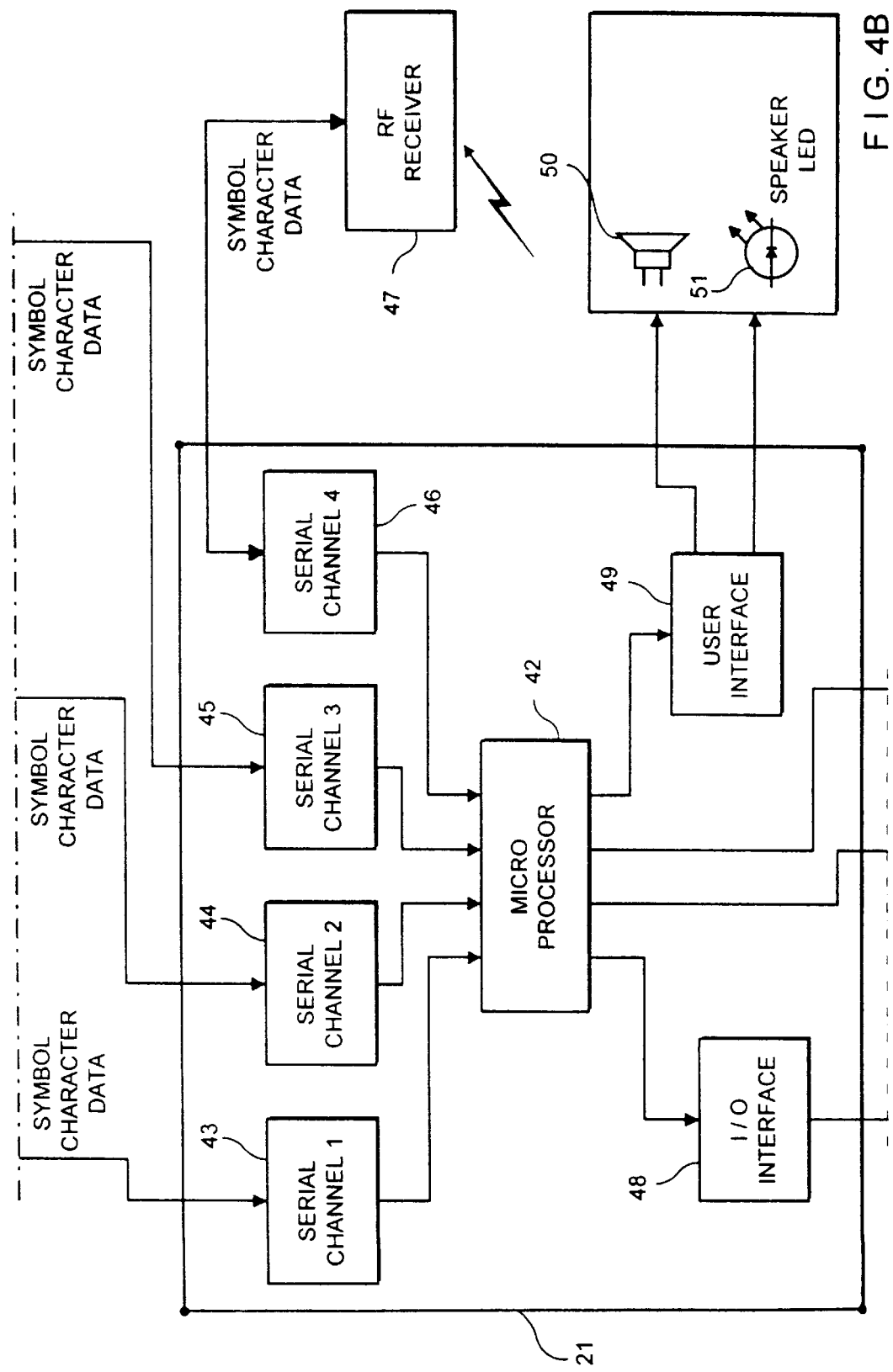

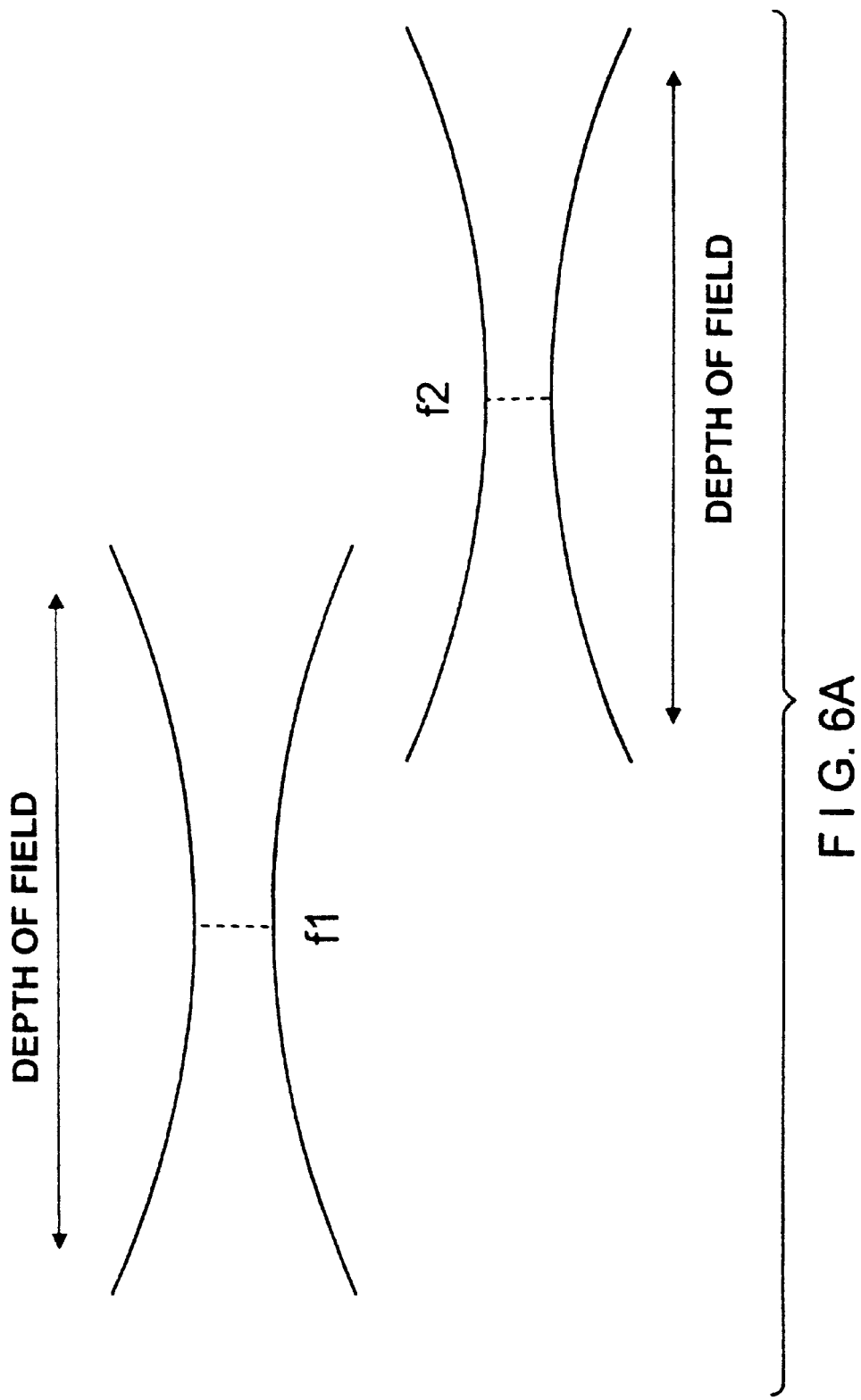

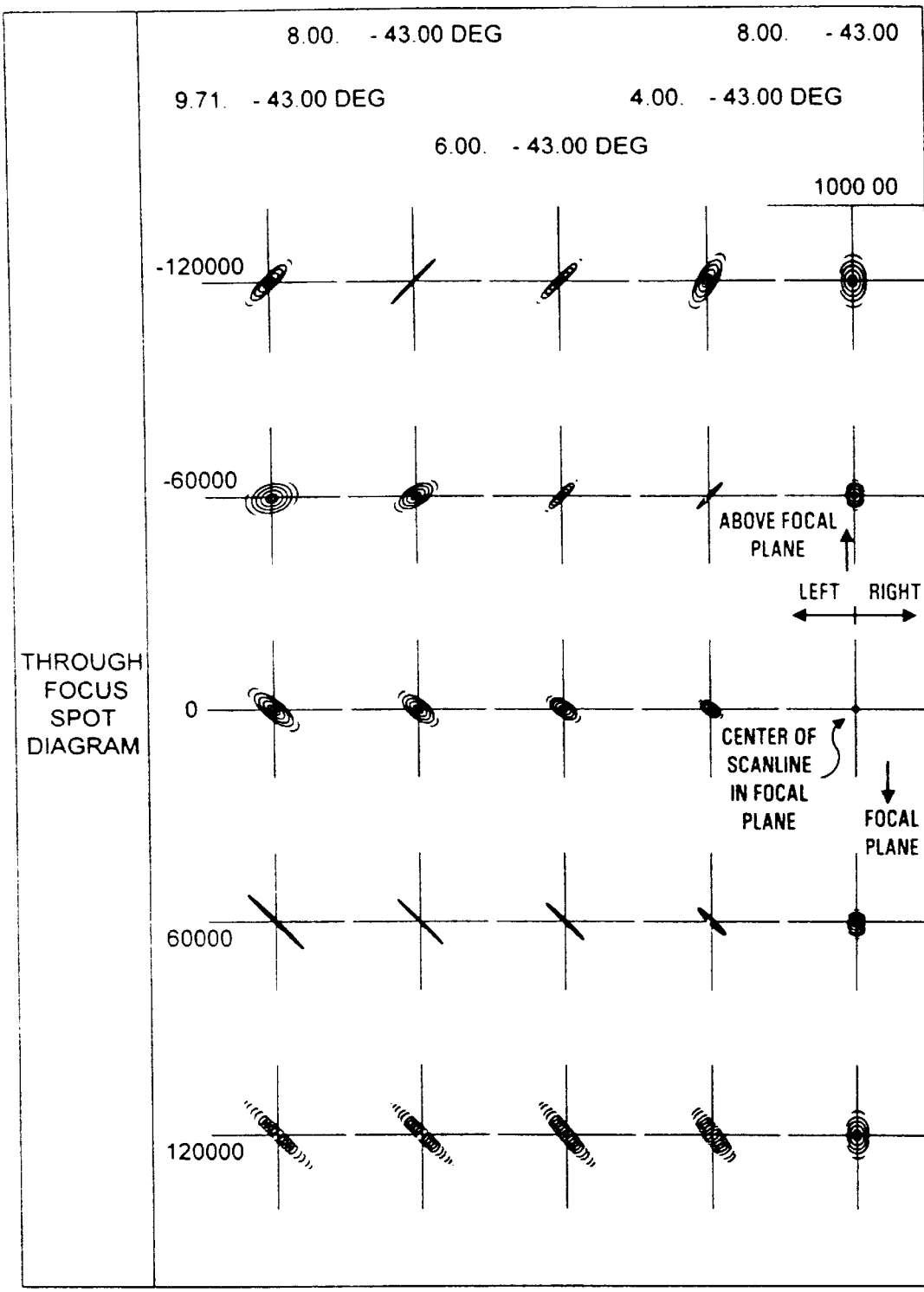
F I G. 6B

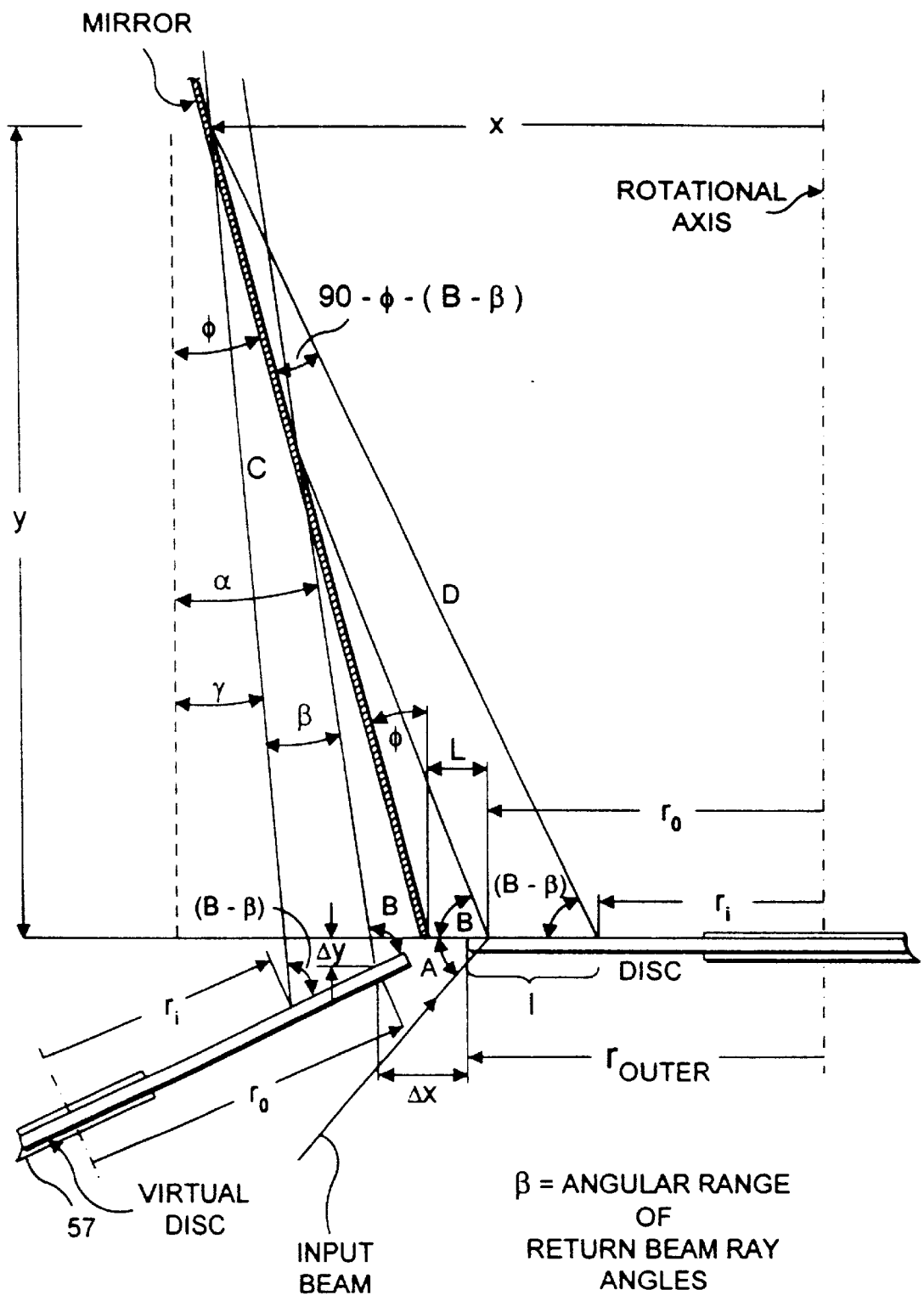
FIG. 8A1

(1) THE RADIUS TO BEAM-INCIDENT-POINT ON THE HOLOGRAPHIC SCANNING DISC, ASSIGNED THE SYMBOLIC NOTATION "$r_0$"

(2) SCANLINE SEPARATION BETWEEN ADJACENT SCANLINES AT THE FOCAL PLANE OF THE (i, J)-TH SCANLINE, ASSIGNED THE SYMBOLIC NOTATION "$S_{SL}$"

(3) THE SCANLINE LENGTH (MEASURED INTO THE PAPER) FOR THE (i, J)-TH SCANLINE, ASSIGNED THE SYMBOLIC NOTATION "$L_{SL}$"

(4) THE DISTANCE MEASURED FROM THE SCANNING DISC TO THE FOCAL PLANE OF THE (i, J)-TH SCANLINE, ASSIGNED THE SYMBOLIC NOTATION "$a_i$"

(5) THE DISTANCE FROM RADIUS TO BEAM-INCIDENT-POINT $r_0$ TO BEAM FOLDING MIRROR, ASSIGNED THE SYMBOLIC NOTATION "$L$"

(6) THE TILT ANGLE OF THE J-TH BEAM FOLDING MIRROR ASSOCIATED WITH GENERATION OF THE (i, J)-TH SCANLINE, ASSIGNED THE SYMBOLIC NOTATION "$\phi_j$"

(7) THE TILT ANGLE OF THE VIRTUAL SCANNING DISC, ASSIGNED THE SYMBOLIC NOTATION "$2\phi$"

(8) THE LATERAL SHIFT OF THE BEAM INCIDENT POINT ON THE VIRTUAL SCANNING DISC, ASSIGNED THE SYMBOLIC NOTATION "$\Delta X$"

(9) THE VERTICAL SHIFT OF THE BEAM INCIDENT POINT ON THE VIRTUAL SCANNING DISC, ASSIGNED THE SYMBOLIC NOTATION "$\Delta Y$"

(10) THE DISTANCE FROM THE ROTATION AXIS TO THE BEAM INCIDENT POINT ON THE VIRTUAL SCANNING DISC, ASSIGNED THE SYMBOLIC NOTATION "$r_0 + \Delta X$"

(11) THE DISTANCE FROM THE BEAM INCIDENT POINT ON THE VIRTUAL SCANNING DISC TO THE FOCAL PLANE WITHIN WHICH THE (i, j)-TH SCANLINE RESIDES, ASSIGNED THE SYMBOLIC NOTATION "$f_i$"

(12) THE DIAMETER OF THE CROSS-SECTION OF THE LASER BEAM SCANNING STATION, ASSIGNED THE SYMBOLIC NOTATION "$d_{BEAM}$"

(13) THE ANGULAR GAP BETWEEN ADJACENT HOLOGRAPHIC SCANNING FACETS, ASSIGNED THE SYMBOLIC NOTATION "$d_{GAP}$"

(14) THE OUTER RADIUS OF THE AVAILABLE LIGHT COLLECTION REGION ON THE HOLOGRAPHIC SCANNING DISC, ASSIGNED THE SYMBOLIC NOTATION "$r_{OUTER}$"

FIG. 8B1

(15) THE INNER RADIUS OF THE AVAILABLE LIGHT COLLECTION REGION ON THE HOLOGRAPHIC SCANNING FACET, ASSIGNED THE SYMBOLIC NOTATION "$r_{INNER}$"

(16) ONE-HALF OF THE DEPTH OF FIELD OF THE (i, j)-TH SCANLINE, ASSIGNED THE SYMBOLIC NOTATION "$\delta$"

(17) THE DISTANCE FROM THE MAXIMUM READ DISTANCE ($f_i + 5"$) TO THE INNER RADIUS $r_i$ OF THE SCANNING FACET, ASSIGNED THE SYMBOLIC NOTATION "C"

(18) THE OUTER RAY ANGLE MEASURED RELATIVE TO THE NORMAL TO THE i-TH HOLOGRAPHIC FACET, ASSIGNED THE SYMBOLIC NOTATION "$\alpha$"

(19) THE INNER RAY ANGLE MEASURED RELATIVE TO THE NORMAL TO THE i-TH HOLOGRAPHIC FACET, ASSIGNED THE SYMBOLIC NOTATION "$\gamma$"

(20) THE LIGHT COLLECTION ANGLE MEASURED FROM THE FOCAL POINT OF THE i-TH FACET TO THE LIGHT COLLECTION AREA OF THE SCANNING FACET, ASSIGNED THE SYMBOLIC NOTATION "$\beta$"

(21) THE INTERSECTION OF THE BEAM FOLDING MIRROR AND LINE C, ASSIGNED THE SYMBOLIC NOTATION "X"

(21A) THE INTERSECTION OF THE BEAM FOLDING MIRROR AND LINE C, ASSIGNED THE SYMBOLIC NOTATION "Y"

(22) THE DISTANCE MEASURED FROM THE INNER RADIUS TO THE POINT OF MIRROR INTERSECTION, ASSIGNED THE SYMBOLIC NOTATION "D"

(23) THE DISTANCE MEASURED FROM THE BASE OF THE SCANNER HOUSING TO THE TOP OF THE j-TH BEAM FOLDING MIRROR, ASSIGNED THE SYMBOLIC NOTATION "h"

(24) THE DISTANCE MEASURED FROM THE SCANNING DISC TO THE BASE OF THE HOLOGRAPHIC SCANNER, ASSIGNED THE SYMBOLIC NOTATION "d"

(25) THE FOCAL LENGTH OF THE i-TH HOLOGRAPHIC SCANNING FACET FROM THE SCANNING FACET TO THE CORRESPONDING FOCAL PLANE WITHIN THE SCANNING VOLUME, ASSIGNED THE SYMBOLIC NOTATION "$f_i$"

(26) INCIDENT BEAM ANGLE, ASSIGNED THE SYMBOLIC NOTATION "$A_i$"

FIG. 8B2

(27) DIFFRACTED BEAM ANGLE, ASSIGNED THE SYMBOLIC NOTATION "$B_i$"

(28) THE ANGLE OF THE J-TH LASER BEAM MEASURED FROM THE VERTICAL, ASSIGNED THE SYMBOLIC NOTATION "$\alpha$"

(29) THE SCAN ANGLE OF THE LASER BEAM, ASSIGNED THE SYMBOLIC NOTATION "$\theta_{Si}$"

(30) THE SCAN MULTIPLICATION FACTOR FOR THE i-TH HOLOGRAPHIC FACET, ASSIGNED THE SYMBOLIC NOTATION "$M_i$"

(31) THE FACET ROTATION ANGLE FOR THE i-TH HOLOGRAPHIC FACET, ASSIGNED THE SYMBOLIC NOTATION "$\theta_{ROTi}$"

(32) ADJUSTED FACET ROTATION ANGLE ACCOUNTING FOR DEADTIME, ASSIGNED THE SYMBOLIC NOTATION "$\theta'_{ROTi}$"

(33) THE LIGHT COLLECTION EFFICIENCY FACTOR FOR THE i-TH HOLOGRAPHIC FACET, NORMALIZED RELATIVE TO THE 16TH FACET, ASSIGNED THE SYMBOLIC NOTATION "$\xi_i$"

(34) THE MAXIMUM LIGHT COLLECTION AREA FOR THE i-TH HOLOGRAPHIC FACET, ASSIGNED THE SYMBOLIC NOTATION "$Area_i$"

(35) THE BEAM SPEED AT THE CENTER OF THE (i,j)-TH SCANLINE, ASSIGNED THE SYMBOLIC NOTATION "$V_{CENTER}$"

(36) THE ANGLE OF SKEW OF THE DIFFRACTED LASER BEAM AT THE CENTER OF THE i-TH HOLOGRAPHIC FACET, ASSIGNED THE SYMBOLIC NOTATION "$\phi_{SKEW}$"

(37) THE MAXIMUM BEAM SPEED OF ALL LASER BEAMS PRODUCED BY THE HOLOGRAPHIC SCANNING DISC, ASSIGNED THE SYMBOLIC NOTATION "$V_{MAX}$"

(38) THE MINIMUM BEAM SPEED OF ALL LASER BEAMS PRODUCED BY THE HOLOGRAPHIC SCANNING DISC, ASSIGNED THE SYMBOLIC NOTATION "$V_{MIN}$"

(39) THE RATIO OF THE MAXIMUM BEAM SPEED TO THE MINIMUM BEAM SPEED, ASSIGNED THE SYMBOLIC NOTATION "$V_{MAX}/V_{MIN}$"

(40) THE DEVIATION OF THE LIGHT RAYS REFLECTED OFF THE PARABOLIC LIGHT REFLECTING MIRROR BENEATH THE SCANNING DISC, FROM THE BRAGG ANGLE FOR THE FACET, ASSIGNED THE SYMBOLIC NOTATION "$\delta_e$"

FIG. 8B3

PARAMETER EQUATION USED IN THE SPREADSHEET DESIGN OF THE SCANNER (1) $\Delta x := L(1 + \cos(2\phi))$ (2) $\Delta y := L \sin(2\phi)$ (3) $\Delta y := r_0 + \Delta x$ (4) $C := \sqrt{(f+\delta)^2 + l^2 + 2(f+\delta)l\cos(B)}$ LAW OF COSINES, WHERE: $l = r_{outer} - r_{inner}$ $\beta = \alpha - \gamma = B + 2\phi - 90 - \gamma$ (5) $\alpha := B - 90 + 2\phi$ (6) $r := \alpha - \cos\left[\dfrac{(f+\delta)^2 + C^2 - l^2}{2(f+\delta)C}\right]$ (7) $\beta := \alpha - \gamma$ (8) $X := D\cos(B - \beta) + r_i$ (9) $Y := D\sin(B - \beta)$

(10) $D := \dfrac{[r_0 + L - r_i]\sin(90 + \phi)}{\sin(90 - B + \beta - \phi)}$ (LAW OF SINES)

$$(12) \quad f_i := \sqrt{a_i^2 + \left[mS_{SL} - \left[r_0 + \Delta x\right]\right]^2}$$

m IS A FACTOR THAT VARIES FROM SCAN LINE TO SCAN LINE AND IS DETERMINED BY SCAN LINE SEPARATION AND DISTANCE FROM THE ROTATIONAL AXIS OF THE DISC.

$$(13) \quad B_i := \operatorname{atan}\left[\left[\frac{mS_{SL} - \left[r_0 + \Delta x\right]}{a_i}\right]\right] + 90 - 2\phi$$

$$(14) \quad \theta_{Si} := 2\operatorname{atan}\left[\left[\frac{\frac{1}{2}\text{ScanLineLength}}{f_i}\right]\right]$$

$$(15) \quad M_i := \frac{r_0}{f_i} + \cos(\lambda_i) + \cos(B_i)$$

$$(16) \quad \theta_{roti} := \frac{\theta_{Si}}{M_i}$$

$$(17) \quad \theta'_{roti} := \theta_{roti} + \underbrace{\frac{d_{beam}}{r_0} + \frac{d_{gap}}{r_0}}_{\Theta_{dead}}$$

$$(18) \quad \xi_i := \left[\frac{f_i}{f_{16}}\right]^2 \frac{\sin[B_{16}]}{\sin(B_i)} H_i$$

$$(19) \quad \text{Area}_i := \pi\left[r_{outer}^2 + r_{inner}^2\right] \frac{\xi_i}{\sum_{i=1}^{16}[\xi_i]} \qquad i = 1,2,\ldots 16$$

FIG. 8C2

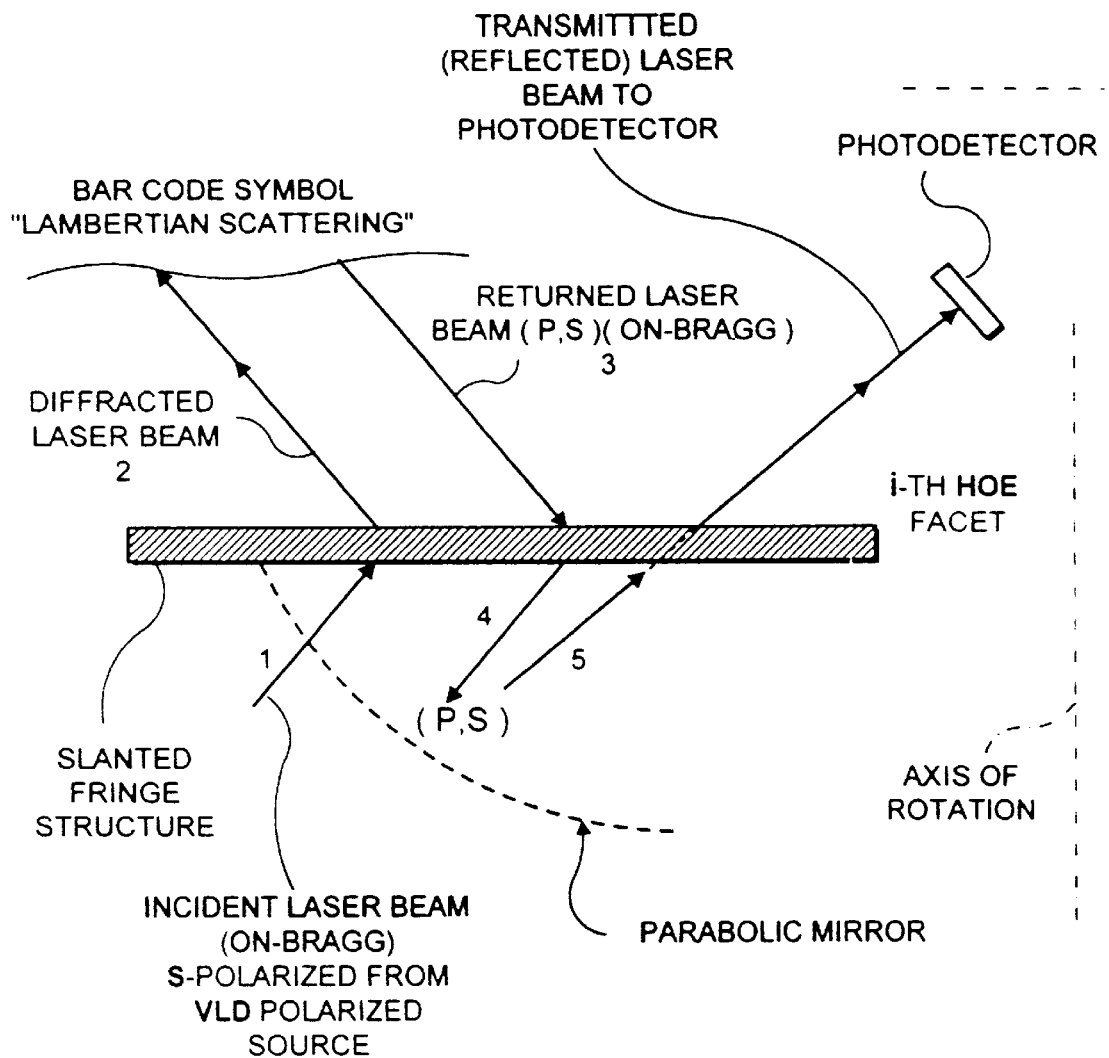
FIG. 10A1

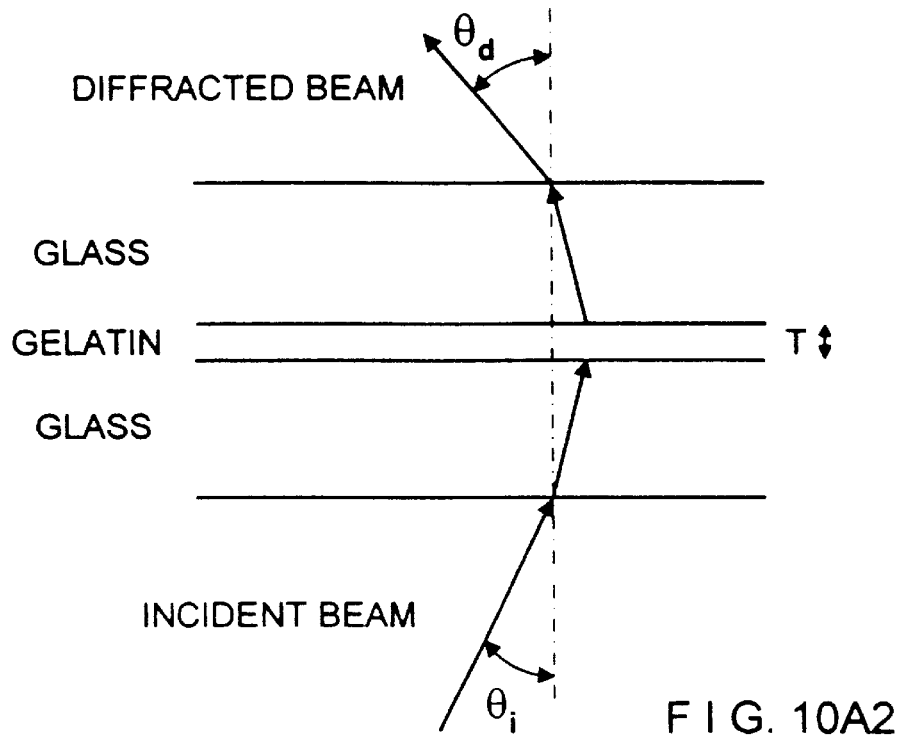
FIG. 10A2
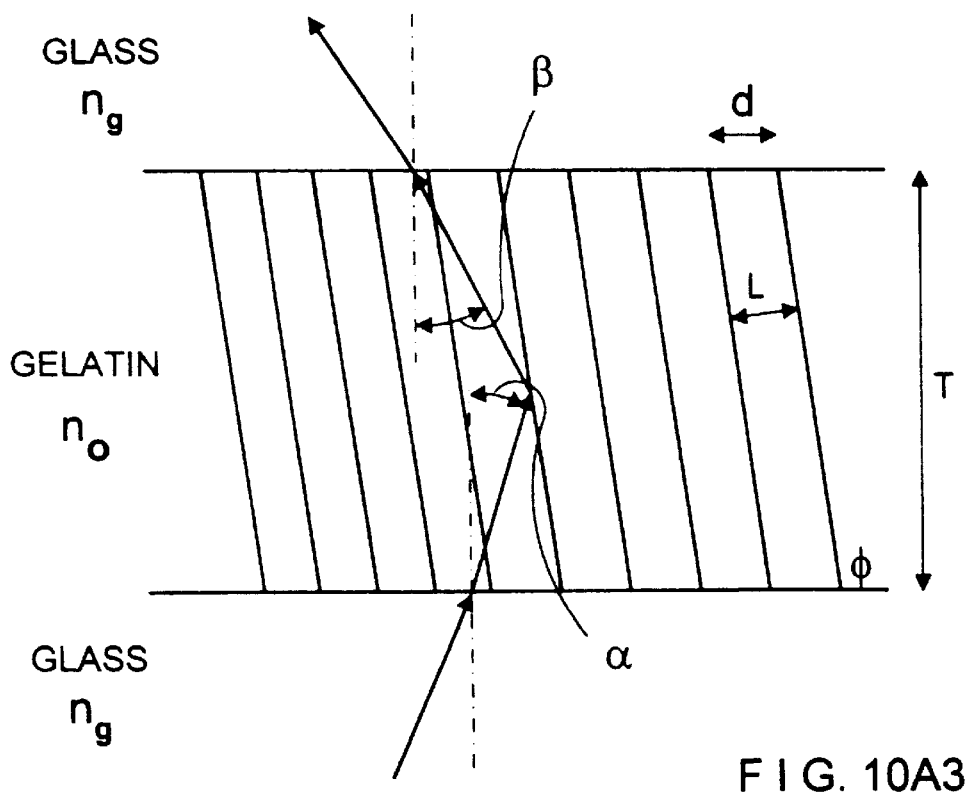
FIG. 10A3

SCANNING DISC ANALYSIS INCLUDING FRESNEL LOSSES AND
ESTIMATED INTERNAL LOSSES OF 10%. THE 10% LOSS INCLUDES
ABOUT 8% SCATTERING AND ABSORPTION AND ABOUT 2%
FRESNEL LOSSES AT THE DCG/GLASS INTERFACES

<u>S AND P POLARIZATION DIFFRACTION EFFICIENCIES FOR THE MOST GENERAL
CASE</u>

S AND P DIFFRACTION EFFICIENCIES AT THE BRAGG ANGLE AS A FUNCTION
OF n1, THE delta-n OF THE HOLOGRAPHIC MEDIUM. SLANTED FRINGES AND
EXTERNAL ANGLES ARE INCLUDED. THIS IS A GENERALIZATION OF THE MORE
COMMON CASE OF ZERO SLANT. Delta-n (n1) IS IN STEPS OF 0.001 microns.

DEFINITIONS:

$\theta_i$ = ANGLE OF INCIDENCE (EXTERNAL) ($\theta_i = 90° - A_i$)

$\alpha$ = ANGLE OF INCIDENCE (INTERNAL)

$\theta_d$ = ANGLE OF DIFFRACTION (EXTERNAL) ($\theta_d = 90° - B_i$)

$\beta$ = ANGLE OF DIFFRACTION (INTERNAL)

$\delta$ = DEVIATION FROM THE BRAGG ANGLE $\phi$ = TILT OF BRAGG PLANES

= $\pi/2$ FOR NO TILT

L = SEPARATION OF THE BRAGG PLANES

T = THICKNESS OF HOE MEDIUM d = EXTERNAL FRINGE SPACING ng = REFRACTIVE INDEX OF THE GLASS SUBSTRATE n0 = AVERAGE REFRACTIVE INDEX OF THE HOE MEDIUM $\Delta n1$ = delta-n OF HOE FRINGE STRUCTURE $\lambda_a$ = WAVELENGTH IN AIR $\delta\lambda$ = DEVIATION FROM $\lambda_a$ (BRAGG $\lambda$)

FIG. 10B

FIXED, OR ESTABLISHED PARAMETERS:
$n_0, \Delta n_1, \theta_i, \theta_d, \delta, \delta\lambda, \lambda_a, T.$ $n_0 := 1.4$  $\qquad n_g := 1.515$  $\qquad \deg = \dfrac{\pi}{180}$ $\Delta n_1 := 0, .001, ..., .2$ $\theta_i := 43 \deg$ $\theta_d := 26.6 \deg$ $\delta := 0 \deg$ $\delta_\lambda := 0$ $T := 2.2$ $\lambda_a := .670$

FIG. 10B1

$$(1) \quad \alpha := \operatorname{asin}\left[\frac{\sin[\theta_i]}{n_0}\right]$$

$$(2) \quad \beta := \operatorname{asin}\left[\frac{\sin[\theta_d]}{n_0}\right]$$

$$(3) \quad \phi := \frac{\pi}{2} - \frac{\beta - \alpha}{2}$$

$$(4) \quad d := \frac{\lambda_a}{\sin[\theta_i] + \sin[\theta_d]}$$

$\left.\right\}$ GRATING EQUATION $$(5) \quad L := d \sin(\phi)$$

$$(6) \quad C_R := \cos(\alpha)$$

$$(7) \quad C_S := \cos(\alpha) - \frac{\lambda_a}{n_0 L}\cos(\phi)$$

$$(8) \quad N[n_1] := \pi n_1 \frac{T}{\lambda_a \sqrt{C_R C_S}}$$

$$(9) \quad \Gamma := 2\pi\delta \frac{\sin(\phi - \alpha)}{L} - \delta_\lambda \frac{\pi}{n_0 L^2}$$

$$(10) \quad S[n_1] := \Gamma \frac{T}{2 C_S}$$

FIG. 10C1

DIFFRACTION EFFICIENCIES: $E_s$ AND $E_p$ (INCLUDING FRESNEL REFLECTION LOSSES AND ESTIMATED INTERNAL LOSSES OF 10%)
ASSUMING n - glass = 1.5155 AND ANGLES AS GIVEN BELOW:

$\theta_i = 43 \text{ deg}$  $\theta_d = 26.6 \text{ deg}$ $$(11) \quad E_s[n_1] := \frac{\left[\sin\left[\sqrt{N[n_1]^2 + S[n_1]^2}\right]\right]^2}{1 + \frac{S[n_1]^2}{N[n_1]^2}} t_s(1-.1)$$

$$(12) \quad E_p[n_1] := \frac{\left[\sin\left[\sqrt{[N[n_1]\cos(2(\alpha-\phi))]^2 + S[n_1]^2}\right]\right]^2}{1 + \frac{S[n_1]^2}{[N[n_1]\cos(2(\alpha-\phi))]^2}} t_p(1-.1)$$

POLARIZED INCIDENT BEAM ⟶         RETURN BEAM ⟵

$$(13) \quad T_s[n_1] := E_s[n_1] \cdot \frac{E_s[n_1] + E_p[n_1]}{2}$$

(T.s IS THE TOTAL OUT-AND-BACK DIFFRACTION EFFICIENCY FOR AN S-POLARIZED OUTGOING BEAM INCIDENT ON THE DISC. INCLUDES FRESNEL REFLECTION LOSSES AND INTERNAL LOSSES OF 10%)

$$(14) \quad H_i(\Delta n) := \frac{T_{s16}(\Delta n)}{T_{s1}(\Delta n)}$$

FIG. 10C2

PARAMETERS FOR CALCULATING THE FRESNEL REFLECTION LOSSES AND TRANSMISSION $$(15)\quad \theta_{r.1} := \operatorname{asin}\left[\frac{\sin[\theta_i]}{n_g}\right]$$

$$(16)\quad \theta_{r.2} := \operatorname{asin}\left[\frac{\sin[\theta_d]}{n_g}\right]$$

$$(17)\quad R_{S.1} := \left[\frac{\sin[\theta_i - \theta_{r.1}]}{\sin[\theta_i + \theta_{r.1}]}\right]^2 \quad \text{S-POLARIZATION REFLECTION AT FIRST (ENTRY) SURFACE OF DISC}$$

$$(18)\quad R_{S.2} := \left[\frac{\sin[\theta_d - \theta_{r.2}]}{\sin[\theta_d + \theta_{r.2}]}\right]^2 \quad \text{S-POLARIZATION REFLECTION AT SECOND (EXIT) SURFACE OF DISC}$$

$$(19)\quad R_{P.1} := \left[\frac{\tan[\theta_i - \theta_{r.1}]}{\tan[\theta_i + \theta_{r.1}]}\right]^2 \quad \text{P-POLARIZATION REFLECTION AT FIRST (ENTRY) SURFACE OF DISC}$$

$$(20)\quad R_{P.2} := \left[\frac{\tan[\theta_d - \theta_{r.2}]}{\tan[\theta_d + \theta_{r.2}]}\right]^2 \quad \text{P-POLARIZATION REFLECTION AT SECOND (EXIT) SURFACE OF DISC}$$

BOTH SURFACES

$$(21)\quad t_s := [1 - R_{S.1}] \cdot [1 - R_{S.2}] \quad \text{S-POLARIZED FRESNEL TRANSMISSION}$$

$$(22)\quad t_p := [1 - R_{P.1}] \cdot [1 - R_{P.2}] \quad \text{P-POLARIZED FRESNEL TRANSMISSION}$$

FIG. 10D

FACET No. 1

DIFFRACTION EFFICIENCIES: $E_S$, $E_P$, $T_S$ - INCLUDING FRESNEL REFLECTION LOSSES AND ESTIMATED INTERNAL LOSSES OF 10%. (ASSUMING n GLASS = 1.515 AND ANGLES ARE AS GIVEN BELOW )

$\theta_i = 43$ deg $\qquad \theta_d = 26.6$ deg $\qquad n_0 = 1.4$ $T = 2.2$ microns $\qquad \lambda_a = 0.67$

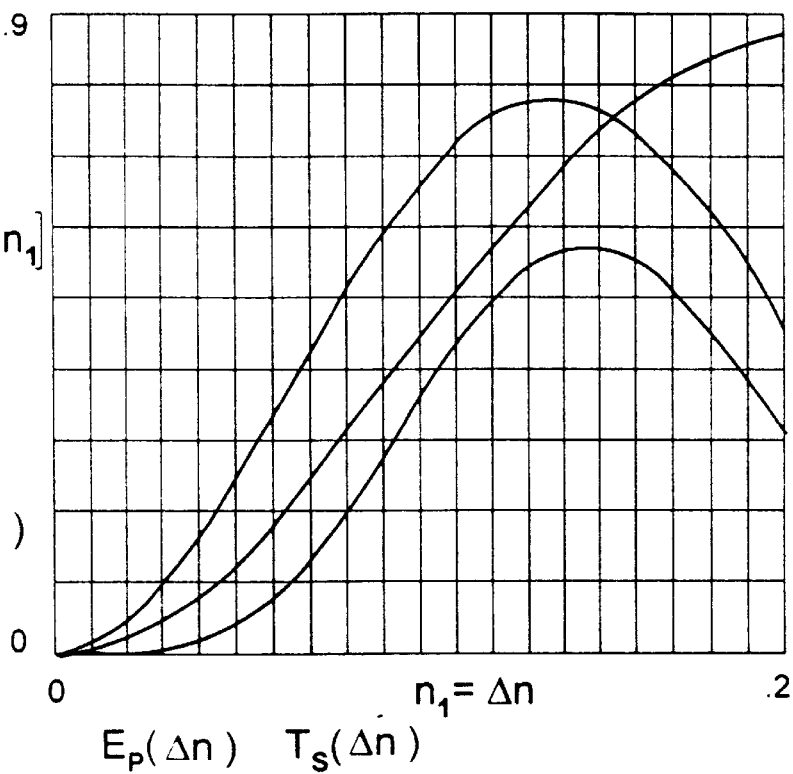

FOR: $n_1 := .146$ $E_S[n_1] = 0.769 \qquad E_P[n_1] = 0.694 \qquad T_S[n_1] = 0.562$ $H_1 := \dfrac{0.474}{T_S[n_1]} \qquad H_1 = 0.843$ H.1 IS THE OUT-AND-BACK DIFFRACTION EFFICIENCY OF FACET 1 RELATIVE TO THE OUT-AND-BACK DIFFRACTION EFFICIENCY OF FACET 16

FIG. 10E1

DIFFRACTION EFFICIENCIES: $E_S$, $E_P$, $T_S$ - INCLUDING FRESNEL REFLECTION LOSSES AND ESTIMATED INTERNAL LOSSES OF 10%. (ASSUMING n GLASS = 1.515 AND ANGLES ARE AS GIVEN BELOW)

$\theta_i = 43$ deg $\qquad \theta_d = 41.8$ deg $\qquad n_0 = 1.4$ $T = 2.2$ microns $\qquad \lambda_a = 0.67$

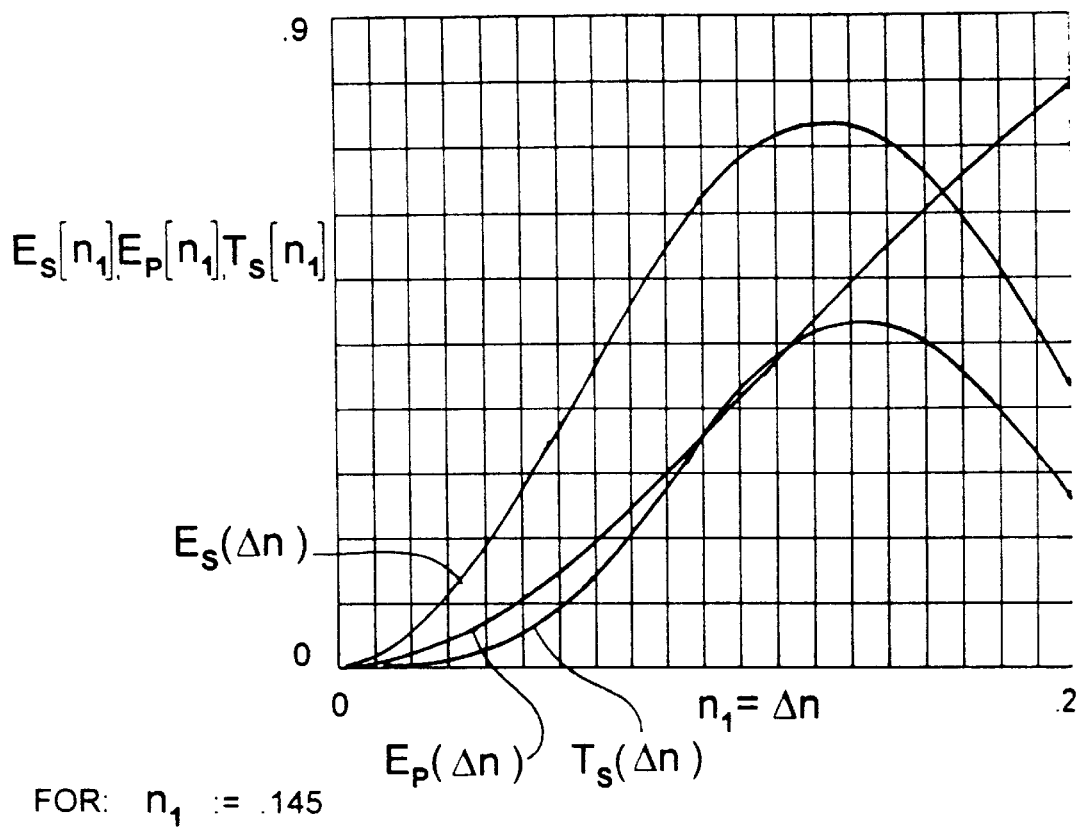

FOR: $n_1 := .145$ $E_S[n_1] = 0.736 \qquad E_P[n_1] = 0.552 \qquad T_S[n_1] = 0.474$ $H_{16} := \dfrac{0.474}{T_S[n_1]} \qquad H_{16} = 1$ H.16 IS THE OUT-AND-BACK DIFFRACTION EFFICIENCY OF FACET 16 RELATIVE TO THE OUT-AND-BACK DIFFRACTION EFFICIENCY OF FACET 1

FIG. 10E2

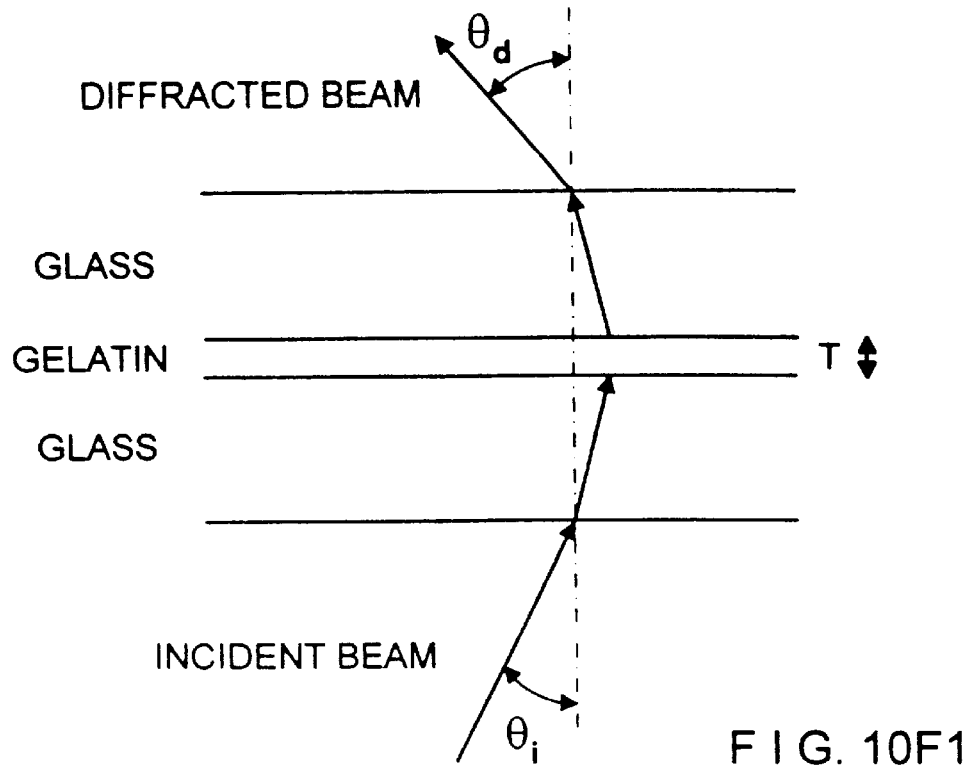
FIG. 10F1
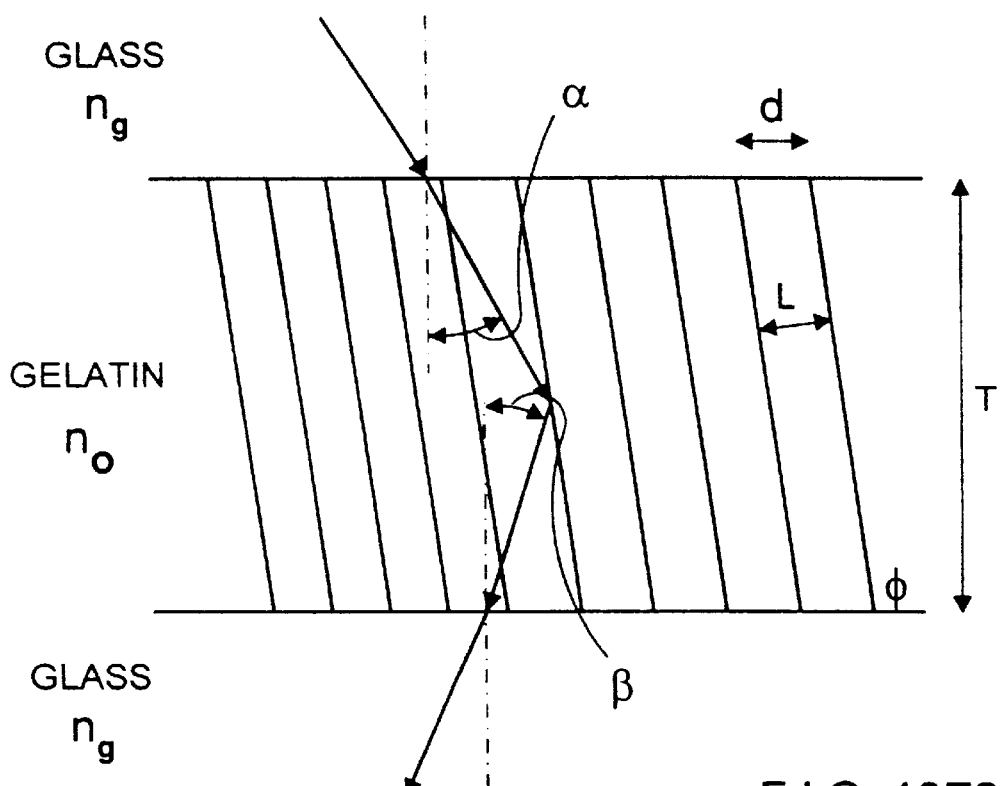
FIG. 10F2

SCANNING DISC ANALYSIS INCLUDING FRESNEL LOSSES AND
ESTIMATED INTERNAL LOSSES OF 10% .THE 10% LOSS INCLUDES
ABOUT 8% SCATTERING AND ABSORPTION AND ABOUT 2%
FRESNEL LOSSES AT THE DCG/GLASS INTERFACES

<u>S AND P POLARIZATION DIFFRACTION EFFICIENCIES FOR MOST GENERAL CASE</u>

S AND P DIFFRACTION EFFICIENCIES AT THE BRAGG ANGLE AS A FUNCTION OF nl AND delta-n OF THE HOLOGRAPHIC MEDIUM. SLANTED FRINGES AND EXTERNAL ANGLES ARE INCLUDED. THIS IS A GENERALIZATION OF THE MORE COMMON CASE OF ZERO SLANT. Delta-n (nl) IS IN STEPS OF 0.001 microns.

DEFINITIONS:

$\theta_i$ = ANGLE OF INCIDENCE (EXTERNAL) ($\theta_i$ = 90° − $A_i$)

$\alpha$ = ANGLE OF INCIDENCE (INTERNAL)

$\theta_d$ = ANGLE OF DIFFRACTION (EXTERNAL) ($\theta_d$ = 90° − $B_i$)

$\beta$ = ANGLE OF DIFFRACTION (INTERNAL)

$\delta$ = DEVIATION FROM THE BRAGG ANGLE $\phi$ = TILT OF BRAGG PLANES

= $\pi/2$ FOR NO TILT

L = SEPARATION OF THE BRAGG PLANES

T = THICKNESS OF HOE MEDIUM d = EXTERNAL FRINGE SPACING ng = REFRACTIVE INDEX OF THE GLASS SUBSTRATE n0 = AVERAGE REFRACTIVE INDEX OF THE HOE MEDIUM n1 = delta-n OF HOE FRINGE STRUCTURE $\lambda_a$ = WAVELENGTH IN AIR $\delta\lambda$ = DEVIATION FROM $\lambda_a$ ( BRAGG $\lambda$ )

F I G. 10G

FIXED, OR ESTABLISHED PARAMETERS: $n_0, \Delta n_1, \theta_i, \delta, \delta\lambda, \lambda_a, T$.

$n_0 := 1.4$ $\qquad n_g := 1.515$ $\qquad deg = \dfrac{\pi}{180}$ $\Delta n_1 := 0, .001, ... 2$ $\theta_i := 43$ deg $\theta_d := 26.6$ deg $\delta := 0$ deg $\delta_\lambda := 0$ $T := 2.2$ $\lambda_a := .670$

FIG. 10G1

(1) $\alpha := \operatorname{asin}\left[\dfrac{\sin[\theta_i]}{n_0}\right]$ (2) $\beta := \operatorname{asin}\left[\dfrac{\sin[\theta_d]}{n_0}\right]$

} INTERNAL ANGLES DERIVED FROM SNELL'S LAW AT INTERFACIAL SURFACES (3) $\phi := \dfrac{\pi}{2} - \dfrac{\beta - \alpha}{2}$ (4) $d := \dfrac{\lambda_a}{\sin[\theta_i] + \sin[\theta_d]}$ (5) $L := d \sin(\phi)$

} GRATING EQUATION (6) $C_R := \cos(\alpha)$ (7) $C_S := \cos(\alpha) - \dfrac{\lambda_a}{n_0 L}\cos(\phi)$ (8) $N[n_1] := \pi n_1 \dfrac{T}{\lambda_a \sqrt{C_R C_S}}$ (9) $\Gamma := 2\pi\delta\, \dfrac{\sin(\phi - \alpha)}{L} - \delta_\lambda \dfrac{\pi}{n_0 L^2}$

(10) $S[n_1] := \Gamma \dfrac{T}{2 C_S}$

} FROM "WAVE COUPLING THEORY"

F I G. 10H1

DIFFRACTION EFFICIENCIES: $E_s$ AND $E_p$ INCLUDING FRESNEL REFLECTION LOSSES AND ESTIMATED INTERNAL LOSSES OF 10% (ASSUMING n - glass = 1.515 AND ANGLES AS GIVEN BELOW)

$$\theta_i = 43 \text{ deg} \qquad \theta_d = 26.6 \text{ deg}$$

$$(11) \quad E_s[n_1] := \frac{\left[\sin\left[\sqrt{N[n_1]^2 + S[n_1]^2}\right]\right]^2}{1 + \frac{S[n_1]^2}{N[n_1]^2}} t_s(1-.1)$$

$$(12) \quad E_p[n_1] :=$$

$$= \frac{\left[\sin\left[\sqrt{[N[n_1]\cos(2(\alpha-\phi))]^2 + S[n_1]^2}\right]\right]^2}{1 + \frac{S[n_1]^2}{[N[n_1]\cos(2(\alpha-\phi))]^2}} t_p(1-.1)$$

$$(13) \quad E_t[n_1] := E_s[n_1] \cdot [E_p[n_1]]$$

($E.t$ IS THE TOTAL OUT-AND-BACK DIFFRACTION EFFICIENCY, ASSUMING THAT A CROSSED POLARIZER IS USED ON THE DETECTOR. IN THIS CASE, THE TOTAL EFFICIENCY IS JUST THE PRODUCT OF THE OUTGOING EFFICIENCY FOR THE INCIDENT P ( OR S ) POLARIZATION AND THE RETURN EFFICIENCY FOR THE ORTHOGONAL S ( OR P ) POLARIZATION. INCLUDES FRESNEL - REFLECTION LOSSES AND ESTIMATED INTERNAL LOSSES OF 10% )

$$\Delta n = n_1$$
$$(14) \quad H_i(\Delta n) := \frac{E_{t1}(\Delta n)}{E_{t16}(\Delta n)}$$

FIG. 10H2

PARAMETERS FOR CALCULATING THE FRESNEL REFLECTION LOSSES AND TRANSMISSION $$\theta_{r.1} := \operatorname{asin}\left[\frac{\sin[\theta_i]}{n_g}\right]$$

$$\theta_{r.2} := \operatorname{asin}\left[\frac{\sin[\theta_d]}{n_g}\right]$$

$$R_{S.1} := \left[\frac{\sin[\theta_i - \theta_{r.1}]}{\sin[\theta_i + \theta_{r.1}]}\right]^2 \quad \begin{array}{l}\text{S-POLARIZATION}\\\text{REFLECTION}\\\text{AT FIRST (ENTRY)}\\\text{SURFACE OF DISC}\end{array}$$

$$R_{S.2} := \left[\frac{\sin[\theta_d - \theta_{r.2}]}{\sin[\theta_d + \theta_{r.2}]}\right]^2 \quad \begin{array}{l}\text{S-POLARIZATION}\\\text{REFLECTION}\\\text{AT SECOND (EXIT)}\\\text{SURFACE OF DISC}\end{array}$$

$$R_{P.1} := \left[\frac{\tan[\theta_i - \theta_{r.1}]}{\tan[\theta_i + \theta_{r.1}]}\right]^2 \quad \begin{array}{l}\text{P-POLARIZATION}\\\text{REFLECTION}\\\text{AT FIRST (ENTRY)}\\\text{SURFACE OF DISC}\end{array}$$

$$R_{P.2} := \left[\frac{\tan[\theta_d - \theta_{r.2}]}{\tan[\theta_d + \theta_{r.2}]}\right]^2 \quad \begin{array}{l}\text{P-POLARIZATION}\\\text{REFLECTION}\\\text{AT SECOND (EXIT)}\\\text{SURFACE OF DISC}\end{array}$$

BOTH SURFACES

$$t_s := [1 - R_{S.1}] \cdot [1 - R_{S.2}] \quad \begin{array}{l}\text{S-POLARIZED}\\\text{FRESNEL TRANSMISSION}\end{array}$$

$$t_p := [1 - R_{P.1}] \cdot [1 - R_{P.2}] \quad \begin{array}{l}\text{P-POLARIZED}\\\text{FRESNEL TRANSMISSION}\end{array}$$

FIG. 10H3

DIFFRACTION EFFICIENCIES: $E_s$, $E_p$, $E_t$ - INCLUDING FRESNEL REFLECTION LOSSES AND ESTIMATED INTERNAL LOSSES OF 10%. (ASSUMING n GLASS = 1.515 AND ANGLES ARE AS GIVEN BELOW)

$\theta_i = 43$ deg $\quad n_0 = 1.4 \quad \theta_d = 26.6$ deg $T = 2.2$ microns $\quad \lambda_a = 0.67$

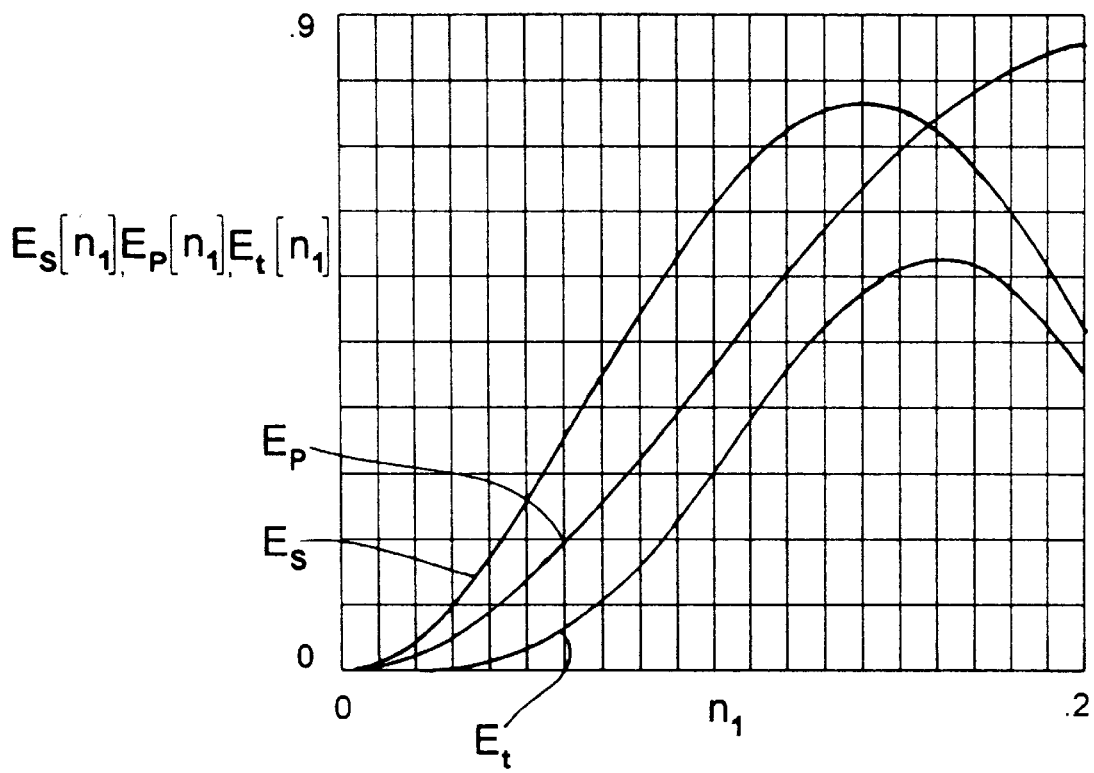

FOR: $n_1 := .16$ $E_s[n_1] = 0.72915 \quad E_p[n_1] = 0.76037 \quad E_t[n_1] = 0.55442$ $H_1 := \dfrac{0.42745}{E_t[n_1]} \quad H_1 := 0.77098$ H.1 IS THE OUT-AND-BACK DIFFRACTION EFFICIENCY OF FACET 1 RELATIVE TO THE OUT-AND-BACK DIFFRACTION EFFICIENCY OF FACET 16

F I G. 10I1

FACET No. 16

DIFFRACTION EFFICIENCIES: $E_s$, $E_p$, $E_t$ - INCLUDING FRESNEL REFLECTION LOSSES AND ESTIMATED INTERNAL LOSSES OF 10%. (ASSUMING n GLASS = 1.515 AND ANGLES ARE AS GIVEN BELOW)

$\theta_i$ = 43 deg $\qquad \theta_d$ = 41.8 deg $\qquad n_0$ = 1.4

T = 2.2 microns $\qquad \lambda_a$ = 0.67

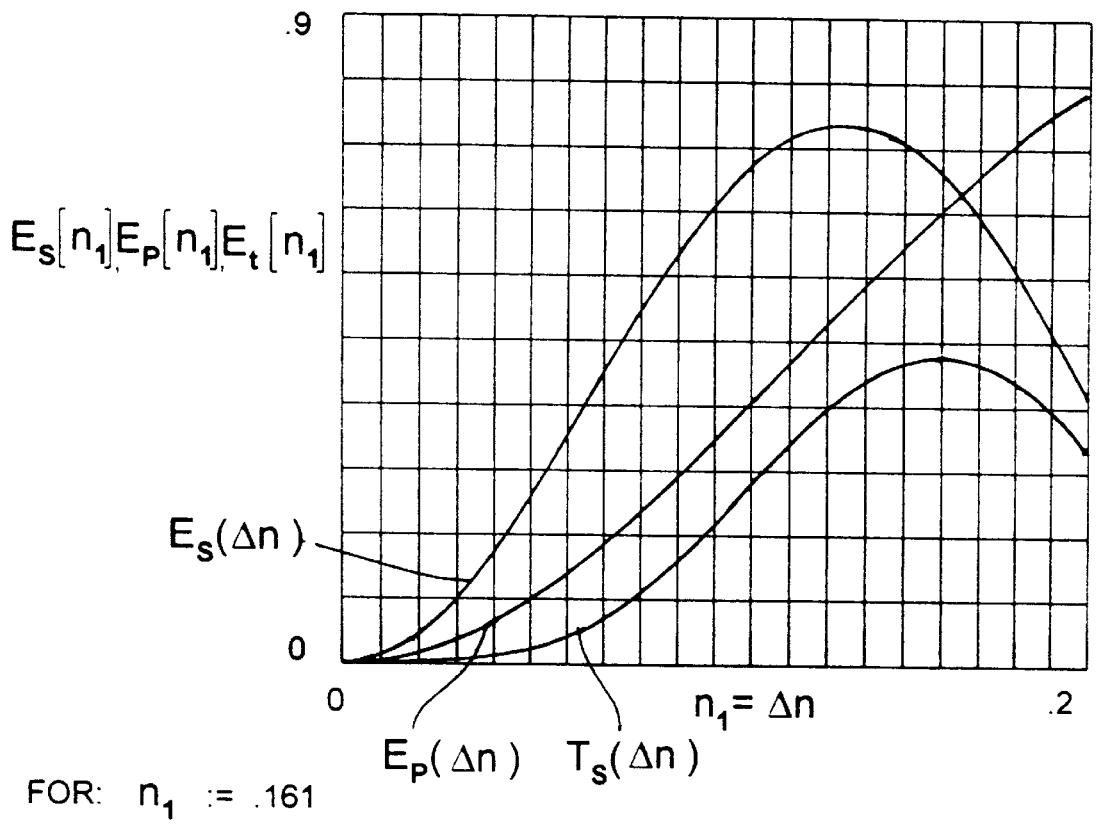

FOR: $n_1 := .161$ $E_s[n_1] = 0.67386 \qquad E_p[n_1] = 0.63433 \qquad E_t[n_1] = 0.42745$ $$H_{16} := \frac{E_t[n_1]}{0.42745} \qquad H_{16} = 1$$

H.16 IS THE OUT-AND-BACK DIFFRACTION EFFICIENCY OF FACET 16 RELATIVE TO THE OUT-AND-BACK DIFFRACTION EFFICIENCY OF FACET 16

FIG. 10I2

FACET LIGHT COLLECTION EFFICIENCY

Z = DISTANCE FROM SCAN POINT ON LABEL ( MAX = FOCAL) LENGTH PLUS 5 INCHES )

A = AREA OF CORRESPONDING FACET

R = RADIUS OF EFFECTIVE CIRCULAR APERTURE

R.pr = RADIUS OF PROJECTED EFFECTIVE CIRCULAR APERTURE

B = ANGLE BETWEEN OUTGOING BEAM AND THE DISC SURFACE $\delta$ = HALF-ANGLE SUBTENDED BY EFFECTIVE PROJECTED CIRCULAR APERTURE

E.L = LAMBERTIAN LIGHT COLLECTION EFFICIENCY

FIG. 10K $$R_{pr} := \sqrt{\frac{A \sin B}{\pi}} \qquad \delta := \operatorname{atan}\left[\frac{R_{pr}}{Z}\right]$$

$$E_L := (\sin(\delta))^2$$

FIG. 10L1

FOR FACET 16 :

$Z := 70$ inches $\qquad \deg = \dfrac{\pi}{180}$ $A := 4.7$ square inches $B := 48.2$ deg $\qquad E_L := 0.00022756$

FIG. 10L

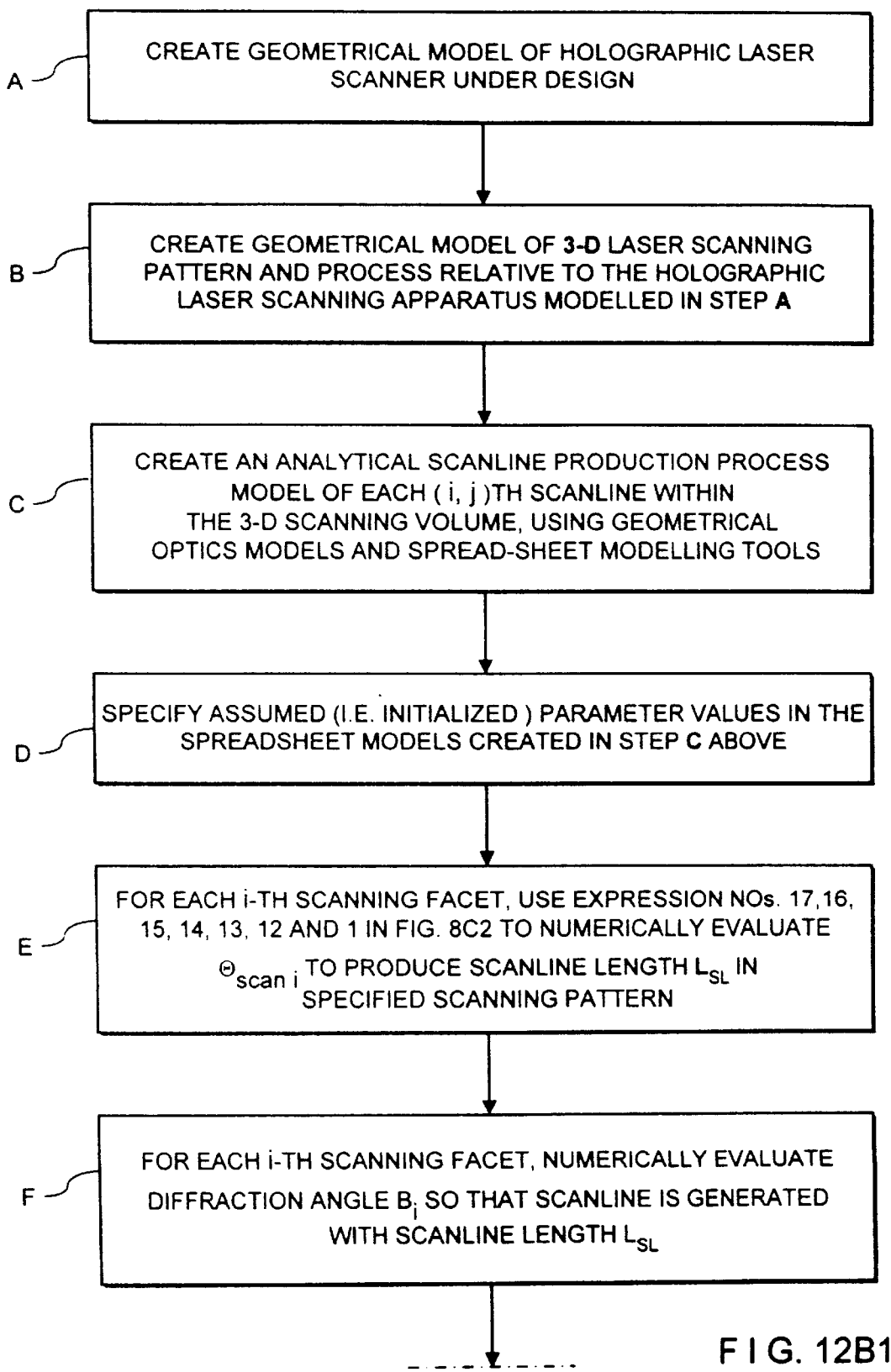
FIG. 12B1

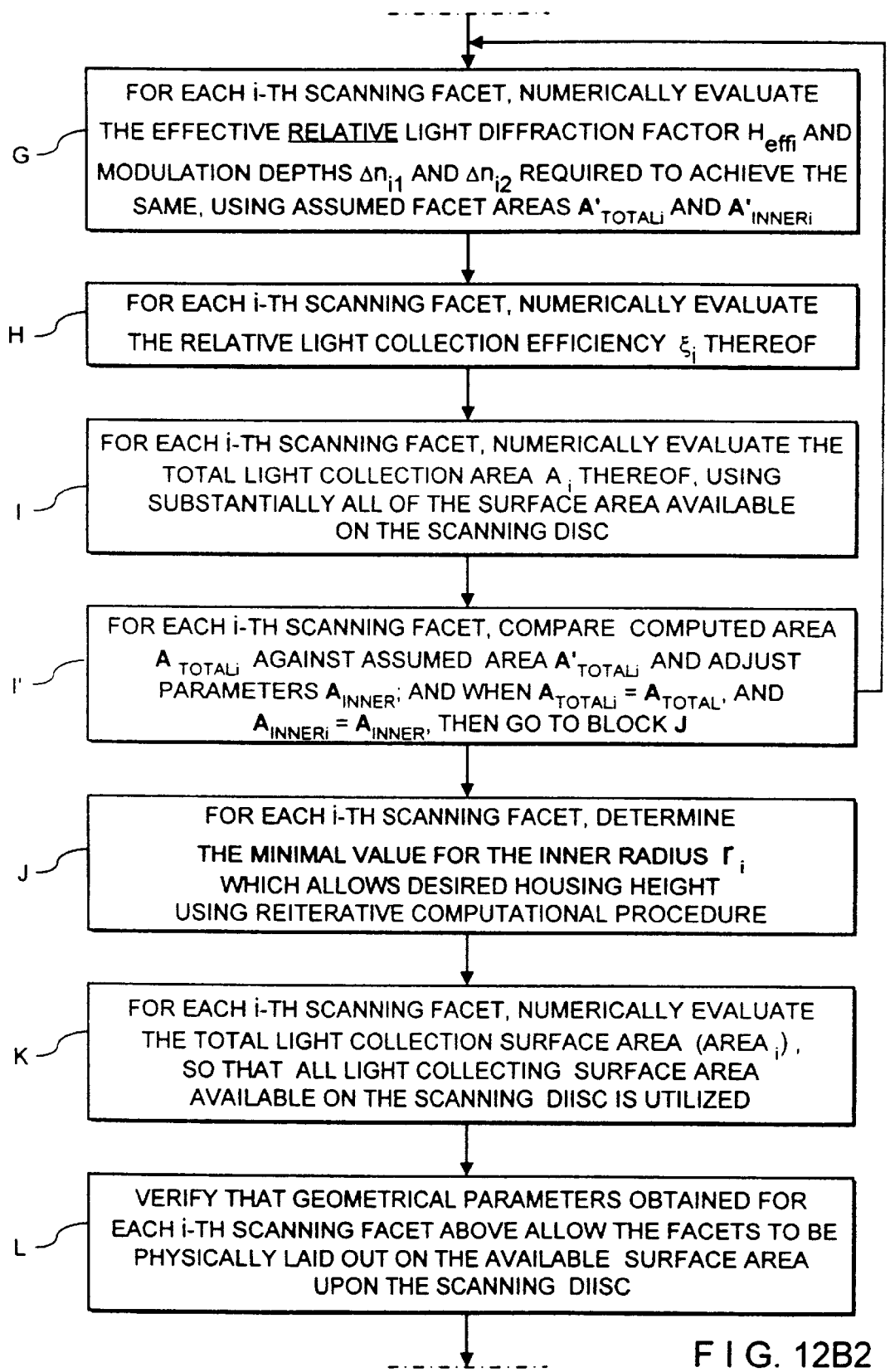
FIG. 12B2

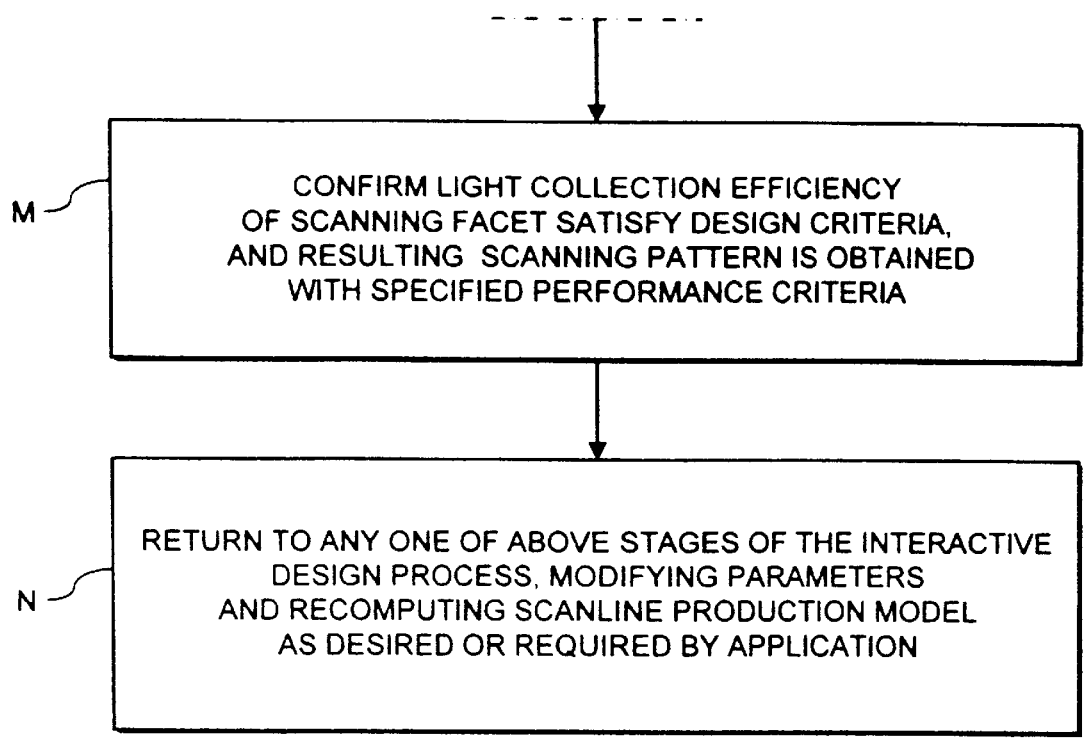
FIG. 12B3

$$H_1 := \frac{\dfrac{E_{S.o.16}}{A_{T.16}}\left[E_{P.o.16}A_{o.16} + E_{P.i.16}A_{i.16}\right]}{\dfrac{E_{S.o.1}}{A_{T.1}}\left[E_{P.o.1}A_{o.1} + E_{P.i.1}A_{i.1}\right]}$$

WHERE:

E.S.o.16 = S-POLARIZATION EFFICIENCY OF THE OUTER SEGMENT OF FACET 16

E.S.o.1 = S-POLARIZATION EFFICIENCY OF THE OUTER SEGMENT OF FACET 1

E.P.o.16 = P-POLARIZATION EFFICIENCY OF THE OUTER SEGMENT OF FACET 16

E.P.o.1 = P-POLARIZATION EFFICIENCY OF THE OUTER SEGMENT OF FACET 1

E.P.i.16 = P-POLARIZATION EFFICIENCY OF THE INNER SEGMENT OF FACET 16

E.P.i.1 = P-POLARIZATION EFFICIENCY OF THE INNER SEGMENT OF FACET 1

A.T.16 = TOTAL AREA OF FACET 16

A.T.1 = TOTAL AREA OF FACET 1

A.o.16 = OUTER AREA OF FACET 16

A.o.1 = OUTER AREA OF FACET 1

A.i.16 = OUTER AREA OF FACET 16

A.i.1 = OUTER AREA OF FACET 1

FIG. 12C

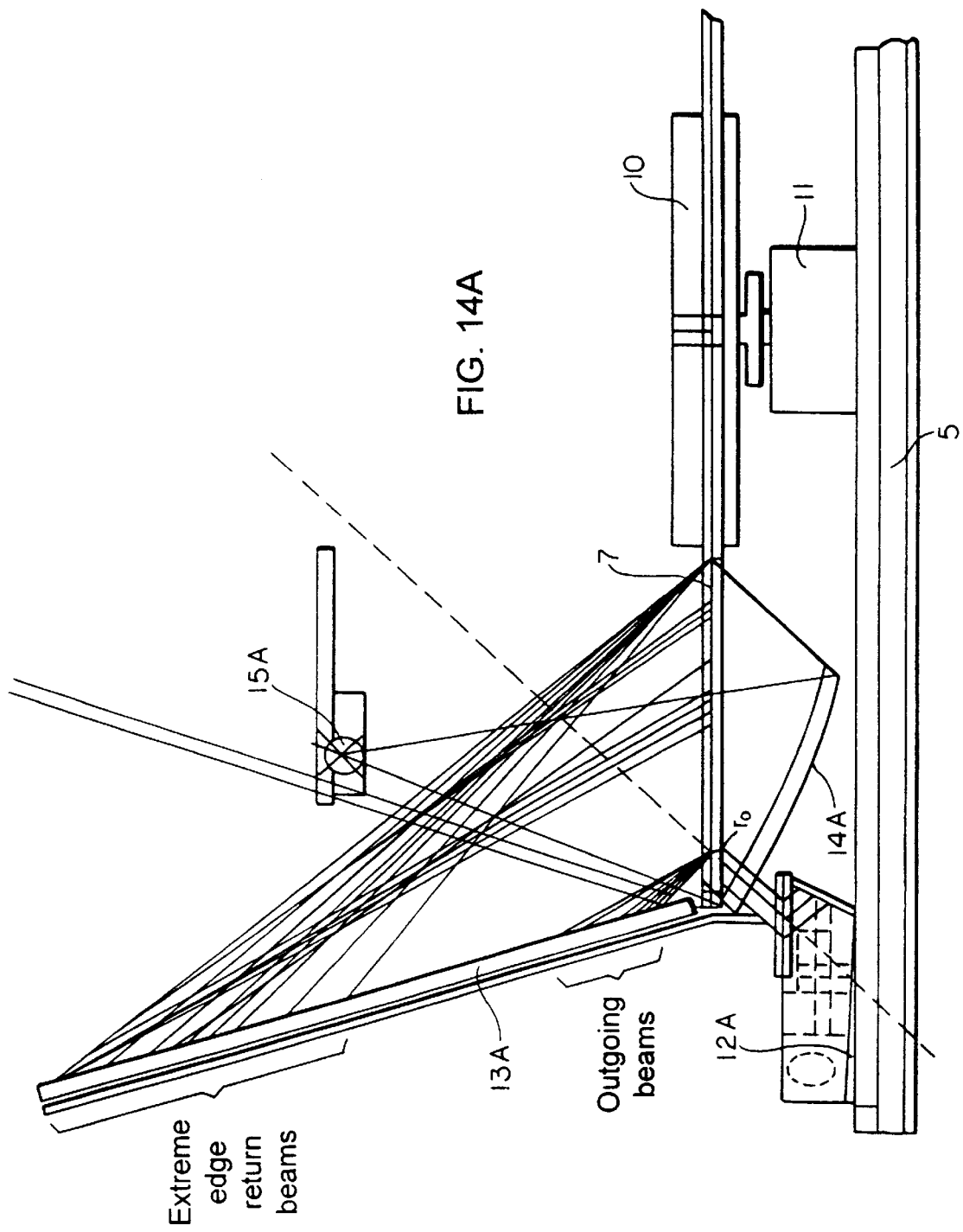

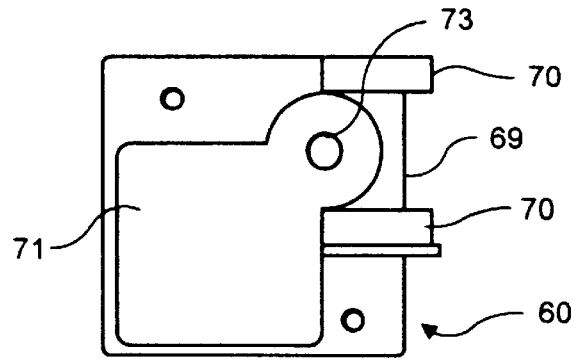
F I G. 15B
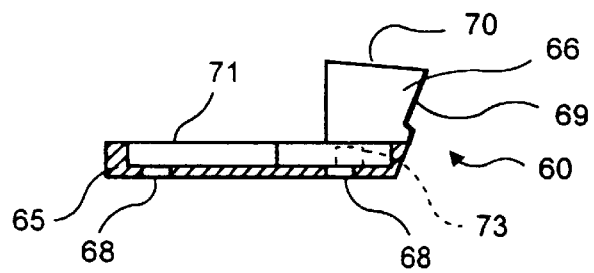
F I G. 15C
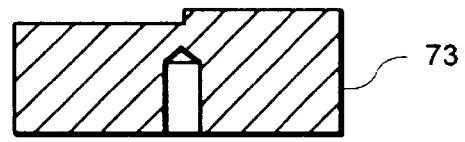
F I G. 15D1
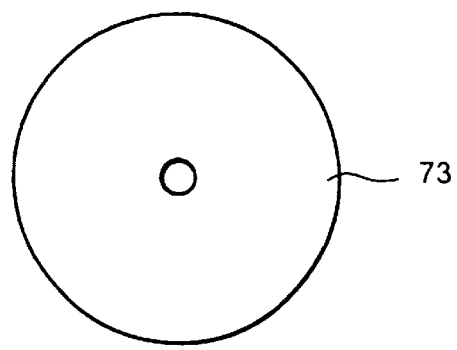
F I G. 15D2

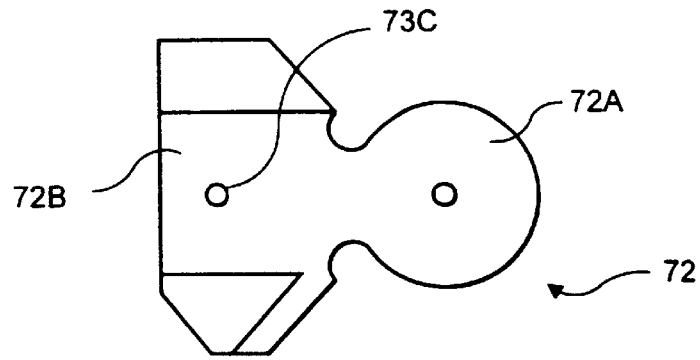
FIG. 15E1
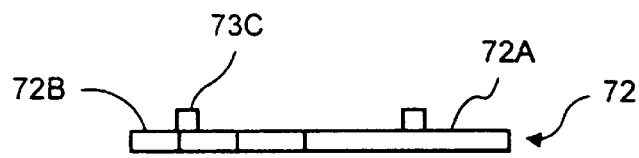
FIG. 15E2
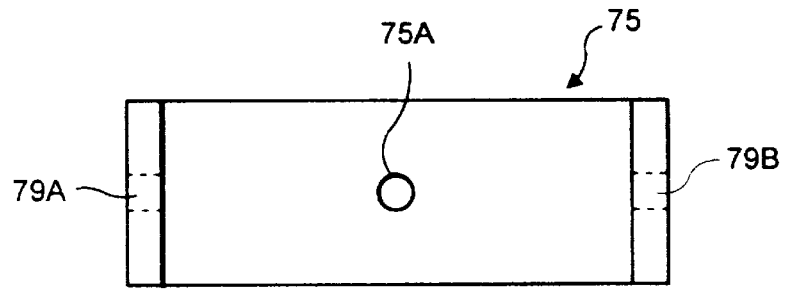
FIG. 15F1
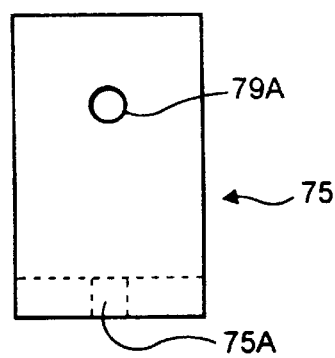
FIG. 15F2

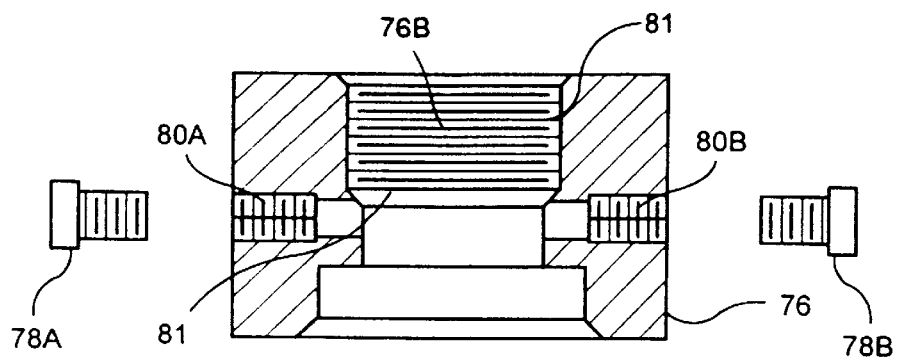
FIG. 15G1
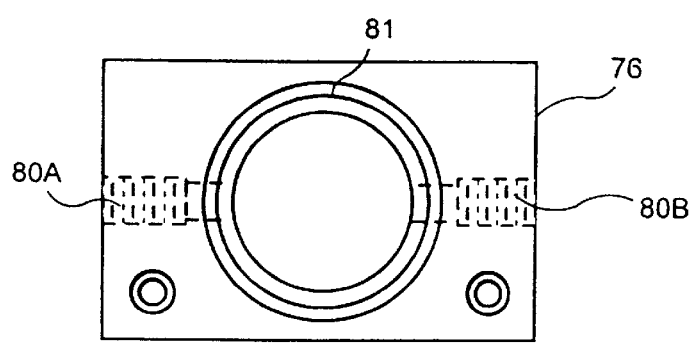
FIG. 15G2
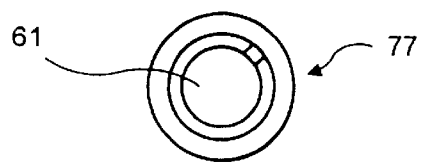
FIG. 15H1
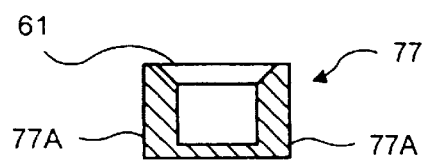
FIG. 15H2

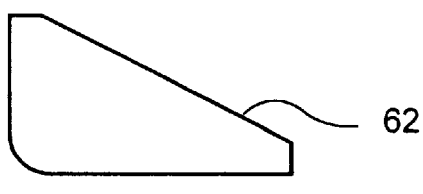
F I G. 15I1
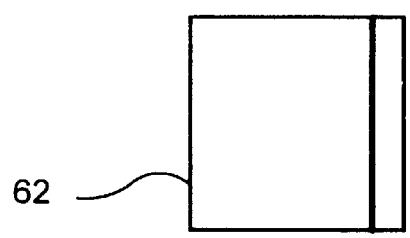
F I G. 15I2
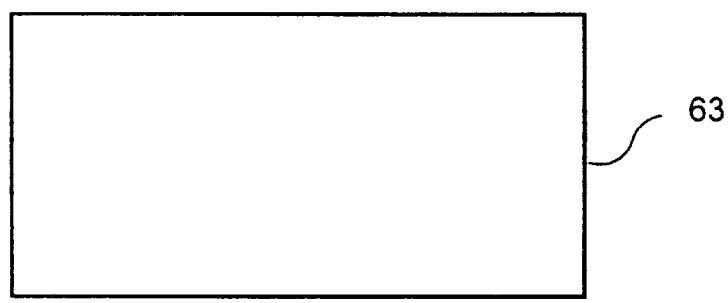
F I G. 15J
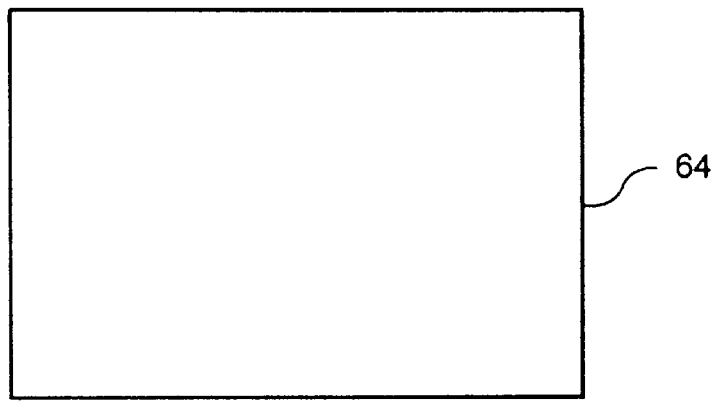
F I G. 15K θ.i.2 = ANGLE OF INCIDENCE AT HOLOGRAPHIC FACET θ.d.c.2 = CONSTRUCTION ANGLE OF DIFFRACTION FOR HOLOGRAPHIC FACET θ.d.2 = ANGLE OF DIFFRACTION OF HOLOGRAPHIC FACET

λ = WAVELENGTH (IN AIR)

λ.c = CONSTRUCTION WAVELENGTH FOR HOLOGRAPHIC FACET d.2 = GRATING SPACING IN HOLOGRAPHIC FACET

F I G. 17B $$\text{deg} := \frac{\pi}{180}$$

$$\lambda_c := .670 \text{ microns} \qquad \lambda := .650, .651, ..., .690 \text{ microns}$$

$$\theta_{i.2} := 43 \text{ deg} \qquad \theta_{d.c.2} := 37 \text{ deg}$$

F I G. 17B1

$$d_2 := \frac{\lambda_c}{\sin[\theta_{i.2}] + \sin[\theta_{d.c.2}]} \text{ microns} \qquad d_2 = 0.52188$$

$$\theta_{d.2}(\lambda) := \operatorname{asin}\left[\left[\frac{\lambda}{d_2}\right] - \sin[\theta_{i.2}]\right]$$

F I G. 17C

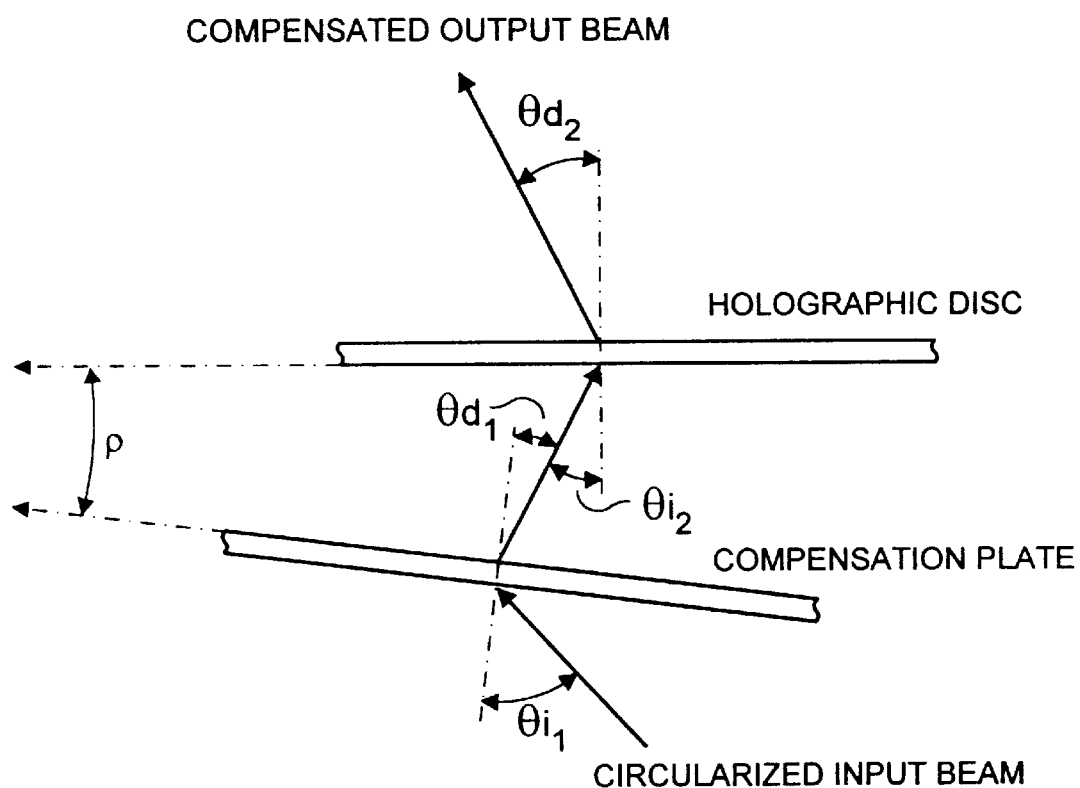
F I G. 18A

COMPENSATION PLATE ADDED - WITH TILT ANGLE.
TILT ANGLE RELATIVE TO HOLOGRAPHIC FACET - ρ

$\theta.i.1$ = ANGLE OF INCIDENCE FOR COMPENSATION PLATE ( FIXED )

$\theta.d.c.1$ = CONSTRUCTION ANGLE OF DIFFRACTION OF COMPENSATION PLATE $\theta.d.1$ = ANGLE OF DIFFRACTION OF COMPENSATION PLATE $\lambda$ = WAVELENGTH ( IN AIR )

$\lambda.c$ = CONSTRUCTION WAVELENGTH $d.1$ = GRATING SPACING IN COMPENSATION PLATE $\rho$ = TILT ANGLE OF COMPENSATION PLATE RELATIVE TO HOLOGRAPHIC FACET

FIG. 18B $\theta_{i.1} := 41.5$ deg          $\rho := -1.5$ deg $d_1 = 0.50557$ deg          $\theta_{d.c.1} = 41.5$ deg $\theta_{d.c.2} := 37$ deg

FIG. 18B1

$$\theta_{d.c.1} = \theta_{i.2} + \rho$$

(1) $\quad d_1 := \dfrac{\lambda_c}{\sin[\theta_{i.1}] + \sin[\theta_{d.c.1}]}$ microns (2) $\quad \theta_{d.1}(\lambda) := \text{asin}\left[\left[\dfrac{\lambda}{d_1}\right] - \sin[\theta_{i.1}]\right]$ (3) $\quad \theta_{d.2}(\lambda) :=$ $= \text{asin}\left[\dfrac{\lambda}{d_2} - \sin\left[\text{asin}\left[\dfrac{\lambda}{d_1} - \sin[\theta_{i.1}]\right] - \rho\right]\right]$

FIG. 18C

CHANGE IN CONSTRUCTION BEAM ANGLES FOR A CHANGE IN WAVELENGTH BETWEEN CONSTRUCTION AND RECONSTRUCTION. THIS PROGRAM CALCULATES THE EXTERNAL ANGLE OF INCIDENCE AND EXTERNAL ANGLE OF DIFFRACTION FOR THE CONSTRUCTION WAVELENGTH WHEN THE EXTERNAL ANGLE OF INCIDENCE AND EXTERNAL ANGLE OF DIFFRACTION ARE GIVEN FOR THE RECONSTRUCTION WAVELENGTH. BRAGG CONDITION IS MAINTAINED IN BOTH CASES SO THAT THE BRAGG PLANE TILT IS UNCHANGED.

$$deg = \frac{\pi}{180}$$

$n_0 := 1.53$      AVERAGE REFRACTIVE INDEX OF THE MEDIUM BEFORE PROCESSING $n_2 := 1.4$      AVERAGE REFRACTIVE INDEX OF THE MEDIUM AFTER PROCESSING $\lambda_1 := 0.670$      RECONSTRUCTION WAVELENGTH (VISIBLE LASER DIODE)

$\lambda_2 := 0.488$      CONSTRUCTION WAVELENGTH (ARGON LASER)

$\theta_{i.1} := 41.5 \text{ deg}$      ANGLE OF INCIDENCE AT RECONSTRUCTION $\theta_{d.1} := 41.5 \text{ deg}$      ANGLE OF DIFFRACTION AT RECONSTRUCTION

FIG. 19C

HOE CONSTRUCTION ANGLES AT SECOND WAVELENGTH

REFERENCE BEAM      OBJECT BEAM $\theta_e = \theta_{i.2} = 28.857 \text{ deg}$      $\theta_o = \theta_{d.2} = 28.857 \text{ deg}$

FIG. 19E (1) $\alpha_1 := \operatorname{asin}\left[\dfrac{\sin[\theta_{i.1}]}{n_2}\right]$  ANGLE OF INCIDENCE INSIDE THE MEDIUM AFTER PROCESSING $\alpha_1 = 28.249$ deg (2) $\beta_1 := \operatorname{asin}\left[\dfrac{\sin[\theta_{d.1}]}{n_2}\right]$  ANGLE OF DIFFRACTION INSIDE THE MEDIUM AFTER PROCESSING $\beta_1 = 28.249$ deg $d := \dfrac{\lambda_1}{\sin[\theta_{i.1}] + \sin[\theta_{d.1}]}$  $d = 0.506$ microns $\dfrac{1000}{d} = 1.978 \cdot 10^3$ lines per mm.

(3) $\phi := \dfrac{\pi}{2} - \dfrac{\beta_1 - \alpha_1}{2}$  TILT ANGLE OF THE BRAGG PLANES $\phi = 90$ deg (4) $\theta_{0.1} := \alpha_1 + \dfrac{\pi}{2} - \phi$  ANGLE RELATIVE TO THE BRAGG PLANES $\theta_{0.1} = 28.249$ deg (6) $L := \dfrac{\lambda_1}{2 \, n_2 \sin[\theta_{0.1}]}$  SEPARATION OF THE BRAGG PLANES.
BRAGG CONDITION EQUATION.

$\dfrac{1}{L} = 1.978$  $\dfrac{1}{L}\sin(\phi) = 1.978$ (7) $\theta_{0.2} := \operatorname{asin}\left[\dfrac{\lambda_2}{2 \, n_0 \, L}\right]$  ANGLE RELATIVE TO THE BRAGG PLANES FOR THE SECOND WAVELENGTH SATISFYING THE BRAGG CONDITION - BEFORE PROCESSING $\theta_{0.2} = 18.387$ deg

FIG. 19D1

(8) $\alpha_2 := \theta_{0.2} + \phi - \dfrac{\pi}{2}$  ANGLE OF INCIDENCE INSIDE THE MEDIUM FOR THE SECOND WAVELENGTH - BEFORE PROCESSING $\alpha_2 = 18.387$ deg (9) $\beta_2 := \alpha_2 + \pi - 2\phi$  ANGLE OF DIFFRACTION INSIDE THE MEDIUM FOR THE SECOND WAVELENGTH - BEFORE PROCESSING $\beta_2 = 18.387$ deg

(10) $\theta_{i.2} := \operatorname{asin}[n_0 \sin[\alpha_2]]$  ANGLE OF INCIDENCE (REFERENCE BEAM) FOR THE SECOND WAVELENGTH - EXTERNAL $\theta_{i.2} = 28.857$ deg

(11) $\theta_{d.2} := \operatorname{asin}[n_0 \sin[\beta_2]]$  ANGLE OF DIFFRACTION (OBJECT BEAM) FOR THE SECOND WAVELENGTH - EXTERNAL $\theta_{d.2} = 28.857$ deg

FIG. 19D2

ASTIGMATIC DIFFERENCE IN A LASER DIODE
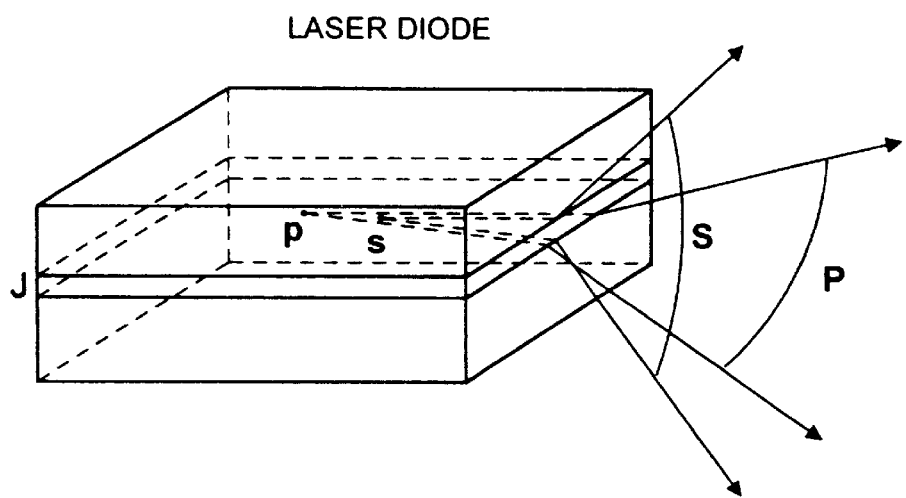
s = EFFECTIVE SOURCE OF WAVEFRONT PERPENDICULAR TO JUNCTION
p = EFFECTIVE SOURCE OF WAVEFRONT PARALLEL TO JUNCTION
S = EXTERNAL WAVEFRONT PERPENDICULAR TO JUNCTION
P = EXTERNAL WAVEFRONT PARALLEL TO JUNCTION
J = DIOD JUNCTION LAYERS
F I G. 20

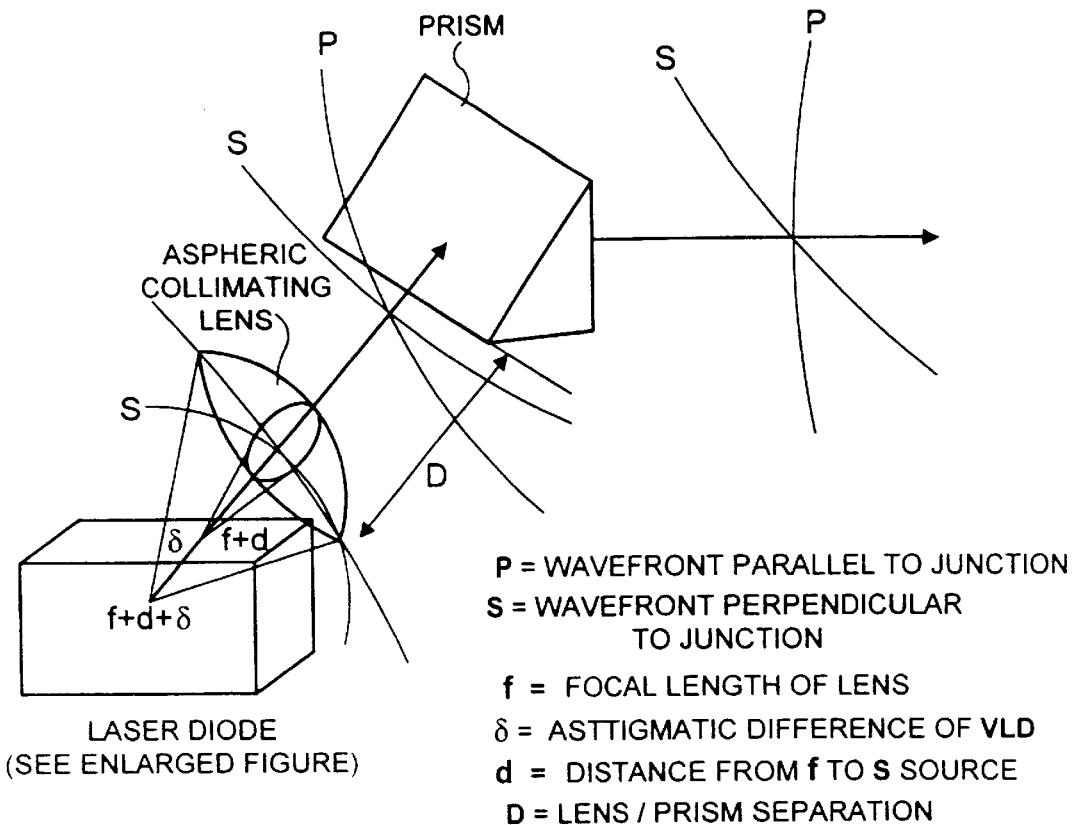
FIG. 20A
CIRCULARIZATION AND ASTIGMATISM ELIMINATION
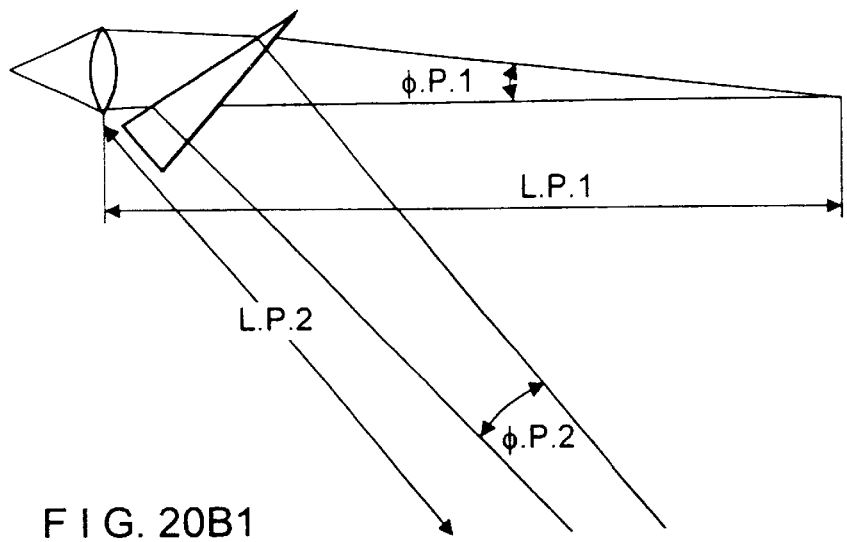
FIG. 20B1

ENLARGED SECTION
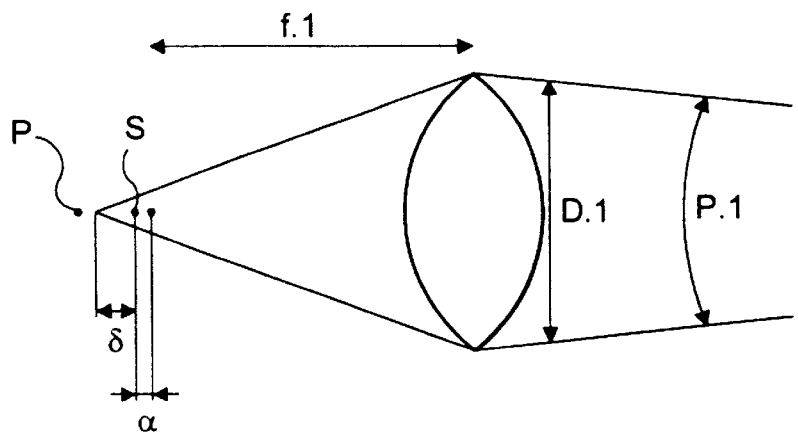
FIG. 20B2
ENLARGED SECTION
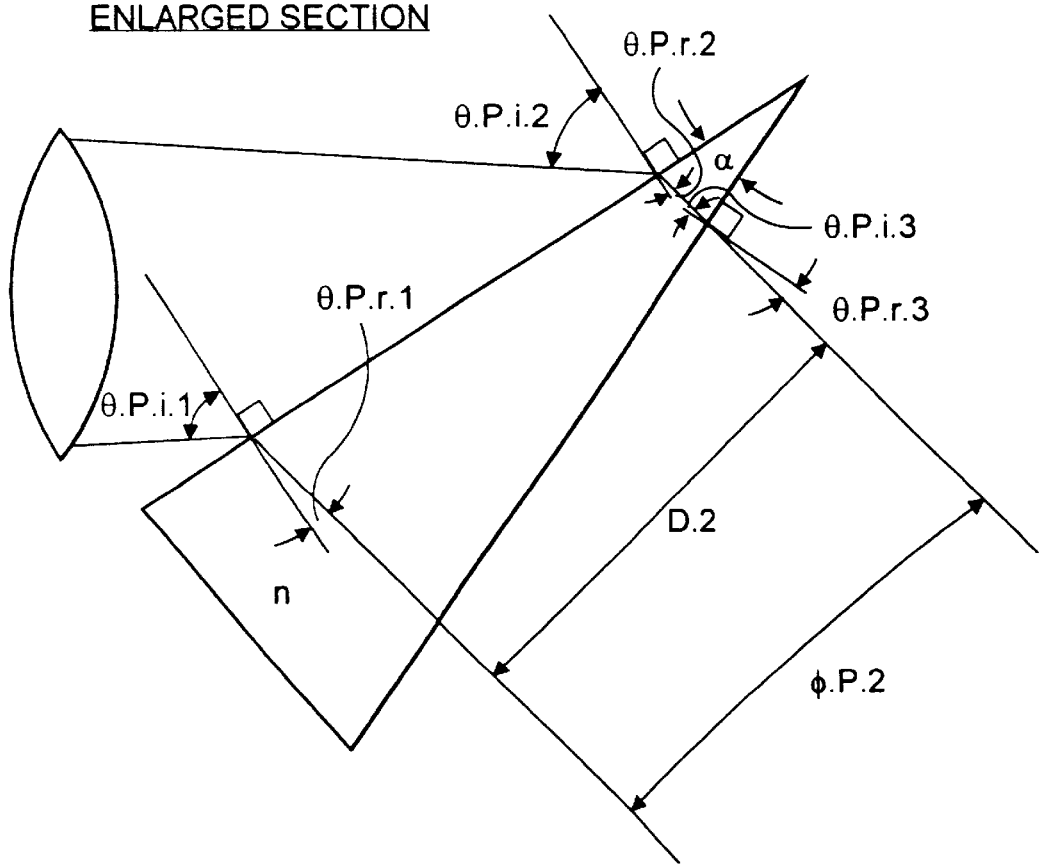
FIG. 20B3

ANALYSIS OF ASTIGMATIC DIFFERENCE REDUCTION WITH A CIRCULARIZING PRISM FOR THE GENERAL CASE WHERE BOTH S AND P BEAMS ARE CONVERGING.

$f.1$ = FOCAL LENGTH OF COLLIMATING LENS
$d$ = DISTANCE FROM FOCAL POINT OF COLLAMATING LENS TO S-BEAM SOURCE
$\delta$ = ASTIGMATIC DIFFERENCE OF LASER DIODE
$D.1$ = P- BEAM DIAMETER LEAVING COLLIMATING LENS
$D.2$ = EXPANDED P- BEAM DIAMETER LEAVING PRISM
$M$ = BEAM EXPANSION FACTOR = $D.2 / D.1$
$n$ = REFRACTIVE INDEX OF PRISM MATERIAL
$\theta.P.i.1$ = ANGLE OF INCIDENCE OF LOWER PORTION OF CONVERGING P-BEAM AT PRISM
$\theta.P.i.2$ = ANGLE OF INCIDENCE OF UPPER PORTION OF CONVERGING P-BEAM AT PRISM
$\phi.P.1$ = CONVERGENCE OF P- BEAM LEAVING COLLIMATING LENS
$\phi.S.1$ = CONVERGENCE OF S- BEAM LEAVING COLLIMATING LENS
$\phi.P.2$ = CONVERGENCE OF P- BEAM LEAVING PRISM
$\phi.S.1$ = $\phi.S.1$ = CONVERGENCE OF S- BEAM LEAVING PRISM
$L.P.1$ = IMAGE DISTANCE FOR P SOURCE IMAGED BY COLLIMATING LENS
$L.P.2$ = IMAGE DISTANCE FOR P SOURCE AFTER INSERTING PRISM
$L.S.1$ = IMAGE DISTANCE FOR S SOURCE IMAGED BY COLLIMATING LENS
$L.S.2 = L.S.1$ = IMAGE DISTANCE FOR S SOURCE AFTER INSERTING PRISM
$\theta.P.r.1$ = ANGLE OF REFRACTION OF LOWER PORTION OF CONVERGING P-BEAM IN PRISM
$\theta.P.r.2$ = ANGLE OF REFRACTION OF UPPER PORTION OF CONVERGING P-BEAM IN PRISM
$\alpha$ = PRISM APEX ANGLE = $\theta.P.r.1$ (BY DESIGN FOR CONVENIENCE )
$\theta.P.i.3$ = ANGLE OF INCIDENCE OF UPPER PORTION OF CONVERGING P-BEAM AT SECOND SURFACE OF PRISM= $\theta.P.r.1 - \theta.P.r.2$= = $\alpha - \theta.P.r.2$
$\theta.P.r.3$ = ANGLE OF REFRACTION OF UPPER PORTION OF CONVERGING P-BEAM LEAVING SECOND SURFACE OF PRISM = $\phi.P.2$

FIG. 20C

ASSUMED VALUE OF FIXED PARAMETERS: $\quad \deg = \dfrac{\pi}{180}$ $n := 1.72$ (REFRACTIVE INDEX OF SF10 GLASS AT 675 mm.)

$f_1 := 4.5$ mm $\qquad \delta := .01$ mm $D_1 := 1$ mm $\qquad \theta_{P.i.1} := 78$ deg

VARIABLE PARAMETER:

$$(1)\ L_{P.1}(d) := \frac{f_1^2}{d + \delta} \qquad (2)\ L_{S.1}(d) := \frac{f_1^2}{d}$$

$$(3)\ \phi_{P.1}(d) := \operatorname{atan}\left[\frac{D_1}{L_{P.1}(d)}\right]$$

$$(4)\ \phi_{S.1}(d) := \operatorname{atan}\left[\frac{D_1}{L_{S.1}(d)}\right]$$

$$(5)\ M := \frac{\cos\left[\operatorname{asin}\left[\frac{\sin[\theta_{P.i.1}]}{n}\right]\right]}{\cos[\theta_{P.i.1}]} \qquad M = 3.9563$$

$$(6)\ D_2 := M D_1 \qquad D_2 = 3.9563$$

$$(7)\ \theta_{P.i.2}(d) := \theta_{P.i.1} - \phi_{P.1}(d)$$

$$(8)\ \theta_{P.r.1} := \operatorname{asin}\left[\frac{\sin[\theta_{P.i.1}]}{n}\right] \qquad \theta_{P.r.1} = 34.659\ \deg$$

$$(9)\ \alpha := \theta_{P.r.1} \qquad \alpha = 34.659\ \deg$$

$$(10)\ \theta_{P.r.2}(d) := \operatorname{asin}\left[\frac{\sin[\theta_{P.i.2}(d)]}{n}\right]$$

FIG. 20D $$(11)\ \theta_{P.i.3}(d) := \theta_{P.r.1} - \theta_{P.r.2}(d)$$

$$(12)\ \theta_{P.r.3}(d) := \mathrm{asin}\left[\,n\,\sin\left[\theta_{P.i.3}(d)\right]\right]$$

$$(13)\ \phi_{P.2}(d) := \theta_{P.r.3}(d)$$

$$(14)\ L_{P.2}(d) := \frac{D_2}{\tan\left[\phi_{P.2}(d)\right]}$$

$$(15)\ L_{S.2}(d) := L_{S.1}(d)$$

F I G. 20D1

S AND P IMAGE DISTANCES IN THE IMAGE PLANE OF THE COLLIMATING LENS AS A FUNCTION OF THE DISTANCE FROM THE FOCAL POINT OF THE COLLIMATING LENS TO THE S SOURCE. PRISM PLACED AFTER THE COLLIMATING LENS. $\theta.P.i.1$ IS THE ANGLE OF INCIDENCE OF THE LOWER PORTION OF THE P-BEAM ON THE HYPOTENUSE OF THE PRISM. $\delta$ IS THE VLD ASTIGMATIC DIFFERENCE.

S AND P IMAGE LOCATIONS - COLLIMATING LENS AND PRISM ONLY $n = 1.72$     $f_1 = 4.5$ mm     $\theta_{P.i.1} = 78$ deg     $\delta = 0.01$ mm

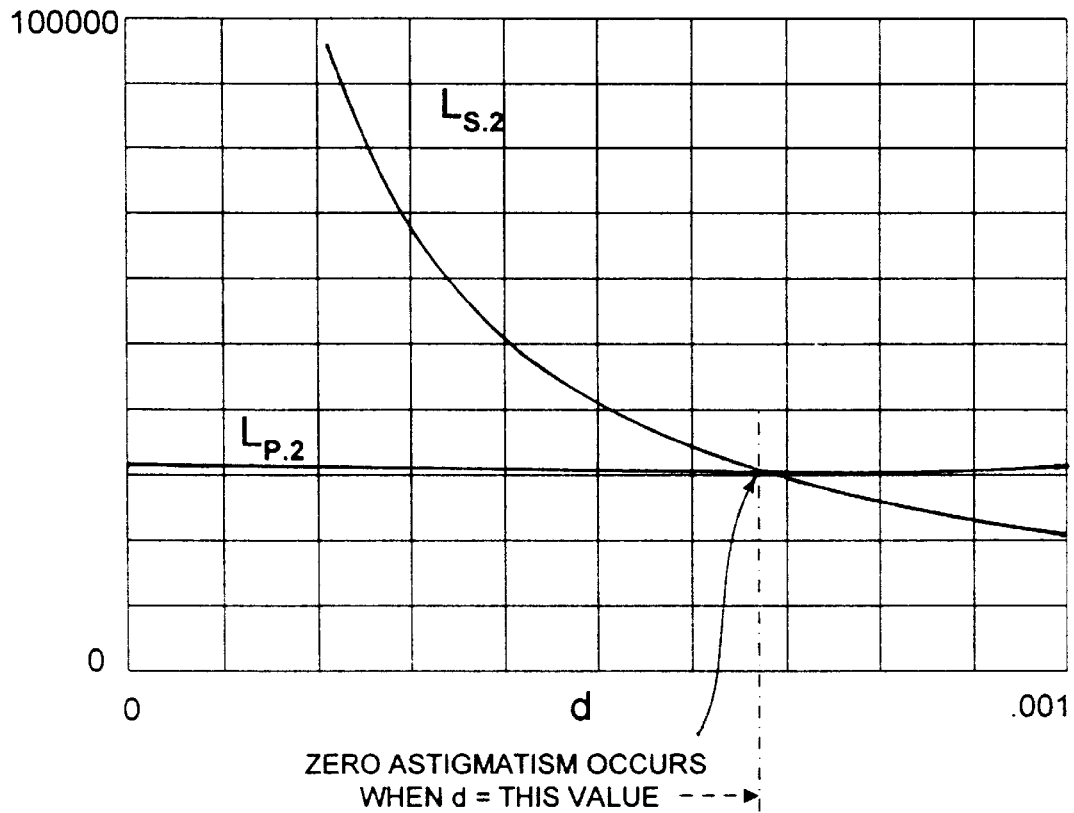

ZERO ASTIGMATISM OCCURS WHEN d = THIS VALUE $d := .00068338$ mm $L_{P.2}(d) = 2.9632 \cdot 10^{-4}$ mm     $L_{S.2}(d) = 2.9632 \cdot 10^{-4}$ mm

FIG. 20E

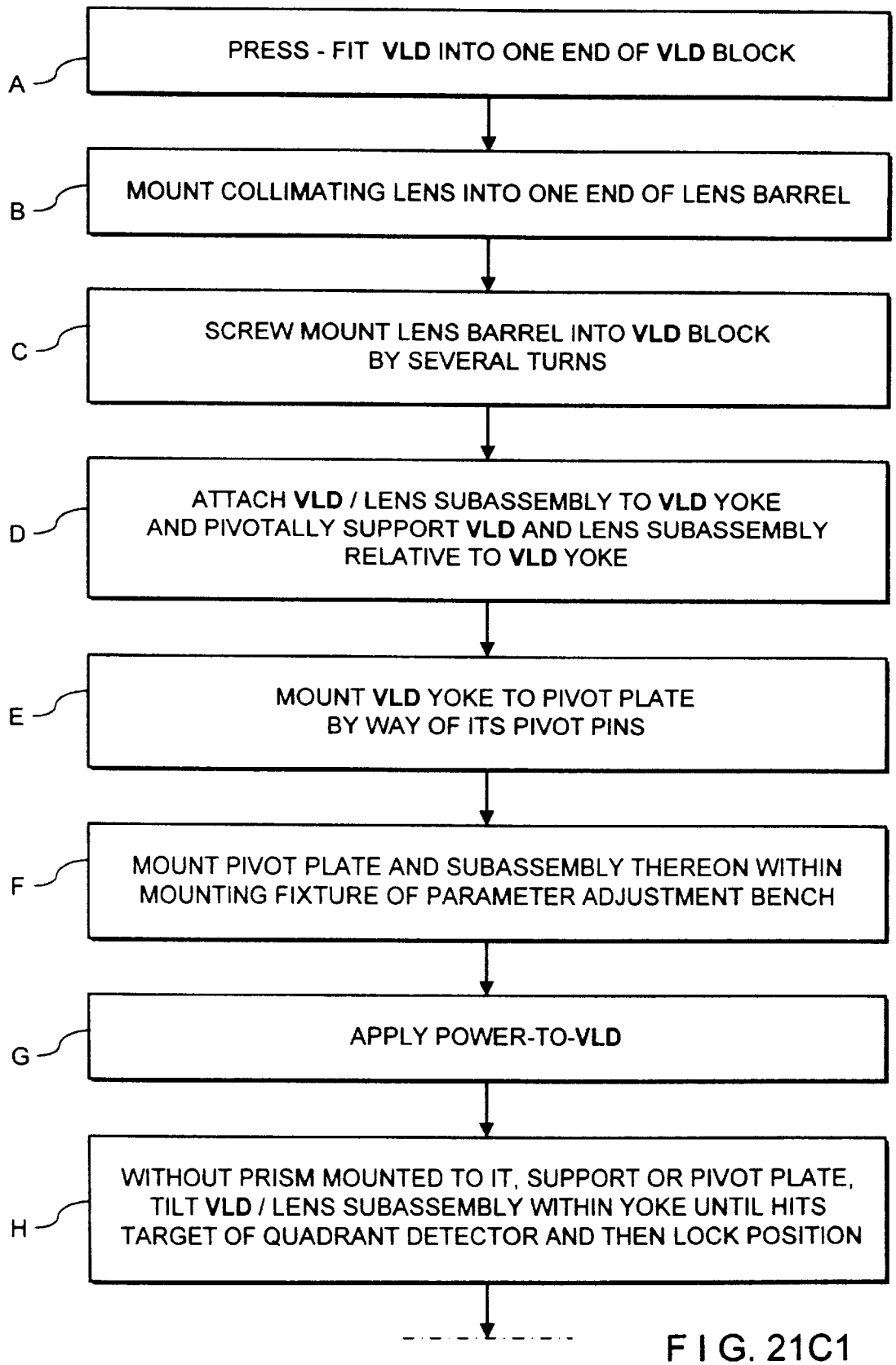
FIG. 21C1

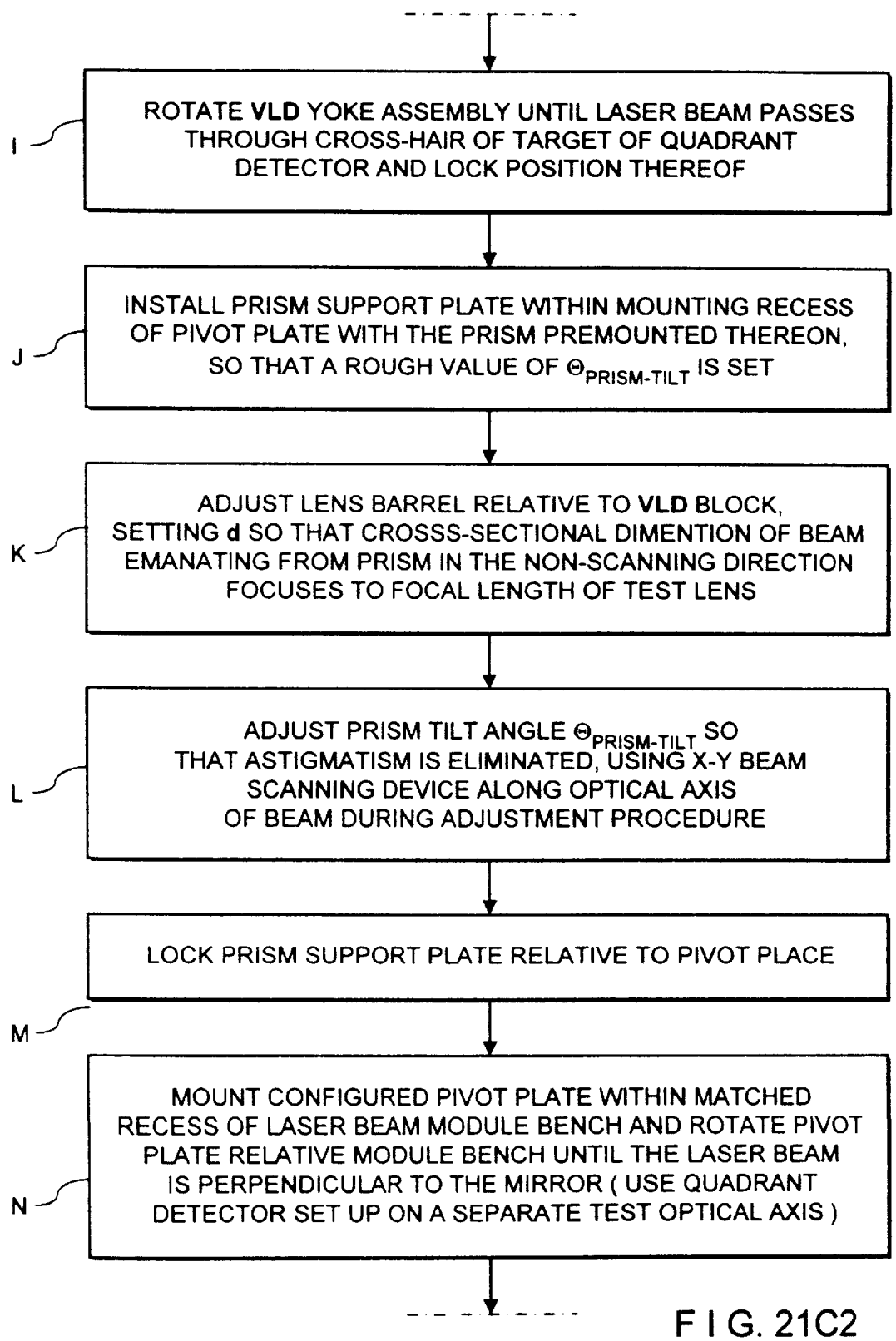
FIG. 21C2

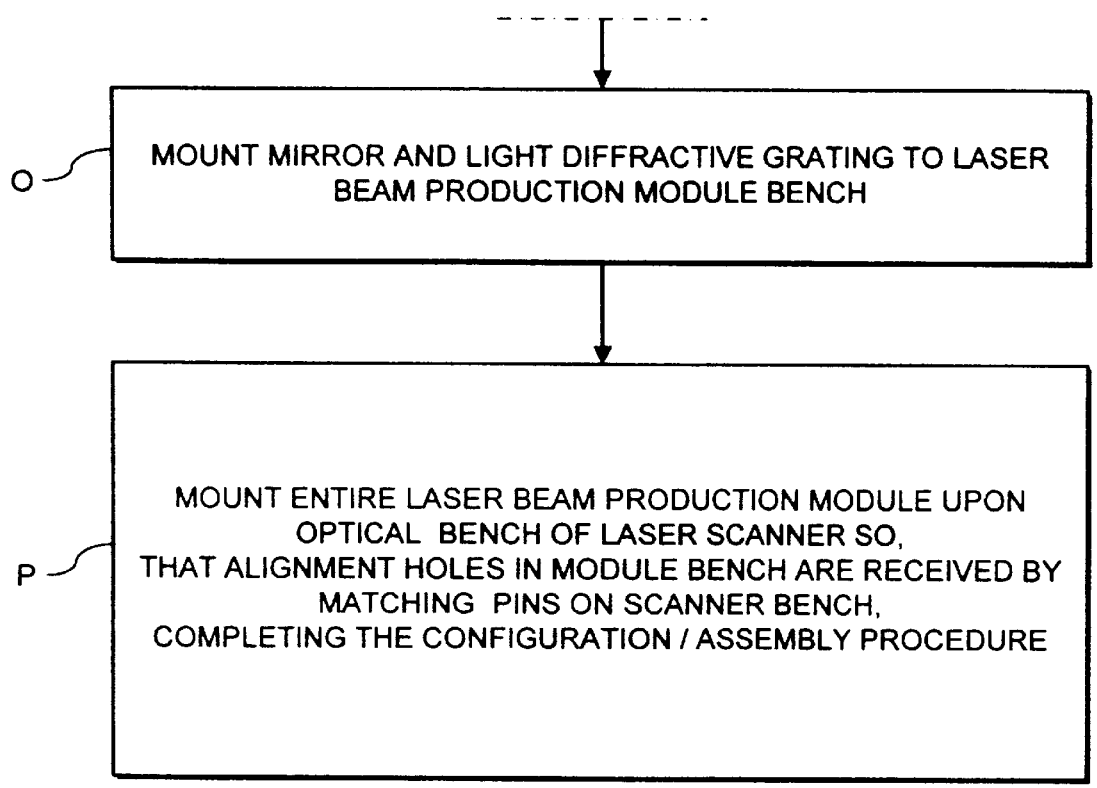
FIG. 21C3

ANALYSIS OF THE MULTI-FUNCTION HOLOGRAPHIC PLATE. THIS ANALYSIS WILL DETRMINE THE ANGLE OF INCIDENCE AND ANGLE OF DIFFFRACTION AND ORIENTATION ANGLE, RELATIVE TO THE HOLOGRAPHIC DISC, FOR A PRE- DISC HOLOGRAPHIC PLATE THAT SIMULTANEOUSLY ACCOMPLISHES ALL OF THE FUNCTIONS OF BEAM CIRCULARIZATION, ELIMINATION OF DISPERSION AND ELIMINATION OF ASTIGMATISM. ( THE ELIMINATION OF ASTIGMATISM IS ACTUALLY ACCOMPLISHED BY ADJUSTING THE LASER / COLLIMATION LENS SEPARATION AFTER THE BEAM EXPANSION RATIO IS ESTABLISHED FOR THE CIRCULARIZING FUNCTION. ) THE MULTI-FUNCTION HOLOGRAPHIC PLATE IS PLACED BETWEEN THE COLLIMATING LENS AND HOLOGRAPHIC DISC.

A DESIRED BEAM EXPANSION RATIO IS SELECTED AND THE ANGLES OF INCIDENCE AND DIFFRACTION FOR THE HOLOGRAPHIC DISC ARE GIVEN. WAVELENGTH IS ALSO GIVEN. THE FINAL RESULT IS A SINGLE GRAPH CONTAINING TWO PLOTS OF THE ANGLE OF INCIDENCE VS. MULTI-FUNCTION PLATE ORIENTATION ANGLE FOR TWO SITUATIONS - OBTAINING THE DESIRED BEAM EXPANSION RATIO AND OBTAINING ZERO DISPERSION, WHERE THESE TWO CURVES INTERSECT, BOTH REQUIREMENTS WILL BE MET SIMULTANEOUSLY.

$D.1$ = BEAM DIAMETER LEAVING COLLIMATING LENS
$D.2$ = EXPANDED BEAM DIAMETER LEAVING MULTI-FUNCTION HOLOGRAPHIC PLATE
$M$ = BEAM EXPANSION FACTOR = $D.2 / D.1$
$d.2$ = GRATING SPACING OF THE HOLOGRAPHIC DISC ( microns )
$d.1$ = GRATING SPACING OF THE MULTI-FUNCTION HOLOGRAPHIC PLATE ( microns )
$\theta.i.2$ = ANGLE OF INCIDENCE OF BEAM AT HOLOGRAPHIC DISC
$\theta.d.2$ = ANGLE OF INCIDENCE OF BEAM LEAVING HOLOGRAPHIC DISC
$\theta.i.1.M$ = ANGLE OF INCIDENCE OF BEAM AT HOLOGRAPHIC MULTI-FUNCTION PLATE THAT WILL PROVIDE THE DESIRED BEAM EXPANSION RATIO, M
$\theta.i.1.D$ = ANGLE OF INCIDENCE OF BEAM AT HOLOGRAPHIC MULTI-FUNCTION PLATE THAT WILL PROVIDE ZERO DISRERSION FOR THE BEAM LEAVING THE HOLOGRAPHIC DISC
$\theta.d.1.M$ = ANGLE OF DIFFRACTION OF BEAM LEAVING MULTI-FUNCTION PLATE THAT WILL PROVIDE THE DESIRED BEAM EXPANSION RATIO, M
$\theta.d.1.D$ = ANGLE OF DIFFRACTION OF BEAM LEAVING MULTI-FUNCTION PLATE THAT WILL PROVIDE ZERO DISRERSION FOR THE BEAM LEAVING THE HOLOGRAPHIC DISC
$\rho$ = ORIENTATION ANGLE OF MULTI-FUNCTION PLATE RELATIVE TO THE HOLOGRAPHIC DISC
$\lambda$ = WAVELENGTH OF LASER BEAM ( microns )

FIG. 25B

ASSUMED PARAMETERS:

$M := 3$     BEAM EXPANSION RATIO         $\deg = \dfrac{\pi}{180}$ $\lambda := .670$ microns     WAVELENGTH OF LASER $\theta_{i.2} := 43 \deg$     ANGLE OF INCIDENCE AT HOLOGRAPHIC DISC $\theta_{d.2} := 37 \deg$     ANGLE OF DIFFRACTION AT HOLOGRAPHIC DISC $\rho := -5 \deg, -5.1 \deg, \ldots, -12 \deg$

F I G. 25B1

(1) $\quad d_2 := \dfrac{\lambda}{\sin[\theta_{i.2}] + \sin[\theta_{d.2}]}\quad$ GRATING SPACING FOR HOLOGRAPHIC DISC (2) $\quad \theta_{i.1.M}(\rho) := \mathrm{acos}\left[\dfrac{\cos[\theta_{i.2}+\rho]}{M}\right]\quad$ ANGLE OF INCIDENCE AT PLATE TO GIVE THE DESIRED BEAM EXPANSION RATIO (3) $\quad \theta_{d.1.M}(\rho) := \theta_{i.2} + \rho \quad$ CORRESPONDING ANGLE OF DIFFRACTION (4) $\quad d_{1.M}(\rho) := \left[\dfrac{\lambda}{\sin[\theta_{i.1.M}(\rho)] + \sin[\theta_{d.1.M}(\rho)]}\right]$

RESULTANT GRATING SPACING (5) $\quad \theta_{i.1.D}(\rho) :=$ $= \mathrm{asin}\left[\lambda\dfrac{\cos[\theta_{i.2}+\rho]}{d_2 \cos[\theta_{i.2}]} - \sin[\theta_{i.2}+\rho]\right]\quad$ ANGLE OF INCIDENCE AT PLATE TO GIVE ZERO DISPERSION (6) $\quad \theta_{d.1.D}(\rho) := \theta_{i.2} + \rho \quad$ CORRESPONDING ANGLE OF DIFFRACTION (7) $\quad d_{1.D}(\rho) := \left[\dfrac{\lambda}{\sin[\theta_{i.1.D}(\rho)] + \sin[\theta_{d.1.D}(\rho)]}\right]$

RESULTANT GRATING SPACING

FIG. 25C

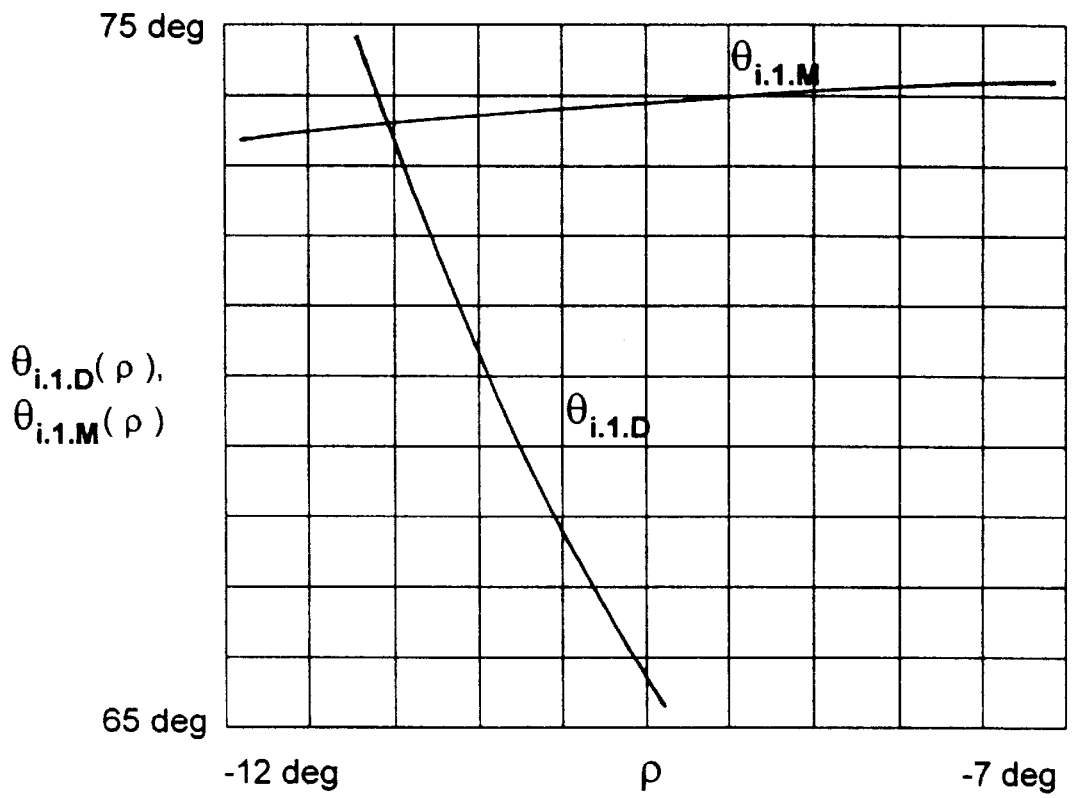

$\rho := -11.01\text{deg}$  ORIENTATION ANGLE, RELATIVE TO THE HOLOGRAPHIC DISC, OF THE MULTI-FUNCTION HOLOGRAPHIC PLATE FOR ZERO DISPERSION AND A BEAM EXPANSION RATIO OF 3.0

F I G. 25D

CONSTRUCTION PARAMETERS FOR THE MULTI- FUNCTION HOLOGRAPHIC PLATE AT 670 nm WAVELENGTH $\theta_{i.1.M}(\rho) = 73.57777674$ deg    $\theta_{i.1.D}(\rho) = 73.54631956$ deg $\theta_{d.1.M}(\rho) = 31.99$ deg    $\theta_{d.1.D}(\rho) = 31.99$ deg $d_{1.M}(\rho) = 0.44997378$ microns   $d_{1.D}(\rho) = 0.45002074$ microns

F I G. 25E

ANALYSIS OF THE DISPERSION OF THE MULTI-FUNCTION HOLOGRAPHIC PLATE

THIS ANALYSIS WILL SHOW THE VARIATION OF DIFFRACTION ANGLE FOR THE BEAM LEAVING THE HOLOGRAPHIC DISC WHEN THE MULTI-FUNCTION HOLOGRAPHIC PLATE IS USED WITH THE CONSTRUCTION PARAMETERS AS CALCULATED ABOVE AND WITH THE ORIENTATION ANGLE, RELATIVE TO THE HOLOGRAPHIC DISC, AS ALSO CALCULATED ABOVE.

$\theta.i.1 =$ ANGLE OF INCIDENCE FOR MULTI-FUNCTION PLATE ( FIXED - SEE ABOVE )

$\theta.d.c.1 =$ CONSTRUCTION ANGLE OF DIFFRACTION OF MULTI-FUNCTION PLATE ( FIXED - SEE ABOVE )

$\theta.d.1 =$ ANGLE OF DIFFRACTION OF MULTI-FUNCTION PLATE ( VARIES WITH WAVELENGTH )

$\theta.d.c.1 =$ CONSTRUCTION ANGLE OF DIFFRACTION OF HOLOGRAPHIC DISC ( FIXED - SEE $\theta.d.2$ IN ABOVE ANALYSIS )

$\theta.d.2 =$ ANGLE OF DIFFRACTION OF BEAM LEAVING HOLOGRAPHIC DISC ( VARIES WITH WAVELENGTH )

$\lambda =$ WAVELENGTH ( IN AIR )

$\lambda.c =$ CONSTRUCTION WAVELENGTH ( = .670 microns )

$d.1 =$ GRATING SPACING IN MULTI-FUNCTION PLATE ( FIXED - SEE ABOVE )

$\rho =$ TILT ANGLE OF MULTI-FUNCTION PLATE RELATIVE TO HOLOGRAPHIC DISC ( FIXED - SEE ABOVE )

F I G. 27A $\lambda_c := .670$ microns     $\theta_{d.c.2} := 37$ deg     $\theta_{i.2} := 43$ deg $\theta_{i.1} := \theta_{i.1.M}(\rho)$     $\theta_{d.c.1} := \theta_{i.2} + \rho$ $\lambda := .650, .6501, ..., .690$     $\theta_{d.c.1} = 31.99$ deg

F I G. 27B $$(1) \quad d_1 := \frac{\lambda_c}{\sin[\theta_{i.1}] + \sin[\theta_{d.c.1}]} \text{ microns}$$

$$d_1 = 0.44997378$$

$$(2) \quad \theta_{d.1}(\lambda) := \operatorname{asin}\left[\left[\frac{\lambda}{d_1}\right] - \sin[\theta_{i.1}]\right]$$

$$(3) \quad M := \left[\frac{\cos[\theta_{d.c.1}]}{\cos[\theta_{i.1}]}\right] \qquad M = 3$$

$$(4) \quad \theta_{d.2}(\lambda) :=$$

$$= \operatorname{asin}\left[\frac{\lambda}{d_2} - \sin\left[\operatorname{asin}\left[\frac{\lambda}{d_1} - \sin[\theta_{i.1}]\right] - \rho\right]\right]$$

FIG. 27C

DISPERSION CHARACTERISTIC GRAPH AND SAMPLE VALUES

| $\lambda$ | := .660 microns | $\theta_{d.2}(\lambda)$ = 37.00560129 deg |
| $\lambda$ | := .665 microns | $\theta_{d.2}(\lambda)$ = 37.00144699 deg |
| $\lambda$ | := .670 microns | $\theta_{d.2}(\lambda)$ = 37 deg |
| $\lambda$ | := .675 microns | $\theta_{d.2}(\lambda)$ = 37.00132623 deg |
| $\lambda$ | := .680 microns | $\theta_{d.2}(\lambda)$ = 37.00549609 deg |

$\delta\theta_{d.2} := \theta_{d.2}(.675) - \theta_{d.2}(.670)$   $\delta\theta_{d.2} = 0.00132623$ deg

FIG. 27D1

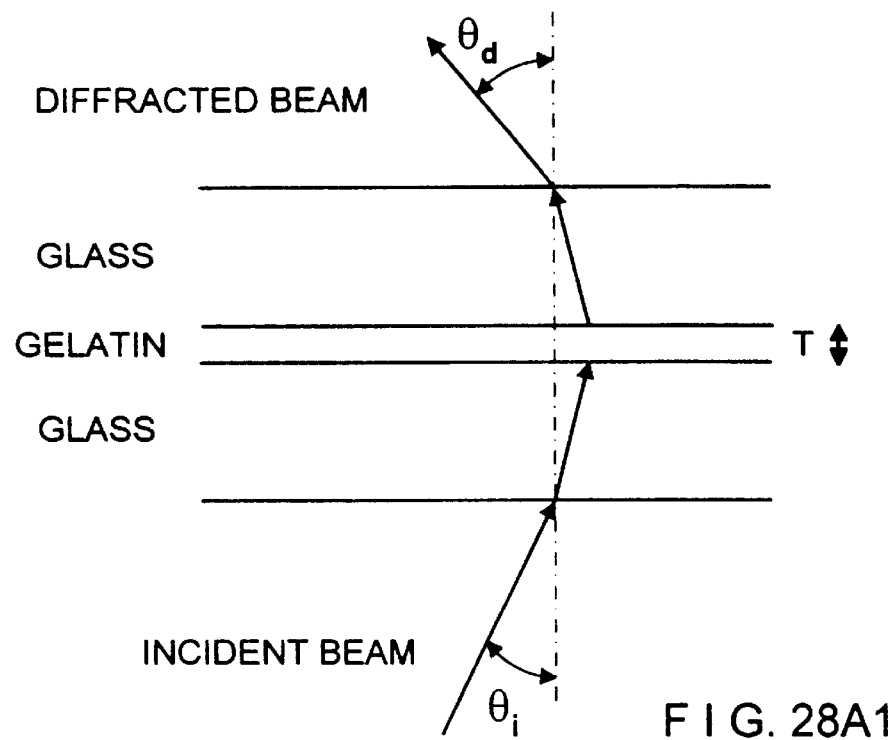
FIG. 28A1
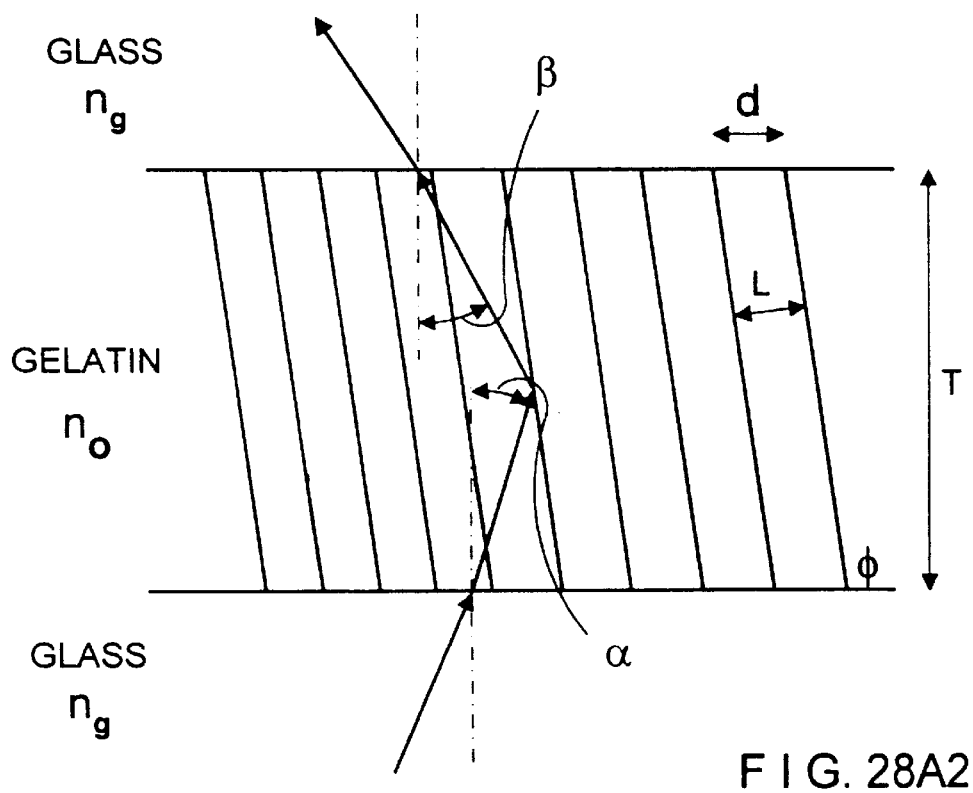
FIG. 28A2

CHANGE IN CONSTRUCTION BEAM ANGLES FOR A CHANGE IN WAVELENGTH BETWEEN CONSTRUCTION AND RECONSTRUCTION. THIS PROGRAM CALCULATES THE EXTERNAL ANGLE OF INCIDENCE AND EXTERNAL ANGLE OF DIFFRACTION FOR THE CONSTRUCTION WAVELENGTH WHEN THE EXTERNAL ANGLE OF INCIDENCE AND EXTERNAL ANGLE OF DIFFRACTION ARE GIVEN FOR THE RECONSTRUCTION WAVELENGTH. BRAGG CONDITION IS MAINTAINED IN BOTH CASES SO THAT THE BRAGG PLANE TILT IS UNCHANGED.

$$deg = \frac{\pi}{180}$$

$n_0 := 1.53$      AVERAGE REFRACTIVE INDEX OF THE MEDIUM BEFORE PROCESSING $n_2 := 1.4$      AVERAGE REFRACTIVE INDEX OF THE MEDIUM AFTER PROCESSING $\lambda_1 := .670$      RECONSTRUCTION WAVELENGTH (VISIBLE LASER DIODE)

$\lambda_2 := .488$      CONSTRUCTION WAVELENGTH (ARGON LASER)

$\theta_{i.1} := 77\ deg$      ANGLE OF INCIDENCE AT RECONSTRUCTION $\theta_{d.1} := 31.5\ deg$      ANGLE OF DIFFRACTION AT RECONSTRUCTION

F I G. 28B

HOE CONSTRUCTION ANGLES AT SECOND WAVELENGTH

REFERENCE BEAM      OBJECT BEAM

$\theta_{i.2} = \theta_R = 54.143\ deg$      $\theta_{d.2} = \theta_O = 15.915\ deg$

F I G. 28D $$(1)\ \alpha_1 := \operatorname{asin}\left[\frac{\sin[\theta_{i.1}]}{n_2}\right]$$

ANGLE OF INCIDENCE INSIDE THE MEDIUM AFTER PROCESSING $\alpha_1 = 44.105$ deg $$(2)\ \beta_1 := \operatorname{asin}\left[\frac{\sin[\theta_{d.1}]}{n_2}\right]$$

ANGLE OF DIFFRACTION INSIDE THE MEDIUM AFTER PROCESSING $\beta_1 = 21.914$ deg $$d := \frac{\lambda_1}{\sin[\theta_{i.1}] + \sin[\theta_{d.1}]}$$

$d = 0.448$ microns $\frac{1000}{d} = 2.234 \cdot 10^3$ lines per mm.

$$(3)\ \phi := \frac{\pi}{2} - \frac{\beta_1 - \alpha_1}{2}$$

TILT ANGLE OF THE BRAGG PLANES $\phi = 101.086$ deg $$(4)\ \theta_{0.1} := \alpha_1 + \frac{\pi}{2} - \phi$$

ANGLE RELATIVE TO THE BRAGG PLANES $\theta_{0.1} = 34.198$ deg $$(6)\ L := \frac{\lambda_1}{2\ n_2\ \sin[\theta_{0.1}]}$$

SEPARATION OF THE BRAGG PLANES.
BRAGG CONDITION EQUATION.

$L = 0.442$ microns $$(7)\ \theta_{0.2} := \operatorname{asin}\left[\frac{\lambda_2}{2\ n_0\ L}\right]$$

ANGLE RELATIVE TO THE BRAGG PLANES FOR THE SECOND WAVELENGTH SATISFYING THE BRAGG CONDITION - BEFORE PROCESSING $\theta_{0.2} = 21.619$ deg

FIG. 28C1

(8) $\alpha_2 := \theta_{0.2} + \phi - \dfrac{\pi}{2}$    ANGLE OF INCIDENCE INSIDE THE MEDIUM FOR THE SECOND WAVELENGTH - BEFORE PROCESSING $\alpha_2 = 32.705$ deg (9) $\beta_2 := \alpha_2 + \pi - 2\phi$    ANGLE OF DIFFRACTION INSIDE THE MEDIUM FOR THE SECOND WAVELENGTH - BEFORE PROCESSING $\beta_2 = 10.534$ deg

(10) $\theta_R := \operatorname{asin}\left[ n_0 \sin\left[ \alpha_2 \right] \right]$    ANGLE OF INCIDENCE (REFERENCE BEAM) FOR THE SECOND WAVELENGTH - EXTERNAL $\theta_R = 54.143$ deg

(11) $\theta_O := \operatorname{asin}\left[ n_0 \sin\left[ \beta_2 \right] \right]$    ANGLE OF DIFFRACTION (OBJECT BEAM) FOR THE SECOND WAVELENGTH - EXTERNAL $\theta_O = 15.915$ deg

FIG. 28C2

CIRCULARIZATION AND ASTIGMATISM ELIMINATION WITH A HOE
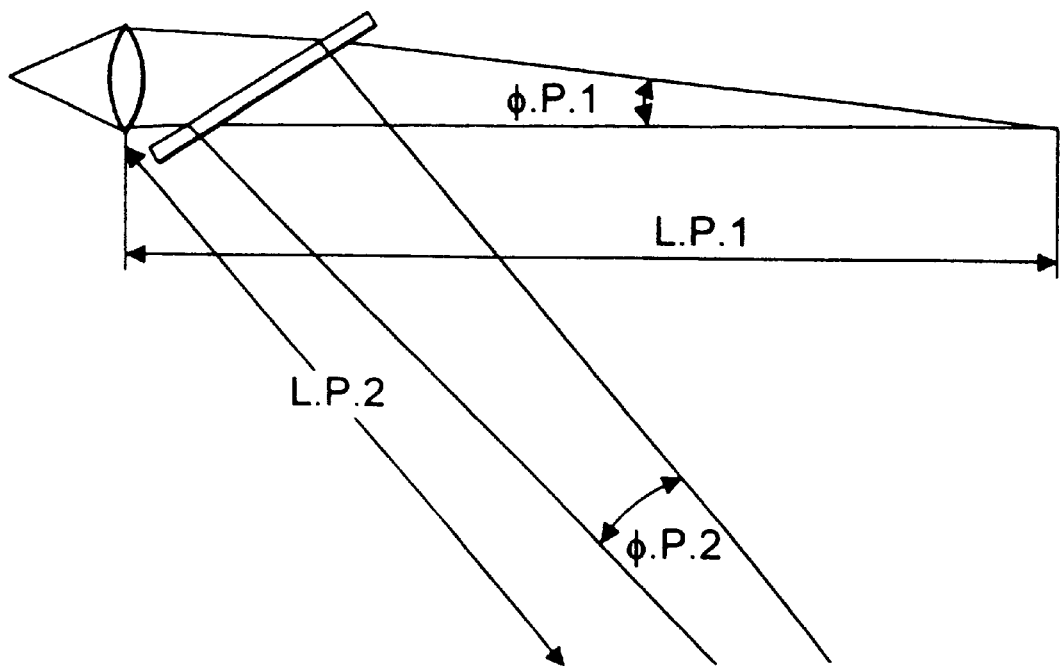
F I G. 30A1

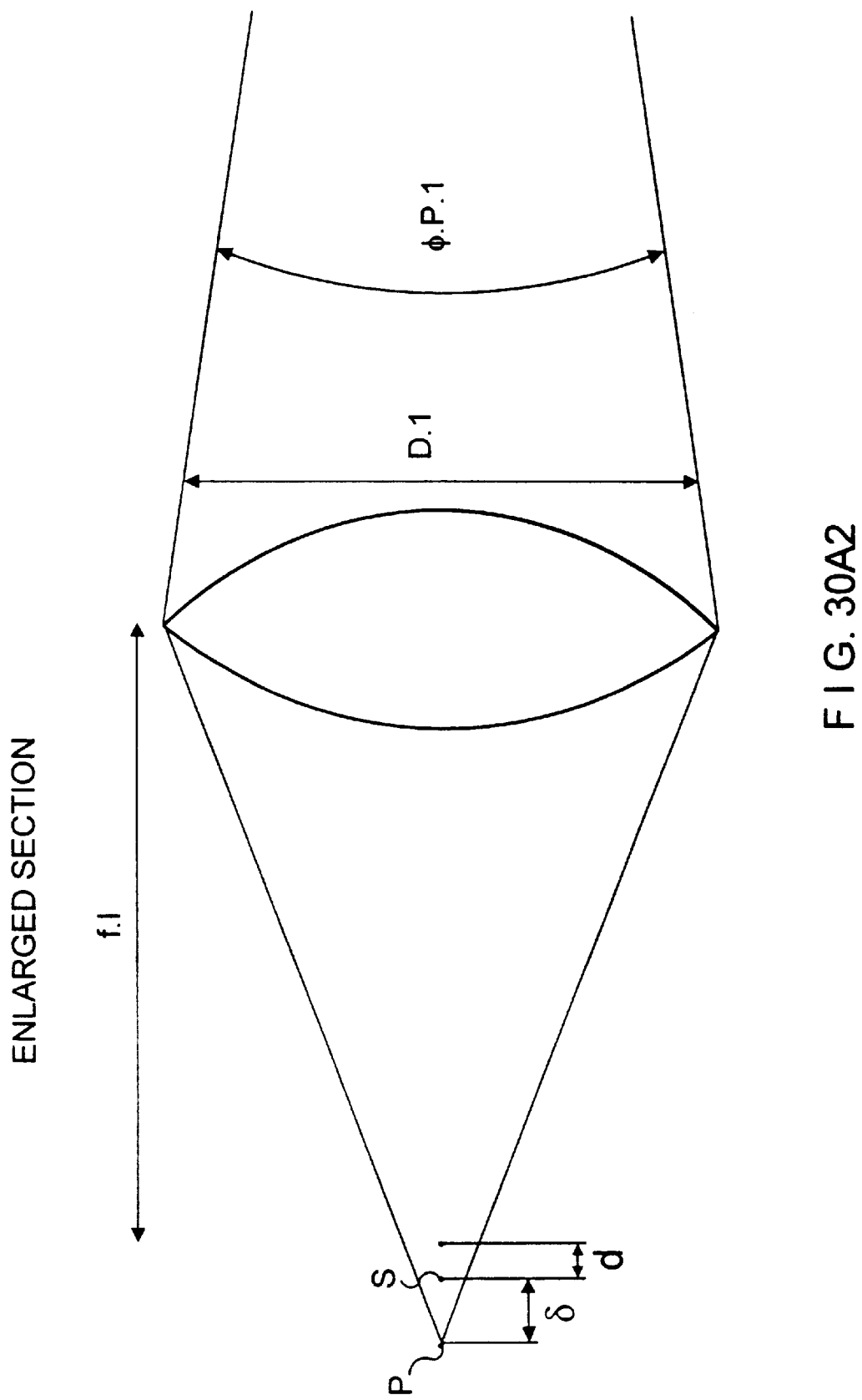
FIG. 30A2

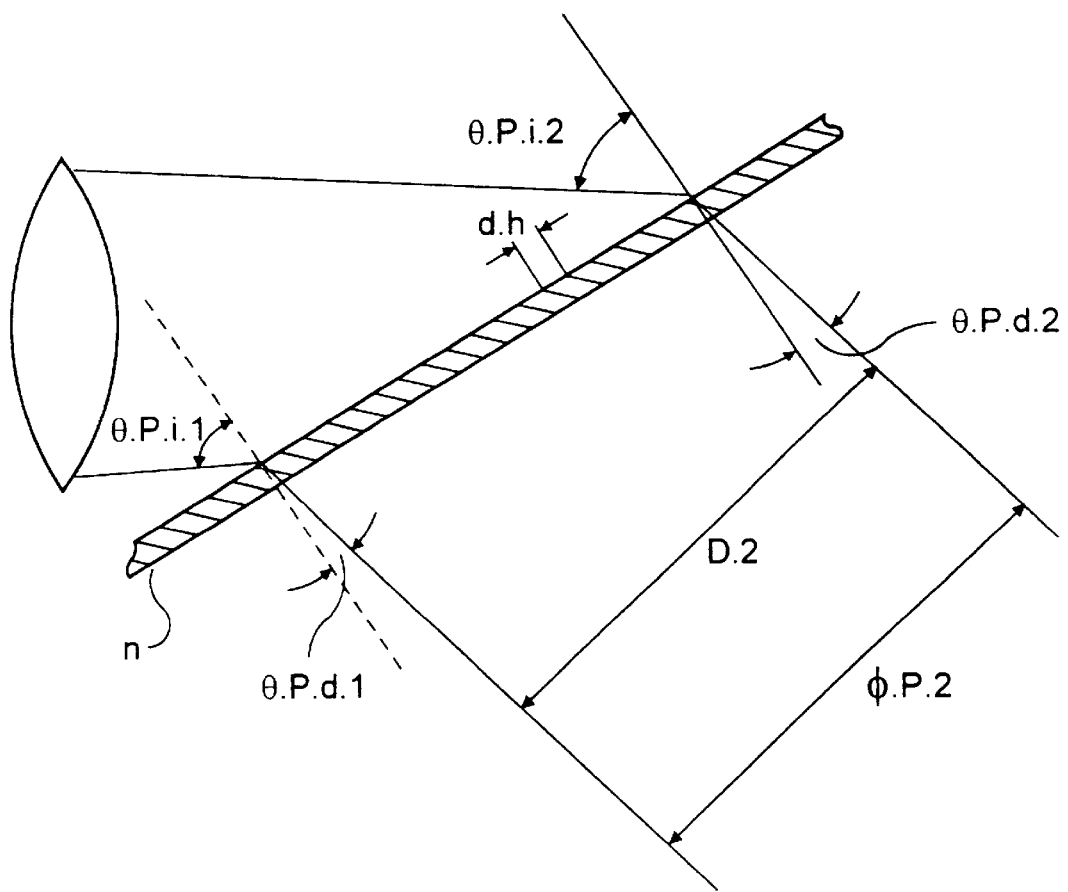
F I G. 30A3

ANALYSIS OF ASTIGMATIC DIFFERENCE REDUCTION WITH A CIRCULARIZING HOLOGRAPHIC OPTICAL ELEMENTS ( HOE ) FOR GENERAL CASE WHERE BOTH S AND P BEAMS ARE CONVERGING.
THE HOE IN THIS CASE IS A SIMPLE,FIXED-SPATIAL-FREQUENCY HOLOGRAPHIC DIFFRACTION GRATING.

f.1 = FOCAL LENGTH OF COLLIMATING LENS
d = DISTANCE FROM FOCAL POINT OF COLLAMATING LENS TO S-BEAM SOURCE
$\delta$ = ASTIGMATIC DIFFERENCE OF LASER DIODE
D.1 = P- BEAM DIAMETER LEAVING COLLIMATING LENS
D.2 = EXPANDED P- BEAM DIAMETER LEAVING HOE
M = BEAM EXPANTION FACTOR = D.2 / D.1
d.h = GRATING SPACING OF HOE GRATING ( mm )
$\theta.P.i.1$ = ANGLE OF INCIDENCE OF LOWER PORTION OF CONVERGING P-BEAM AT HOE
$\theta.P.i.2$ = ANGLE OF INCIDENCE OF UPPER PORTION OF CONVERGING P-BEAM AT HOE
$\phi.P.1$ = CONVERGENCE OF P- BEAM LEAVING COLLIMATING LENS
$\phi.S.1$ = CONVERGENCE OF S- BEAM LEAVING COLLIMATING LENS
$\phi.P.2$ = CONVERGENCE OF P- BEAM LEAVING HOE
$\phi.S.1$ = $\phi.S.1$ = CONVERGENCE OF S- BEAM LEAVING HOE
L.P.1 = IMAGE DISTANCE FOR P SOURCE IMAGED BY COLLIMATING LENS
L.P.2 = IMAGE DISTANCE FOR P SOURCE AFTER INSERTING HOE
L.S.1 = IMAGE DISTANCE FOR S SOURCE IMAGED BY COLLIMATING LENS
L.S.2 = L.S.1 = IMAGE DISTANCE FOR S SOURCE AFTER INSERTIG HOE
$\theta.P.d.1$ = ANGLE OF DIFFRACTION OF LOWER PORTION OF CONVERGING P-BEAM AT HOE
$\theta.P.d.2$ = ANGLE OF DIFFRACTION OF UPPER PORTION OF CONVERGING P-BEAM AT HOE
$\lambda$ = WAVELENGTH OF LASER BEAM

FIG. 30B

ASSUMED VALUE OF FIXED PARAMETERS: $\quad deg = \dfrac{\pi}{180}$ $\lambda := .000670$ mm $\qquad \theta_{P.i.1} := 73.6$ deg $\qquad \theta_{P.d.1} := 32$ deg $f_1 := 4.5$ mm $\qquad D_1 := 1$ mm $\qquad \delta := .01$ mm

VARIABLE PARAMETER:

$d := .00000000001, .00004, \ldots .004$ mm

FIG. 30B1

$$d_h := \frac{\lambda}{\sin[\theta_{P.i.1}] + \sin[\theta_{P.i.1}]}$$

(1) $\quad L_{P.1}(d) := \dfrac{f_1^2}{d + \delta} \qquad$ (2) $\quad L_{S.1}(d) := \dfrac{f_1^2}{d}$ (3) $\quad \phi_{P.1}(d) := \mathrm{atan}\left[\dfrac{D_1}{L_{P.1}(d)}\right]$ (4) $\quad \phi_{S.1}(d) := \mathrm{atan}\left[\dfrac{D_1}{L_{S.1}(d)}\right]$ (5) $\quad M := \dfrac{\cos\left[\mathrm{asin}\left[\dfrac{\lambda}{d_h} - \sin[\theta_{P.i.1}]\right]\right]}{\cos[\theta_{P.i.1}]} \qquad M = 3.003626$ (6) $\quad D_2 := M D_1 \qquad\qquad\qquad\qquad D_2 = 3.003626$ (7) $\quad \theta_{P.i.2}(d) := \theta_{P.i.1} - \phi_{P.1}(d)$

FIG. 30C1

$$(8) \quad \theta_{P.d.1} := \operatorname{asin}\left[\frac{\lambda}{d_h} - \sin\left[\theta_{P.i.1}\right]\right] \qquad \theta_{P.d.1} = 32 \text{ deg}$$

$$(9) \quad \theta_{P.d.2}(d) := \operatorname{asin}\left[\frac{\lambda}{d_h} - \sin\left[\theta_{P.i.2}(d)\right]\right]$$

$$(10) \quad \phi_{P.2}(d) := \theta_{P.d.2}(d) - \theta_{P.d.1}$$

$$(11) \quad L_{P.2}(d) := \frac{D_2}{\tan\left[\phi_{P.2}(d)\right]}$$

$$(12) \quad L_{S.2}(d) := L_{S.1}(d)$$

FIG. 30C2

S AND P IMAGE DISTANCES IN THE IMAGE PLANE OF THE
FOCUSING LENS AS A FUNCTION OF THE DISTANCE FROM THE
FOCAL POINT OF THE COLLIMATING LENS TO THE S SOURCE.
HOE PLACED AFTER THE COLLIMATING LENS. $\theta.P.i.1$ IS THE ANGLE
OF INCIDENCE OF THE LOWER PORTION OF THE P-BEAM ON THE
SURFACE OF THE HOE. $\delta$ IS THE VLD ASTIGMATIC DIFFERENCE.

S AND P IMAGE LOCATIONS - COLLIMATING LENS AND HOE ONLY $\lambda = 0.00067$ mm   $f_1 = 4.5$ mm   $\theta_{P.i.1} = 73.6$ deg   $\delta = 0.01$ mm

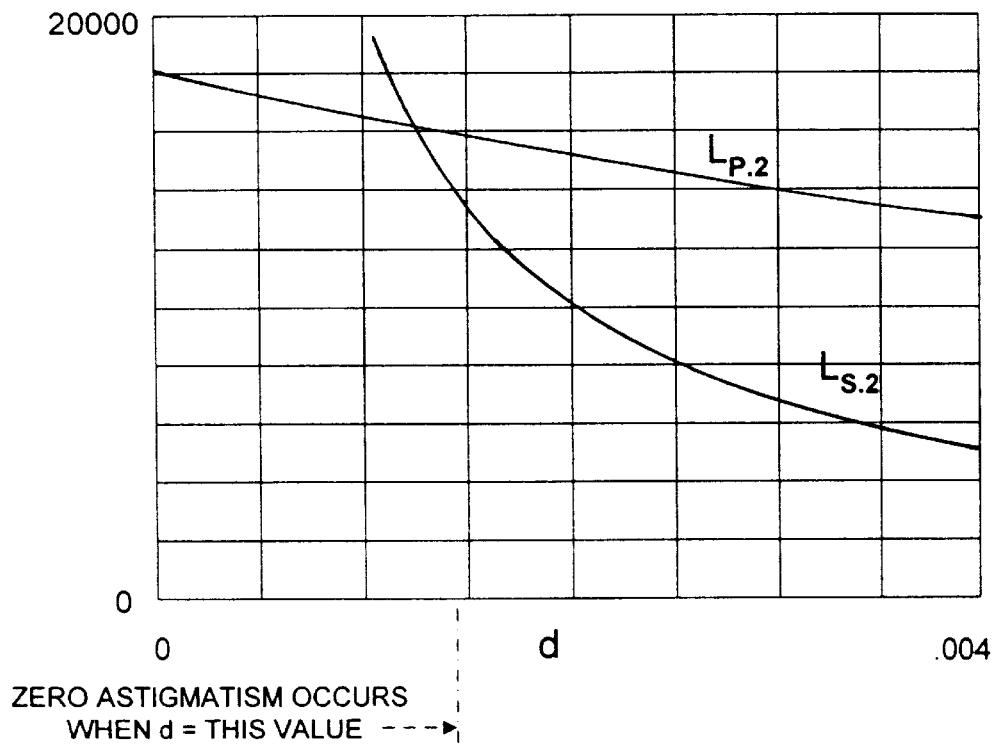

d := .001248 mm $L_{P.2}(d) = 1.622582 \cdot 10^{-4}$ mm   $L_{S.2}(d) = 1.622596 \cdot 10^{-4}$ mm

FIG. 30D

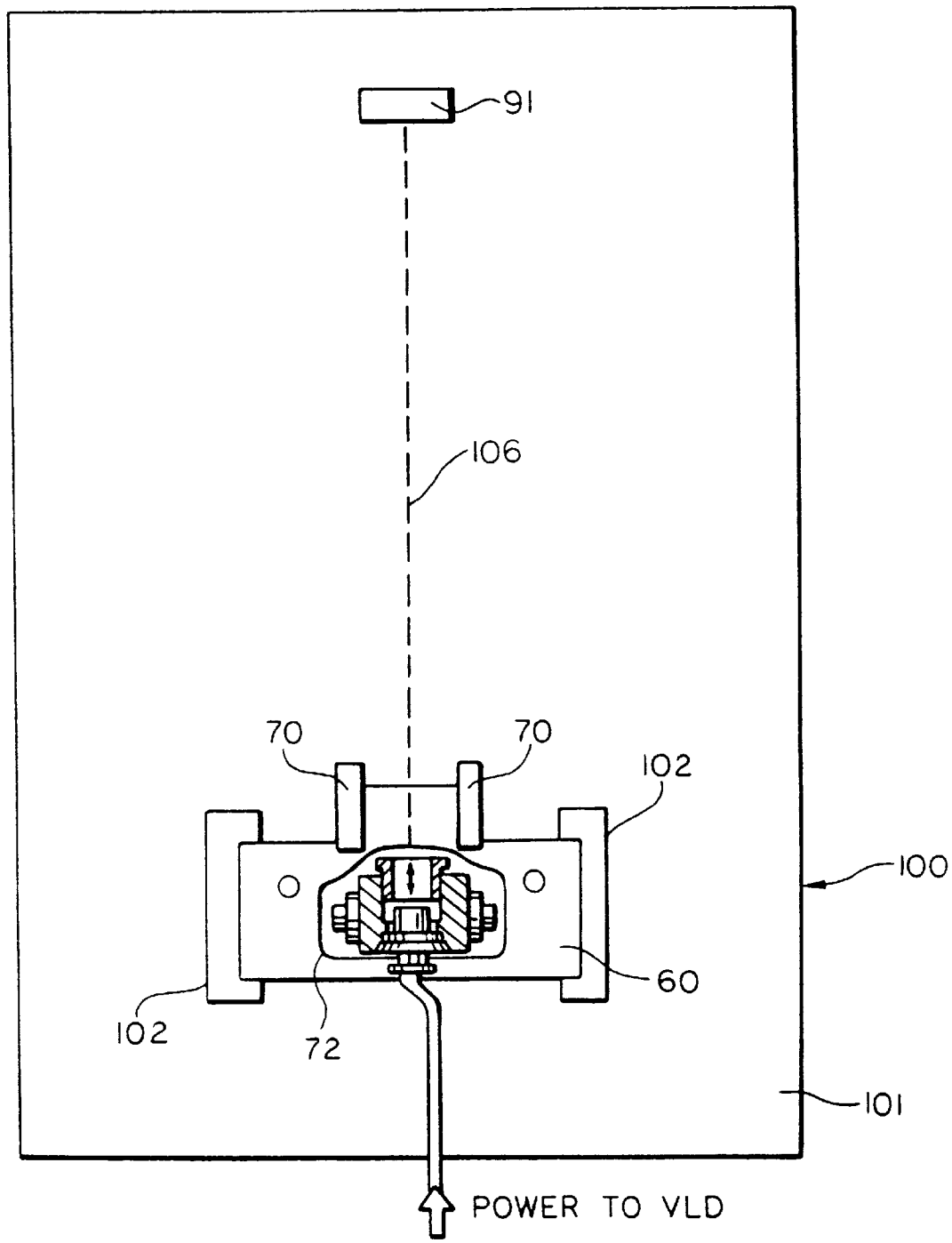
FIG. 31A1

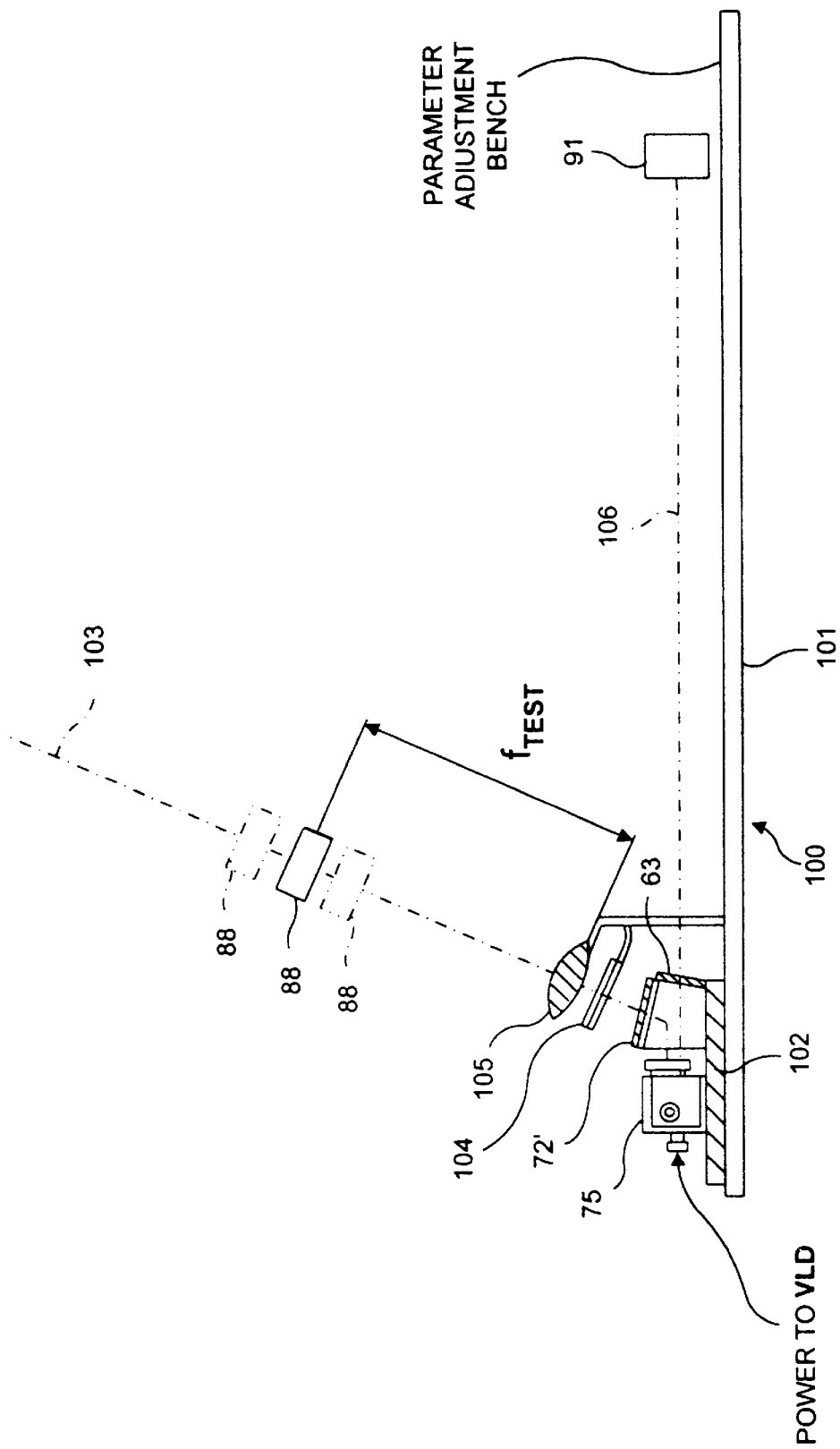
FIG. 31A2

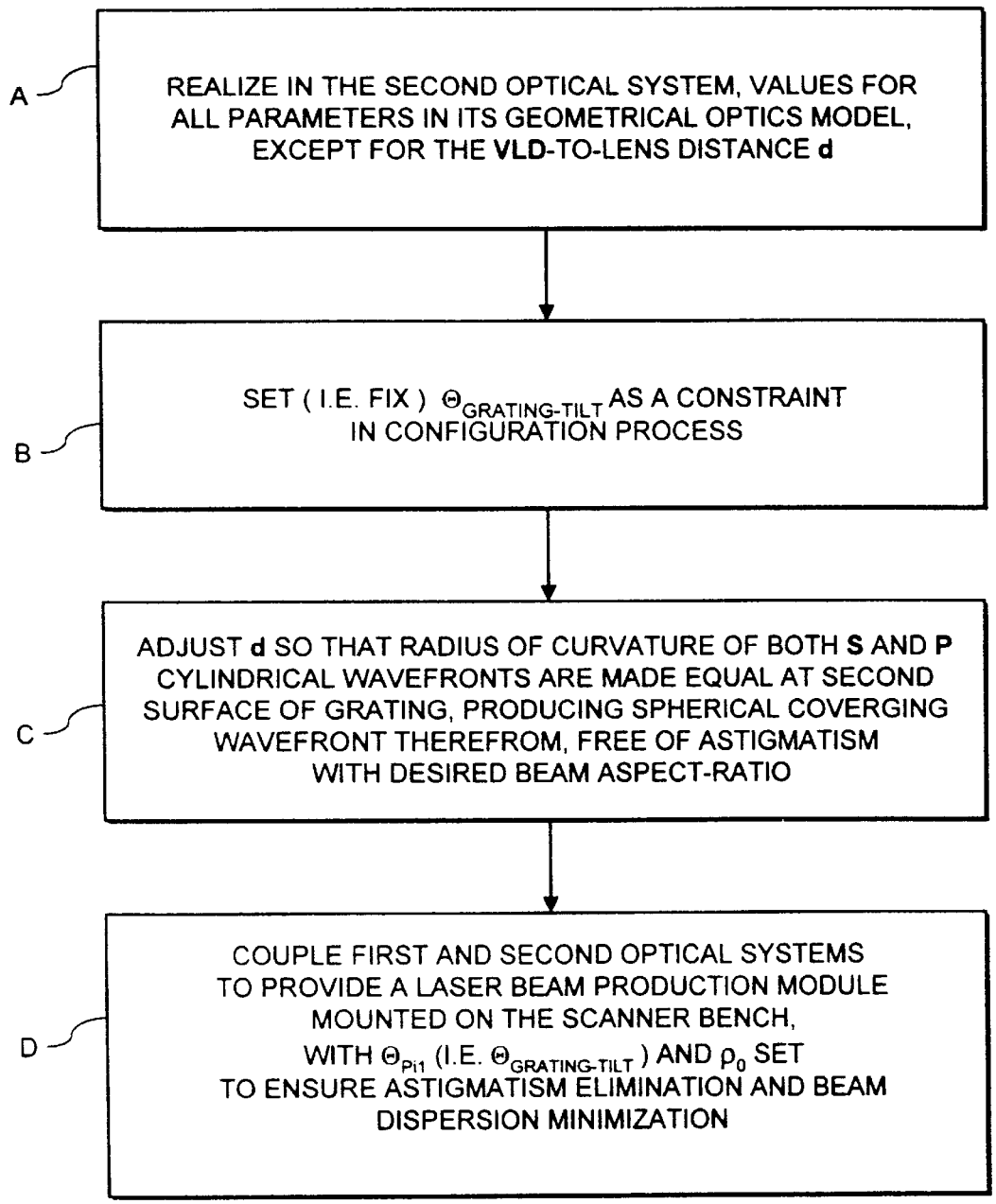
F I G. 31B

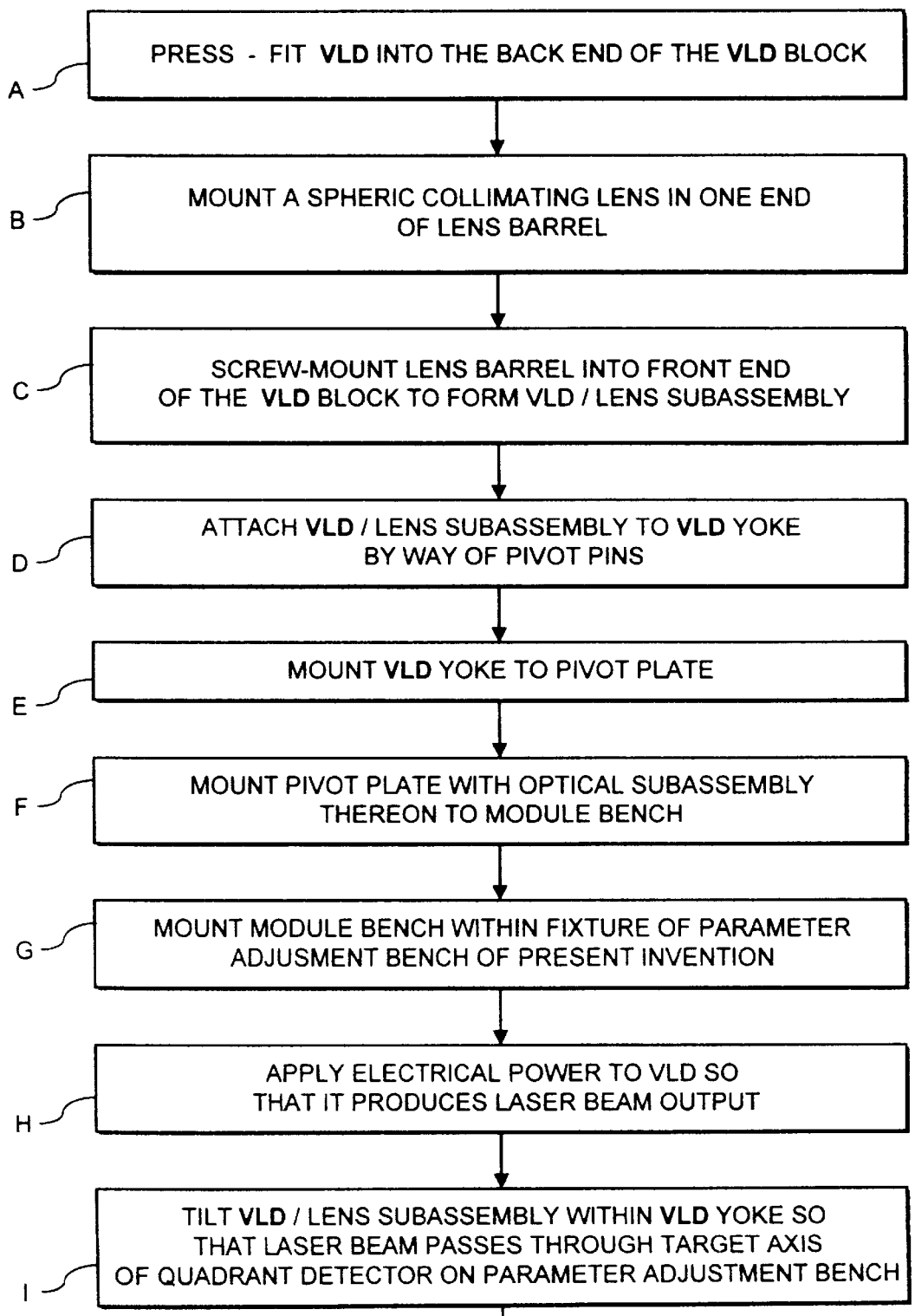
FIG. 31C1

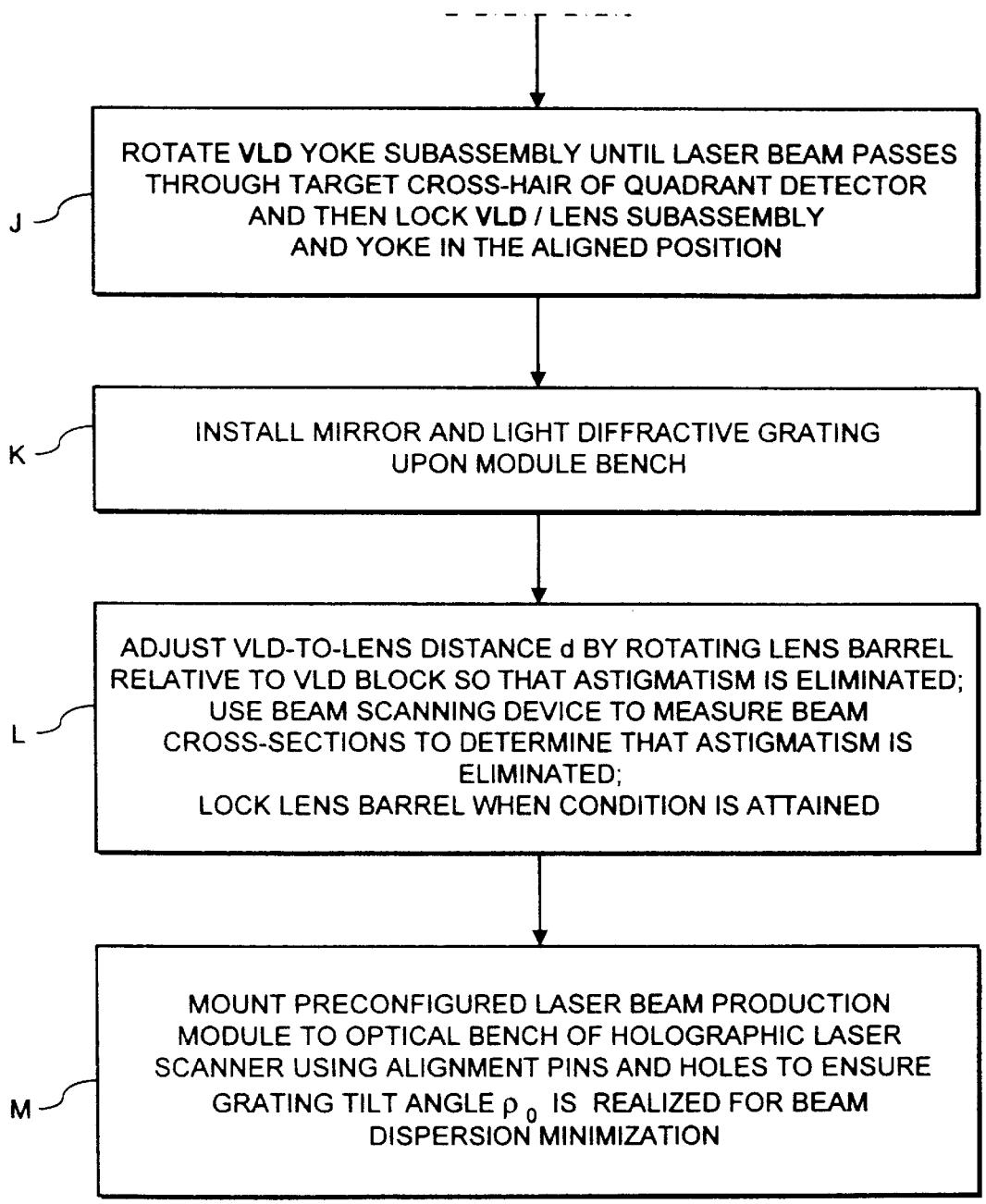
FIG. 31C2

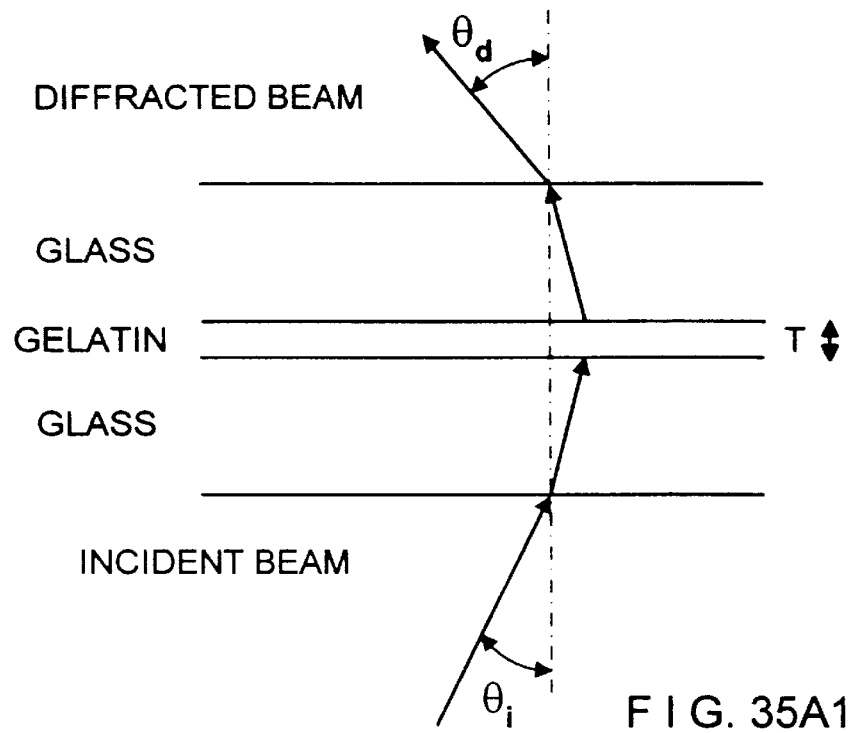
FIG. 35A1
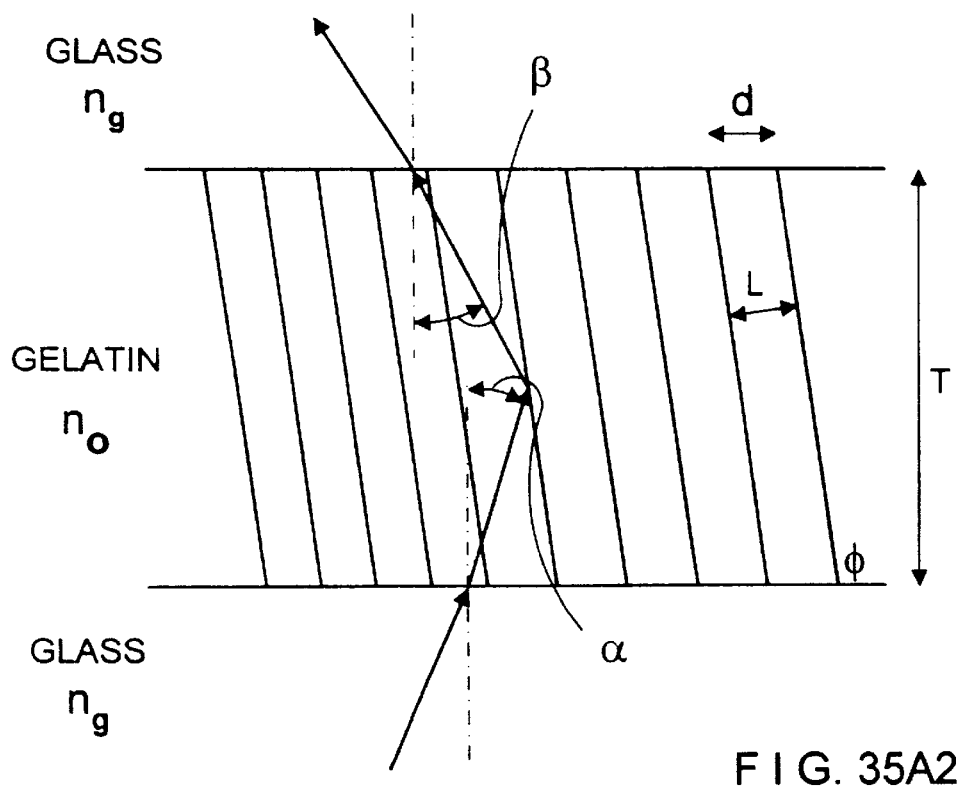
FIG. 35A2

S AND P POLARIZATION DIFFRACTION EFFICIENCY FOR THE TECH20 HOLOGRAPHIC SCANNING DISC AS FUNCTIONS OF THE EXTERNAL ANGLE OF INCIDENCE.

S AND P DIFFRACTION EFFICIENCY AS A FUNCTION OF THE DEVIATION FROM THE BRAGG ANGLE. SLANTED FRINGES ARE INCLUDED. IN THIS FILE, WE ARE CONSIDERING THE EXTERNAL ANGLES. THE EXTERNAL ANGLES ARE RELATED TO THE INTERNAL ANGLES VIA SNELL'S LAW. THE INTERNAL ANGLES ARE $\theta.0$, $\alpha$, AND $\beta$, WHERE $2\theta.0 = (\alpha + \beta)$..
$\alpha$ = THE ANGLE OF REFRACTION, $\beta$ - THE INTERNAL ANGLE OF DIFFRACTION, AND $\theta.0$ IS THE ANGLE BETWEEN THE REFRACTED BEAM AND THE BRAGG PLANES. THE EXTERNAL ANGLES ARE $\theta.i$ ( THE ANGLE OF INCIDENCE ) AND $\theta.d$ (THE ANGLE OF DIFFRACTION).

DEFINITIONS:

$\theta_i$ = ANGLE OF INCIDENCE (EXTERNAL)

$\alpha$ = ANGLE OF INCIDENCE (INTERNAL)

$\beta$ = ANGLE OF DIFFRACTION (INTERNAL)

$\delta$ = DEVIATION FROM THE BRAGG ANGLE (INTERNAL)

$\delta.0$ = DEVIATION FROM THE BRAGG ANGLE (EXTERNAL)

$\phi$ = TILT OF BRAGG PLANES

= $\pi/2$ FOR NO TILT

L = SEPARATION OF THE BRAGG PLANES

T = THICKNESS OF HOE MEDIUM d = EXTERNAL FRINGE SPACING n0 = AVERAGE REFRACTIVE INDEX OF THE HOE MEDIUM n1 = delta-n OF HOE FRINGE STRUCTURE $\lambda_a$ = WAVELENGTH IN AIR $\delta\lambda$ = DEVIATION FROM $\lambda_a$ ( BRAGG $\lambda$ )

FIG. 35B

FIXED, OR ESTABLISHED PARAMETERS:

$$\underline{n_0, n_1, \theta_i, \theta_d, \delta, \delta\lambda, \lambda_a, T.}$$

$n_0 := 1.4$ $\qquad\qquad deg = \dfrac{\pi}{180}$ $n_1 := 0.146$ $\theta_i := 43 \text{ deg}$ $\theta_d := 27.2 \text{ deg}$ $\delta_e := 0 \text{ deg}, .2 \text{ deg}, ..., .70 \text{ deg}$ $\delta_\lambda := 0$ $T := 2.2$ $\lambda_a := .670$

FIG. 35B1

$$(1) \quad \alpha := \operatorname{asin}\left[\frac{\sin[\theta_i]}{n_0}\right]$$

$$(2) \quad \beta := \operatorname{asin}\left[\frac{\sin[\theta_d]}{n_0}\right]$$

$$(3) \quad \phi := \frac{\pi}{2} - \frac{\beta - \alpha}{2}$$

$$(4) \quad d := \frac{\lambda_a}{[n_0(\sin(\alpha) + \sin(\beta))]} \quad \text{GRATING EQUATION}$$

$$(5) \quad L := d \sin(\phi)$$

$$(6) \quad C_R := \cos(\alpha)$$

$$(7) \quad C_S := \cos(\alpha) - \frac{\lambda_a}{n_0 L} \cos(\phi)$$

$$(8) \quad N := \pi n_1 \frac{T}{\lambda_a \sqrt{C_R C_S}}$$

$$(9) \quad \delta[\delta_e] := \left[\operatorname{asin}\left[\frac{\sin[\theta_i + \delta_e]}{n_0}\right] - \alpha\right]$$

$$(10) \quad \Gamma[\delta_e] := 2\pi \, \delta[\delta_e] \frac{\sin(\phi - \alpha)}{L} - \delta_\lambda \frac{\pi}{n_0 L^2}$$

$$(11) \quad S[\delta_e] := \Gamma[\delta_e] \frac{T}{2 C_S}$$

FIG. 35C1

DIFFRACTION EFFICIENCIES: $E_S$ AND $E_P$ AS A FUNCTION OF $\delta_e$

(12) $$E_S[\delta_e] := \frac{\left[\sin\left[\sqrt{N^2 + S[\delta_e]^2}\right]\right]^2}{1 + \frac{S[\delta_e]^2}{N^2}}$$

(13) $$E_P[\delta_e] := \frac{\left[\sin\left[\sqrt{(N\cos(2(\alpha-\phi)))^2 + S[\delta_e]^2}\right]\right]^2}{1 + \frac{S[\delta_e]^2}{(N\cos(2(\alpha-\phi)))^2}}$$

(14) $$E_{av}[\delta_e] := \frac{E_S[\delta_e] + E_P[\delta_e]}{2}$$

FIG. 35C2

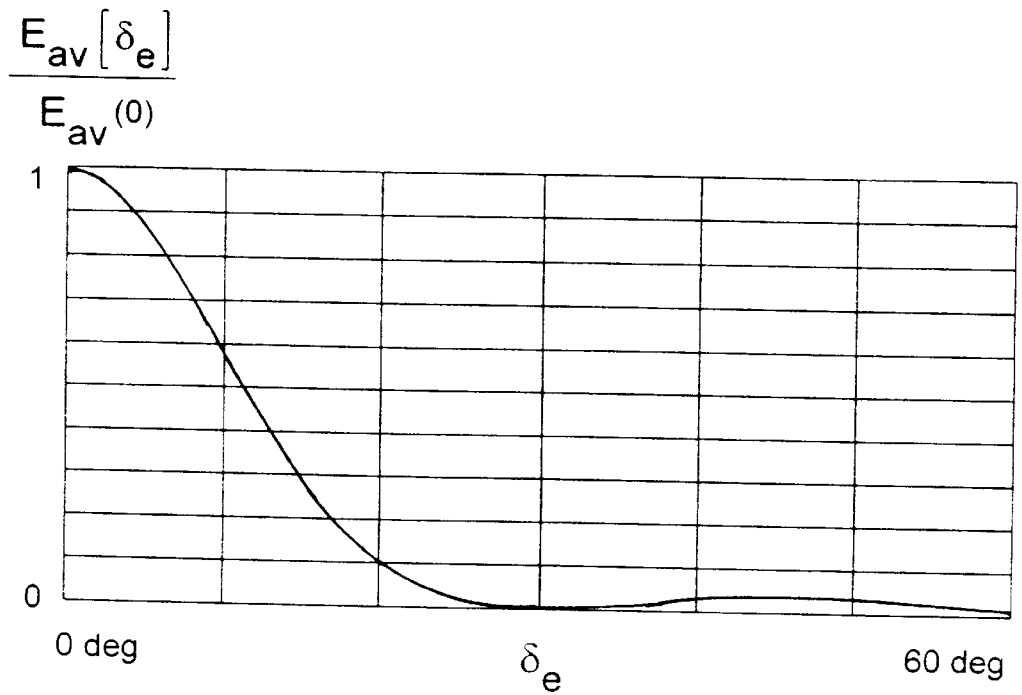
FIG. 35D1

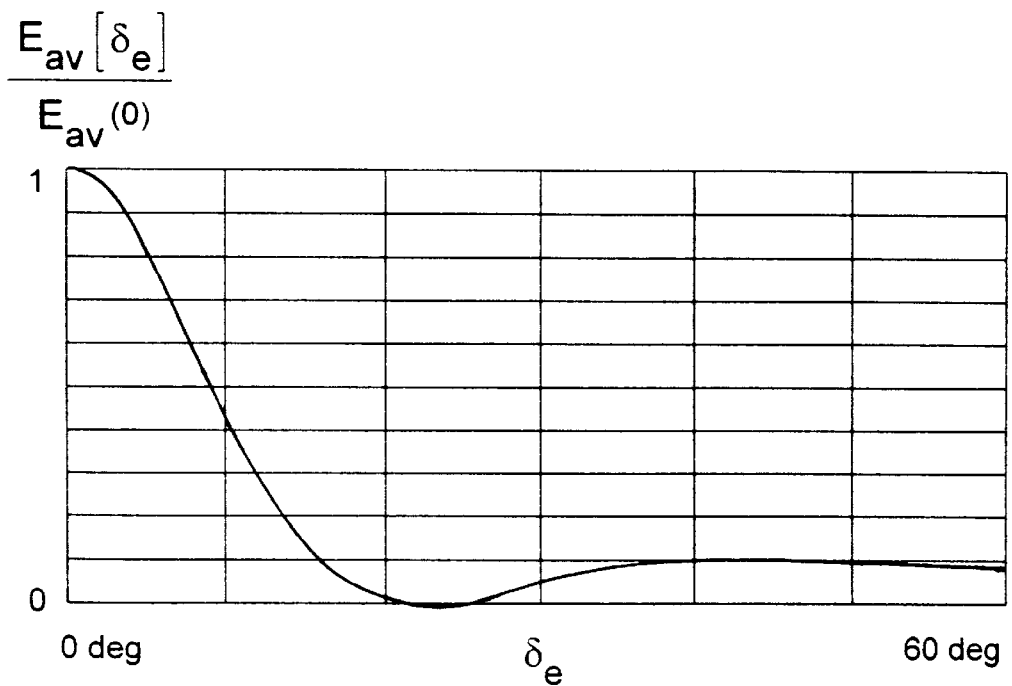
FIG. 35D2

CASE: CROSS-POLARIZER USED BEFORE PHOTO-DETECTOR

S POLARIZATION DIFFRACTION EFFICIENCY FOR THE TECH20
HOLOGRAPHIC SCANNING DISC AS A FUNCTION OF THE EXTERNAL ANGLE
OF INCIDENCE. THIS IS THE SECOND CASE OF INTEREST WHEN A CROSSED
POLARIZER IS USED ON THE DETECTOR.

S DIFFRACTION EFFICIENCY AS A FUNCTION OF THE DEVIATION FROM THE
BRAGG ANGLE . SLANTED FRINGES ARE INCLUDED. IN THIS FILE, WE ARE
CONSIDERING THE EXTERNAL ANGLES. THE EXTERNAL ANGLES ARE RELATED
TO THE INTERNAL ANGLES VIA SNELL'S LAW. THE INTERNAL ANGLES ARE $\theta.0$,
$\alpha$, AND $\beta$, WHERE $2\theta.0 = (\alpha + \beta)$..
$\alpha$ = THE ANGLE OF REFRACTION, $\beta$ - THE INTERNAL ANGLE OF DIFFRACTION,
AND $\theta.0$ IS THE ANGLE BETWEEN THE REFRACTED BEAM AND THE BRAGG
PLANES. THE EXTERNAL ANGLES ARE $\theta.i$ ( THE ANGLE OF INCIDENCE ) AND
$\theta.d$ (THE ANGLE OF DIFFRACTION).

DEFINITIONS:

$\theta_i$ = ANGLE OF INCIDENCE (EXTERNAL)

$\alpha$ = ANGLE OF INCIDENCE (INTERNAL)

$\beta$ = ANGLE OF DIFFRACTION (INTERNAL)

$\delta$ = DEVIATION FROM THE BRAGG ANGLE (INTERNAL)

$\delta.0$ = DEVIATION FROM THE BRAGG ANGLE (EXTERNAL)

$\phi$ = TILT OF BRAGG PLANES

= $\pi/2$ FOR NO TILT

L = SEPARATION OF THE BRAGG PLANES

T = THICKNESS OF HOE MEDIUM d = EXTERNAL FRINGE SPACING n0 = AVERAGE REFRACTIVE INDEX OF THE HOE MEDIUM n1 = delta-n OF HOE FRINGE STRUCTURE $\lambda_a$ = WAVELENGTH IN AIR $\delta\lambda$ = DEVIATION FROM $\lambda_a$ ( BRAGG $\lambda$ )

FIG. 37A

FIXED, OR ESTABLISHED PARAMETERS:
$n_0, n_1, \theta_i, \theta_d, \delta, \delta\lambda, \lambda_a, T.$ $n_0 := 1.4$ $\qquad$ $deg = \dfrac{\pi}{180}$ $n_1 := 0.146$ $\theta_i := 43 \ deg$ $\theta_d := 27.2 \ deg$ $\delta_e := 0 \ deg, .2 \ deg, ..., .70 \ deg$ $\delta_\lambda := 0$ $T := 2.2$ $\lambda_a := .670$

FIG. 37A1

$$(1) \quad \alpha := \operatorname{asin}\left[\frac{\sin[\theta_i]}{n_0}\right]$$

$$(2) \quad \beta := \operatorname{asin}\left[\frac{\sin[\theta_d]}{n_0}\right]$$

$$(3) \quad \phi := \frac{\pi}{2} - \frac{\beta - \alpha}{2}$$

$$(4) \quad d := \frac{\lambda_a}{[n_0(\sin(\alpha) + \sin(\beta))]} \quad \text{GRATING EQUATION}$$

$$(5) \quad L := d\sin(\phi) \qquad (6) \quad C_R := \cos(\alpha)$$

$$(7) \quad C_S := \cos(\alpha) - \frac{\lambda_a}{n_0 L}\cos(\phi)$$

$$(8) \quad N := \pi n_1 \frac{T}{\lambda_a \sqrt{C_R C_S}}$$

$$(9) \quad \delta[\delta_e] := \left[\operatorname{asin}\left[\frac{\sin[\theta_i + \delta_e]}{n_0}\right] - \alpha\right]$$

$$(10) \quad \Gamma[\delta_e] := 2\pi \delta[\delta_e]\frac{\sin(\phi - \alpha)}{L} - \delta_\lambda \frac{\pi}{n_0 L^2}$$

$$(11) \quad S[\delta_e] := \Gamma[\delta_e]\frac{T}{2 C_S}$$

S-POLARIZATION DIFFRACTION EFFICIENCY: $E_s$ AS A FUNCTION OF $\delta_e$ $$(12) \quad E_S[\delta_e] := \frac{\left[\sin\left[\sqrt{N^2 + S[\delta_e]^2}\right]\right]^2}{1 + \frac{S[\delta_e]^2}{N^2}}$$

FIG. 37B

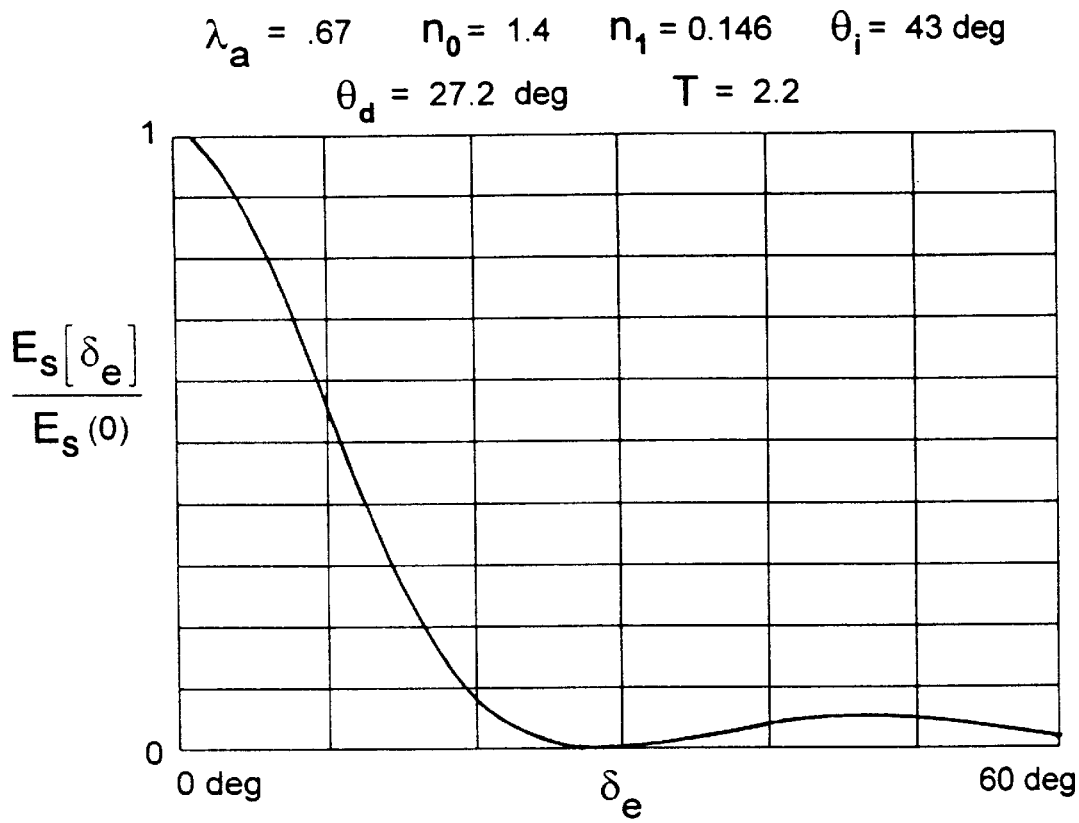
FIG. 37C1

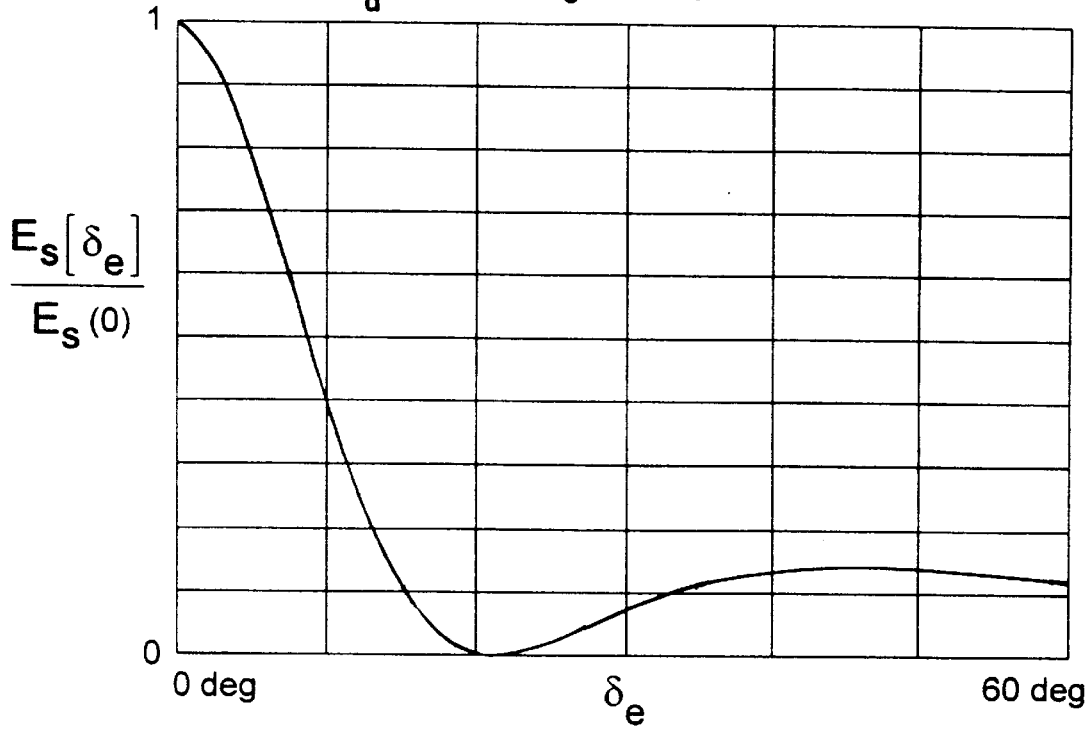
$\lambda_a = .670 \quad n_0 = 1.4 \quad n_1 = 0.145 \quad \theta_i = 43 \text{ deg}$
$\theta_d = 41.8 \text{ deg} \quad T = 2.2$
$$\text{PerCentLoss} := 100 \left[ \frac{1}{28 \text{ deg}} \right] \left[ \int_{25 \text{ deg}}^{53 \text{ deg}} \frac{E_s[\delta_e]}{E_s(0)} d\delta_e \right]$$
PerCentLoss := 10.972
FIG. 37C2

P POLARIZATION DIFFRACTION EFFICIENCY FOR THE TECH20 HOLOGRAPHIC SCANNING DISC AS A FUNCTION OF THE EXTERNAL ANGLE OF INCIDENCE. THIS IS THE CASE OF INTEREST WHEN A CROSSED POLARIZER IS USED ON THE DETECTOR.

P DIFFRACTION EFFICIENCY AS A FUNCTION OF THE DEVIATION FROM THE BRAGG ANGLE . SLANTED FRINGES ARE INCLUDED. IN THIS FILE, WE ARE CONCIDERING THE EXTERNAL ANGLES. THE EXTERNAL ANGLES ARE RELATED TO THE INTERNAL ANGLES VIA SNELL'S LAW. THE INTERNAL ANGLES ARE $\theta.0$, a, AND $\beta$, WHERE $2\theta.0 = (\alpha + \beta)$..
$\alpha$ = THE ANGLE OF REFRACTION, $\beta$ - THE INTERNAL ANGLE OF DIFFRACTION, AND $\theta.0$ IS THE ANGLE BETWEEN THE REFRACTED BEAM AND THE BRAGG PLANES. THE EXTERNAL ANGLES ARE $\theta.i$ ( THE ANGLE OF INCIDENCE ) AND $\theta.d$ (THE ANGLE OF DIFFRACTION).

DEFINITIONS:

$\theta_i$ = ANGLE OF INCIDENCE (EXTERNAL)

$\alpha$ = ANGLE OF INCIDENCE (INTERNAL)

$\beta$ = ANGLE OF DIFFRACTION (INTERNAL)

$\delta$ = DEVIATION FROM THE BRAGG ANGLE (INTERNAL)

$\delta.0$ = DEVIATION FROM THE BRAGG ANGLE (EXTERNAL)

$\phi$ = TILT OF BRAGG PLANES

= $\pi/2$ FOR NO TILT

L = SEPARATION OF THE BRAGG PLANES

T = THICKNESS OF HOE MEDIUM d = EXTERNAL FRINGE SPACING n0 = AVERAGE REFRACTIVE INDEX OF THE HOE MEDIUM n1 = delta-n OF HOE FRINGE STRUCTURE $\lambda_a$ = WAVELENGTH IN AIR $\delta\lambda$ = DEVIATION FROM $\lambda_a$ ( BRAGG $\lambda$ )

FIG. 38A

FIXED, OR ESTABLISHED
PARAMETERS: n0, Δn1, $\theta_i$, $\theta_d$, $\delta$, $\delta\lambda$, $\lambda_a$, T.

$n_0 := 1.4$ $deg = \dfrac{\pi}{180}$ $\Delta n_1 := 0.146$ $\theta_i := 43 \text{ deg}$ $\theta_d := 27.2 \text{ deg}$ $\delta := 0 \text{ deg}, .2 \text{ deg}, ..., .70 \text{ deg}$ $\delta_\lambda := 0$ $T := 2.2$ $\lambda_a := .670$

FIG. 38A1

$$(1)\quad \alpha := \operatorname{asin}\left[\frac{\sin[\theta_i]}{n_0}\right]$$

$$(2)\quad \beta := \operatorname{asin}\left[\frac{\sin[\theta_d]}{n_0}\right]$$

$$(3)\quad \phi := \frac{\pi}{2} - \frac{\beta - \alpha}{2}$$

$$(4)\quad d := \frac{\lambda_a}{[n_0(\sin(\alpha) + \sin(\beta))]} \quad \text{GRATING EQUATION}$$

$$(5)\quad L := d \sin(\phi)$$

$$(6)\quad C_R := \cos(\alpha)$$

$$(7)\quad C_S := \cos(\alpha) - \frac{\lambda_a}{n_0 L}\cos(\phi)$$

$$(8)\quad N := \pi n_1 \frac{T}{\lambda_a \sqrt{C_R C_S}}$$

$$(9)\quad \delta[\delta_e] := \left[\operatorname{asin}\left[\frac{\sin[\theta_i + \delta_e]}{n_0}\right] - \alpha\right]$$

$$(10)\quad \Gamma[\delta_e] := 2\pi\,\delta[\delta_e]\frac{\sin(\phi - \alpha)}{L} - \delta_\lambda \frac{\pi}{n_0 L^2}$$

$$(11)\quad S[\delta_e] := \Gamma[\delta_e]\frac{T}{2 C_S}$$

FIG. 38B1

P-POLARIZATION DIFFRACTION EFFICIENCY:
$E_P$ AS A FUNCTION OF $\delta.e$ $$(12)\ E_P[\delta_e] := \frac{\left[\sin\left[\sqrt{(N\cos(2(\alpha-\phi)))^2 + S[\delta_e]^2}\right]\right]^2}{1 + \frac{S[\delta_e]^2}{(N\cos(2(\alpha-\phi)))^2}}$$

F I G. 38B2

RELATIVE DIFFRACTION EFFICIENCY FOR P-POLARIZED LIGHT AS A FUNCTION OF DEVIATION FROM THE BRAGG ANGLE - FACET 1

$\lambda_a = .670 \quad n_0 = 1.4 \quad n_1 = 0.146 \quad \theta_i = 43$ deg
$\theta_d = 27.2$ deg $\quad T = 2.2$

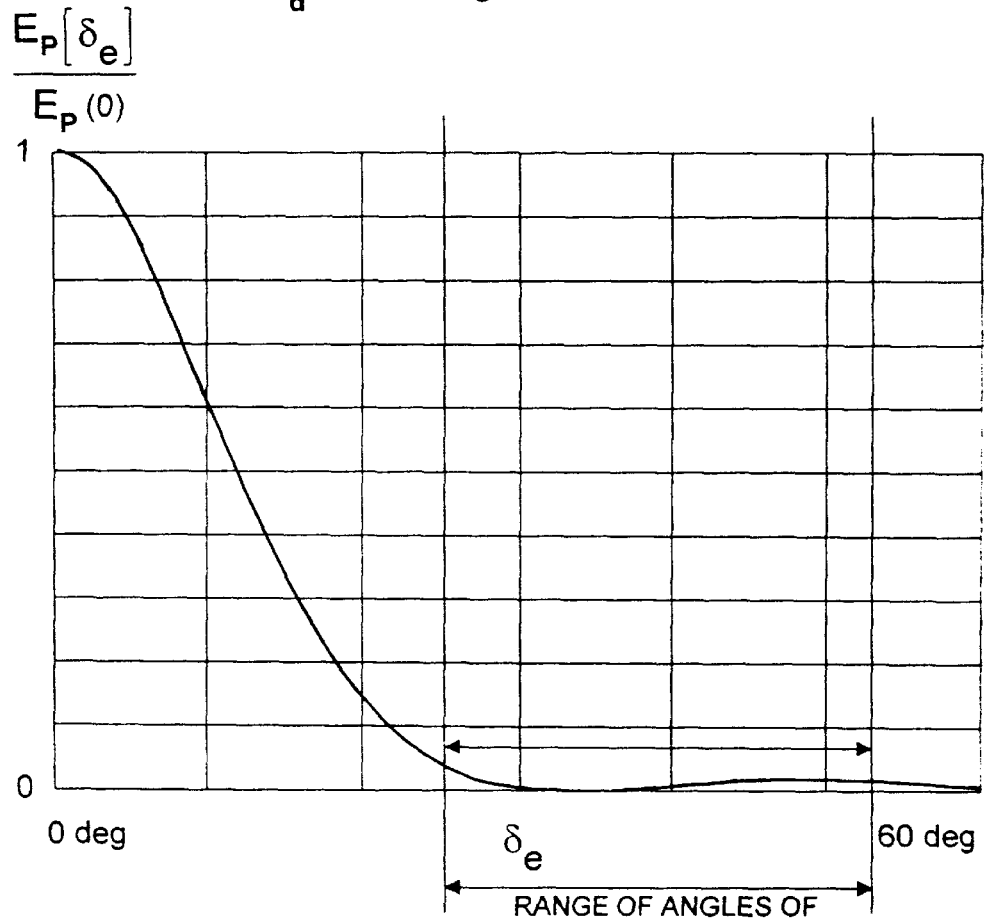

RANGE OF ANGLES OF INCIDENCE FROM RAYS FROM PARABOLIC MIRROR

F I G. 38C1

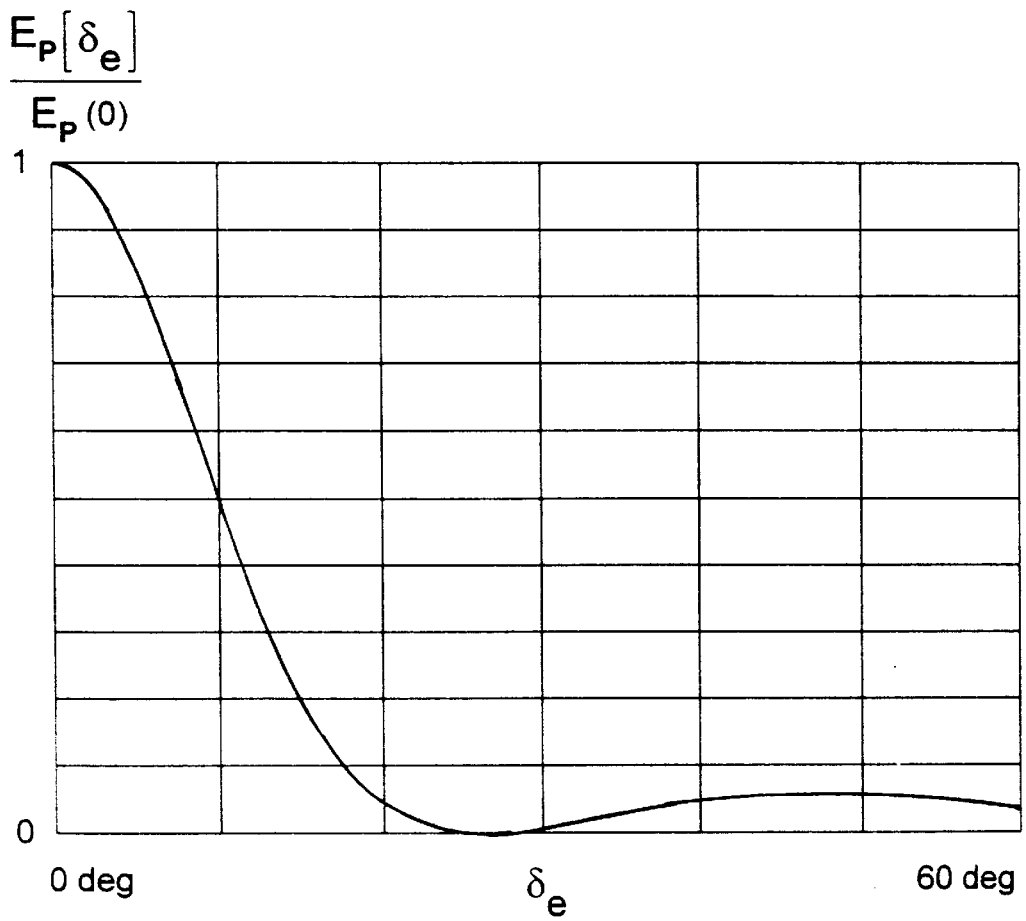
FIG. 38C2

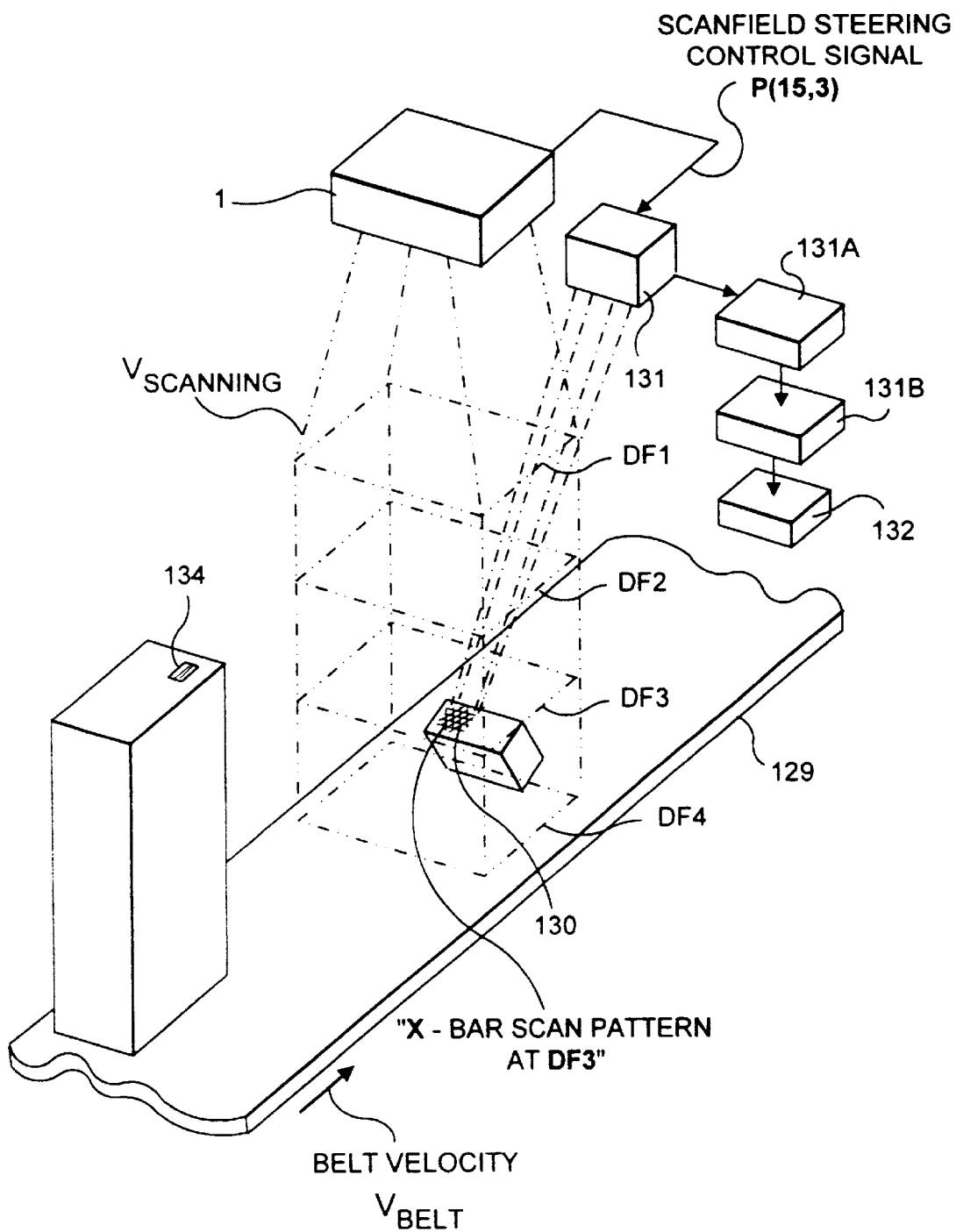
F I G. 45A

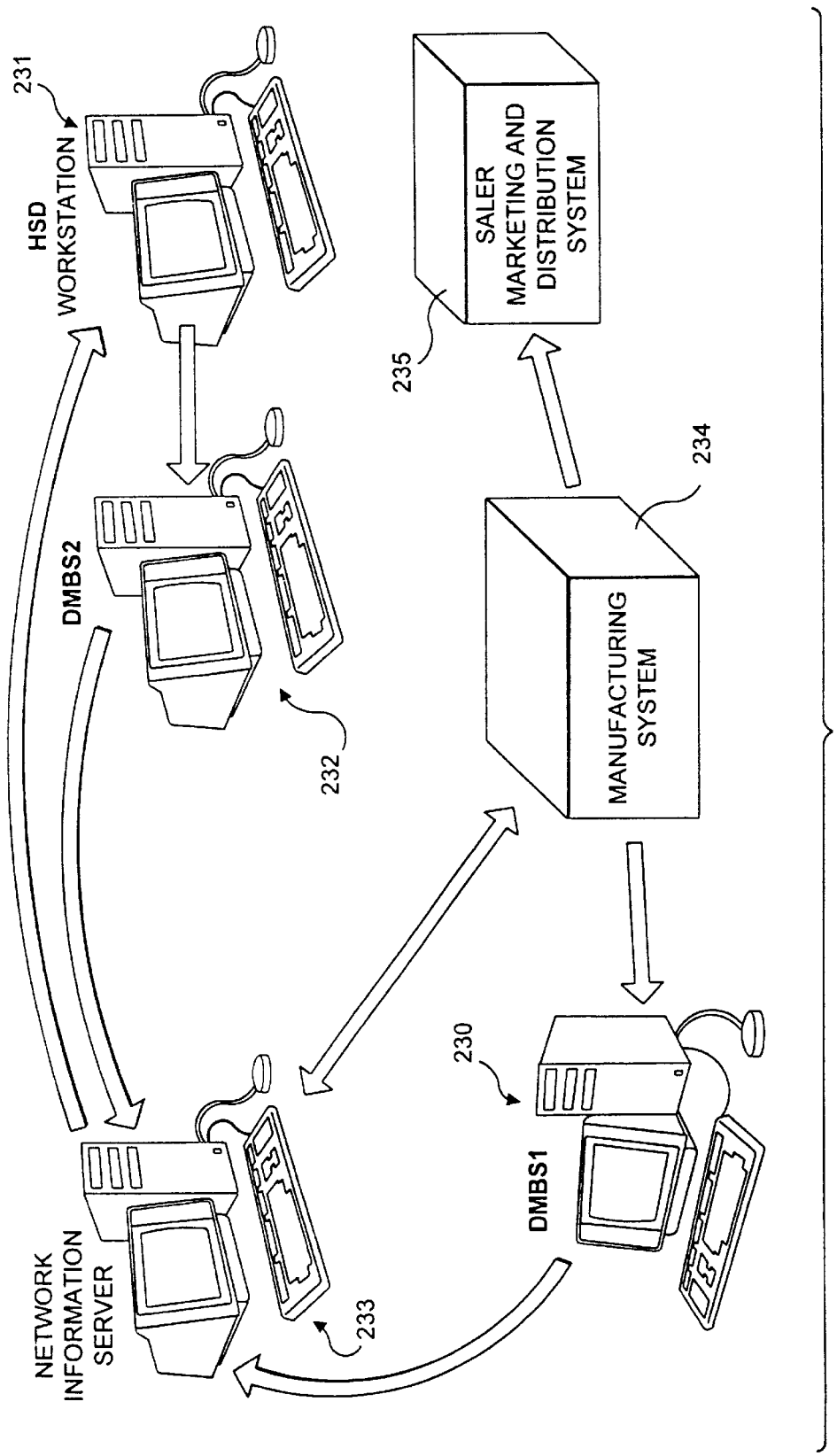
F I G. 50

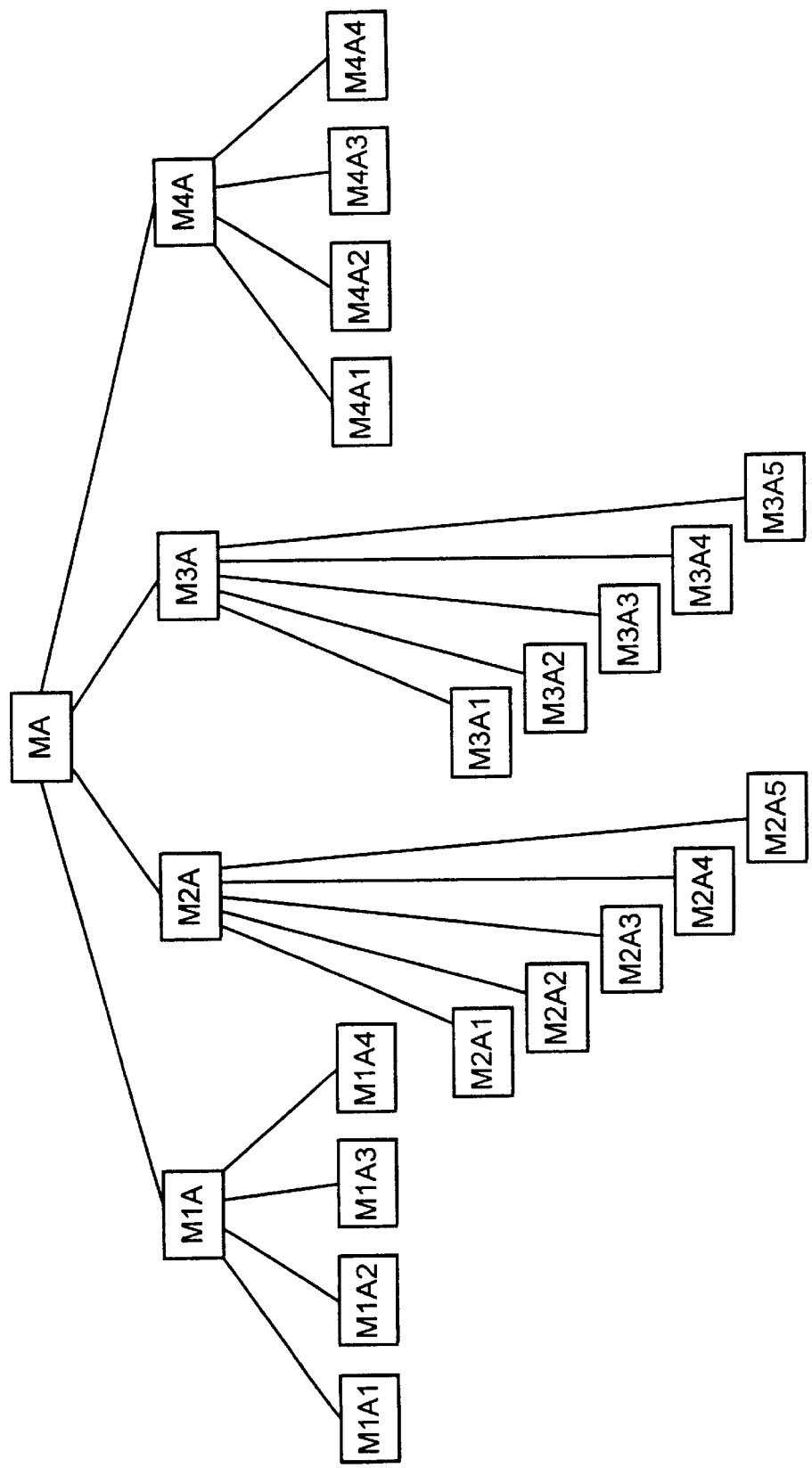
F I G. 52

| MODULES AND SUBCOMPONENTS FOR HOLOGRAPHIC LASER SCANNER DESIGN "A" | | | | |
|---|---|---|---|---|
| MODULES | M1A<br>OPTICAL BENCH /<br>HOUSING MODULE | M2A<br>HOLOGRAPHIC<br>SCANNING DISC/<br>PHOTODETECTOR<br>MODULE | M3A<br>SCANNING STATION<br>MODULE | M4A<br>CPU BOARD/ POWER<br>SUPPLY MODULE |
| SUBCOMPONENTS | M1A1<br>OPTICAL BENCH | M2A1<br>SCANNING DISC<br>PLATES (8.6") | M3A1<br>SCANNING STATION<br>SUPPORT FIXTURE | M4A1<br>CPU MOTHER-BOARD |
| | M1A2<br>HOUSING COVER | M2A2<br>SCANNER MOTOR | M3A2<br>BEAM FOLDING<br>MIRROR | M4A2<br>POWER SUPPLY<br>MODULE |
| | M1A3<br>HOUSING SIDE<br>WALLS | M2A3<br>MOTOR SUPPORT<br>FIXTURE | M3A3<br>PARABOLIC LIGHT<br>COLLECTING MIRROR | M4A3<br>WIRE HARNESSES |
| | | M2A4<br>PHOTODETECTOR<br>BOARDS (3) | M3A4<br>LASER BEAM<br>PRODUCTION MODULE | |
| | | M2A5<br>PHOTODETECTOR<br>COVER PLATE | M3A5<br>ANALOG SIGNAL<br>PROCESSING BOARD | |

FIG. 53

HOLOGRAPHIC LASER SCANNERS OF MODULAR CONSTRUCTION AND METHOD AND APPARATUS FOR DESIGNING AND MANUFACTURING THE SAME

RELATED CASES

This is a Continuation-in-Part of application Ser. No. 08/726,522 filed Oct. 7, 1996 which is a Continuation of application Ser. No. 08/573,949 filed Dec. 18, 1995 now abandoned; which is a Continuation-in-Part of application Ser. No. 08/615,054 filed Mar. 12, 1996; application Ser. No. 08/476,069 filed Jun. 7, 1995 now U.S. Pat. No. 5,591,953; application Ser. No. 08/561,479 filed Nov. 20, 1995 now U.S. Pat. No. 5,661,292 which is a continuation of application Ser. No. 08/293,695 filed Aug. 19, 1995 now U.S. Pat. No. 5,468,951; application Ser. No. 08/293,493 filed Aug. 19, 1994 now U.S. Pat. No. 5,525,789; application Ser. No. 08/475,376 filed Jun. 7, 1995 now U.S. Pat. No. 5,637,852; application Ser. No. 08/439,224 filed May 11, 1995 now U.S. Pat. No. 5,627,359; and application Ser. No. 08/292, 237 filed Aug. 17, 1994 now U.S. Pat. No. 5,808,285, each commonly owned by Assignee, Metrologic Instruments, Inc., of Blackwood, N.J., and is incorporated herein by reference as if fully set forth herein.

BACKGROUND OF THE INVENTION

1. Field of Invention

The present invention relates generally to holographic laser scanners of ultra-compact and modular design capable of reading bar and other types of graphical indicia within a large scanning volume using holographic optical elements and visible laser diodes, and also a method of designing and operating the same for use in diverse applications.

2. Brief Description of the Prior Art

The use of bar code symbols for product and article identification is well known in the art. Presently, various types of bar code symbol scanners have been developed. In general, these bar code symbol readers can be classified into two distinct groups.

The first class of bar code symbol reader simultaneously illuminates all of the bars and spaces of a bar code symbol with light of a specific wavelength(s) in order to capture an image thereof for recognition/decoding purposes. Such scanners are commonly known as CCD scanners because they use CCD image detectors to detect images of the bar code symbols being read.

The second class of bar code symbol reader uses a focused light beam, typically a focused laser beam, to sequentially scan the bars and spaces of a bar code symbol to be read. This type of bar code symbol scanner is commonly called a "flying spot" scanner as the focused laser beam appears as "a spot of light that flies" across the bar code symbol being read. In general, laser bar code symbol scanners are sub-classified further by the type of mechanism used to focus and scan the laser beam across bar code symbols.

The majority of laser scanners in use today employ lenses and moving (i.e., rotating or oscillating) mirrors in order to focus and scan laser beams across bar code symbols during code symbol reading operations. Examples of such laser scanners are disclosed in great detail in the Background of Invention of U.S. Pat. No. 5,216,232 to Knowles, et al.; U.S. Pat. No. 5,340,973 to Knowles et al.; U.S. Pat. No. 5,340, 971 to Rockstein, et al.; U.S. Pat. No. 5,424,525 to Rockstein, et al., which are incorporated herein by reference.

One type of laser scanner that has enjoyed great popularity in recent years is called the "polygon scanner" in that it employs a rotating polygon whose sides bear light reflective surfaces (e.g., mirrors) for scanning a laser beam over multiple paths through space above the scanning window of the scanner. In polygon-type laser scanners, the angular sweep of the outgoing laser beam and the light collection efficiency of the return laser beam are both directly related to the number and size of light reflective facets on the rotating polygon.

In contrast to laser scanners, which use lenses (i.e., light refractive elements) to shape and focus laser light beams and light reflective surfaces to scan focused laser beams, there exists another subclass of laser scanner which employs a high-speed holographic disc. In general, the holographic disc comprises an array of holographic optical elements (HOEs) called "facets" which function to focus and deflect outgoing laser beams during laser beam scanning operations, as well as focus incoming reflected laser light during light collection/detection operations. Such bar code symbol scanners are typically called holographic laser scanners or readers because holographic optical elements (HOEs) are employed. Examples of prior art holographic scanners are disclosed in U.S. Pat. Nos. 4,415,224; 4,758, 058; 4,748,316; 4,591,242; 4,548,463; 5,331,445 and 5,416, 505, incorporated herein by reference.

Holographic laser scanners, or readers, have many advantages over laser scanners which employ lenses and mirrors for laser beam focusing and scanning (i.e., deflection) functions.

One of the major advantages of holographic laser scanners over polygon laser scanners is the ability of holographic laser scanners to independently control (i) the angular sweep of the outgoing laser beam and (ii) the light collection efficiency for the returning laser beam.

Holographic laser scanners have other advantages over polygon-type laser scanners. In particular, in holographic laser scanners, light collection efficiency is determined by the size of the light collecting portion of each holographic facet, while the angular sweep of the outgoing laser beam is determined by the angular width of the outgoing beam portion of the holographic facet and the angles of incidence and diffraction of the outgoing laser beam.

While prior art holographic scanning systems have many advantages over mirror-based laser scanning systems, prior art holographic scanners are not without problems.

In the first holographic scanner produced by International Business Machines (IBM), the holographic facets on its holographic disc were simple sectors which did not allow for independent control over light collection and light scanning functions. Consequently, such holographic scanners had faster scanning speeds than were needed for the applications at hand. Subsequent industrial scanners designed by IBM allowed independent control of these functions. However, the holographic discs employed in prior art holographic scanners, e.g., the HOLOSCAN 2100™ holographic laser scanner designed and sold by Holoscan, Inc. of San Jose, Calif., fail to (i) maximize the use of available space on the disc for light collection purposes, and (ii) minimize the scan line speed for particular laser scanning patterns. As a result of such design limitations, prior art holographic scanners have required the use of large scanning discs which make inefficient use of the available light collecting surface area thereof. They also are incapable of producing from each holographic facet thereon, detected scan data signals having substantially the same signal level independent of the location in the scanning volume from which the corresponding optical scan data signal is produced. Consequently, this has placed great demands on the electrical signal processing circuitry required to handle the dramatic signal swings associated with such detected return signals.

While U.S. Pat. No. 4,415,224 to Applicant (Dickson) discloses a method of equalizing the light collection efficiency of each facet on the holographic scanning disc, it does not disclose, teach or suggest a method of equalizing the light collection efficiency of each facet on the holographic scanning disc, while utilizing substantially all of the light collecting surface area thereof. Thus, in general, prior art holographic laser scanners have required very large scanner housings in order to accommodate very large scanning discs using only a portion of their available light collection surface area.

In many code symbol reading applications, the volumetric extent of the holographic scanner housing must be sufficiently compact to accommodate the small volume of space provided for physical installation. However, due to limitations of conventional design principles, it has not been possible to build prior art holographic scanners having sufficient compactness required in many applications. Consequently, the huge housings required to enclose the optical apparatus of prior art holographic laser scanners have restricted their use to only a few practical applications where housing size constraints are of little concern.

While highly desirable because of their low power usage and miniature size, solid-state visible laser diodes (VLDs) cannot be used practically in prior art holographic laser scanners because of several problems which arise from inherent properties of conventional VLDs.

The first problem associated with the use of VLDs in holographic laser scanners is that the VLDs do not produce a single spectral line output in the manner of conventional He-Ne laser tubes. Rather, conventional VLDs always produce some background super-luminescence, which is a broad spectrum of radiation of the type produced by conventional light emitting diodes (LEDs). Also, VLDs often operate in more than one oscillation mode and/or exhibit mode hopping, in which the VLD jumps from one mode of oscillation to another. Both of these characteristics of VLDs result in a spreading of the laser beam as it leaves the highly dispersive holographic facet of the holographic disc. This results in an effectively larger "spot" at the focal point of the holographic facet, causing errors in the resolution of the bars and spaces of scanned code symbols and, often, intolerable symbol decoding errors.

The second problem associated with the use of VLDs in a holographic scanner is that the inherent "astigmatic difference" in VLDs results in the production of laser beams exhibiting astigmatism along the horizontal and vertical directions of propagation. This fact results in the outgoing laser beam having a cross-sectional dimension whose size and orientation varies as a function of distance away from the VLD. Thus, at particular points in the scanning field of a holographic scanner using a VLD, the orientation of the laser beam ("flying spot") will be such that the bars and spaces cannot be resolved for symbol decoding operations.

Holographic scanners suffer from other technical problems as well.

In prior art holographic scanners, the light collection and detection optics are necessarily complicated and require a significant volume of space within the scanner housing. This necessarily causes the height dimension of the scanner housing to be significantly larger than desired in nearly all code symbol reading applications.

When an outgoing laser beam passes though, and is diffracted by, the rotating holographic facets of prior art holographic scanners, "holographically-introduced" astigmatism is inherently imparted to the outgoing laser beam. While the source of this type of astigmatism is different than the source of astigmatism imparted to a laser beam due to the inherent astigmatic difference in VLDs, the effect is substantially the same, namely: the outgoing laser beam has a cross-sectional dimension whose size and orientation varies as a function of distance away from the holographic facet. Thus, at particular points in the scanning field of a holographic scanner, the orientation of the laser beam (i.e., "the flying spot") will be such that the bars and spaces of a scanned bar code symbol cannot be resolved for symbol decoding operations. Consequently, it has been virtually impossible to design a holographic laser scanner with a three-dimensional scanning volume that is capable of scanning bar code symbols independent of their orientation as they move through the scanning volume.

Because of the methods used to design and construct prior art holographic disks, the size and shape of the light collection area of each facet could not be controlled independent of the angular sweep of the outgoing laser beam. Consequently, this has prevented optimal use of the disk surface area for light collection functions, and thus the performance of prior art holographic scanners has been necessarily compromised.

While the above problems generally define the major areas in which significant improvement is required of prior art holographic laser scanners, there are still other problems which have operated to degrade the performance of such laser scanning systems.

In particular, glare produced by specular reflection of a laser beam scanning a code symbol reduces the detectable contrast of the bars and spaces of the symbol against its background and thus the SNR of the optical scan data signal detected at the photodetectors of the system. While polarization filtering techniques are generally known for addressing such problems in laser scanning systems, it is not known how such techniques might be successfully applied to holographic type laser scanning systems while simultaneously solving the above-described problems.

Thus, there is a great need in the art for an improved holographic laser scanning system and a method of designing and constructing the same, while avoiding the shortcomings and drawbacks of prior art holographic scanners and methodologies.

OBJECTS AND SUMMARY OF THE PRESENT INVENTION

Accordingly, a primary object of the present invention is to provide a holographic laser scanner free of the shortcomings and drawbacks of prior art holographic laser scanning systems and methodologies.

Another object of the present invention is to provide a holographic laser scanner which produces a three-dimensional laser scanning volume that is substantially greater than the volume of the housing of the holographic laser scanner itself, and provides full omni-directional scanning within the laser scanning volume.

A further object of the present invention is to provide such a holographic laser scanner, in which the three-dimensional laser scanning volume has multiple focal planes and a highly confined geometry extending about a projection axis extending from the scanning window of the holographic scanner.

A further object of the present invention is to provide such a holographic laser scanner, in which a plurality of symmetrically arranged laser diodes are used to simultaneously produce a plurality of laser beams which are focused and scanned through the scanning volume by a plurality of volume-transmission type holographic optical elements, each of which is supported upon a centrally located rotating disc and particularly designed to produce a single scanning plane of a particular depth of focus when one of the laser beams passes therethrough during the operation of the holographic laser scanner.

A further object of the present invention is to provide such a holographic laser scanner, in which laser light produced from a particular holographic optical element reflects off a bar code symbol, passes through the same holographic optical element, and is thereafter collimated for light intensity detection.

A further object of the present invention is to provide such a holographic laser scanner, in which a plurality of lasers simultaneously produce a plurality of laser beams which are focused and scanned through the scanning volume by a rotating disc that supports a plurality of holographic facets.

A further object of the present invention is to provide such a holographic laser scanner, in which the scanner housing has an apertured scanning window which allows simultaneously projection of multiple scanning planes, at angles which differ from each other over the duration of each scanning pattern generation cycle.

A further object of the present invention is to provide such a holographic laser scanner, in which the holographic optical elements on the rotating disc maximize the use of the disk space for light collection, while minimizing the laser beam velocity at the focal planes of each of the laser scan patterns, in order to minimize the electronic bandwidth required by the light detection and signal processing circuitry.

A further object of the present invention is to provide a compact holographic laser scanner, in which substantially all of the available light collecting surface area on the scanning disc is utilized and the light collection efficiency of each holographic facet on the holographic scanning disc is substantially equal, thereby allowing the holographic laser scanner to use a holographic scanning disc having the smallest possible disc diameter.

A further object of the present invention is to provide a compact holographic laser scanner, in which the beam steering portion of each holographic facet on the holographic scanning disc is provided with a light diffraction efficiency that is optimized for an incident laser beam having a first polarization state, whereas the light collecting portion of each holographic facet is provided with a light diffraction efficiency that is optimized for reflected laser light having a second polarization state orthogonal to the first polarization state, while light focused onto the photodetectors of the system are passed through polarization filters which transmit collected laser light having the second polarization state and block collected laser light having the first polarization state.

A further object of the present invention is to provide such a holographic laser scanner, in which laser beam astigmatism caused by the inherent astigmatic difference in each visible laser diode is effectively eliminated prior to the passage of the laser beam through the holographic optical elements on the rotating scanning disc.

A further object of the present invention is to provide such a holographic laser scanner, in which the dispersion of the relatively broad spectral output of each visible laser diode by the holographic optical elements on the scanning disc is effectively automatically compensated for as the laser beam propagates from the visible laser diode, through an integrated optics assembly, and through the holographic optical elements on the rotating disc of the holographic laser scanner.

A further object of the present invention is to provide such a holographic laser scanner, in which a conventional visible laser diode is used to produce a laser scanning beam, and a simple and inexpensive arrangement is provided for eliminating or minimizing the effects of the dispersion caused by the holographic disc of the laser scanner.

A further object of the present invention is to provide such a holographic laser scanner, in which the inherent astigmatic difference in each visible laser diode is effectively eliminated prior to the laser beam passing through the holographic optical elements on the rotating disc.

A further object of the present invention is to provide such a holographic laser scanner, in which the laser beam produced from each laser diode is processed by a single, ultra-compact optics module in order to circularize the laser beam produced by the laser diode, eliminate the inherent astigmatic difference therein, as well as compensate for wavelength-dependent variations in the spectral output of each visible laser diode, such as superluminescence, multimode lasing, and laser mode hopping, thereby allowing the use of the resulting laser beam in holographic scanning applications demanding large depths of field.

A further object of the present invention is to provide such a holographic laser scanner, in which the focal lengths of the multiple focal regions of the laser scanning volume are strategically selected so as to create an overlap at the ends of the scanning planes in the near and far regions of adjacent focal regions in the scanning volume, making it easier to read a bar code symbol passing therethrough independent of its orientation.

A further object of the present invention is to provide such a holographic laser scanner, in which an independent light collection/detection subsystem is provided for each laser diode employed within the holographic laser scanner.

A further object of the present invention is to provide such a holographic laser scanner, in which the geometrical dimensions of its beam folding mirrors in conjunction with the geometrical dimensions of its holographic disc are the sole determinants of the width and length dimensions of the scanner housing, whereas the geometrical dimensions of its beam folding mirrors and parabolic light collecting mirrors beneath the holographic disc are the sole determinants of the height dimension of the scanner housing.

A further object of the present invention is to provide such a holographic laser scanner, in which an independent signal processing channel is provided for each laser diode and light collection/detection subsystem in order to improve the signal processing speed of the system.

A further object of the present invention is to provide such a holographic laser scanner, in which a plurality of signal processors are used for simultaneously processing the scan data signals produced from each of the photodetectors within the holographic laser scanner.

A further object of the present invention is to provide such a holographic laser scanner, in which each facet on the holographic disc has an indication code which is encoded by the zero-th diffraction order of the outgoing laser beam and detected so as to determine which scanning planes are to be selectively filtered during the symbol decoding operations.

A further object of the present invention is to provide such a holographic laser scanner, in which the zero-th diffractive order of the laser beam which passes directly through the respective holographic optical elements on the rotating disc is used to produce a start/home pulse for use with stitching-type decoding processes carried out within the scanner.

A further object of the present invention is to provide a code symbol reading system in which a holographic laser scanner is used to create a scanning volume within which the presence of a code symbol is detected, and a high speed laser scanner is used to scan the region within which the detected bar code resides, to collect high-resolution scan data for decode processing.

A further object of the present invention is to provide a hand-supportable, hand-mounted and body-wearable scanning device employing a holographic scanning mechanism to create various types of scanning patterns, including 2-D raster patterns, within a 3-D scanning volume.

A further object of the present invention is to provide a novel method of designing such a holographic laser scanner having a housing with a minimum height (i.e., depth) dimension for any given three-dimensional laser scanning pattern confined within a specified scanning volume during bar code symbol reading operations.

A further object of the present invention is to provide a novel method of designing a holographic disk for such a holographic laser scanner, such that both the size and shape of the light collection area of each holographic optical element (i.e., facet) on the rotating disc is controlled independent of the angular sweep of the outgoing laser beam in order to make maximum use of the disk surface area for light collection functions during the laser scanning process.

A further object of the present invention is to provide a novel method of designing a laser beam optics module for use with the holographic scanning disc and laser diode employed in the holographic laser scanner hereof, which functions to circularize the laser beam produced from the laser diode, eliminate the inherent astigmatic difference therein, and compensate for wavelength-dependent variations in the spectral output of the visible laser diode, such as superluminescence, multi-mode lasing, and laser mode hopping.

A further object of the present invention is to provide a novel method of designing a holographic disc for a holographic laser scanner, in which all of the available area on the disk is used for optimizing the light collection efficiency thereof and thus improve the performance of the holographic laser scanner.

A further object of the present invention is to provide such disc design method, in which to determine the sizes and shapes of the holographic facets thereof, a 3-D surface geometry program is used to create a 3-D geometrical model of the components of the holographic laser scanner and its 3-D laser scanning pattern, whereas a spreadsheet modelling program is used to create an analytical model for the holographic laser scanner and its 3-D laser scanning pattern.

A further object of the present invention is to provide such disc design method which employs a spreadsheet-type computer program for creating analytical model of the process of generating a prespecified laser scanning pattern using a prespecified holographic facet support disc and beam folding mirror arrangement, and arriving at an optimal set of holographic facet parameters which, for prespecified size holographic facet support disc, minimizes the heightwise, lengthwise and widthwise dimensions of the scanner housing.

A further object of the present invention is to provide a novel holographic laser scanner of modular construction ("modularized holographic laser scanner").

A further object of the present invention is to provide a novel method for designing and manufacturing such a modularized holographic laser scanner.

A further object of the present invention is to provide a novel system for designing and manufacturing such a modularized holographic laser scanner.

These and other objects of the present invention will become apparent hereinafter and in the Claims to Invention.

BRIEF DESCRIPTION OF THE DRAWINGS

In order to more fully understand the Objects of the Present Invention, the following Detailed Description of the Illustrative Embodiments should be read in conjunction with the accompanying Figure Drawings in which:

FIG. 2E is a perspective view of the holographic scanning system of the illustrative embodiment, showing the scanning window array of the scanner housing of the present invention;

FIGS. 4A, 4B and 4C set forth is a block functional diagram of holographic laser scanning system of the illustrative embodiment of the present invention, showing the major components of the system and their relation to each other;

FIG. 6A is a schematic diagram showing the overlapping nature of the scanlines produced from different holographic facets, between spatially-adjacent focal planes within the laser scanning volume projected from the holographic laser scanner of the present invention;

FIGS. 6B and 6C are schematic diagrams illustrating the various beam cross-sections of two laser scanning beams having focal lengths in the far portion of the scanning volume, shown at a number of different points along their respective scanline trajectories as well as between their respective adjacent focal planes, showing astigmatic laser beam overlapping within each interfocal plane region of the three-dimensional laser scanning pattern;

FIG. 8A1 is a view of the geometrical optics model of FIG. 8A, showing particular parameters in greater detail;

FIGS. 8B1, FIGS. 8B2 and 8B3, collectively, show a table listing the parameters used to represent the geometrical optics model of FIGS. 8A and 8A1;

FIGS. 8C1 and 8C2, collectively, show a table listing the mathematical equations describing structural and functional relationships among particular parameters of the geometrical optics model of FIGS. 8A and 8A1;

FIG. 10A1 is a geometrical optics model illustrating the path travelled by the light rays associated with an incident laser beam being initially diffracted by a rotating holographic facet towards a bar code symbol, then returning light rays reflected therefrom being diffracted again by the same holographic facet towards a light focusing parabolic mirror, and finally the focused light rays being transmitted through the same holographic facet towards its photodetector without diffraction;

FIGS. 10A2 and 10A3 set forth geometrical optics models of the process of a laser beam propagating through a holographic facet on the rotating holographic scanning disc shown in FIG. 10A1, which are used during the disc design process hereof to compute the normalized total out-and-back light diffraction efficiency of each holographic facet to S and P polarized light when no cross-polarizer is used in the holographic laser scanner;

FIG. 10B sets forth a set of parameters used to represent the geometrical optics models of FIGS. 10A1, 10A2, and 10A3;

FIG. 10B1 sets forth a set of initialized (i.e., assumed) values for various parameters used in the geometrical optics models of FIGS. 10A1, 10A2, and 10A3;

FIG. 10C1 sets forth a set of mathematical expressions describing structural and functional relationships among particular parameters of the geometrical optics model of FIGS. 10A1, 10A2, and 10A3;

FIG. 10C2 sets forth a set of equations defining (1) the light diffraction efficiency of the i-th holographic scanning facet to S-polarized outgoing light rays incident on the holographic scanning disc, (2) the light diffraction efficiency of the i-th holographic scanning facet to P-polarized outgoing light rays incident on the holographic scanning disc, and (3) the total out-and-back light diffraction efficiency of the i-th holographic scanning facet to S-polarized outgoing light rays incident on the holographic disc, each being expressed as a function of the modulation-depth (i.e. modulation-index) within a fixed thickness gelatin;

FIG. 10D sets forth a set of equations used to calculate both Fresnel losses and transmission of P and S polarized light rays passing through the holographic scanning facets, for use in the light diffraction efficiency expression set forth in FIG. 10C2;

FIG. 10E1 sets forth a set of graphs plotting, as a function of the modulation-depth (i.e. modulation-index) within a fixed thickness gelatin, (1) the light diffraction efficiency of the first holographic scanning facet to S-polarized outgoing light rays incident thereto, (2) the light diffraction efficiency of the first holographic scanning facet to P-polarized outgoing light rays incident thereto, and (3) the total out-and-back light diffraction efficiency of the first holographic scanning facet to S-polarized outgoing light rays incident, which are ultimately used to compute the total out-and-back light diffraction efficiency of the first holographic facet relative to the total out-and-back light diffraction efficiency of the sixteenth holographic facet;

FIG. 10E2 sets forth a set of graphs plotting, as a function of the modulation-depth (i.e. modulation-index) with a fixed thickness gelatin, (1) the light diffraction efficiency of the sixteenth holographic scanning facet to S-polarized outgoing light rays incident on the sixteenth holographic facet, (2) the light diffraction efficiency of the sixteenth holographic scanning facet to P-polarized outgoing light rays incident on the sixteenth holographic facet, and (3) the total out-and-back light diffraction efficiency of the sixteenth holographic scanning facet to S-polarized outgoing light rays incident on the sixteenth holographic facet, in order to ultimately compute the total out-and-back light diffraction efficiency of the sixteenth holographic scanning facet relative to the total out-and-back light diffraction efficiency of itself (i.e., the sixteenth holographic scanning facet);

FIGS. 10F1 and 10F2 set forth geometrical optics models of the process of a laser beam propagating through a holographic scanning facet on the rotating scanning disc shown in FIG. 10F, which are used during the disc design process to compute the normalized total out-and-back light diffraction efficiency of each holographic scanning facet in the holographic scanning disc of the present invention, when a cross-polarizer is used in the holographic laser scanner;

FIG. 10G sets forth a set of parameters used to represent the geometrical optics models of FIGS. 10F1 and 10F2;

FIG. 10G1 sets forth a set of initial (i.e., assumed) values for particular parameters used to represent the geometrical optics models of FIGS. 10F1 and 10F2;

FIG. 10H1 sets forth a set of mathematical equations describing structural and functional relationships among particular parameters of the geometrical optics model of FIGS. 10F1 and 10F2;

FIG. 10H2 sets forth a set of equations defining (1) the light diffraction efficiency of the i-th holographic scanning facet of FIG. 10F to S-polarized outgoing light rays incident thereto, (2) the light diffraction efficiency of the i-th holographic scanning facet to P-polarized outgoing light rays incident thereto, and (3) the total out-and-back light diffraction efficiency of the i-th holographic scanning facet to S-polarized outgoing light rays incident thereto, each being expressed as a function of the modulation-depth (i.e.modulation-index) within a fixed thickness gelatin;

FIG. 10H3 sets forth a set of equations used to calculate both Fresnel losses and transmission of P and S polarized light rays passing through the holographic scanning facets on the scanning disc, for use in the light diffraction efficiency expression set forth in FIG. 10H2;

FIG. 10I1 sets forth a set of graphs plotting, as a function of the index modulation-depth (i.e.modulation-index) with a fixed thickness gelatin, (1) the light diffraction efficiency of the first holographic scanning facet to S-polarized outgoing light rays incident thereto, (2) the light diffraction efficiency of the first holographic scanning facet to P-polarized outgoing light rays incident thereto, and (3) the total out-and-back light diffraction efficiency of the first holographic scanning facet to S-polarized outgoing light rays incident thereto, in order to ultimately compute the total out-and-back light diffraction efficiency of the first holographic scanning facet relative to the total out-and-back light diffraction efficiency of the sixteenth holographic scanning facet;

FIG. 10I2 sets forth a set of graphs plotting, as a function of the index modulation-depth (i.e.modulation-index) with a fixed thickness gelatin, (1) the light diffraction efficiency of the sixteenth holographic scanning facet to S-polarized outgoing light rays incident thereto, (2) the light diffraction efficiency of the sixteenth holographic scanning facet to P-polarized outgoing light rays incident thereto, and (3) the total out-and-back light diffraction efficiency of the sixteenth holographic scanning facet to S-polarized outgoing light rays incident thereto, in order to ultimately compute the total out-and-back light diffraction efficiency of the sixteenth holographic scanning facet relative to itself (i.e., $H_{16}(\Delta n)=1$);

FIG. 10K sets forth a description of the parameters associated with the geometrical optics model of FIG. 10J;

FIG. 10L sets forth a table of the initial (i.e., assumed) values for particular parameters associated with the geometrical optics model of FIG. 10J;

FIG. 10L1 sets forth a set of equations describing the relationships among the particular parameters in the geometrical optics model of FIG. 10J;

FIGS. 12B1 through 12B3 provide a flow chart describing, in detail, the steps of the method used to design the holographic scanning disc shown in FIG. 12A;

FIG. 12C is a mathematical expression for the effective relative light diffraction efficiency for facet No. 1 on the scanning disc of FIG. 12A;

FIG. 14A is a partially cut-away, side cross-sectional view of one scanning channel of the laser scanning system of the first illustrative embodiment of the present invention, showing computer-generated schematic indications of both the outgoing and incoming optical paths traversed by laser light produced and detected during the operation of the system;

FIG. 15B is a plan view of the optical bench of the laser beam production module of FIG. 15;

FIG. 15C is a side view of the optical bench of the laser beam production module of FIG. 15;

FIG. 15D1 is a side view of the prism support platform of the laser beam production module of FIG. 15;

FIG. 15D2 is a plan view of the prism support platform of the laser beam production module of FIG. 15;

FIG. 15E1 is a plan view of the VLD/lens mount pivot plate of the laser beam production module of FIG. 15;

FIG. 15E2 is a side view of the VLD/lens mount pivot plate of the laser beam production module of FIG. 15;

FIG. 15F1 is a plan view of the VLD/lens mounting bracket (i.e., yoke) of the laser beam production module of FIG. 15;

FIG. 15F2 is a side view of the VLD/lens mounting bracket of the laser beam production module of FIG. 15;

FIG. 15G1 is a cross-sectional view of the VLD/lens mounting tube of the laser beam production module of FIG. 15;

FIG. 15G2 is an axial view of the VLD/lens mounting tube of the laser beam production module of FIG. 15;

FIG. 15H1 is an axial view of the lens barrel of the laser beam production module of FIG. 15;

FIG. 15H2 is a cross-sectional view of the lens barrel of the laser beam production module of FIG. 15;

FIG. 15I1 is a plan view of the prism of the laser beam production module of FIG. 15;

FIG. 15I2 is a side view of the prism of the laser beam production module of FIG. 15;

FIG. 15J is a plan view of the planar beam folding mirror of the laser beam production module of FIG. 15;

FIG. 15K is a plan view of the holographic light diffractive grating (i.e., plate) of the laser beam production module of FIG. 15;

FIG. 17B is a set of parameters used to construct the geometrical optics model of the laser beam being diffracted by the holographic light diffractive grating, as shown in FIG. 17A;

FIG. 17B1 is a set of assumed values for particular parameters used to construct the geometrical optics model of FIG. 17A;

FIG. 17C is a set of equations describing functional relationships among certain of the parameters of the geometrical optics model of FIG. 17A;

FIG. 18A is a geometrical optics model of the holographic optical system formed by each holographic scanning facet on the scanning disc and the holographic light diffractive grating in the laser beam producing module of the first illustrative embodiment used to substantially decrease the functional dependence of the wavelength of an incident laser beam upon the diffraction angle of the outgoing laser beam from the scanning disc;

FIG. 18B is a set of parameters used to mathematically represent the geometrical optics model shown in FIG. 18A;

FIG. 18B1 is a set of assumed values for particular parameters in the geometrical optics model of FIG. 18A;

FIG. 18C is a set of equations describing the relationships among particular parameters in the geometrical optics model of FIG. 18A;

FIGS. 19C, 19D1, 19D2 and 19E are a set of given parameters, a set of equations, and a resultant set of numbers, respectively, that determine the hologram construction parameters at a second construction-laser wavelength given the desired hologram performance parameters at a first scanner-laser wavelength.

FIG. 20 is a schematic representation of a laser diode, showing the inherent cause of astigmatic difference in visible laser diodes, attributable to the difference in location of the effective sources of the perpendicular and parallel laser beams emitting from the diode junction;

FIG. 20A is a schematic diagram of the optical system used in the laser beam production module of FIG. 15A, for simultaneously circularizing the laser beam and eliminating astigmatism in the laser beam beyond the beam circularizing prism;

FIGS. 20B1, 20B2 and 20B3 provide a geometrical optics model of the optical system of FIG. 20A;

FIG. 20C is a set of parameters used to represent the geometrical optics model of FIGS. 20B1 through 20B3;

FIG. 20C1 is set of assumed values for parameters in the geometrical optics model of FIGS. 20B1 through 20B3;

FIGS. 20D and 20D1 set forth is a set of equations describing functional relationships among particular parameters in the geometrical optics model of FIGS. 20B1 through 20B3;

FIG. 20E is a graphical plot of the distances of the P and S source images (i.e., $L_{S2}$ and $L_{P2}$) projected by the aspheric collimating lens in the laser beam production module of FIG. 15A, as a function of the distance from the focal point of the aspheric collimating lens to the S-beam source (i.e., d), showing the value of distance (d) at which the P and S sources images converge and astigmatism is reduced to zero;

FIGS. 21C1, 21C2 and 21C3, taken together, provide a flow chart describing a specific procedure for assembling the components of the laser beam production module of the first illustrative embodiment, and also for configuring the geometrical and optical parameters thereof in accordance with the principles of the present invention;

FIG. 25B is a set of parameters used to represent the geometrical optics model of FIG. 25A;

FIG. 25B1 is a set of assumed values for parameters in the geometrical optics model of FIG. 25A;

FIG. 25C is a set of mathematical expressions describing relationships among particular parameters in the geometrical optics model of FIG. 25A;

FIG. 25D provides two plots showing the relationship between (i) the beam incidence angle $\theta_{i1D}$ upon the dual-function diffraction grating and the orientation (i.e., tilt angle $\rho$) of the diffraction grating relative to the holographic scanning disc which provides zero dispersion and (ii) the beam incidence angle $\theta_{i1M}$ upon the diffraction grating and the tilt angle $\rho$ of the diffraction grating relative to the holographic scanning disc which provides a desired beam aspect-ratio, wherein the intersection point of these functional plots proves that zero beam dispersion and a desired beam expansion ratio can be achieved by proper selection of tilt angle $\rho$;

FIG. 25E is a set of construction parameters for constructing the dual-function HOE of the illustrative embodiment of the present invention;

FIG. 27A is a set of parameters used to represent the geometrical optics model of FIG. 26;

FIG. 27B1 is a set of assumed values for parameters in the geometrical optics model of FIG. 26;

FIG. 27C is a set of mathematical expressions describing relationships among particular parameters of the geometrical optics model of FIG. 26;

FIG. 27D1 is a table of values associated with the graphical plot of FIG. 27D;

FIGS. 28A1 and 28A2 provide a geometrical optics model of the process of changing construction beam angles for a change in wavelength between construction and reconstruction;

FIG. 28B is a set of parameters used to represent the geometric optics model of FIGS. 28A1 and 28A2 including a set of assumed values for parameters in the geometric optics model thereof;

FIGS. 28C1, 28C2 and 28D set forth a set of given parameters, a set of equations, and a resultant set of numbers, that determine the hologram construction parameters at a second construction-laser wavelength given the desired hologram performance parameters at a first scanner-laser wavelength;

FIGS. 30A, 30A1, and 30A2 and 30A3 provide a geometrical optics model of the second optical system of the laser beam production module of the second illustrative embodiment shown in FIG. 23;

FIG. 30B is a set of parameters used to represent the geometrical optics model of FIG. 30A;

FIG. 30B1 is a set of assumed values for certain fixed parameters used to construct the geometrical optics model of FIG. 30B; and FIGS. 30C1 and 30C2 set forth is a set of mathematical equations describing relationships among particular parameters of the geometrical optics model of FIG. 30A;

FIG. 30D is a graphical plot of the distances of the P and S source images (i.e., $L_{S2}$ and $L_{P2}$) projected by the aspheric collimating lens in the laser beam production module of the second illustrative embodiment, and the distance from the focal point of the collimating lens to the S-beam source (i.e., d), showing that there exists a value of distance d at which the P and S source images $L_{S2}$ and $L_{P2}$ converge and astigmatism is reduced to zero;

Figure 23:
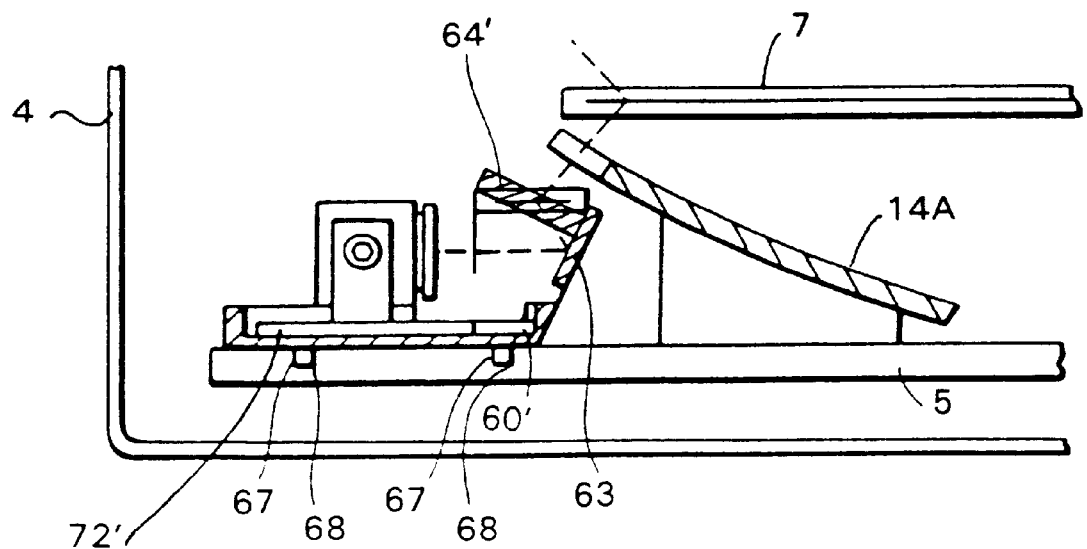
FIG. 23 is an elevated side view of the laser beam production module of the second illustrative embodiment of the present invention, installed upon the optical bench of the laser scanner of the illustrative embodiment with its first and second optical systems coupled together.
Figure 31D:
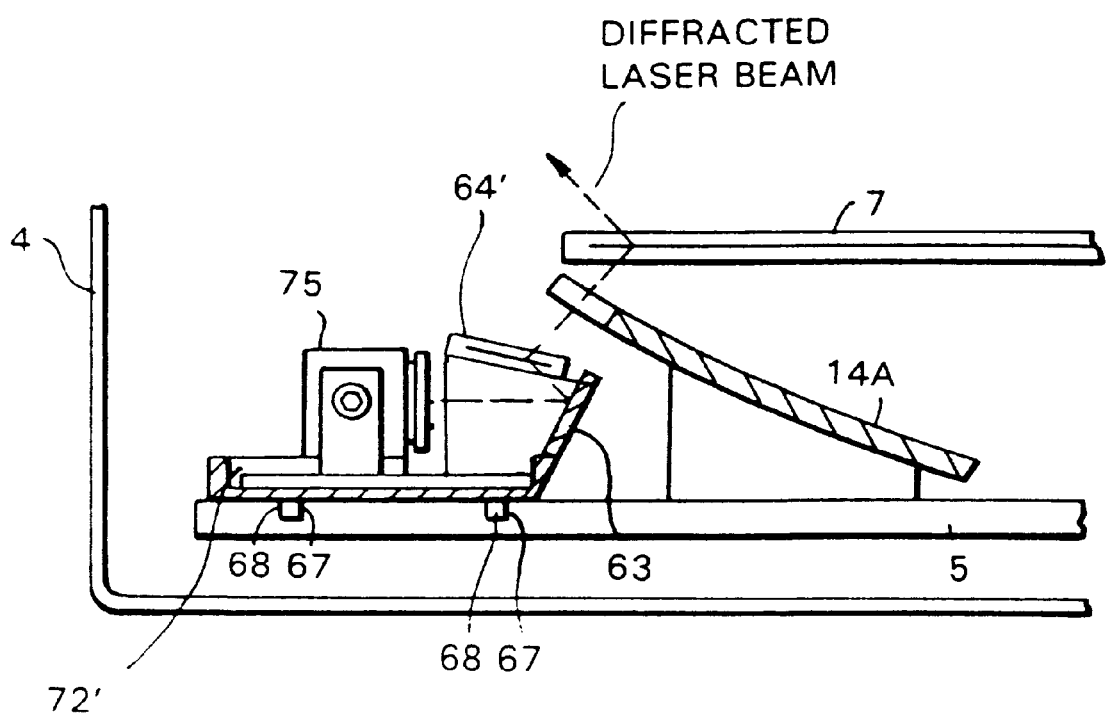
Figure 32:
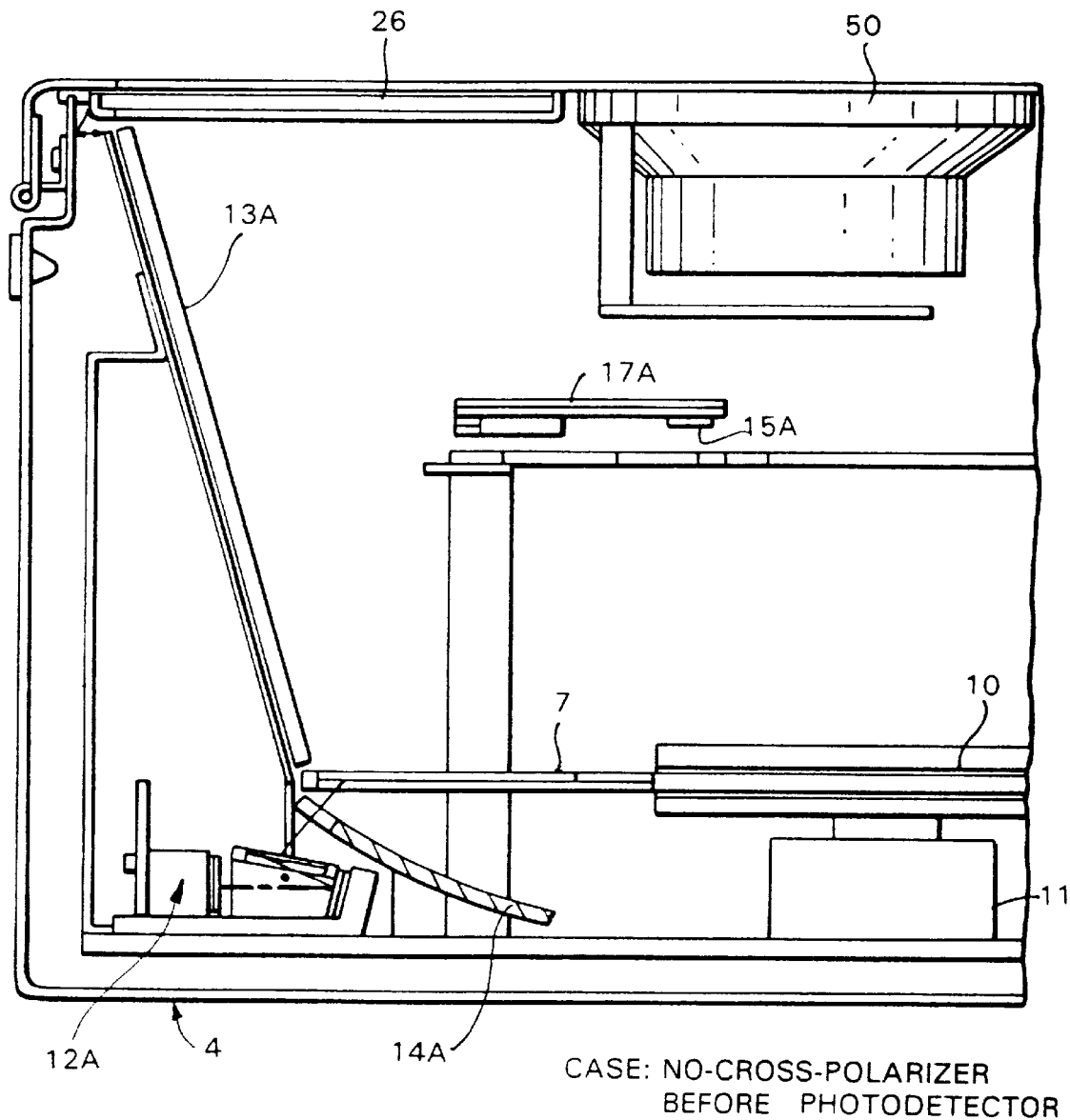
Figure 33A:
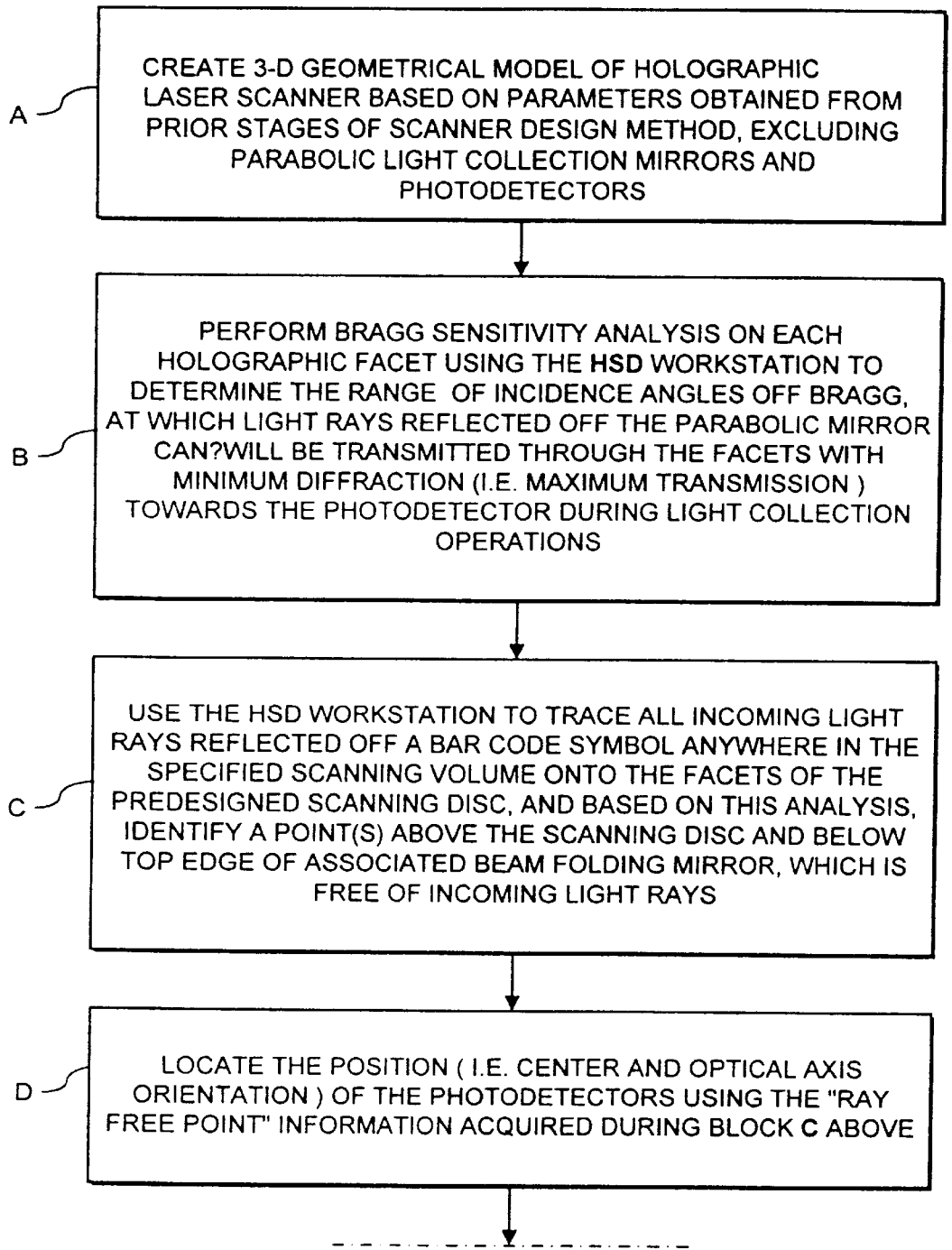
Figure 33B:
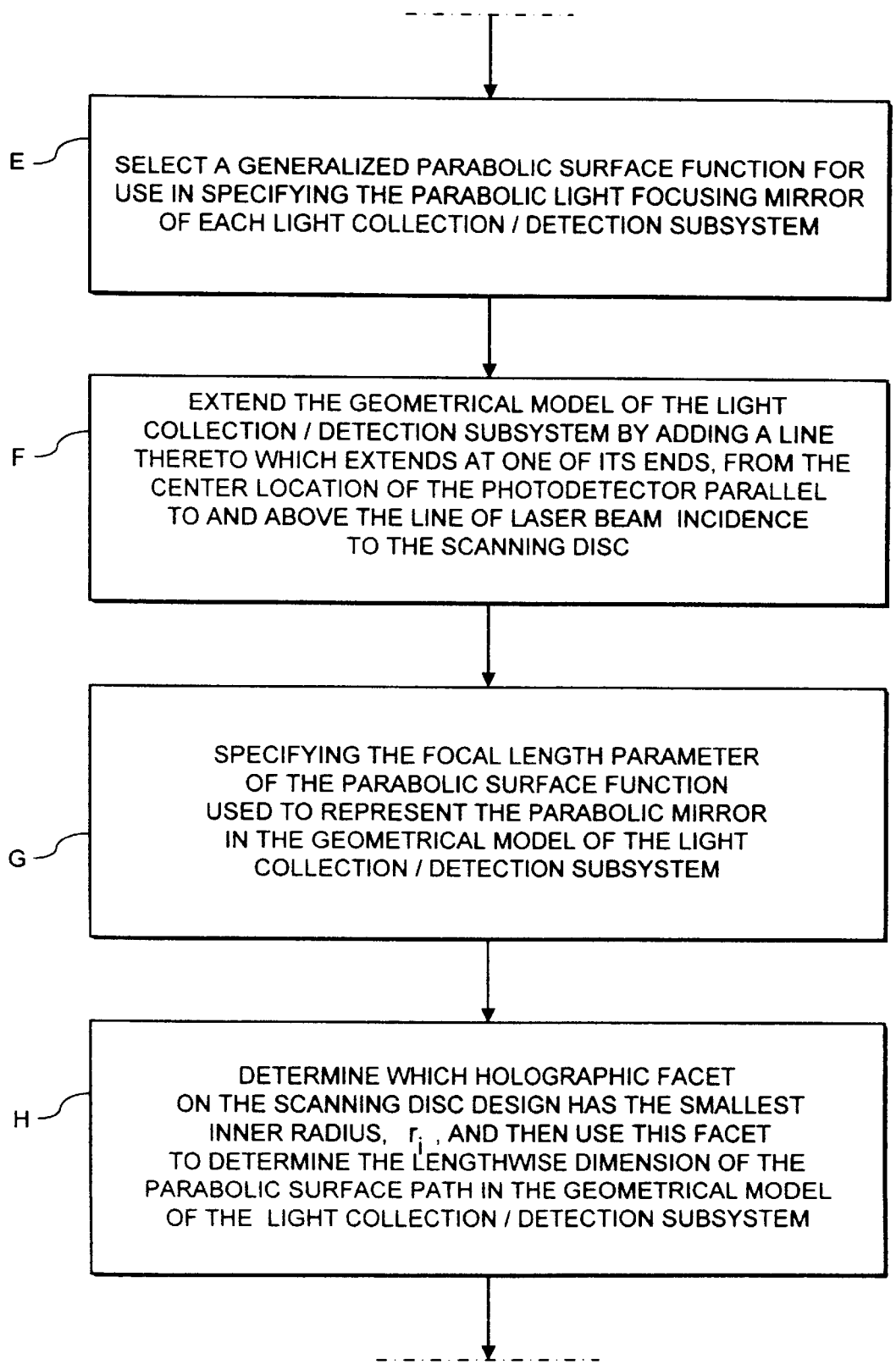
Figure 33C:
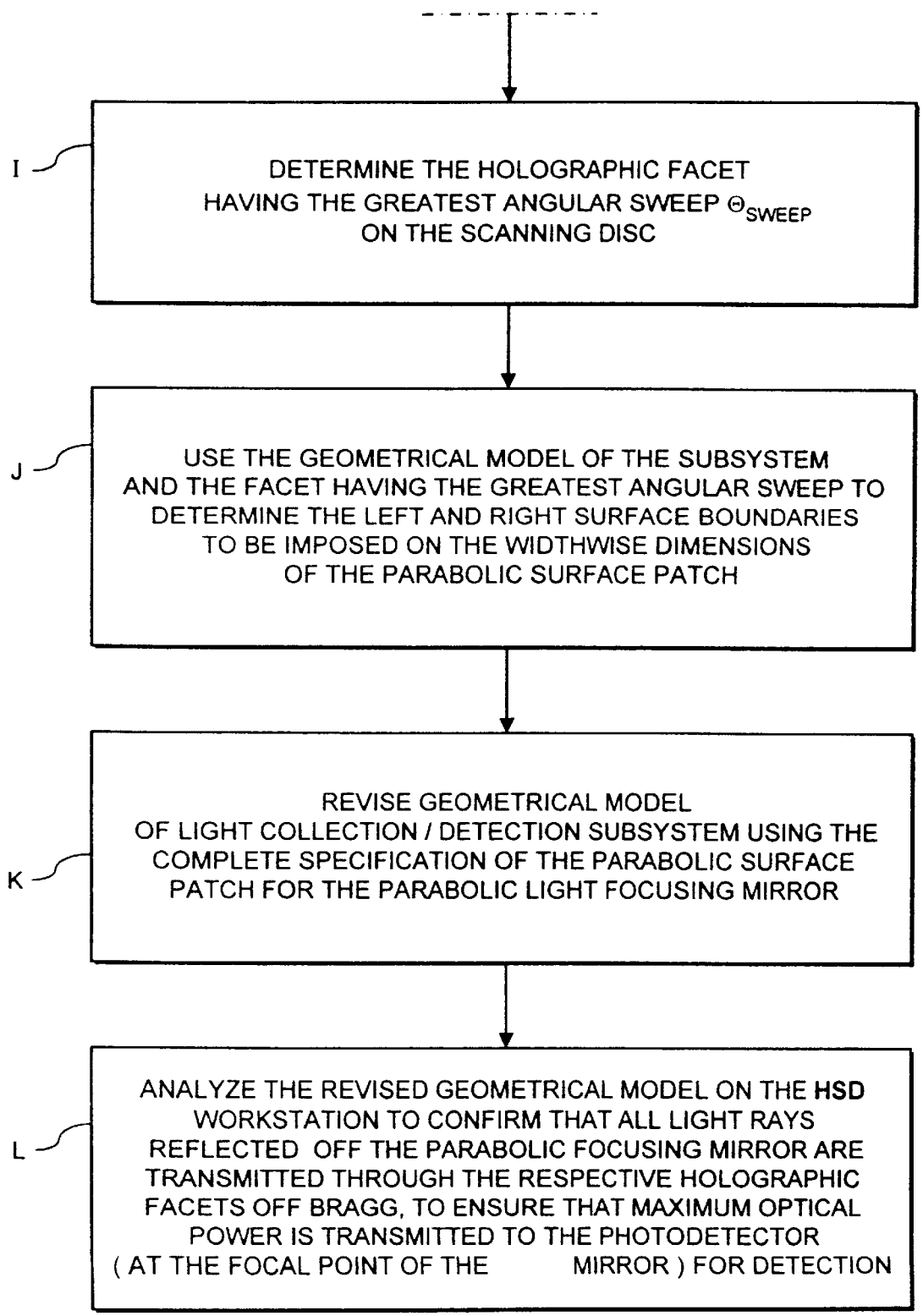
Figure 34:
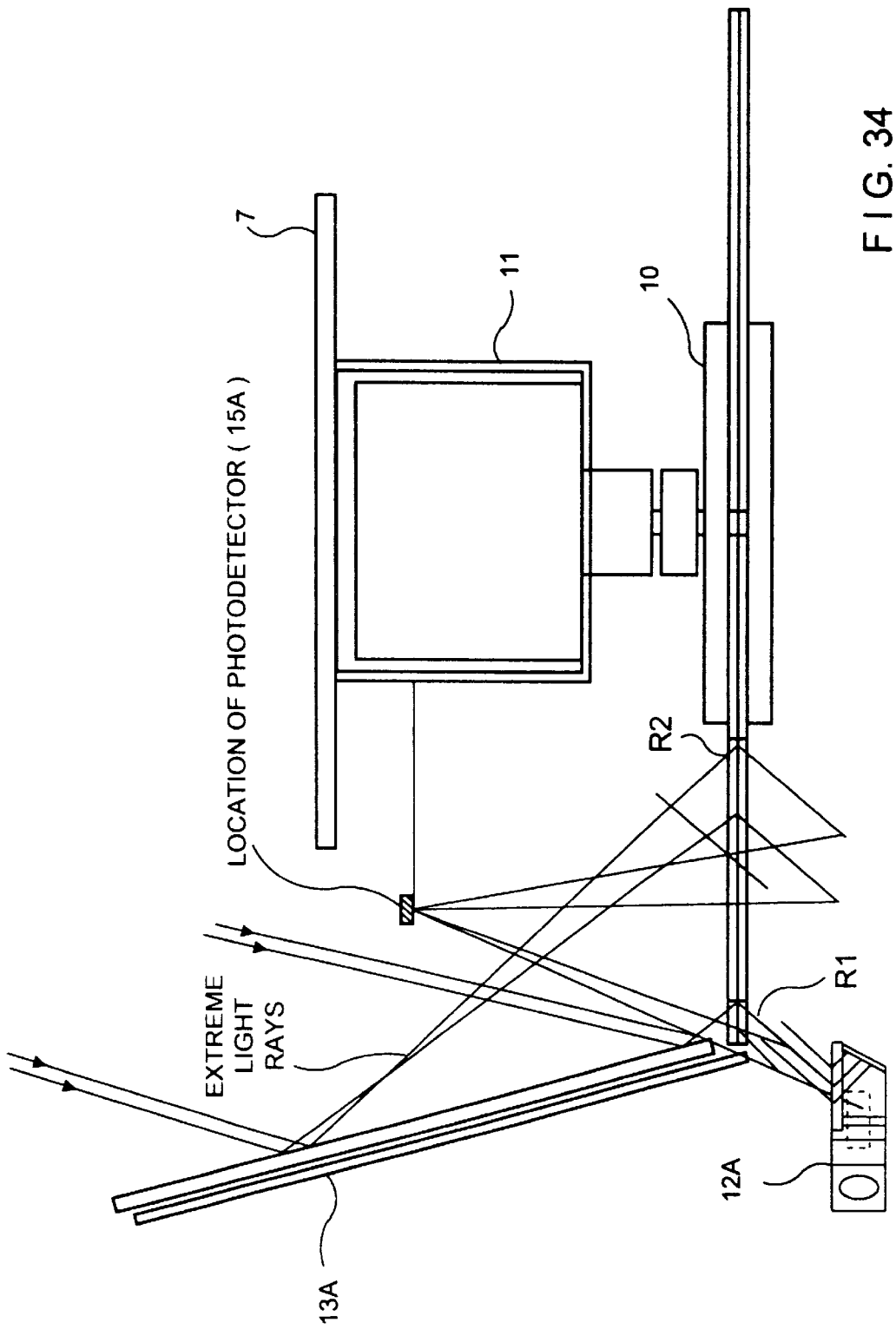

FIGS. 31A1 and 31A2 provide a schematic diagram of the optical system used in aligning the components of the second optical system in the laser beam production module of the first illustrative embodiment, so that astigmatism beyond the dual-function diffractive grating is reduced to zero;

FIG. 31B is a flow chart indicating the procedural steps used to align the components of the second optical system in the laser beam production module of FIG. 23 so that astigmatism beyond the dual-function HOE is reduced to zero;

FIGS. 31C1 and 31C2 provide a flow chart describing a procedure for assembling the components of the laser beam production module of the second illustrative embodiment and configuring the geometrical and optical parameters thereof in accordance with the principles of the present invention;

FIG. 31D is an elevated side view of the first and second optical systems of the laser beam production module of FIG. 23 shown coupled together and mounted on the optical bench of the holographic scanner hereof;

FIG. 32 is a partially cut-away, side cross-sectional view of one scanning channel of the laser scanning system of the second illustrative embodiment of the present invention, showing the light detection subsystem of the first illustrative embodiment comprising the holographic scanning disc rotatably supported by the motor, the laser beam production module associated with the illustrated scanning channel, its beam folding mirror, parabolic light focusing mirror, and photodetector;

FIGS. 33A, 33B and 33C provide a flow chart describing a method of designing a light collection and detection subsystem for a holographic scanner according to the present invention;

FIG. 34 is a geometrical model of the holographic scanner under design prior to the specification of the parabolic mirror and photodetectors;

FIGS. 35A1 and 35A2 provide a geometrical optics model of the light detection subsystem shown in FIG. 32, which does not use cross-polarizers;

FIG. 35B is a set of parameters used to represent the optics model of FIGS. 35A1 and 35A2;

FIG. 35B1 is a set of assumed values for parameters used in the optics model of FIGS. 35A1 and 35A2;

FIGS. 35C1 and 35C2 set forth a set of mathematical expressions describing relations among particular parameters of the geometrical optics model of FIGS. 35A1 and 35A2;

FIG. 35D1 provides a plot of the normalized "average" light diffraction efficiency of the holographic scanning facet No. 1 on the scanning disc as a function of the amount of angular degrees off Bragg (i.e., $\delta_e$), where normalized is with respect to the peak diffraction efficiency of facet No. 1 at the Bragg angle.

FIG. 35D2 provides a plot of the normalized "average" light diffraction efficiency of the 16-th holographic scanning facet on the scanning disc as a function of the amount of angular degrees off Bragg (i.e., $\delta_e$) where normalized is with respect the peak diffraction efficiency of facet No. 16 at the Bragg angle.

Figure 36:
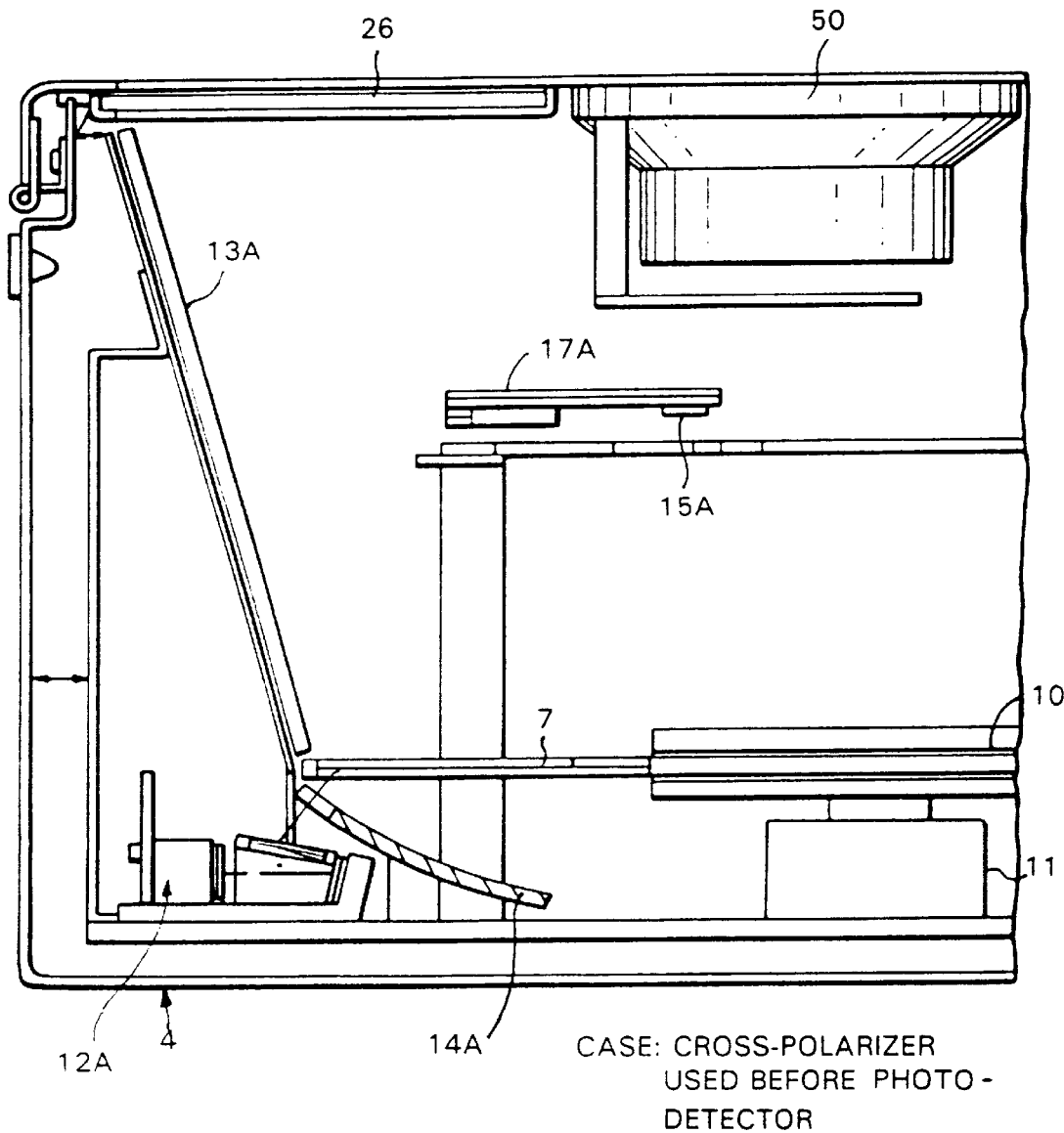
Figure 39:
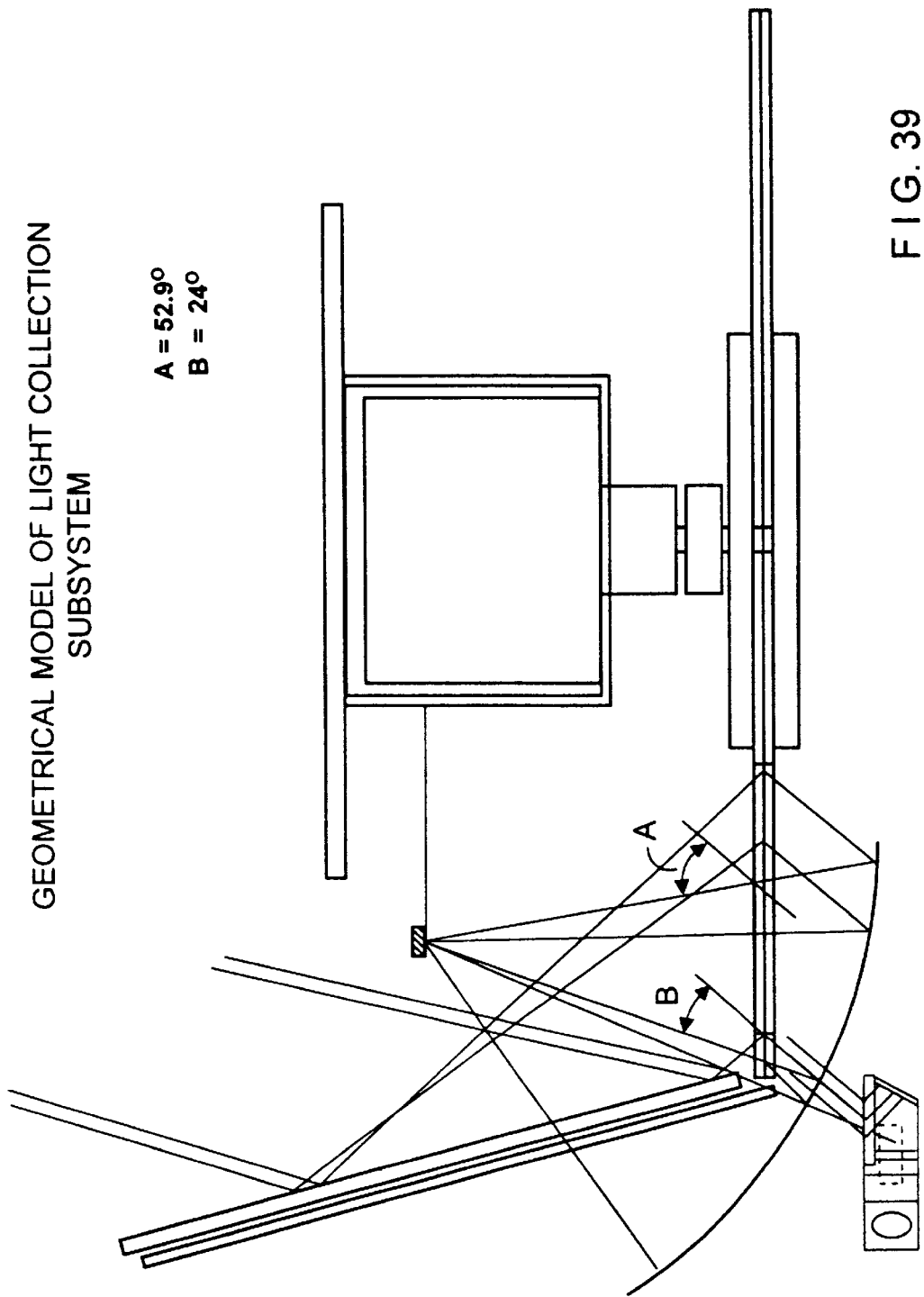
Figure 40A:
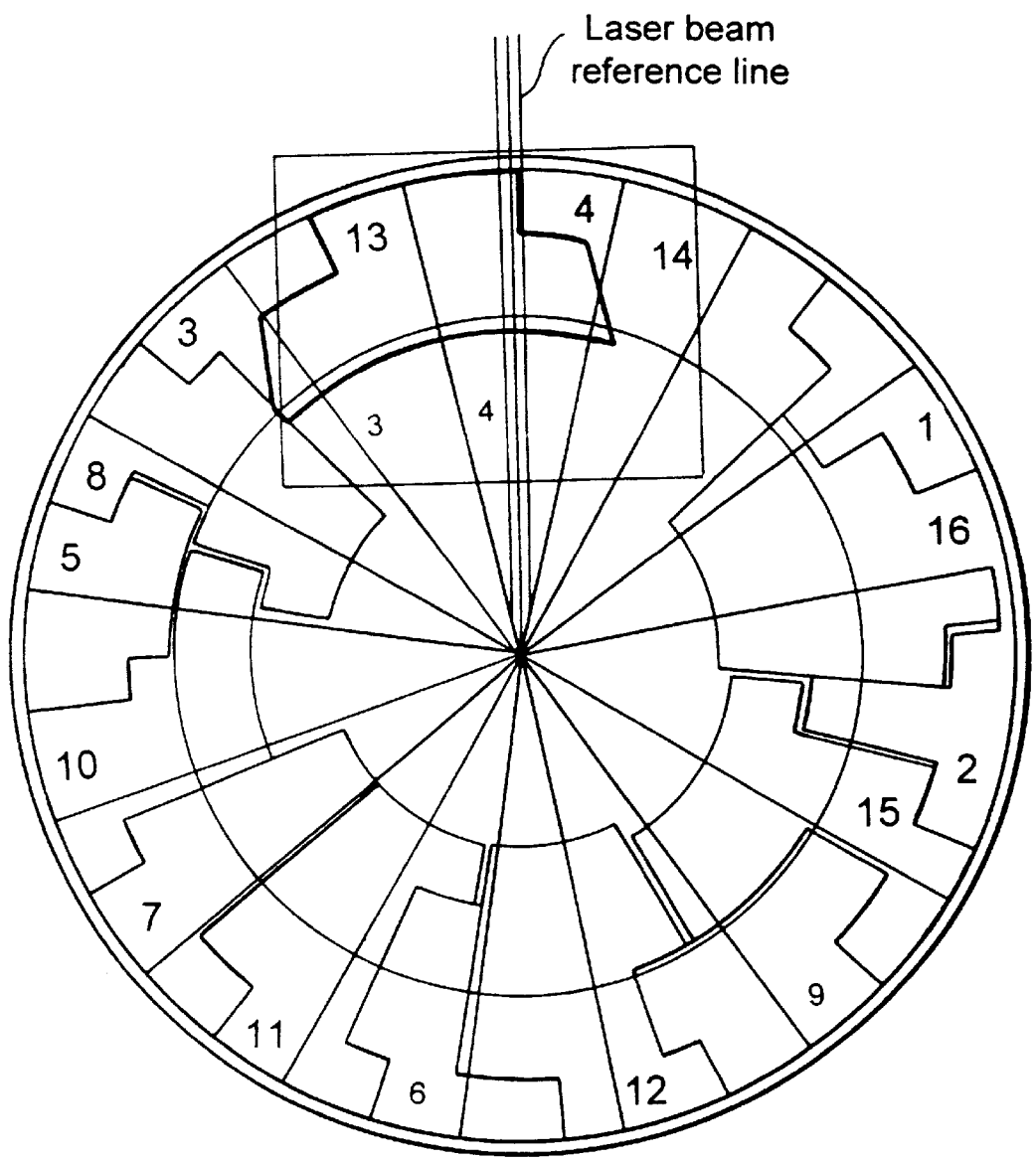
Figure 40B:
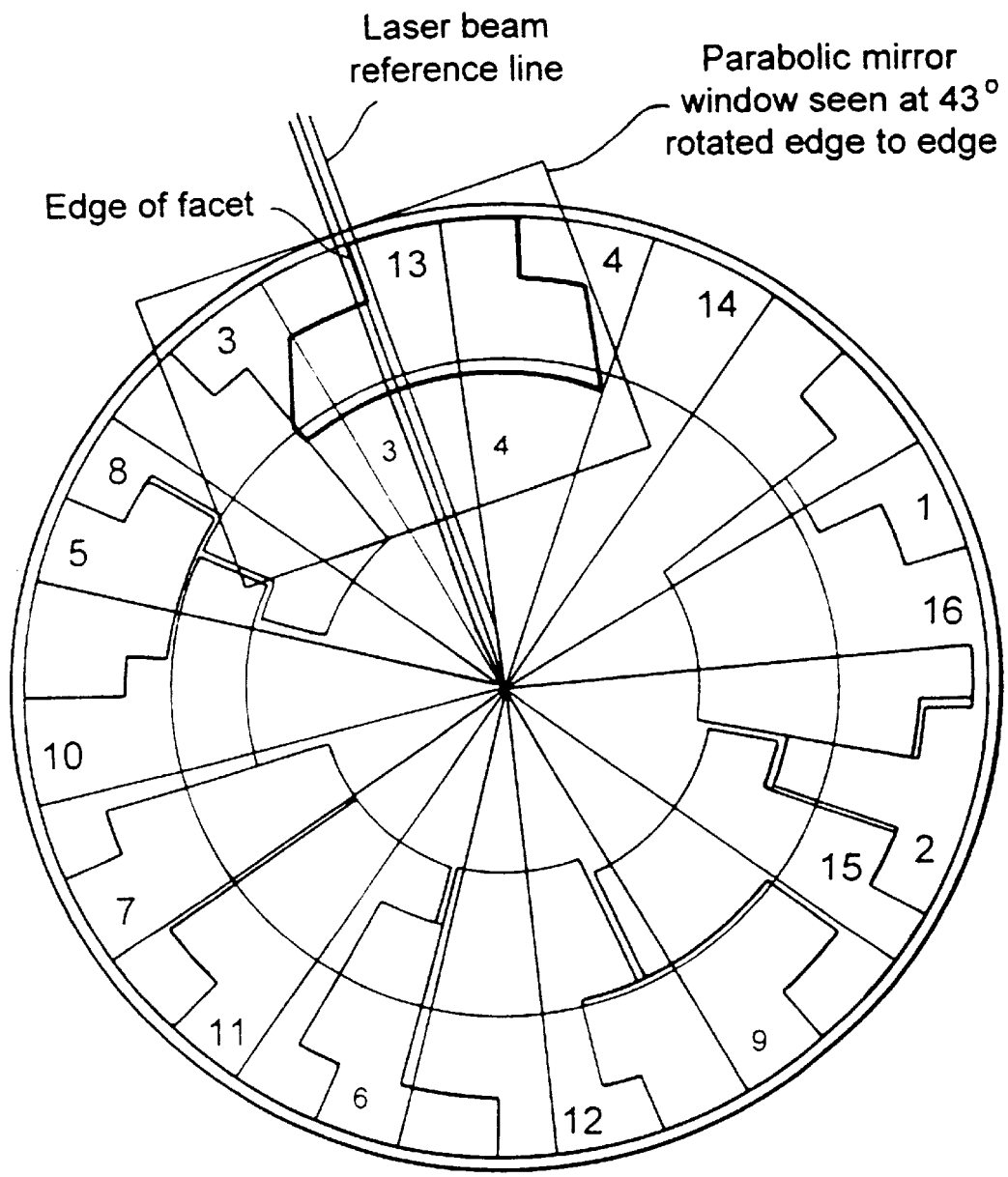
Figure 41:
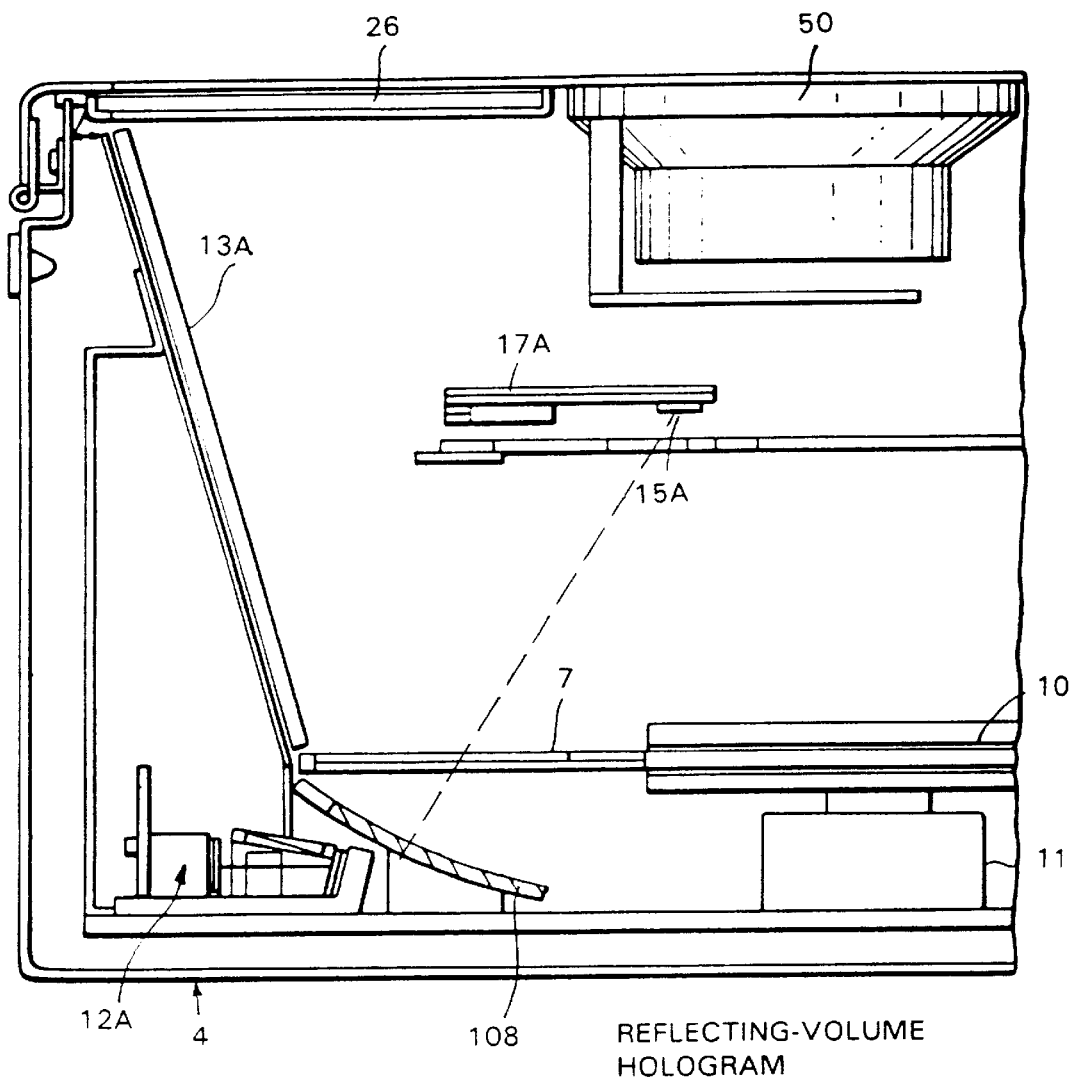
Figure 42:
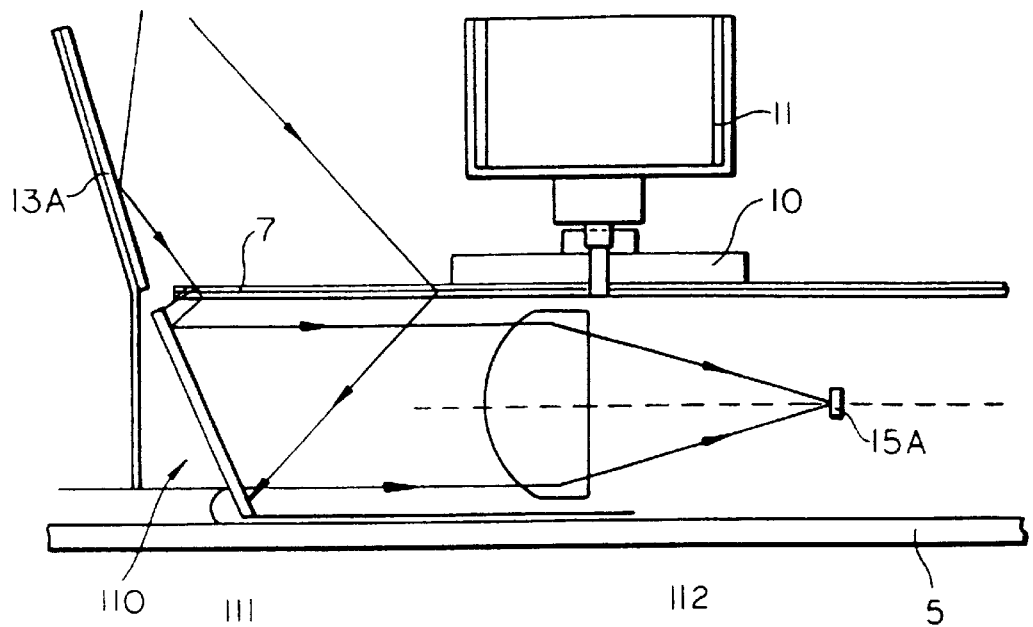
Figure 43A:
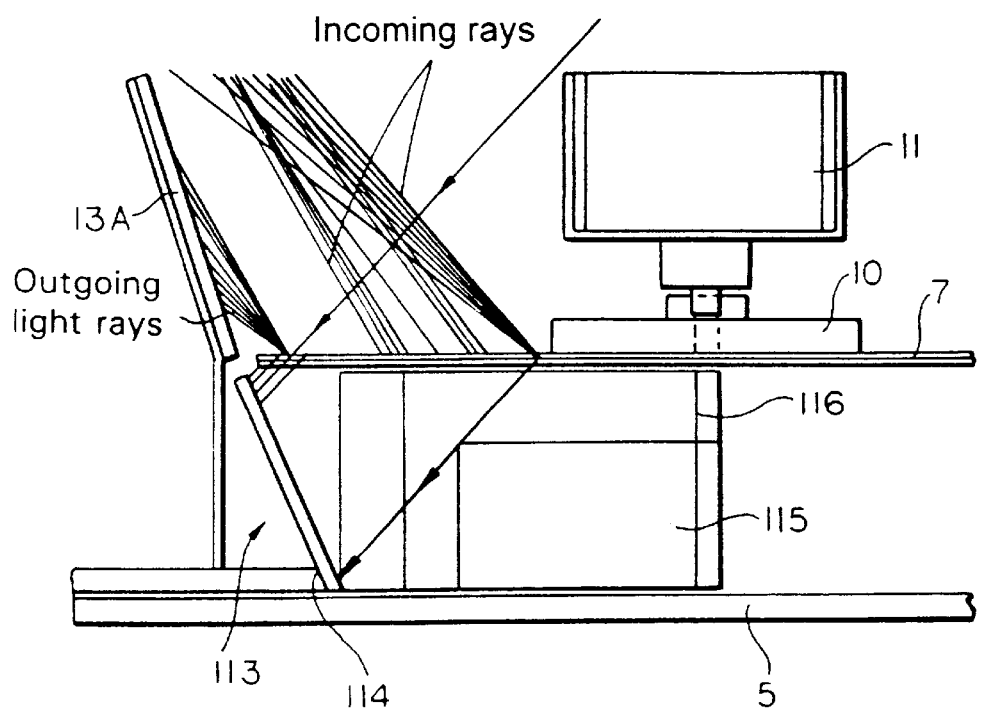
Figure 43B:
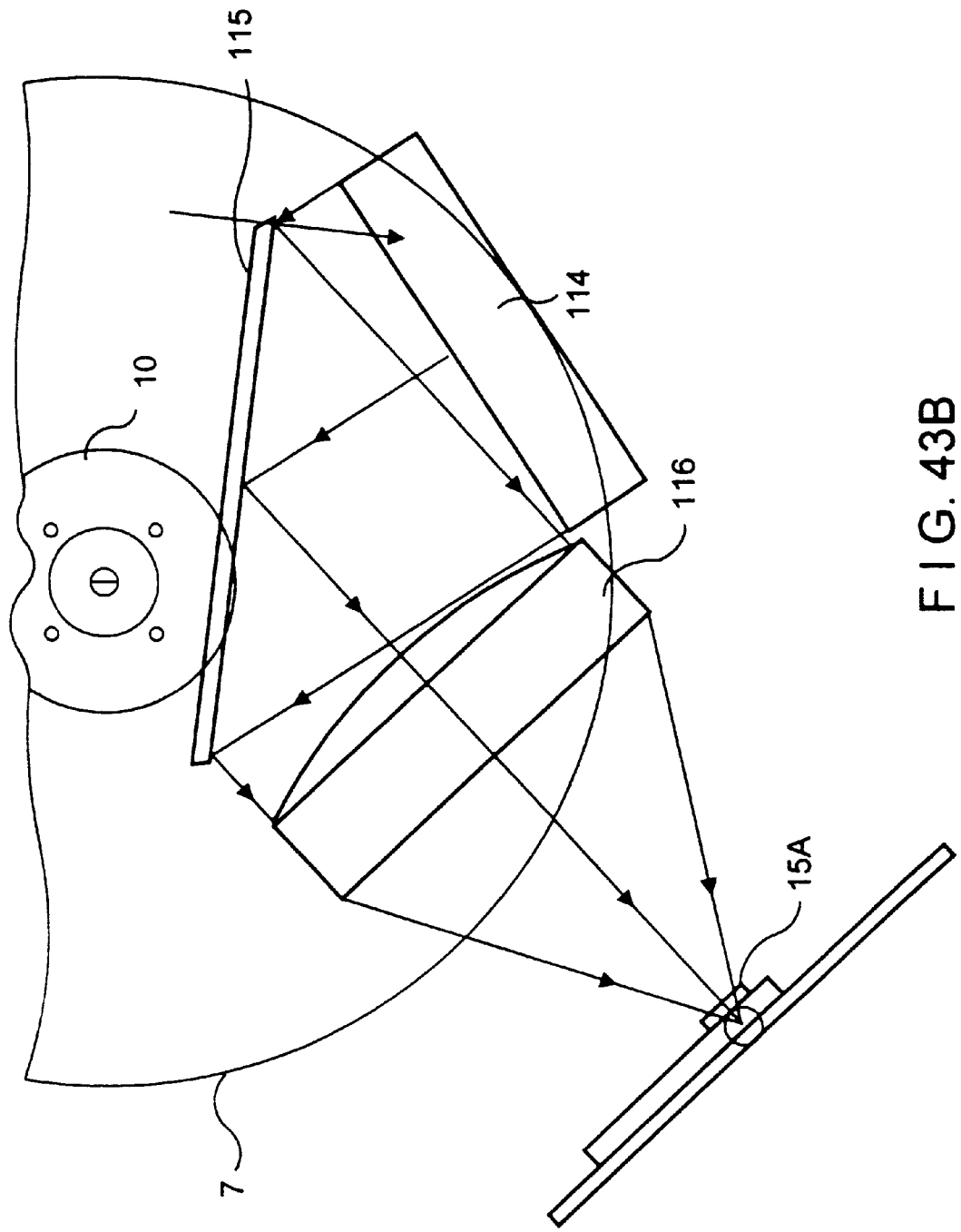
Figure 44:
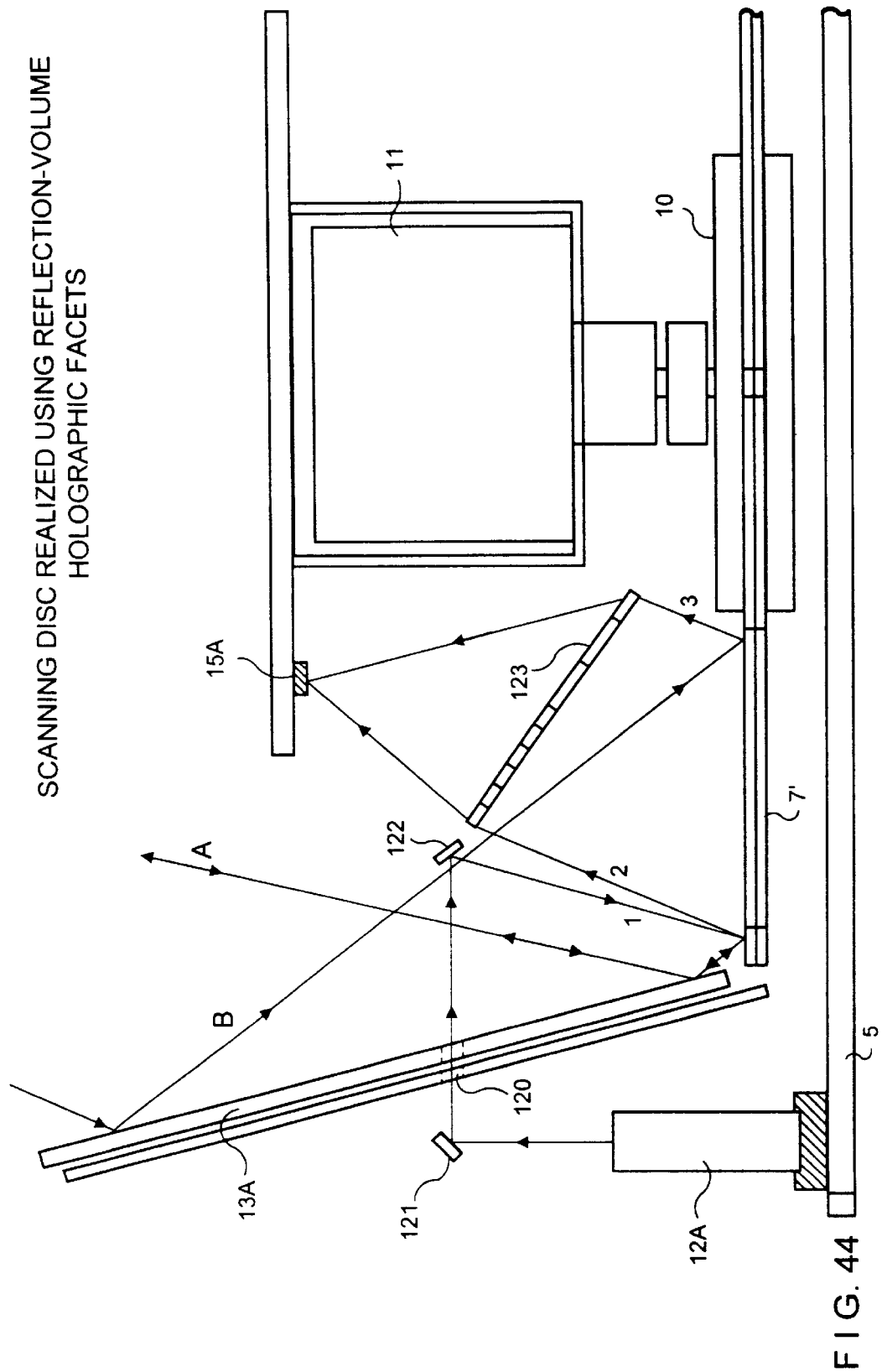
Figure 45B:
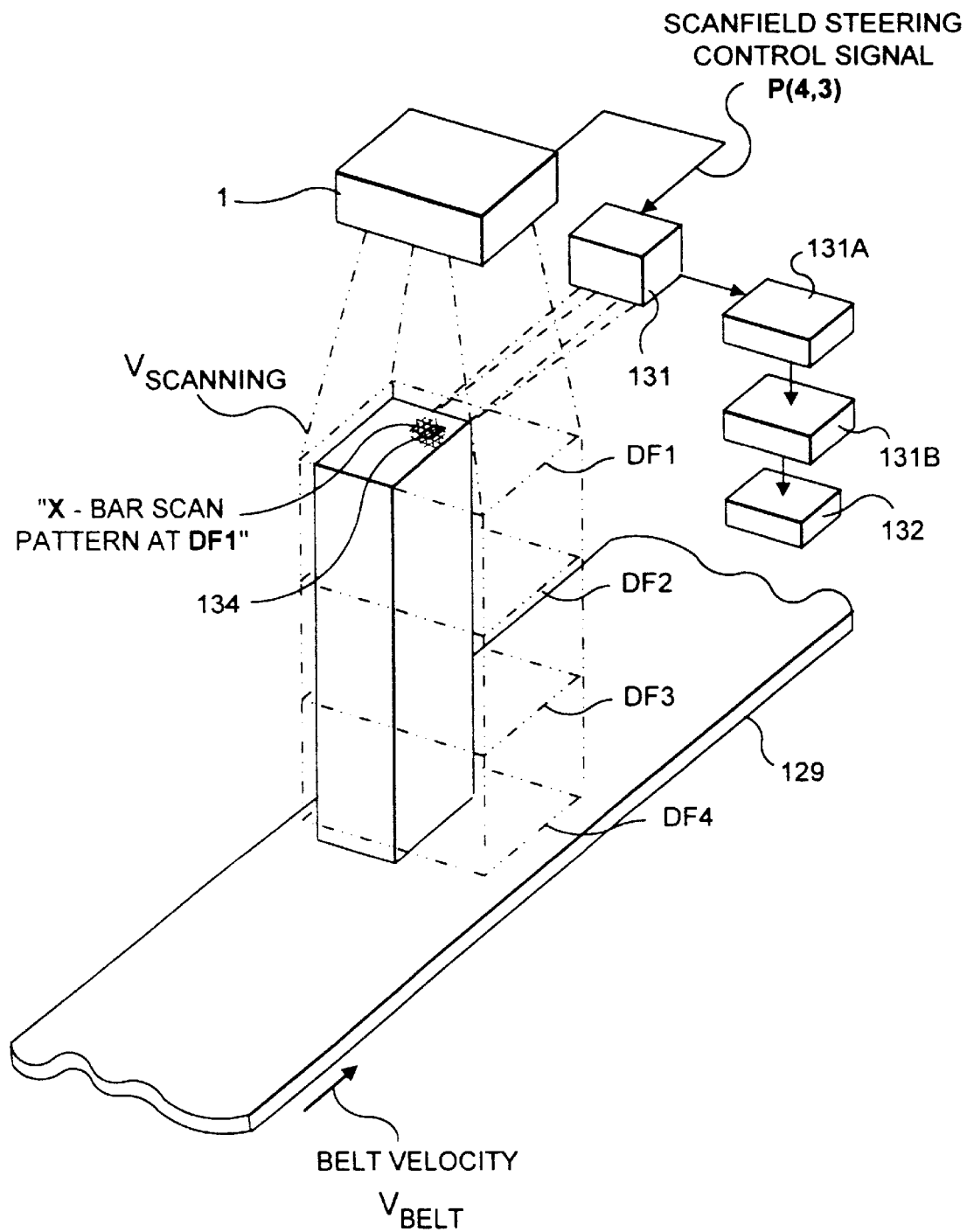
Figure 46:
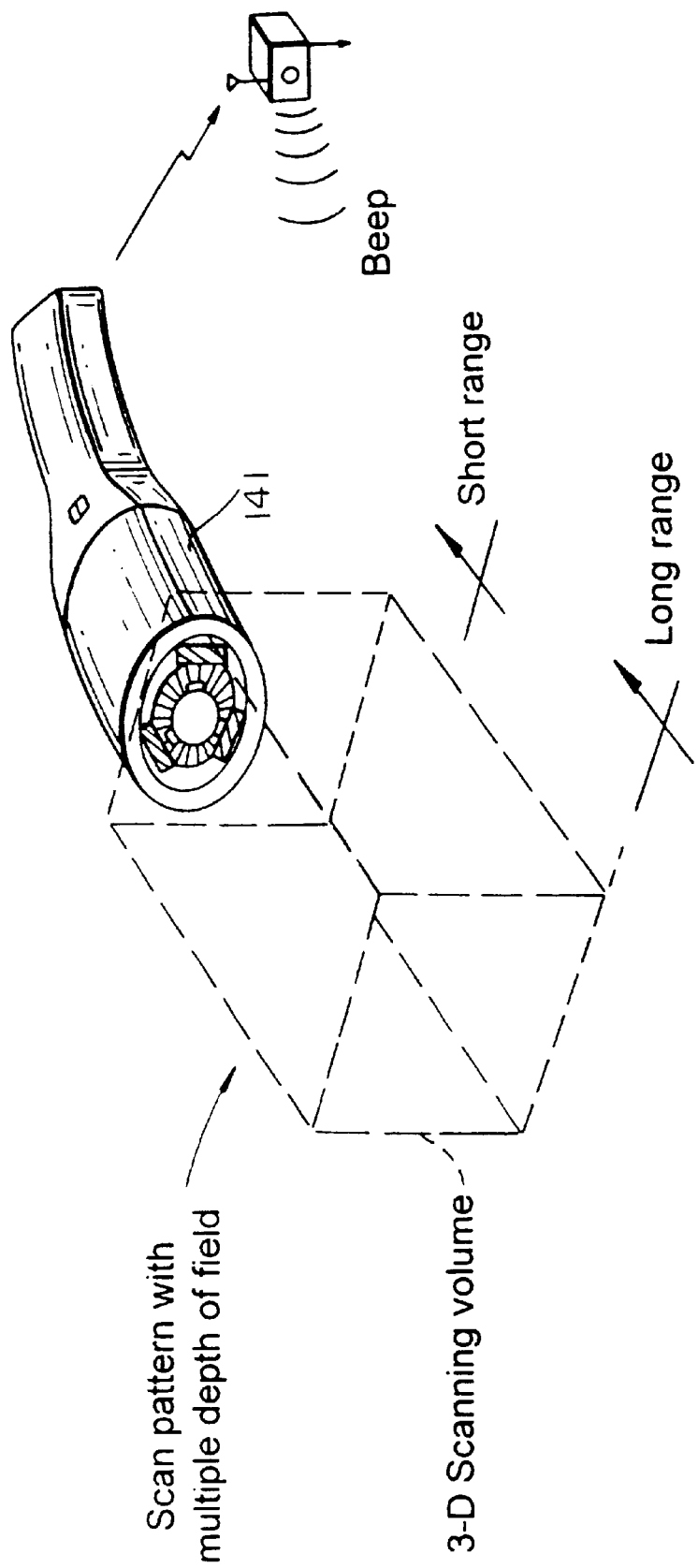
Figure 47:
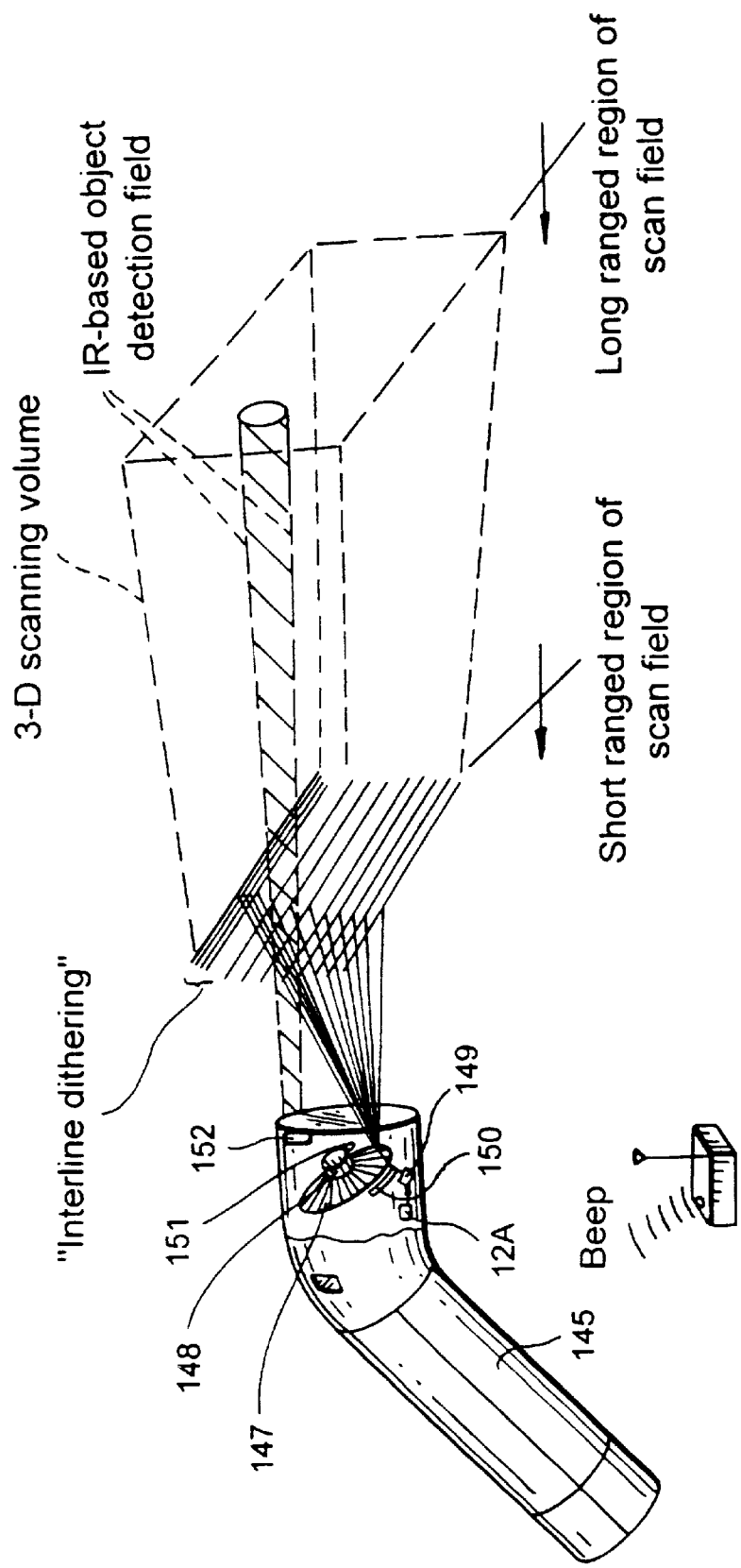
Figure 48:
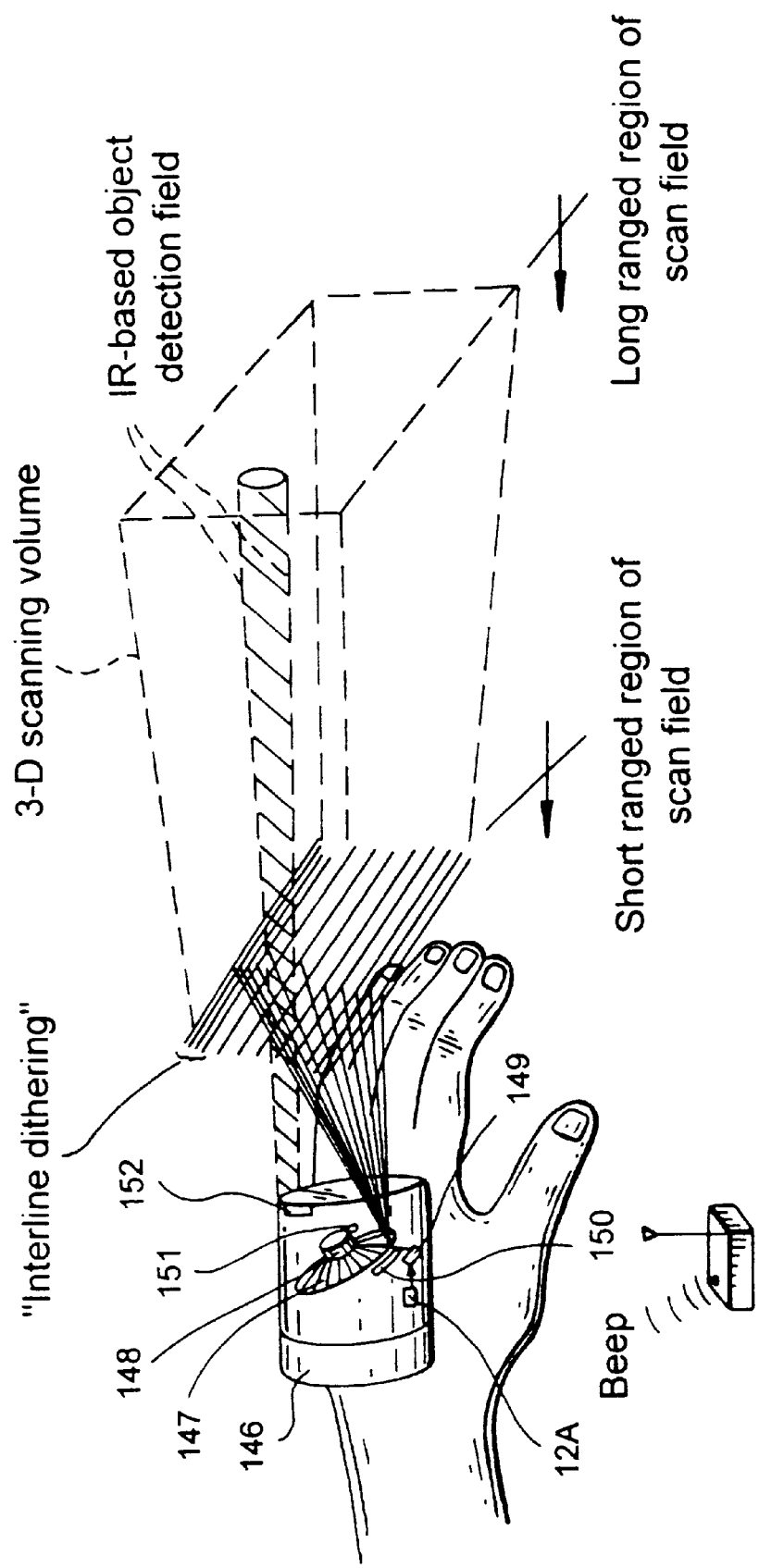

FIG. 36 is a partially cut-away, side cross-sectional view of one scanning channel of the laser scanning system hereof, showing the light detection subsystem of the second illustrative embodiment comprising the holographic scanning disc rotatably supported by the motor, the laser beam production module associated with the illustrated scanning channel, its beam folding mirror, parabolic light focusing mirror, photodetector, and a cross S polarizing filter disposed in front of the photodetector;

FIG. 37A is a set of parameters used to represent the optics model of the subsystem of FIG. 36 in which an S polarizing filter is placed before the photodetector, and the geometrical optics model thereof has a similar structure to the geometrical optics model shown in FIGS. 35A1 and 35A2 for the subsystem not employing cross-polarizers;

FIG. 37A1 is a set of assumed values for parameters used in the optics model of the subsystem of FIG. 36;

FIG. 37B sets forth a set of mathematical expressions describing relations among particular parameters of the geometrical optics model of the subsystem of FIG. 36;

FIG. 37C1 provides a plot of the normalized light diffraction efficiency of holographic scanning facet No. 1 on the scanning disc to S Polarized light, expressed as a function of the amount of angular degrees off Bragg (i.e., $\delta_e$), where normalization is with respect to the peak diffraction efficiency of facet No. 1 at the Bragg angle;

FIG. 37C2 provides a plot of the normalized light diffraction efficiency of the 16-th holographic scanning facet on the scanning disc to S polarized light, expressed as a function of the amount of angular degrees off Bragg (i.e.$\delta_e$) where normalization is with respect to the peak diffraction efficiency of facet No. 16 at the Bragg angle;

FIG. 38A is a set of parameters used to represent the optics model of the subsystem of FIG. 36, in which a S polarizing filter is placed before the photodetector, and the geometrical optics model thereof has a similar structure to the geometrical optics model shown in FIGS. 35A1 and 35A2 for the subsystem not employing cross-polarizers;

FIG. 38A1 is a set of assumed values for parameters used in the optics model of the subsystem of FIG. 36;

FIGS. 38B1 and 38B2 set forth a set of mathematical expressions describing relations among particular parameters of the geometrical optics model of the subsystem of FIG. 36, where a S polarizer is used;

FIG. 38C1 provides a plot of the normalized light diffraction efficiency of holographic scanning facet No. 1 on the scanning disc to P Polarized light, expressed as a function of the amount of angular degrees off Bragg (i.e., $\delta_e$), where normalization is with respect to the peak diffraction efficiency of facet No. 1 at the Bragg angle;

FIG. 38C2 provides a plot of the normalized light diffraction efficiency of the 16-th holographic scanning facet on the scanning disc to P polarized light, expressed as a function of the amount of angular degrees off Bragg (i.e.$\delta_e$) where normalization is with respect to the peak diffraction efficiency of facet No. 16 at the Bragg angle;

FIG. 39 is a ray optics diagram showing the paths of the innermost and outermost light rays collected by a holographic scanning facet on the scanning disc associated with the light detection subsystem of the present invention;

FIG. 40A is a plan view of a 3-D geometrical model of scanning disc within the laser scanner of the present invention, illustrating the first step of the method used to determine the first widthwise boundary of the parabolic light collecting surface patch being designed for use in the light detecting subsystem of the system hereof;

FIG. 40B is a plan view of a 3-D geometrical model of scanning disc within the laser scanner of the present invention, illustrating the second step of the method used to determine the second widthwise boundary of the parabolic light collecting surface patch being designed for use in the light detecting subsystem of the system hereof;

FIG. 41 is a partially cut-away, side cross-sectional view of one scanning channel of the laser scanning system of the fifth illustrative embodiment of the present invention, showing the scanning window of the scanner housing, the transmission-type volume holographic scanning disc rotatably supported by the motor, the laser beam production module associated with the illustrated scanning channel, its beam folding mirror, volume-reflection type holographic light focusing element, and photodetector;

FIG. 42 is a partially cut-away, side cross-sectional view of one scanning channel of the laser scanning system of the sixth illustrative embodiment of the present invention, showing the transmission-type volume holographic scanning disc rotatably supported by the motor, the laser beam production module associated with the illustrated scanning channel, its beam folding mirror, and a single light folding mirror, light focusing optics and photodetector disposed beneath the scanning disc;

FIGS. 43A and 43B provide partially cut-away, side cross-sectional views of one scanning channel of the laser scanning system of the seventh illustrative embodiment of the present invention, showing the transmission-type volume holographic scanning disc rotatably supported by the motor, the laser beam production module associated with the illustrated scanning channel, its beam folding mirror, and dual light folding mirrors, light focusing optics and photodetector disposed beneath the scanning disc;

FIG. 44 is a partially cut-away, side cross-sectional view of one scanning channel of the laser scanning system of the eighth illustrative embodiment of the present invention, showing the reflection-type volume holographic scanning disc rotatably supported by the motor, the laser beam production module associated with the illustrated scanning channel, its beam folding mirror, and a volume-transmission type holographic light focusing element and photodetector disposed above the scanning disc;

FIGS. 45A and 45B are perspective schematic views of a code symbol scanning system, in which the holographic laser scanner of the present invention is used to detect the presence of code symbols within its scanning volume, and a high-speed laser scanner with variable focal distance is used to scan the region in which the detected code symbol resides to collect high-resolution scan data for use in decode processing;

FIG. 46 is a perspective view of an automatic, hand-supportable holographic laser scanning device constructed in accordance with the principles of the present invention;

FIG. 47 is a schematic representation of a automatic, hand-supportable holographic scanning device constructed in accordance with the present invention, and which produces a two-dimensional raster-type laser scanning pattern within its 3-D scanning volume;

FIG. 48 is a schematic representation of an automatic holographic laser scanning engine of the present invention, shown mounted on the back of a user's hand for hands-free scanning applications.

Figure 49:
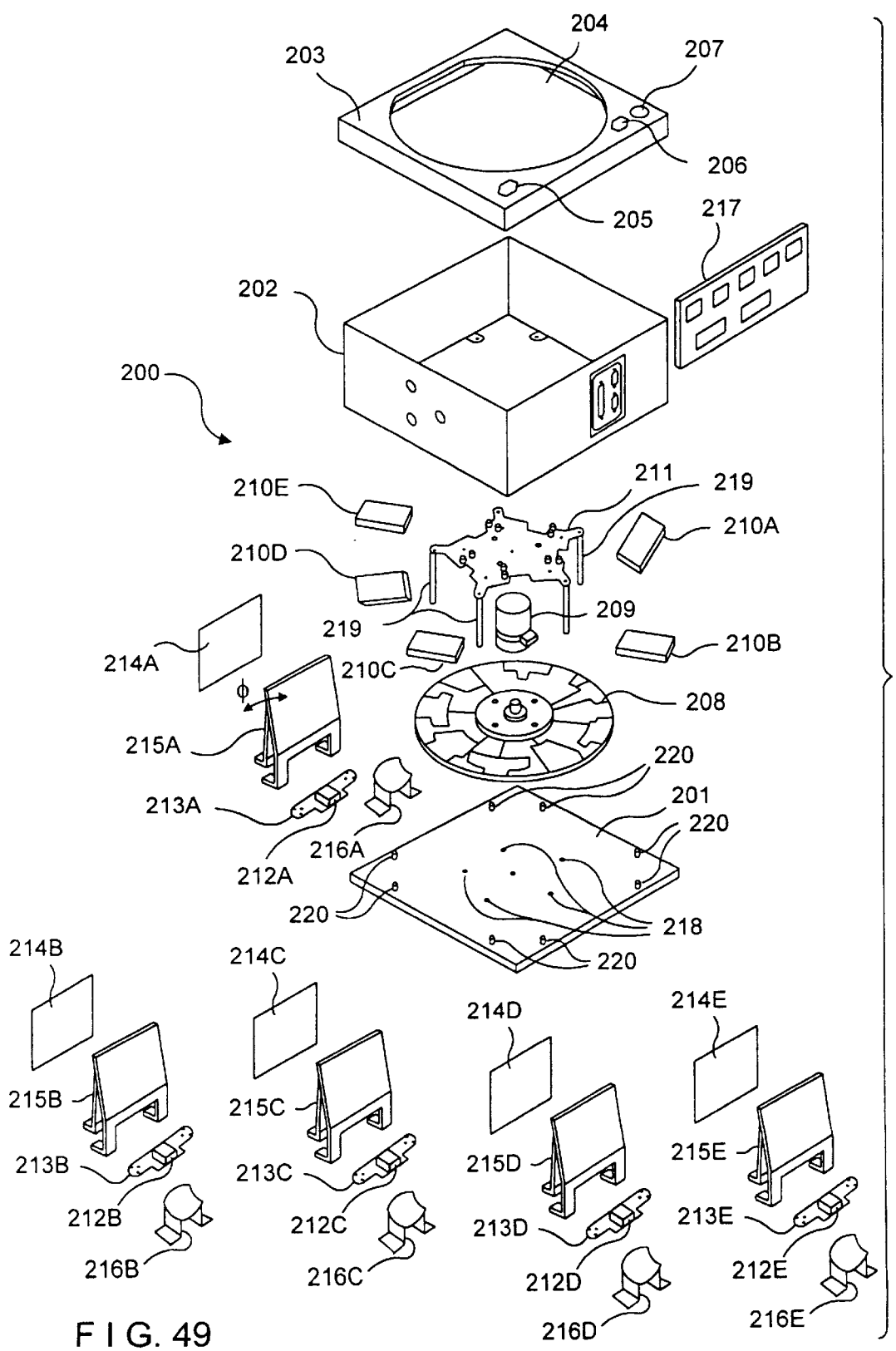
Figure 51:
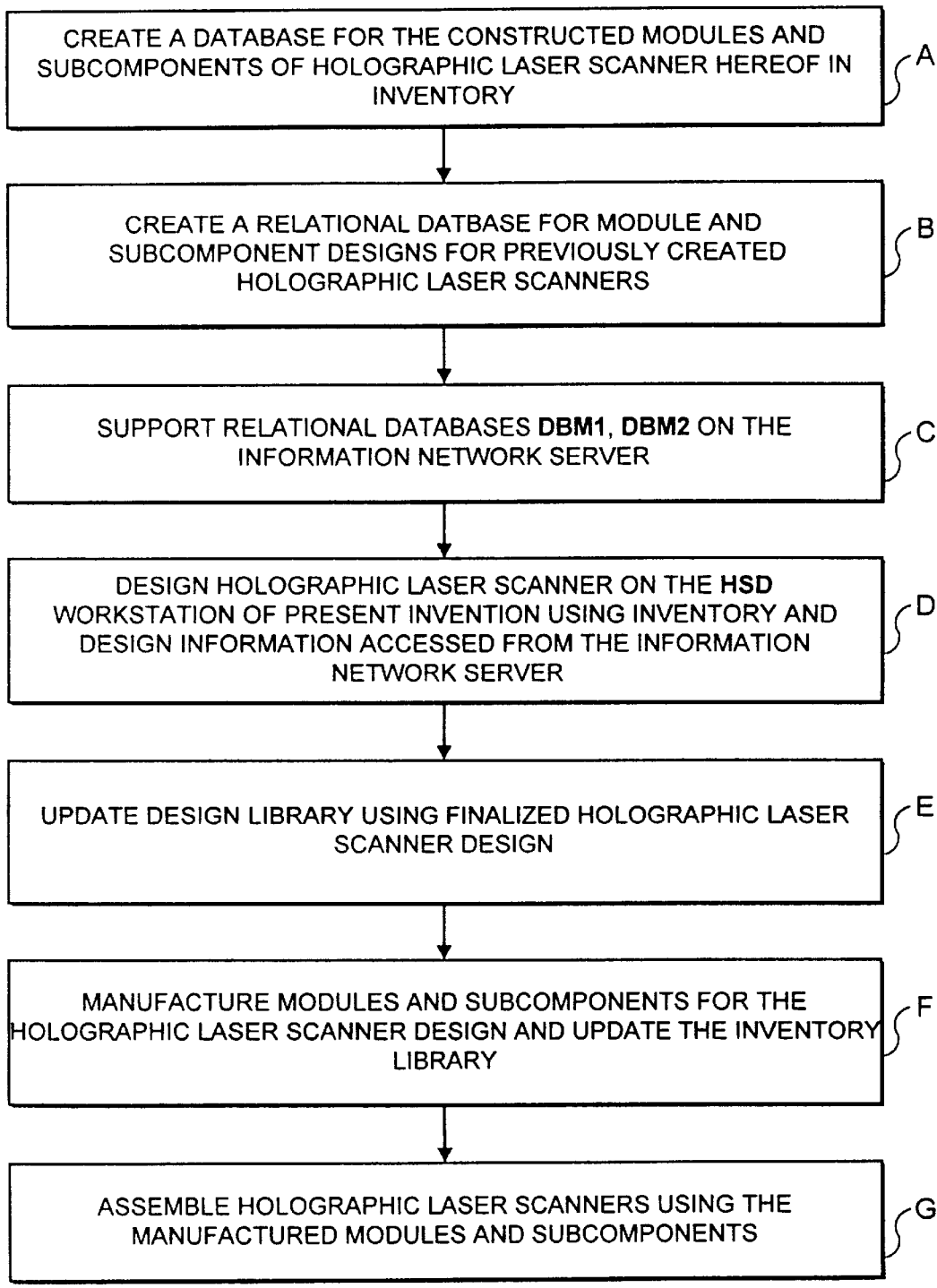

FIG. 49 is an exploded schematic diagram of a modularized holographic laser scanning system according to the principles of the present invention;

FIG. 50 a schematic diagram of a computer-integrated system for designing and manufacturing modularized holographic laser scanning systems according to the principles of the present invention;

FIG. 51 is a high level flow chart illustrating the stages of a process of designing and manufacturing modularized holographic laser scanners according to the principles of the present invention;

FIG. 52 is a schematic representation of a tree type information structure used to display which modules and subcomponents have been selected from Inventory Library or the Design Library of the system during the design of the modularized holographic laser scanners according to the principles of the present invention; and FIG. 53 is a schematic representation of an information display structure used to display information models of modules and subcomponents from the Inventory Library and the Design Library of the system during the design of the modularized holographic laser scanners according to the principles of the present invention.

DETAILED DESCRIPTION OF THE ILLUSTRATIVE EMBODIMENTS OF THE PRESENT INVENTION

Referring to the figures in the accompanying Drawings, the various illustrative embodiments of the holographic laser scanner of the present invention will be described in great detail.

In the illustrative embodiments, the apparatus of the present invention is realized in the form of an automatic code symbol reading system having a high-speed holographic laser scanning mechanism as well as a scan data processor for decode processing scan data signals produced thereby. However, for the sake of convenience of expression, the term "holographic laser scanner" shall be used in hereinafter to denote the bar code symbol reading system which employs the holographic laser scanning mechanism of the present invention.

THE HOLOGRAPHIC LASER SCANNING SYSTEM EMPLOYING A TRANSMISSION-VOLUME TYPE HOLOGRAPHIC LASER SCANNING DISC

Figure 1A:
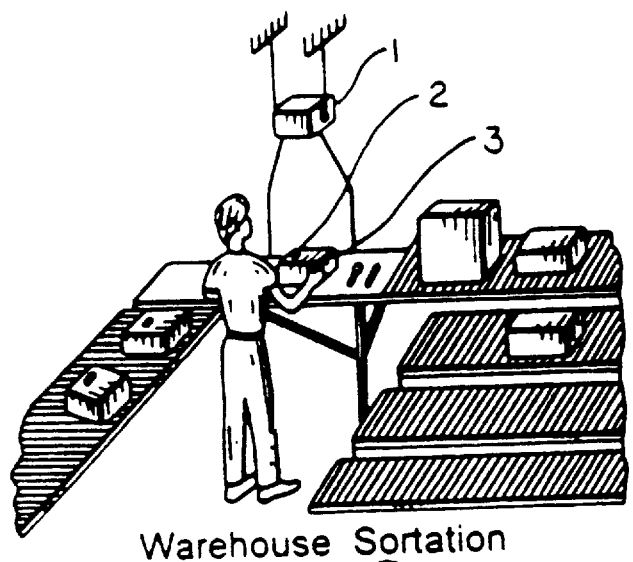
FIG. 1A is a perspective view of the holographic laser scanning system of the present invention shown installed in a first exemplary application environment.
Figure 1B:
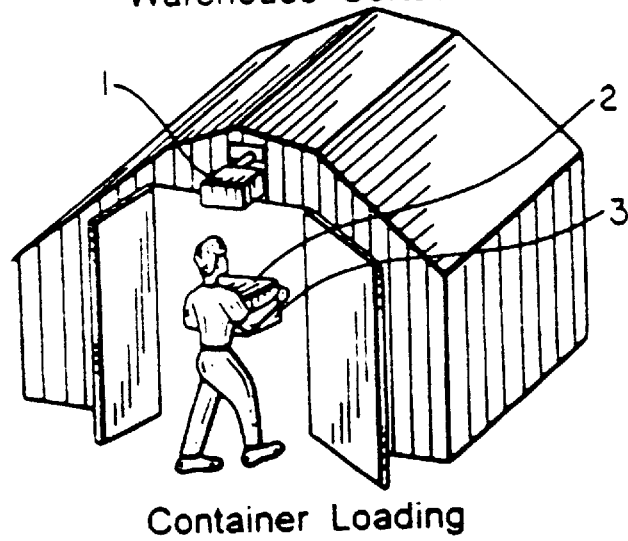
FIG. 1B is a perspective view of the holographic laser scanning system of the present invention shown installed in a second exemplary application environment.
Figure 1C:
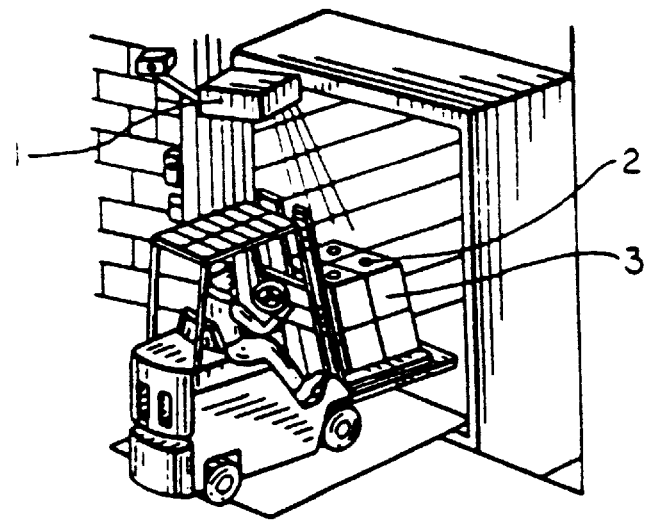
FIG. 1C is a perspective view of the holographic laser scanning system of the present invention shown installed in a third exemplary application environment.

As illustrated in FIGS. 1A, 1B and 1C, the holographic laser scanner of the present invention 1 can be used in a diverse variety of code symbol scanning applications. In FIG. 1A, the holographic laser scanner is installed in a warehouse and is used to read bar code symbols 2 on packages 3 for sorting and routing purposes. In FIG. 1B, the holographic laser scanner is installed above the doorway of a storage warehouse and is used to read bar code symbols on packages being loaded in as well as unloaded from the warehouse, as part of an automated inventory control operation. In FIG. 1C, the holographic laser scanner is shown installed above the doorway of a storage container parked against a loading dock, and is used to read bar code symbols on packages being loaded in or unloaded from the container, also as part of an automated inventory control operation.

In FIGS. 2A through 2E, the holographic scanning system 1 is shown with its compact housing enclosure 4 removed from its base 5 which functions as an optical bench for its various optical and electro-optical components. In the illustrative embodiment, the total height of the scanner housing is 6.96 inches, with width and length dimensions of 12.0 and 13.7 inches, respectively, to provide a total internal housing volume ("scanner volume") $V_{housing}$ of about 1144 cubic inches with a scanner housing depth of 6.96 inches. As will be described in greater detail below, the total three-dimensional scanning volume produced by this ultra-compact housing is 15043.6 cubic inches with a scanning field depth of 30.0 inches. Importantly, the resolution of the bar code symbol that the scanning pattern of the illustrative embodiment can resolve at any location within the specified three-dimensional laser scanning volume $V_{scanning}$ is on the order of about 0.017 inches minimum element width. In the illustrative embodiment (the figure of merit $V_{scanning}/V_{housing}$=13.15. As will become apparent hereinafter, using the design principles and methods of the present invention disclosed herein, the figure of merit $V_{scanning}/V_{housing}$ can be maximized under a various range of conditions.

Figure 2A:
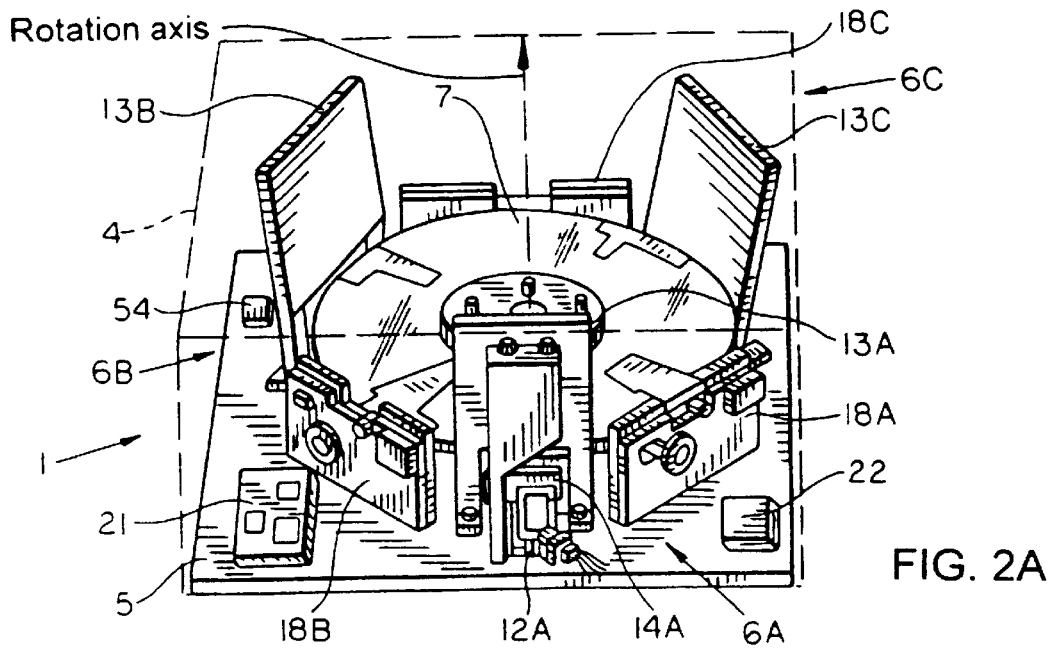
FIG. 2A is a global perspective view of the holographic scanning system of the illustrative embodiment of the present invention, shown with its housing and the light detector support structure removed from its optical bench in order to reveal the holographic scanning disc, beam folding mirrors, laser beam production modules, analog/digital signal processing boards, and other structures otherwise hidden by the housing and the light detector support structure of the system.
Figure 2B:
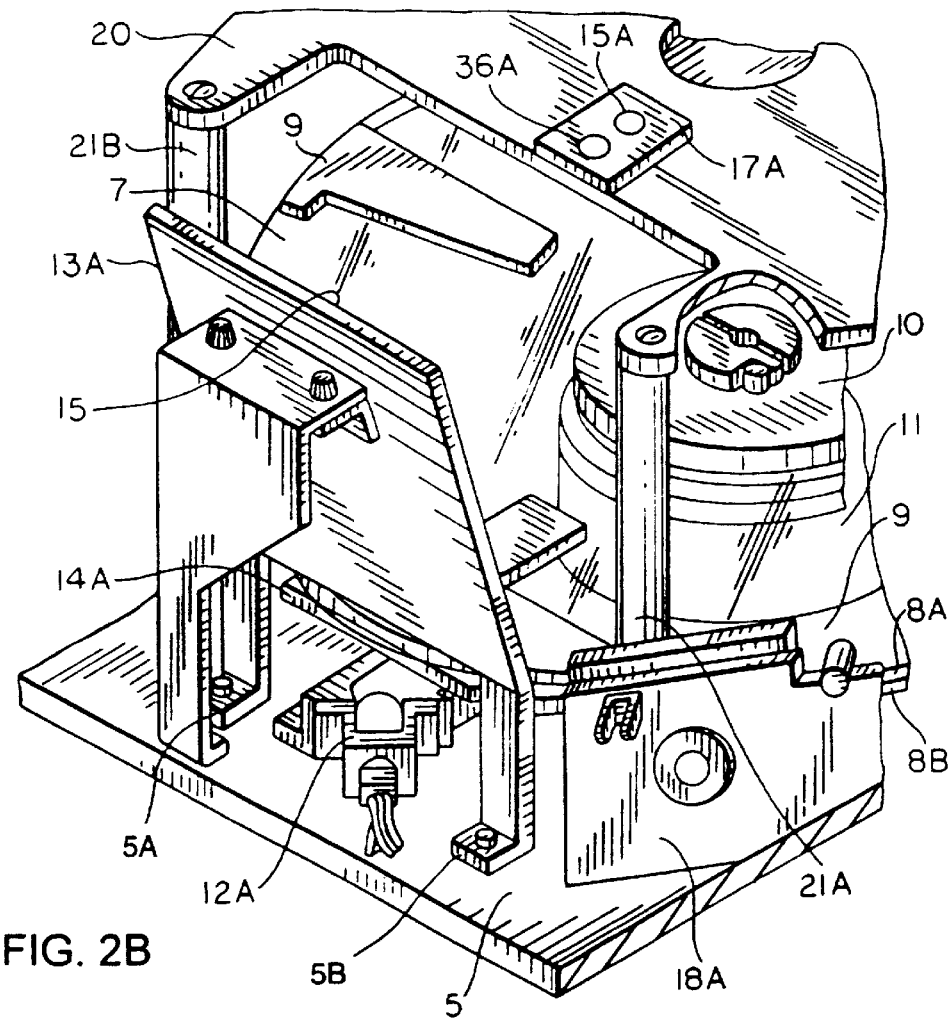
FIG. 2B is limited perspective view of the holographic scanning system of the illustrative embodiment, showing in greater detail the beam folding mirror of the first scanning channel of the system, in relation to its associated laser beam production module, parabolic light collection mirror, photodetector and analog/digital signal processing board, arranged about the centrally rotating holographic scanning disc of the system.
Figure 2C:
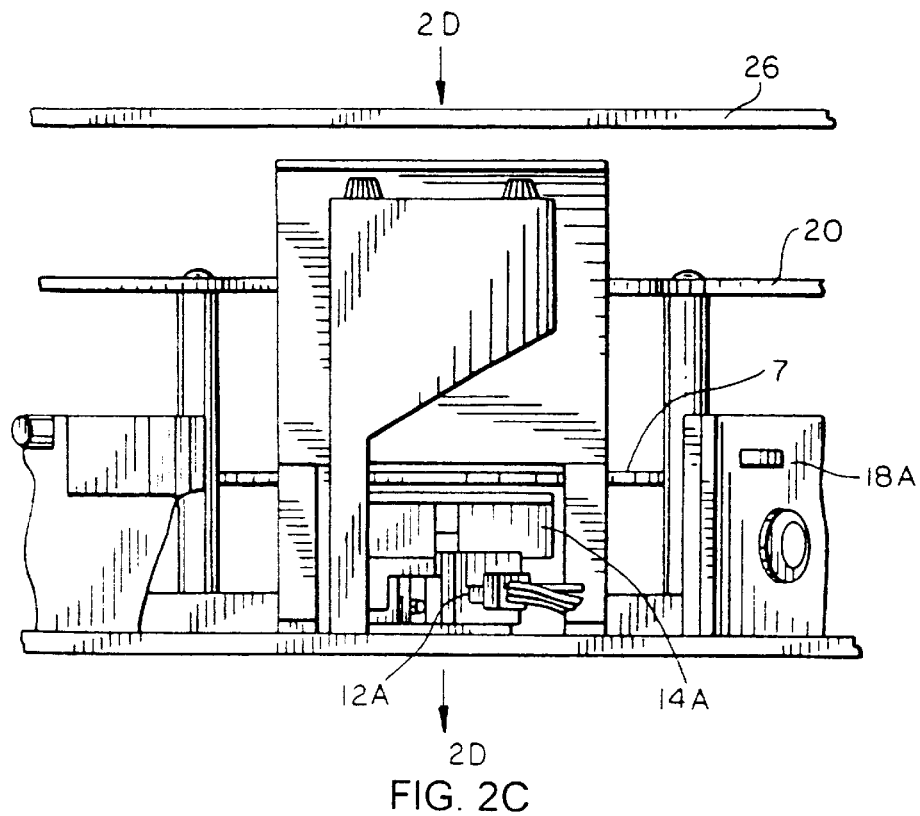
FIG. 2C is a partially cut away elevated side view of the holographic scanning system of the illustrative embodiment, showing in greater detail from about the holographic disc, the laser beam production module, beam folding mirror, parabolic light detection mirror and photodetector associated with one laser station of the system of the present invention.
Figure 3:
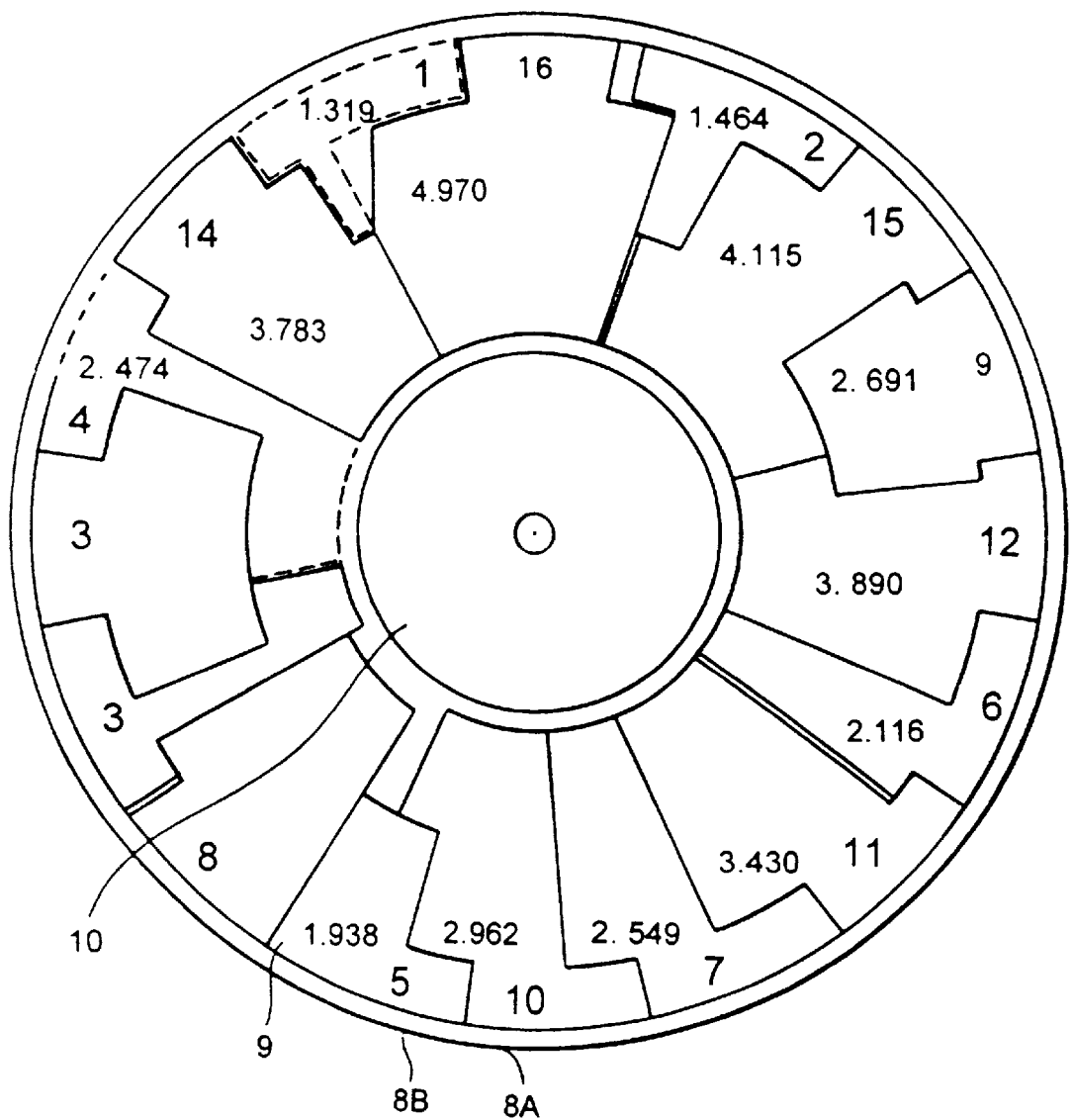
FIG. 3 is a plan view of the holographic scanning disc of the illustrative embodiment of the present invention, showing the boundaries of each i-th holographic optical facet mounted thereon about its axis of rotation, with the assigned facet number imposed thereon for illustrative purposes.

As shown in FIG. 2A, the holographic scanning system of the illustrative embodiment comprises three laser scanning stations 6A, 6B and 6C, symmetrically arranged about a holographic scanning disc 7. As best illustrated in FIGS. 2B and 3, the holographic scanning disc 7 comprises two glass plates 8A and 8B, between which are supported a plurality of specially designed holographic optical elements (HOEs), referred to hereinafter as "holographic scanning facets" or "holographic facets". In the illustrative embodiments, each holographic facet 9 is realized as a volume transmission-type light diffraction hologram having a slanted fringe structure having variations in spatial frequency to provide a characteristic focal length $f_i$. The light diffraction efficiency of such volume light diffraction holograms, as a function of incidence angle $A_i$, modulation depth $\Delta n_i$, or recording media losses, is described in great detail in the celebrated paper entitled *"Coupled Wave Theory for Thick Hologram Gratings"* by Herwig Kogelnik, published in The Bell System Technical Journal (BSTJ), Volume.8, Number 9, at Pages 2909–2947, in November 1969, incorporated herein by reference in its entirety.

In a conventional manner, the glass support plates 8A and 8B forming part of the holographic scanning disc hereof are mounted to a support hub 10. In turn, the support hub is mounted to the shaft of a high-speed, electric motor 11. The other principal subcomponents of each laser scanning station are a laser beam production module 12A (12B, 12C), a planar beam folding mirror 13A (13B, 13C), a parabolic light focusing element (e.g., mirror or volume reflection hologram) 14A (14B, 14C), a photodetector 15A (15B, 15C) with an optional cross-polarizing filter element 16A (16B, 16C) disposed thereacross, an analog scan data signal processing board 17A (17B, 17C), and a digital scan data signal processing board 18A (18B, 18C). For purposes of simplicity of description, when describing the laser scanning stations of the present invention, reference will be made to station 6A. It is understood, however, the stations 6B and 6C have similar structure and operate in substantially the same manner as Station 6A.

Figure 5:
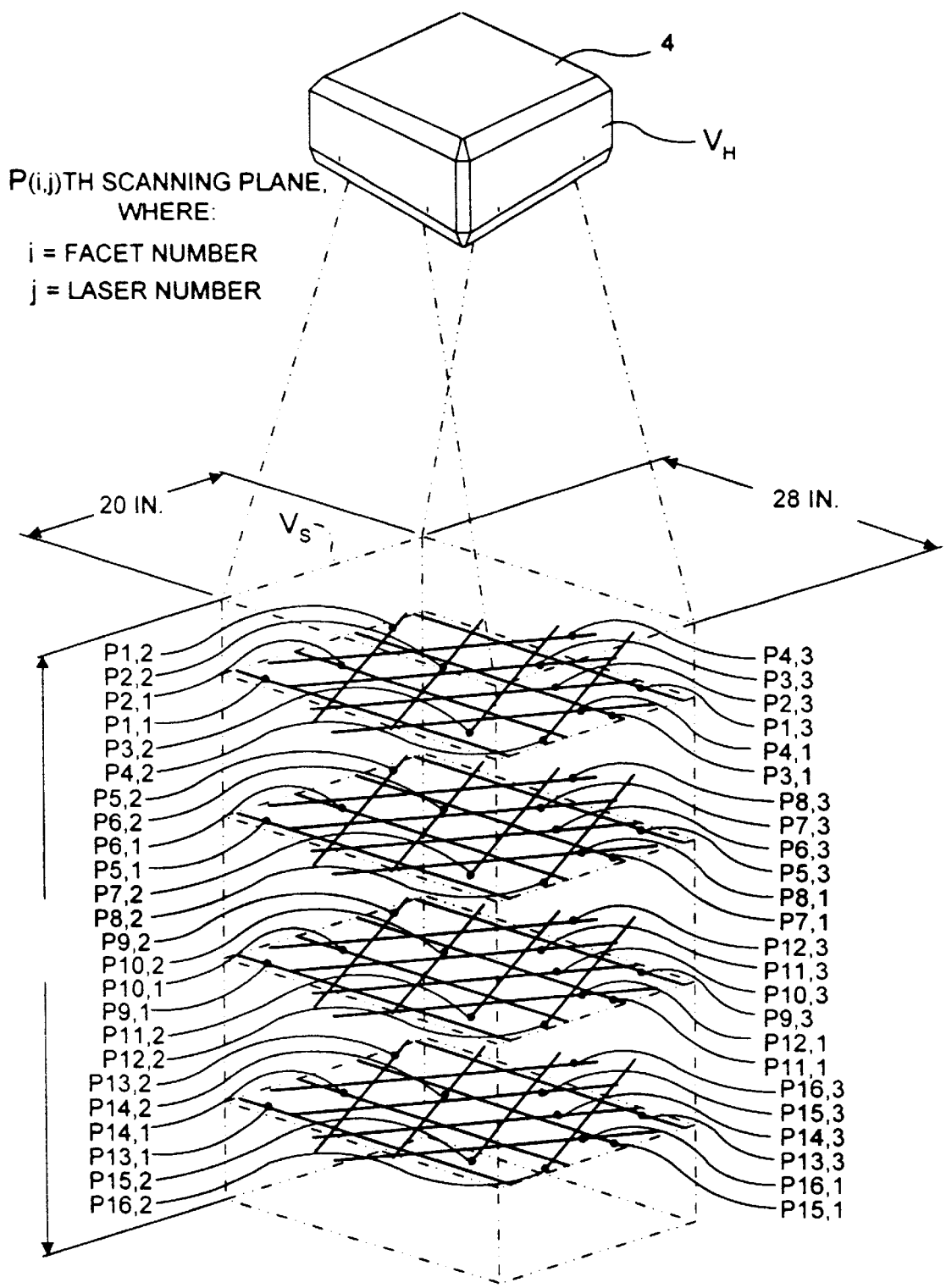
FIG. 5 is a perspective view of the holographic laser scanning system of the illustrative embodiment of the present invention, schematically illustrating the projection of each P(i,j)-th laser scanning plane at its prespecified focal plane (i.e., zone) within the three-dimensional scanning volume extending about the projection axis of the holographic laser scanner.

The function of each laser beam production module is to cooperate with the holographic scanning disc and produce from its internal visible laser diode(VLD), a laser beam with desired beam cross-sectional characteristics (e.g., having the beam aspect ratio of an ellipse or circle) and being essentially free of astigmatism and beam-dispersion that is otherwise associated with a laser beam directly transmitted from a VLD through a rotating holographic scanning facet during laser beam scanning operations. When an incident laser beam from the VLD passes through a particular holographic scanning facet on the rotating scanning disc, it is diffracted in a prespecified "outgoing" direction (i.e., at an angle of diffraction $B_i$) determined during the holographic disc design process of the present invention. The function of the beam folding mirror associated with each scanning station is to change (i.e., fold) the direction of the outgoing diffracted laser beam from its outgoing direction, into the direction required to generate its corresponding laser scanning plane. Notably, when the produced laser scanning plane is intersected by a planar surface (e.g., bearing a bar code symbol), a linear scanline is projected on the intersected surface, as illustrated in FIG. 5. The angular dimensions of each resulting scanning plane are determined by the Scan Angle, $\theta_{Si}$, associated with the geometry of the scanning facet and the Scan Angle Multiplication Factor, $M_i$, associated therewith, which will be discussed in greater detail hereinafter. When a bar code symbol is scanned by any one of the laser scanning planes, the incident laser light is scattered (according to Lambert's Law for diffuse reflective surfaces). A portion of this laser light is reflected back along the outgoing ray path, off the beam folding mirror and thereafter passes through the same holographic scanning facet that generated the corresponding scanning plane only $T_{transit}=2-f_i/c$ seconds before, where c is the speed of light. As the reflected laser light passes through the holographic scanning facet on its return path towards the parabolic mirror beneath the scanning disc, the incoming light rays enter the holographic scanning facet close to the Bragg angle thereof (i.e., $B_i$) and thus (once again) are strongly diffracted towards the parabolic mirror along its optical axis. The parabolic mirror, in turn, focuses these collected light rays and redirects the same through the holographic scanning facet at angles sufficiently far off the Bragg angle (i.e., $A_i$) so that they are transmitted therethrough towards the photodetector with minimal losses due to internal diffraction within the holographic facet. A novel method of designing the light detection subsystem of the present invention will be described in great detail hereinafter for various types of holographic scanning discs and light polarization techniques.

As best shown in FIG. 3, the holographic facets on the holographic scanning disc of the present invention are arranged on the surface thereof in a manner which utilizes substantially all of the light collecting surface area provided between the outer radius of the scanning disc, $r_{outer}$, and the inner radius thereof, $r_{inner}$. In the illustrative embodiment, sixteen holographic scanning facets are used in conjunction with the three independent laser beam sources, to provide an omni-directional laser scanning pattern consisting of forty-eight(48) laser scanning planes cyclically generated at a rate in excess of 56 times per second. In is understood, however, this number will vary from embodiment to embodiment of the present invention and thus shall not form a limitation thereof. As will be described in greater detail hereinafter, the geometry of each holographic facet has been designed so that (1) each of the sixteen holographic facets supported thereon has substantially the same (i.e., equal) Lambertian light collecting efficiency, independent of its focal length, and (2) the collective surface area of all of the holographic facets occupies (i.e., uses) all of the available light collecting surface area between the outer radius and inner radius of the scanning disc. The advantage of this aspect of the present invention is that optical-based scan data signals with maximum signal-to-noise (SNR) ratio are produced and collected at the photodetector of each laser scanning station in the system. This, of course, implies higher performance and higher quality scan data signals for signal processing.

As shown in FIG. 3, each holographic facet on the surface of the scanning disc is specified by a set of geometrical parameters, a set of optical parameters, and a set of holographic recording parameters. The geometrical parameters define various physical characteristics of the facet in issue, such as the location of the facet on the disc specified by its preassigned facet number (e.g., i=1, 2, 3, ... or 16), its light collecting surface $Area_i$ (designed to exhibit a high diffraction efficiency to incoming light rays on Bragg), the Angle of the facet $\theta_{roti}$, the adjusted Rotation Angle of the facet $\theta'_{roti}$ actual scan angle of the facet $\theta_{sweepi}$ (accounting for beam diameter $d_{beam}$ and interfaced gaps $d_{gap}$), and the surface boundaries $SB_i$ occupied by the holographic facet on the scanning disc, which typically will be irregular in shape by virtue of the optimized light collecting surface area of the holographic disc). The optical parameters associated with each holographic facet include the wavelength λ at which the object beam is designed to be reconstructed, the angle of incidence of the holographic facet $A_i$, the angle of diffraction thereof $B_i$, its scan angle multiplication factor $M_i$, the focal length $f_i$ of the facet, etc. Unlike the other parameters associated with each facet, the recording parameters define the thickness, T, of the recording medium (e.g., dichromate gelatin) used during the recording of the holographic facet, the average bulk index of refraction of the recording medium, and the modulation depth (i.e., modulation-index) $\Delta n_i$ associated with fringe structure formed in the recording medium. Collectively, these parameters shall be referred to as "construction parameters", as they are required to construct the holographic facet with which they are associated.

In the scanning system of the present invention, the principal function of each holographic facet is to deflect an incident laser beam along a particular path in 3-D space in order to generate a corresponding scanning plane within the 3-D laser scanning volume produced by the scanning system. Collectively, the complex of laser scanning planes produced by the plurality of holographic facets in cooperation with the three laser beam production modules, creates the highly confined 3-D scanning pattern within the highly defined scanning volume of the scanning system.

As shown in FIG. 5, the holographic laser scanner of the illustrative embodiment cyclically generates from its ultra compact scanner housing 4, a complex three-dimensional laser scanning pattern consisting of forty-eight laser scanning planes, with four different focal planes. This implies that twelve different laser scanning planes are focused in each of the four different focal planes within the 3-D scanning volume. As shown, each of these focal planes extend substantially parallel to the scanning window of the holographic laser scanner and are located at different distances from the scanning window. Thus when each one of these scanning planes is intersected by a planar object, such as a carton wall-surface, twelve laser scanning lines are projected onto its surface, as best shown in FIG. 5. Greater details of the laser scanning pattern of the present invention will be described hereinbelow.

In FIG. 2B, one of the laser scanning stations in the holographic scanner is shown in greater detail. As illustrated in this figure, the beam folding mirror associated with each laser scanning station, has a substantially planar reflective surface 15 and is tangentially mounted adjacent the holographic scanning disc. In the illustrative embodiment, beam folding mirror 13A is supported in this position relative to the housing base (i.e the optical bench) 5 using support legs 5A and 5B and rear support bracket 5C. The angle of inclination of the (j-th beam folding mirror relative to the normal to the holographic disc, $\phi$, will be specified in greater detail during the description of the scanner design process of the present invention. Notably, in order to minimize the height of the holographic scanner housing designated as "h", and thus design a truly ultra-compact holographic laser scanner, it is necessary to minimize the height of each j-th beam folding mirror relative to housing base designated as "$Y_j$". As will be described in great detail hereinafter, the design process of the present invention provides a way in which to determine the minimum height of the beam folding mirrors $Y_j$, given a prespecified laser scanning pattern, resolution, and holographic disc size, and thus provides a novel method of designing a compact holographic laser scanner having physical dimensions hitherto unattainable using prior art techniques. While the design method of the present invention is shown herein applied to a compact, transportable holographic laser scanner, it is readily applicable to hand-held hand-supportable as well as body mountable holographic laser scanners.

As shown in FIG. 2B, the laser beam production module associated with each laser scanning station is mounted on the optical bench (i.e., housing base plate 5), immediately beneath its associated beam folding mirror. Depending on which embodiment of the laser beam production module is employed in the construction of the holographic laser scanner, the position of the laser beam production module may be different. However, it is preferred that the geometrical dimensions of its beam folding mirrors in conjunction with the geometrical dimensions of its holographic disc are the sole determinants of the width and length dimensions of the scanner housing, whereas the geometrical dimensions of its beam folding mirrors and parabolic light focusing mirror beneath the holographic scanning disc are the sole determinants of the height dimension of the scanner housing. This implies that when designing a holographic laser scanner according to the method of the present invention, the location of the laser beam production modules, the signal processing boards, the motor for rotating the holographic scanning disc, the photodetectors, the beam folding mirrors, the light detection subsystem, and all components other than the holographic scanning disc, do not impose constraints on the geometrical dimensions of the scanner housing. In short, according to the design and construction principles of the present invention, the above-described holographic scanner components can be mounted on the optical bench within the heightwise, widthwise and lengthwise boundary constraints set solely by the geometrical dimensions of the holographic scanning disc, the beam folding mirrors and the parabolic light collecting mirrors beneath the holographic disc. However, as will be shown during the detailed description of the scanner design method hereof, the geometrical dimensions of the laser scanning pattern within the 3-D scanning volume $V_{scanning}$ are what ultimately determine the heightwise, widthwise and lengthwise boundary constraints necessarily imposed on the geometrical dimensions of the holographic disc, the beam folding mirrors and the parabolic light collecting mirrors beneath the holographic scanning disc. Thus, specifications for the laser scanning pattern to be realized provide fundamental constraints for the holographic scanner design process of the present invention.

Figure 2D:
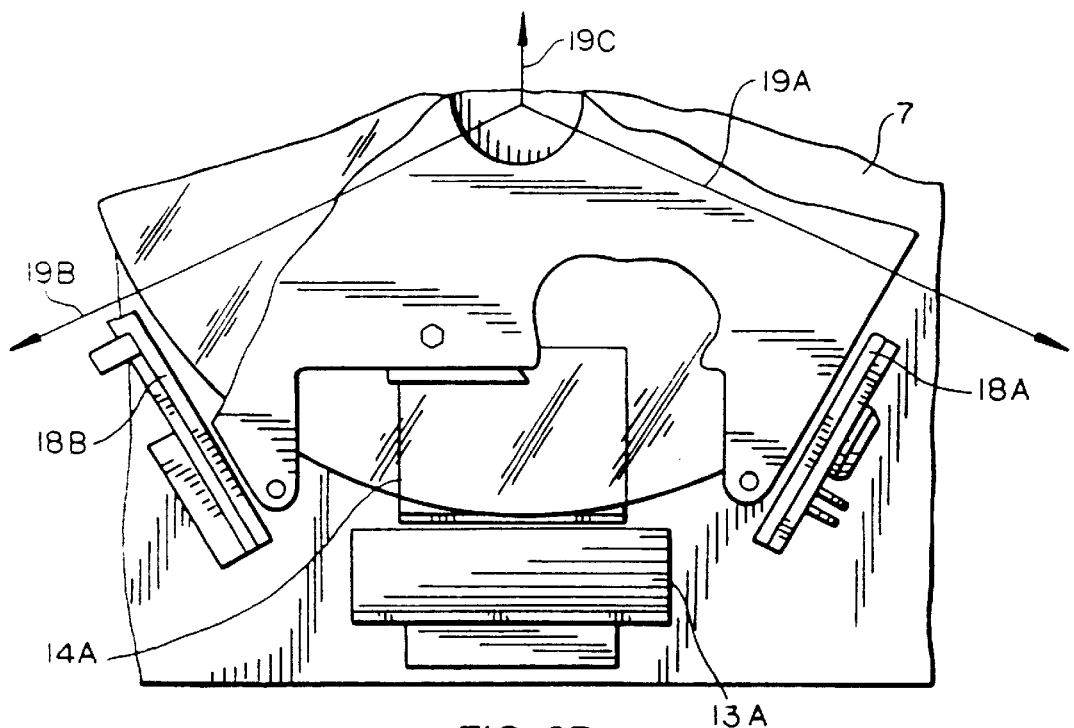
FIG. 2D is partially cut away view of the holographic scanning system of the illustrative embodiment, taken along line 2D—2D of FIG. 2C, showing in greater detail the holographic scanning disc, the arrangement of the beam folding mirror and parabolic light detection mirror associated with an illustrative laser scanning station of the system of the present invention.

As shown in FIGS. 2A through 2D, the three laser production modules 12A, 12B and 12C are mounted on base plate 5, symmetrically about the axis of rotation of the shaft of electric motor 11. During laser scanning operations, these laser beam production modules produce three independent laser beams which are directed through the edge of the holographic disc at an angle of incidence $A_i$, which, owing to the symmetry of the laser scanning pattern of the illustrative embodiment, is the same for each laser scanning station (i.e., $A_i$=43.0 degrees for all values of i). The incident laser beams produced from the three laser beam production modules 12A, 12B and 12C extend along the three central reference planes 19A, 19B and 19C, each extending normal to the plane of base plate 5 and arranged 120° apart from its adjacent neighboring central planes, as best illustrated in FIG. 2D. While these central reference planes are not real (i.e., are merely virtual), they will be useful in describing the detailed geometrical structure of each laser scanning station in the holographic laser scanner of the present invention.

As shown in FIG. 2B, the photodetector of each laser scanning station is mounted along its central reference plane, above the holographic disc and opposite its associated beam folding mirror so that it does not block or otherwise interfere with the returning (i.e., incoming) laser light rays reflecting off light reflective surfaces (e.g., product surfaces, bar code symbols, etc) during laser scanning and light collecting operations. In the illustrative embodiment, the three photodetectors 15A, 15B and 15C are supported in their respective positions by a photodetector support frame 20 which is stationarily mounted to the optical bench by way of vertically extending support elements 21A, 21B and 21C. The electrical analog scan data signal produced from each photodetector is processed in a conventional manner by its analog scan data signal processing board which is also supported upon photodetector support frame 20. Notably, the height of the photodetector support board, referenced to the base plate (i.e., optical bench), is chosen to be less than the minimum height that the beam folding mirrors must extend above the holographic disc in order to realize the prespecified laser scanning pattern of the illustrative embodiment. In practice, this height parameter is not selected (i.e., specified) until after the holographic disc has been completely designed according to the design process of the present invention, while satisfying the design constraints imposed on the disc design process. As will be explained in greater detail hereinafter, the use of a spreadsheet-type computer program to analytically model the geometrical structure of both the laser scanning apparatus and the ray optics of the laser beam scanning process, allows the designer to determine the geometrical parameters associated with the holographic scanning facets on the disc which, given the specified maximum height of the beam folding mirrors $Y_j$, will produce the prespecified laser scanning pattern (including focal plane resolution) while maximizing the use of the available light collecting area on the holographic scanning disc.

As best shown in FIGS. 2B, 2C, 2D and 14, the parabolic light collecting mirror associated with each laser scanning station is disposed beneath the holographic scanning disc, along the central reference plane associated with the laser scanning station. While certainly not apparent, precise placement of the parabolic light collecting element (e.g., mirror) relative to the holographic facets on the scanning disc is a critical requirement for effective light detection by the photodetector associated with each laser scanning station. Placement of the photodetector at the focal point of the parabolic light focusing mirror alone is not sufficient for optimal light detection in the light detection subsystem of the present invention. Careful analysis must be accorded to the light diffraction efficiency of the holographic facets on the scanning disc and to the polarization state (s) of collected and focused light rays being transmitted therethrough for detection. As will become more apparent hereinafter, the purpose of such light diffraction efficiency analysis ensures the realization of two important conditions, namely: (i) that substantially all of the incoming light rays reflected off an object (e.g., bar code symbol) and passing through the holographic facet (producing the corresponding instant scanning beam) are collected by the parabolic light collecting mirror; and (ii) that all of the light rays collected by the parabolic light collecting mirror are focused through the same holographic facet onto the photodetector associated with the station, with minimal loss associated with light diffraction and refractive scattering within the holographic facet. A detailed procedure will be described hereinafter for designing and installing the parabolic light collecting mirror in order to satisfy the critical operating conditions above.

As shown in FIGS. 2A through 2D, the three digital scan data signal processing boards 18A, 18B and 18C are arranged in such a manner to receive and provide for processing the analog scan data signals produced from analog scan data signal processing boards 17A, 17B and 17C, respectively. As best shown in FIGS. 2A and 2B, each digital scan data signal processing board is mounted vertically between a pair of adjacent beam folding mirrors, close to the tangential edge of the holographic disc, within the scanner volume defined by the geometrical dimensions of the holographic disc and the beam folding mirrors. A central processing board 21 is also mounted upon the base plate for processing signals produced from the digital scan data signal processing boards. A conventional power supply board 22 is also mounted upon the base plate, within one of its extreme corners. The function of the digital scan data signal processing boards, the central processing board, and the power supply board will be described in greater detail in connection with the functional system diagram of FIGS. 4A through 4C. As shown, electrical cables are used to conduct electrical signals from each analog scan data signal processing board to its associated digital scan data signal processing board, and from each digital scan data signal processing board to the central processing board. Regulated power supply voltages are provided to the central signal processing board 21 by way of an electrical harness (not shown), for distribution to the various electrical and electro-optical devices requiring electrical power within the holographic laser scanner. In a conventional manner, electrical power from a standard 120 Volt, 60 HZ, power supply is provided to the power supply board by way of flexible electrical wiring (not shown). Symbol character data produced from the central processing board is transmitted over a serial data transmission cable connected to a serial output (i.e., standard RS232) communications jack 23 installed through a wall in the scanner housing. This data can be transmitted to any host device 24 by way of a serial (or parallel) data communications cable, RF signal transceiver, or other communication mechanism known in the art.

As shown in FIG. 2E, the scanner housing has three symmetrically arranged light transmission apertures 25A, 25B and 25C formed in its top wall surface 26. Each of these light transmission apertures has a substantially planar extent which is substantially parallel to the scanning disc rotatably supported upon the shaft of electric motor 11. In order to seal off the optical components of the scanning system from dust, moisture and the like, a laser scanning window 26, preferably fabricated from a high impact plastic material, is installed over each light transmission aperture using a rubber gasket and conventional mounting techniques. In the illustrative embodiment, each laser scanning window 26 has spectrally-selective light transmission characteristics which, in conjunction with a spectrally-selective filter 27 installed before each photodetector within the housing, forms a narrow-band spectral filtering subsystem that performs two different functions. The first function of the narrow-band spectral filtering subsystem is to transmit only the optical wavelengths in the red region of the visible spectrum in order to impart a reddish color or semi-transparent character to the laser scanning window. This makes the internal optical components less visible and thus remarkably improves the external appearance of the holographic laser scanning system. This feature also makes the holographic laser scanner less intimidating to customers at point-of-sale (POS) stations where it may be used. The second function of the narrow-band spectral filtering subsystem is to transmit to the photodetector for detection, only the narrow band of spectral components comprising the outgoing laser beam produced by the associated laser beam production module. Details regarding this optical filtering subsystem are disclosed in copending application Ser. No. 08/439,224, entitled "Laser Bar Code Symbol Scanner Employing Optical Filtering With Narrow Band-Pass Characteristics and Spatially Separated Optical Filter Elements" filed on May 11, 1995, which is incorporated herein by reference in its entirety.

When using multiple laser beam sources in any holographic laser scanning system, the problem of "cross-talk" among the neighboring light detection subsystems typically arises and must be adequately resolved. The cause of the cross-talk problem is well known. It is due to the fact that the spectral components of one laser beam are detected by a neighboring photodetector. While certainly not apparent, the holographic scanning disc of the present invention has been designed so that light rays produced from one laser beam (e.g., j=1) and reflected off a scanned code symbol anywhere within the laser scanning volume $V_{scanning}$ will fall incident upon the light collecting region of the scanning disc associated with a neighboring light detection subsystem in an off-Bragg condition. Consequently, the signal level of "neighboring" incoming scan data signals are virtually undetectable by each photodetector in the holographic laser scanner of the present invention. The optical characteristics of the scanning facets on the scanning disc which makes this feature possible will be described in greater detail hereinafter during the description of the scanning disc design process hereof.

As best shown in FIG. 3, the holographic scanning disc of the present invention is unlike any other prior art laser scanning disc in two important respects. Firstly, virtually all of the utilizable surface area of the scanning disc, defined between the outer edge of the support hub 10 and the outer edge of the scanning disc, is occupied by the collective surface area of all sixteen holographic scanning facets that have been laid out over this defined region. Secondly, each holographic scanning facet has substantially the same Lambertian light collection efficiency as all other scanning facets. Unlike conventional laser scanning discs, the geometry of each holographic facet on the scanning disc of the present invention is apparently irregular, arbitrary and perhaps even fanciful to the eyes of onlookers. The fact is, however, that this is not the case. As will be described in greater detail hereinafter, the scanning disc design process hereof comprises two major stages: a first, "analytical modelling stage" during which particular optical and geometrical parameters are determined for each holographic facet within a complex set of scanning system constraints; and a second, "holographic facet layout stage", during which the scanning disc designer lays out each holographic facet on the support disc so that virtually all of the available surface area thereon is utilized by the resulting layout. While the disc design method hereof allows certain geometrical parameters associated with each designed holographic facet to be selected on the basis of discretion and judgement of the disc designer (preferably using a computer-aided (CAD) tool) during the holographic facet layout stage, certain geometrical parameters, however, such as the total surface area of each facet $Area_i$, its Scan Sweep Rotation (or Sweep Angle $\theta'_{rot}$) and its inner radius $r_i$ are determined during the analytical modelling stage by the geometrical structure (e.g., its scanline length, focal plane, and relative position in the scan pattern) associated with the corresponding laser scanline P(i,j) produced by the holographic facet within a particular focal plane of the prespecified laser scanning pattern. Consequently, particular parameters determined during the analytical modelling stage of the design process operate as constraints upon the disc designer during the facet layout stage of the process. Thus, the holographic facets realized on the scanning disc of the present invention have particular geometrical characteristics that are directly determined by geometrical properties of the laser scanning pattern produced therefrom, as well as the optical properties associated with the laser beam and the holographic facets realized on the scanning disc. This fact, while presently subtle, will become readily apparent during the detailed description of the holographic scanning disc design process of the present invention.

Figure 4A:
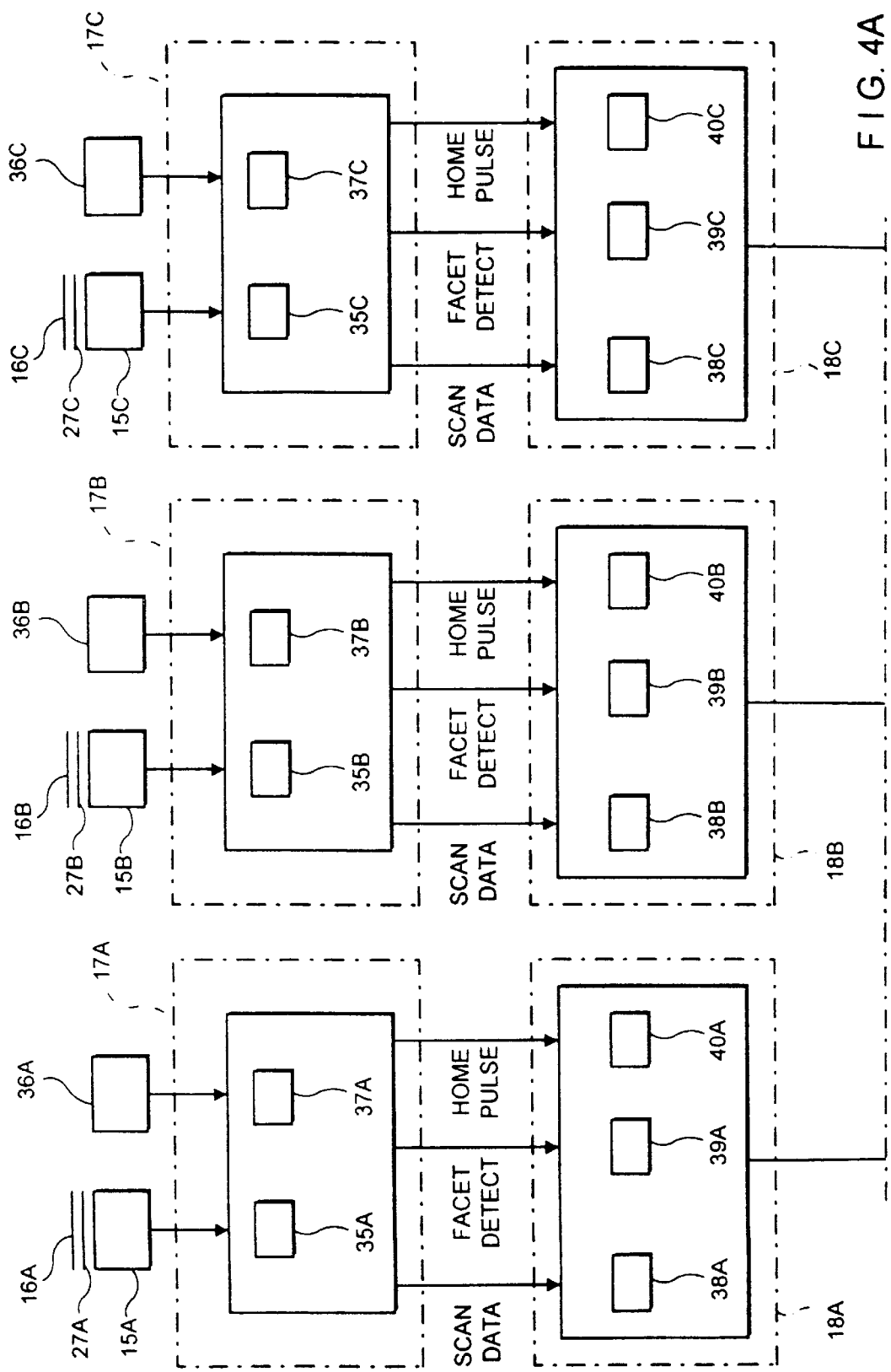
Figure 4C:
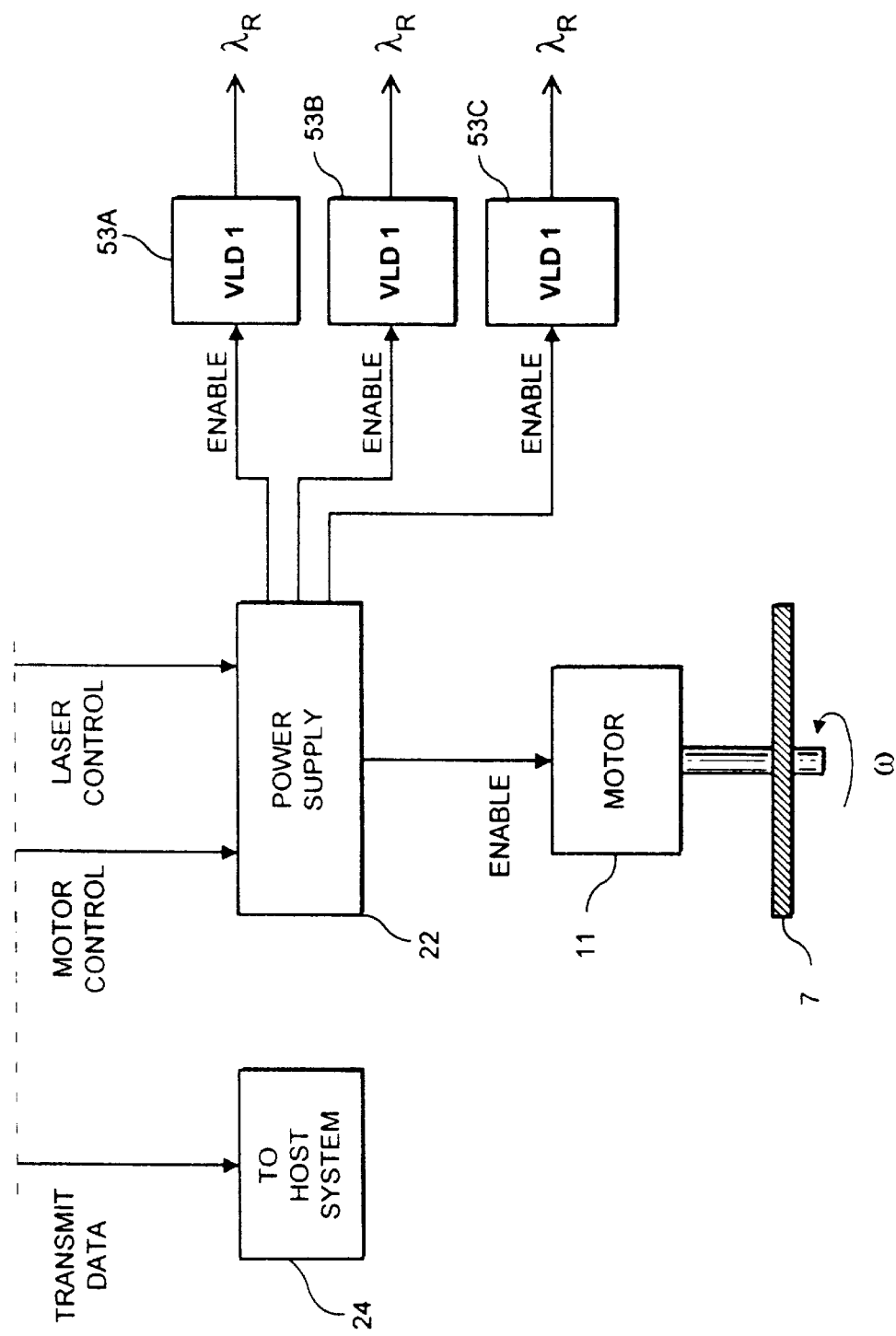

As shown in the system diagram of FIGS. 4A through 4C, the holographic laser scanning system of the present invention comprises a number of system components, many of which are realized on boards that have been hereinbefore described. For sake of simplicity, it will be best to describe these system components by describing the components realized on each of the above-described boards, and thereafter describe the interfaces and interaction therebetween.

In the illustrative embodiment, each analog scan data signal processing board 17A, 17B, 17C has the following components mounted thereon: an associated photodetector 15A (15B, 15C) (e.g., a silicon photocell) for detection of analog scan data signals (as described); an analog signal processing circuit 35A (35B, 35C) for processing detected analog scan data signals; a 0-th diffraction order signal detector 36A (36B, 36C) for detecting the low-level, 0-th diffraction order signal produced from each holographic facet on the rotating scanning disc during scanner operation; and associated signal processing circuitry 37A (37B, 37C) for detecting a prespecified pulse in the optical signal produced by the 0-th diffraction order signal detector and generating a synchronizing signal S(t) containing a periodic pulse pattern. As will be described below in greater detail, the function of the synchronizing signal S(t) is to indicate when a particular holographic facet (e.g., Facet No. i=1) produces its 0-th order optical signal, for purposes of linking detected scan data signals with the particular holographic facets that generated them during the scanning process.

In the illustrative embodiment, each photodetector 15A, 15B and 15C is realized as an opto-electronic device and each analog signal processing circuit 35A (35B, 35C) aboard the analog signal processing board is realized as an Application Specific Integrated Circuit (ASIC) chip. These chips are suitably mounted onto a small printed circuit (PC) board, along with electrical connectors which allow for interfacing with other boards within the scanner housing. With all of its components mounted thereon, each PC board is suitably fastened to the photodetector support frame 20, along its respective central reference frame, as shown in FIG. 2B.

In a conventional manner, the optical scan data signal $D_0$ focused onto the photodetector 15A (15B, 15C) during laser scanning operations is produced by light rays of a particular polarization state (e.g., S polarization state) associated with a diffracted laser beam being scanned across a light reflective surface (e.g., the bars and spaces of a bar code symbol) and scattering thereof, whereupon the polarization state distribution of the scattered light rays is typically altered when the scanned surface exhibits diffuse reflective characteristics. Thereafter, a portion of the scattered light rays are reflected along the same outgoing light ray paths toward the holographic facet which produced the scanned laser beam. These reflected light rays are collected by the scanning facet and ultimately focused onto the photodetector of the associated light detection subsystem by its parabolic light reflecting mirror disposed beneath the scanning disc. The function of each photodetector is to detect variations in the amplitude (i.e., intensity) of optical scan data signal $D_0$, and produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to light reflection characteristics of the scanned surface (e.g., the scanned bar code symbol). The function of the analog signal processing circuitry is to band-pass filter and preamplify the electrical analog scan data signal $D_1$, in order to improve the SNR of the output signal.

In the illustrative embodiment, each digital scan data signal processing board 18A (18B and 18C) is constructed the same. On each of these signal processing boards, the following devices are realized. An analog-to-digital (A/D) conversion circuit 38A (38B, 38C) is realized as a first application specific integrated circuit (ASIC) chip. A programmable digitizing circuit 39A (39B, 39C) is realized as a second ASIC chip. Also, a programmed decode computer 40A (40B, 40C) is realized as a microprocessor and associated program and data storage memory and system buses, for carrying out symbol decoding operations. In the illustrative embodiment, the ASIC chips, the microprocessor, its associated memory and systems buses are all mounted on a single printed circuit (PC) board, using suitable electrical connectors, in a manner well known in the art.

The function of the A/D conversion circuit is to perform a simple thresholding function in order to convert the electrical analog scan data signal $D_1$ into a corresponding digital scan data signal $D_2$ having first and second (i.e., binary) signal levels which correspond to the bars and spaces of the bar code symbol being scanned. In practice, the digital scan data signal $D_2$ appears as a pulse-width modulated type signal as the first and second signal levels thereof vary in proportion to the width of bars and spaces in the scanned bar code symbol.

The function of the programmable digitizing circuit is to convert the digital scan data signal D2, associated with each scanned bar code symbol, into a corresponding sequence of digital words (i.e., a sequence of digital count values) $D_3$. Notably, in the digital word sequence D3, each digital word represents the time length associated with each first or second signal level in the corresponding digital scan data signal $D_2$. Preferably, these digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic digitizing circuits suitable for use in the holographic laser scanner of the present invention.

In bar code symbol scanning applications, the function of the programmed decode computer is to receive each digital word sequence $D_3$ produced from the digitizing circuit, and subject it to one or more bar code symbol decoding algorithms in order to determine which bar code symbol is indicated (i.e., represented) by the digital word sequence $D_3$, originally derived from corresponding scan data signal $D_1$ detected by the photodetector associated with the decode computer. In more general scanning applications, the function of the programmed decode computer is to receive each digital word sequence $D_3$ produced from the digitizing circuit, and subject it to one or more pattern recognition algorithms (e.g., character recognition algorithms) in order to determine which pattern is indicated by the digital word sequence $D_3$. In bar code symbol reading applications, in which scanned code symbols can be any one of a number of symbologies, a bar code symbol decoding algorithm with auto-discrimination capabilities can be used in a manner known in the art.

As shown in FIGS. 4A through 4C, the central processing board 21 comprises a number of components mounted on a small PC board, namely: a programmed microprocessor 42 with a system bus and associated program and data storage memory, for controlling the system operation of the holographic laser scanner and performing other auxiliary functions; first, second, third and forth serial data channels 43, 44, 45 and 46, for receiving serial data input from the programmable decode computers 40A (40B and 40C) and RF receiver/base unit 47; an input/output (I/O) interface circuit 48 for interfacing with and transmitting symbol character data and other information to host computer system 24 (e.g., central computer, cash register, etc.); and a user-interface circuit 49 for providing drive signals to an audio-transducer 50 and LED-based visual indicators 51 used to signal successful symbol reading operations to users and the like. In the illustrative embodiment, each serial data channel is be realized as an RS232 port, although it is understood that other structures may be used to realize the function performed thereby. The programmed control computer 42 also produces motor control signals, and laser control signals during system operation. These control signals are received as input by a power supply circuit 52 realized on the power supply PC board 22, identified hereinabove. Other input signals to the power supply circuit 52 include a 120 Volt, 60 Hz line voltage signal from a standard power distribution circuit. On the basis of the received input signals, the power supply circuit produces as output, (1) laser source enable signals to drive VLDs 53A, 53B and 53C, respectively, and (2) motor enable signals in order to drive the scanning disc motor 11.

In the illustrative embodiment, RF base unit 47 is realized on a very small PC board 54 mounted on the base plate 5 within the scanner housing. Preferably, RF base unit 47 is constructed according to the teachings of copending U.S. application Ser. No. 08/292,237 filed Aug. 17, 1995, also incorporated herein by reference. The function of the base unit 47 is to receive data-packet modulated carrier signals transmitted from a remotely situated bar code symbol reader, data collection unit, or other device capable of transmitting data packet modulated carrier signals of the type described in said application Ser. No. 08/292,237, supra.

In some holographic scanning applications, where omnidirectional scanning cannot be ensured at all regions within a prespecified scanning volume, it may be useful to use scan data produced either (i) from the same laser scanning plane reproduced many times over a very short time duration while the code symbol is being scanned therethrough, or (ii) from several different scanning planes spatially contiguous within a prespecified portion of the scanning volume. In the first instance, if the bar code symbol is moved through a partial region of the scanning volume, a number of partial scan data signal fragments associated with the moved bar code symbol can be acquired by a particular scanning plane (e.g., P(i=1,j=3) being cyclically generated over an ultra-short period of time (e.g., 1–3 milliseconds), thereby providing sufficient scan data to read the bar code symbol. In the second instance, if the bar code symbol is within the scanning volume, a number of partial scan data signal fragments associated with the bar code symbol can be acquired by several different scanning planes being simultaneously generated by the three laser scanning stations of the system hereof, thereby providing sufficient scan data to read the bar code symbol, that is, provided such scan data can be identified and collectively gathered at a particular decode processor for symbol decoding operations.

In order to allow the holographic scanner of the present invention to use symbol decoding algorithms that operate upon partial scan data signal fragments, as described above, the 0-th order signal detector and its associated processing circuitry are used to produce a periodic signal X(t), as discussed briefly above. As the periodic signal X(t) is generated by the 0-th order of the incident laser beam passing through the outer radial portion of each holographic facet on the rotating scanning disc, this signal will include a pulse at the occurrence of each holographic facet interface. However, in order to uniquely identify a particular facet for reference purposes, a "gap" of prespecified width $d_{gap}$, as shown in FIG. 3, is formed between two prespecified facets (i.e., i=2 and 16) at the radial distance through which the incident laser beam passes. Thus, in addition to the periodic inter-facet pulses, the periodic signal X(t) also includes a "synchronizing pulse" produced by the prespecified "gap" which is detectable every $T=2\pi/\omega$ [seconds], where $\omega$ is the constant angular velocity of the holographic scanning disc maintained by the scanning disc motor and associated driver control circuitry. Thus, while the function of the 0-th order light detector is to detect the 0-th diffractive order of the incident laser beam, the function of its associated signal processing circuitry is to (1) detect the periodic occurrence of the "synchronizing pulse" in the periodic signal X(t) and (2) simultaneously generate a periodic synchronizing signal S(t) containing only the periodic synchronizing pulse stream. The construction of such pulse detection and signal generation circuitry is well known within the ordinary skill of those in the art.

As each synchronizing pulse in the synchronizing signal S(t) is synchronous with the "reference" holographic facet on the scanning disc, the decode processor (i.e., computer) (40A, 40B, 40C) provided with this periodic signal can readily "link up" or relate, on a real-time basis, (1) each analog scan data signal $D_1$ it receives with (2) the particular holographic facet on the scanning disc that generated the analog scan data signal. To perform such signal-to-facet relating operations, the decode computer is provided with information regarding the order in which the holographic facets are arranged on the scanning disc. Such facet order information can be represented as a sequence of facet numbers (e.g.i=1, 16, 2, 15, 9, 12, 6, 11, 7, 10, 5, 8, 3, 13, 4, 14, 1) stored within the associated memory of each decode processor. By producing both a scan data signal and a synchronizing signal S(t) as described above, the holographic scanner of the present invention can readily carry out a diverse repertoire of symbol decoding processes which use partial scan data signal fragments during the symbol reading process. The advantages of this feature of the system will become apparent hereinafter.

In code symbol reading applications where partial scan data signal fragments are used to decode scanned code symbols, the synchronizing signal S(t) described above can be used to identify a set of digital word sequences $D_3$, (i.e., $\{D_S\}$), associated with a set of time-sequentially generated laser scanning beams produced by a particular holographic facet on the scanning disc. In such applications, each set of digital word sequences can be used to decode a partially scanned code symbol and produce symbol character data representative of the scanned code symbol. In code symbol reading applications where complete scan data signals are used to decode scanned code symbols, the synchronizing signal S(t) described above need not be used, as the digital word sequence $D_3$ corresponding to the completely scanned bar code symbol is sufficient to carry out symbol decoding operations using conventional symbol decoding algorithms known in the art.

DESCRIPTION OF THE 3-D LASER SCANNING PATTERN OF THE ILLUSTRATIVE EMBODIMENT OF THE PRESENT INVENTION

Figure 5A:
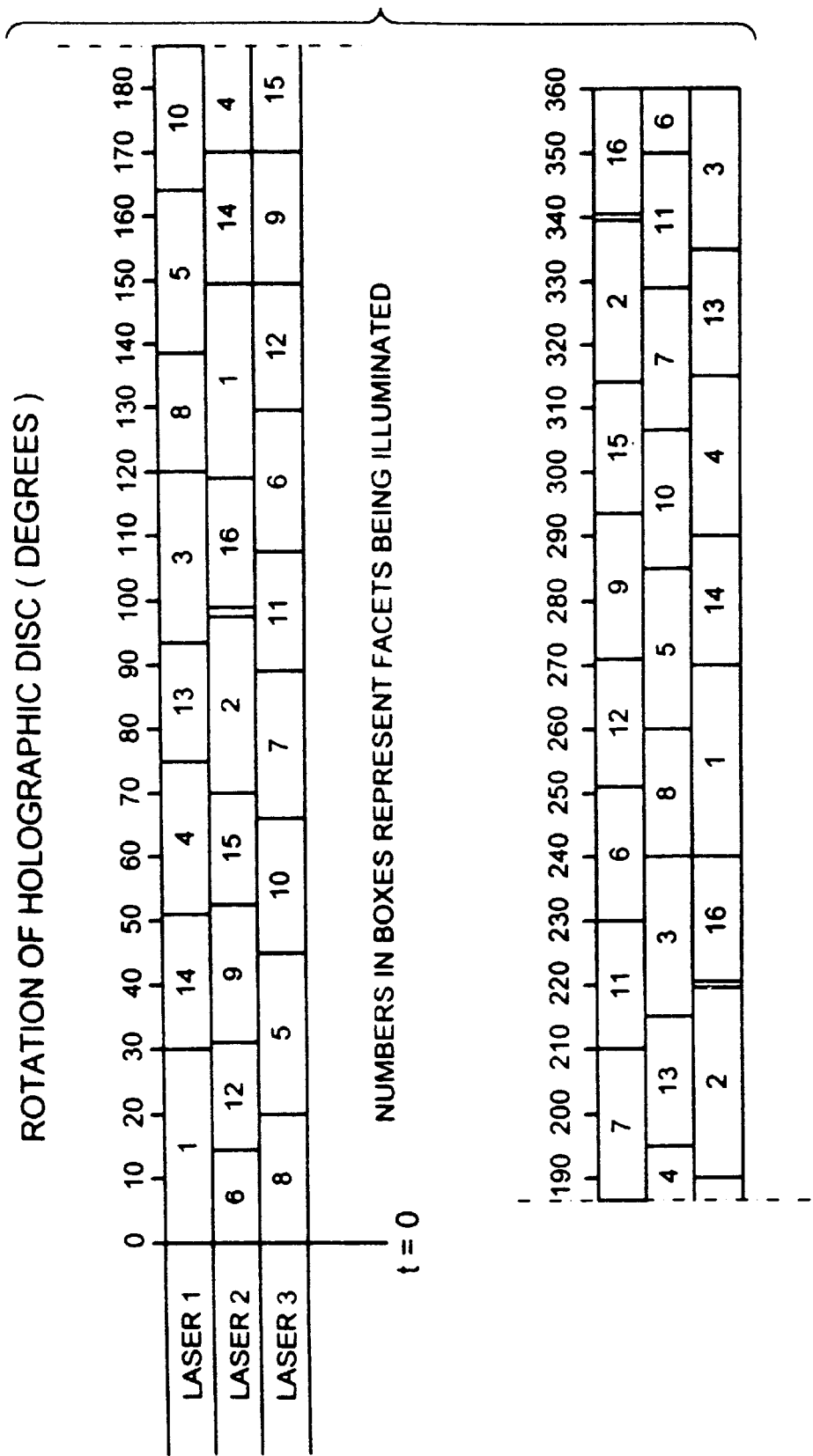
FIG. 5A is a schematic diagram showing the time order in which each P(i,j)-th laser scanning plane is cyclically generated as the j-th laser beam passes through the i-th holographic facet on the rotating holographic scanning disc within the scanner housing during laser scanning operations.

Referring to FIG. 5, the laser scanning pattern generated by the holographic scanner hereof is illustrated in greater detail. For illustrative purposes, the laser scanlines that are projected onto each of the four focal planes of the scanning volume, are shown as black lines labelled with their respective scanline (i.e., scanning plane) designation, P(i,j). Each such scanline has a scanline length which is defined, for the most part, by the geometry of the scanning volume $V_{scanning}$, the boundaries of which are indicated by dotted lines, as shown. While the laser scanning pattern of the illustrative embodiment has forty-eight scanning planes in total, only three scanning planes (i.e., scanlines) are simultaneously generated at any instant in time. However, within a single revolution of the holographic scanning disc, all forty-eight scanning planes are generated. The order in which each scanning plane is produced during a single revolution of the scanning disc is described by the schematic representation shown in FIG. 5A. As indicated in this figure, the laser source and holographic facet used to generate each scanning plane are indicated by its holographic facet number i and laser source number j.

It is appropriate at this juncture to now describe the cross-sectional characteristics of the laser scanning pattern of the present invention, and the advantages provided thereby in omni-directional scanning applications.

While the laser beam production module of the present invention provides a novel way to produce a circularized laser beam free of astigmatism due to intrinsic properties of visible laser diodes (VLD), the laser scanning planes P(i,j) generated by the rotating holographic scanning disc diffracting an astigmatism-free laser beam are not completely free of astigmatism. By virtue of the fact that an incident collimated laser beam is scanned through a light diffractive element at an angle of incidence $A_i$ other than zero degrees, results in astigmatism within the scanning volume. This form of astigmatism, referred to as "beam-scan astigmatism", manifests itself at the end of each scanline and at the extreme portions of the depth of field for each set of scanlines.

While not necessarily apparent, there are several reasons why a zero degree angle of incidence (i.e., $A_i=0$) cannot be used to eliminate astigmatism in the holographic scanner of the present invention. The first reason is that this approach would greatly reduce the scan angle multiplication factor M for each scanning facet, thus making it impossible to achieve the scan pattern of the illustrative embodiment. Secondly, this approach would reduce the Total Light Collection Efficiency of the facets, as the angles of diffraction $B_i$ would have to be lower to realize the spatially corresponding scanline. Thirdly, this approach would necessarily result in a holographic scanning disc which would be extremely difficult to manufacture.

As shown in FIG. 6A, adjacent scanning planes overlap between focal regions within the scanning volume. Each scanning plane is produced as each holographic facet is rotated through a circularized laser beam directed incident thereto at about $A_i=47°$ for all values of i. While each scanning plane is often visualized as a continuous sheet of light, in actuality it is made up of a single laser beam whose movement is progressively advanced while its cross-sectional dimensions are changed as the laser beam is diffracted through its scanline path in space.

Figure 6C:
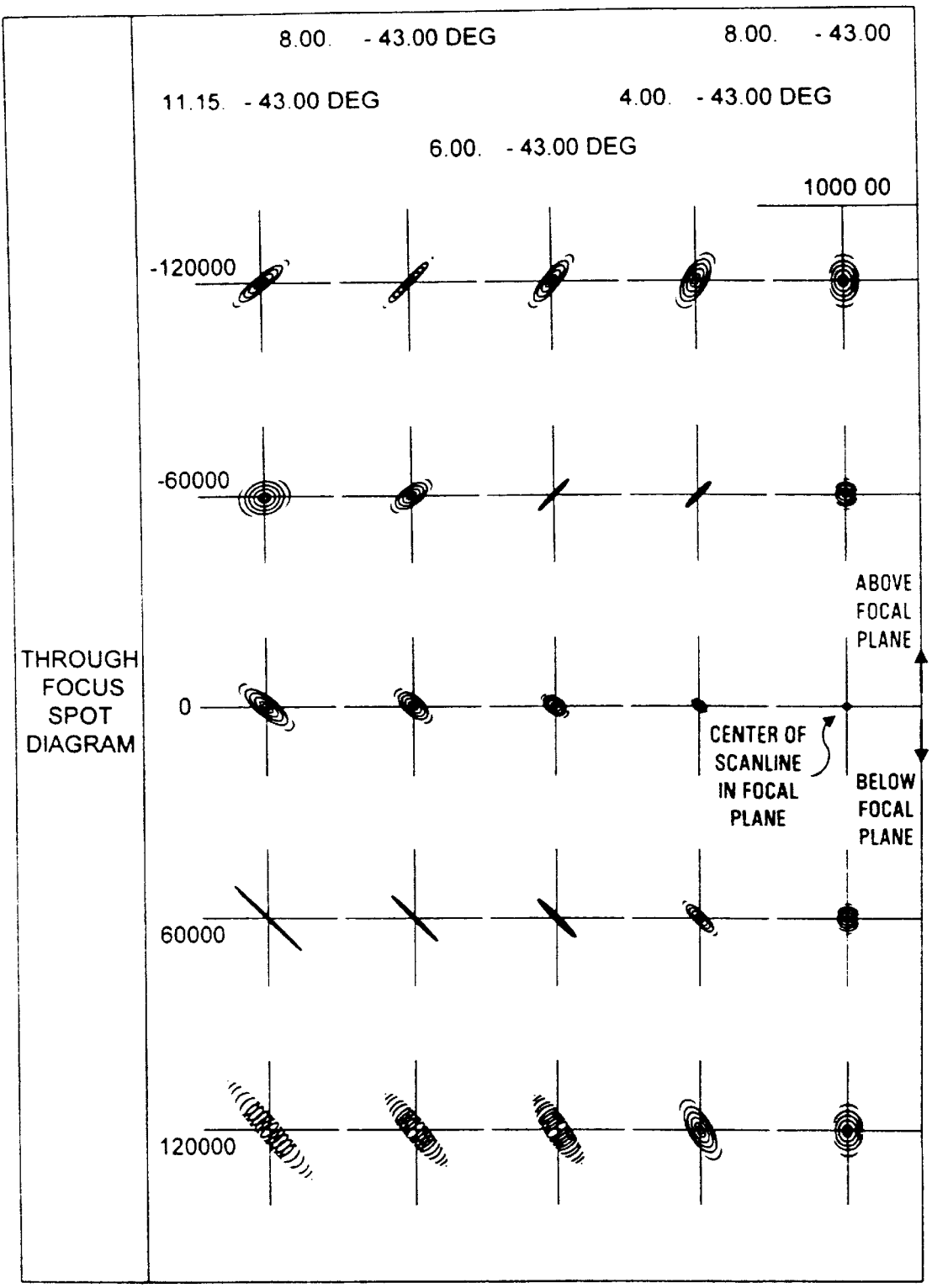

Using the ZEMAX optical program from Focus Software, Inc. of Tucson, Ariz., the spot-diagrams of FIGS. 6B and 6C can be generated in order to analyze the astigmatic characteristics of the scanned laser beams comprising the scanning pattern of the present invention. As shown in FIGS. 6B and 6C, the spot size (i.e.cross-sectional) dimensions and orientation of a particular scanned laser beam are represented at its focal plane for five different distances along one half of the scanning plane, as well as for two planes above its focal plane and for two planes below its focal plane. In reality, the spacing of these scanning planes from the focal plane are −120 mm, −60 mm, 60 mm, 120 mm, respectively. The five different spot-size distances represented along the scanning plane correspond to five different angular rotations of the scanning disc about its axis of rotation. Notably, spot-size diagrams shown in FIG. 6B are for a scanned laser beam having its focal plane located farther out from the scanning window, whereas the spot-size diagrams shown in FIG. 6C are for a scanned laser beam having its focal plane adjacent to the focal plane of FIG. 6B, and closer to the scanning window. The far right side of the spot-size diagram shown in FIGS. 6B and 6C represent the middle of the neighboring scanning planes. The middle set of spot-size diagrams represent the cross-sectional diameter and orientation of the laser beam at its focal plane within the scanning volume. The upper set of spot-size diagrams represent the cross-sectional diameter and orientation of the laser beam above its focal plane within the scanning volume. The lower set of spot-size diagrams represent the cross-sectional diameter and orientation of the laser beam below its focal plane within the scanning volume.

In each of the spot-size diagrams shown in FIGS. 6B and 6C, the beam orientations are governed by the astigmatism introduced as the incident laser beam is diffracted by its corresponding holographic facet moving about the disk axis of rotation. At each focal plane in the scanning volume, a particular laser beam is focused thereat with astigmatic characteristics that are opposite those of the neighboring laser beam which spatially overlaps the particular laser beam. As illustrated in FIGS. 6A and 6B, the direction of beam orientation, measured from the middle of the scan line, at the focal plane, rotates in a direction opposite the direction that the neighboring overlapping laser beam rotates. Consequently, in the region of overlapping laser beams between each adjacent pair of focal planes within the scanning volume, the complementary beam cross-sectional characteristics cooperate to provide an omni-directional scanning field over the extent of the spatially overlapping scanning planes. Thus, when a bar code to be scanned is oriented in a manner which makes it difficult to read the symbol due to the tilt of the astigmatic spot in the near portion of the two adjacent focal regions, the tilt of the astigmatic spot in the adjacent far field region is in the opposite direction, making it easier to read the same code symbol. Collectively, the overlapping scanning planes between adjacent focal regions within the scanning volume provides robust omni-directional code symbol scanning performance.

DESIGNING A HOLOGRAPHIC LASER SCANNING SYSTEM ACCORDING TO THE METHOD OF THE PRESENT INVENTION

Figure 7:
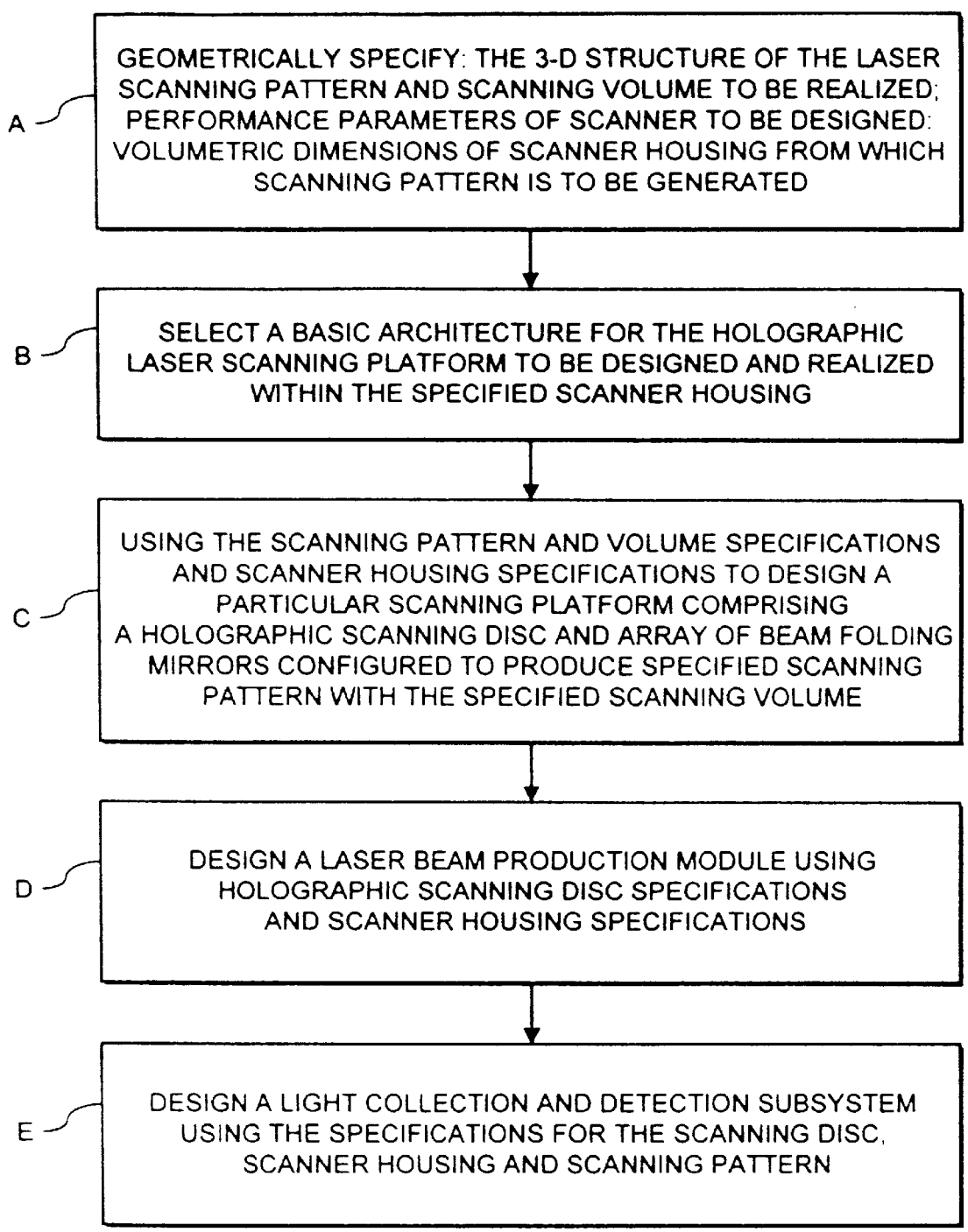
FIG. 7 is a flow chart illustrating the major steps involved in the method of designing the holographic disc and laser beam production module(s) of the holographic scanning system of the present invention.

In FIG. 7, the four primary steps involved in designing a holographic laser scanner according to the present invention are shown.

As indicated at Block A in FIG. 7, the first step of the design method involves geometrically specifying the following entities: (i) the structure of the three-dimensional scanning pattern and scanning volume to be realized; (ii) the performance parameters of the scanner to be designed; and (iii) the volumetric dimensions of the scanner housing from which the scanning pattern is to be generated. Typically, each of these entities will be specified by end user requirements which include factors such as: the scanning application and environment at hand; bar code symbol resolution; reflection characteristics of bar code symbol substrate; speed of objects being identified; and the throughput of the scanning environment.

Thus, as part of this specification step, the number and location of each scanning plane (i.e., focal plane), and its focal distance $f_i$ within the specified scanning volume must be specified in geometrical terms, that is, using coordinate geometry etc. In general, this step involves providing a geometrical specification of the 3-D laser scanning pattern, as shown in FIGS. 5, 6A, 6B and 6C, for example. In short, this procedure necessitates specifying a coordinate system (e.g., Cartesian coordinate system), and then specifying the location of each scan line (i.e., scanning plane) within the scanning volume and its focal distance $f_i$ from the i-th holographic scanning facet. Naturally, the resolution of the bar code symbols to be read will determine the largest cross sectional dimension that each scan line can be in order to resolve the bar code symbol. Thus, it will be necessary to provide a proper specification of the maximum cross-sectional diameter of the scanned laser beams within the operative scanning range of the specified scanning volume.

As shown in FIG. 3, the scanning pattern of the illustrative embodiment has four specified focal planes, indexed as k=1,2,3,4. Each of the scan lines within each of the focal planes is specified in terms of its geometrical coordinates. For example, four focal planes are used in the illustrative embodiment to satisfy a 40 inch depth of field requirement for the exemplary application at hand. While this may appear conservative at first, it has been found that this four focal plane design offers an important advantage over other system designs in that it provides a vertical "sweet spot" in the central portion of the 3-D scanning volume. In the illustrative embodiment, each of these four focal planes are parallel to the scanning window of the scanner, and each of the four scan patterns in the four focal planes are centered over the rotational axis of the rotating holographic disk. Also, the lines at each focal plane are spaced equally apart from each other. The basic four line scan pattern selected in the illustrative embodiment provides good coverage of the scan region at each focal plane. From the customer requirements, the minimum and maximum focal distances and lengths of each scanline $S_L$ in the scanning volume $V_{scanning}$ can be established (i.e., determined) in order to completely cover each of the scanning regions in the scanning volume.

As indicated at Block B of FIG. 7, the next step of the design method involves selecting a basic architecture for the laser scanning platform upon which the designed scanning pattern will be produced. In the illustrative embodiment shown in FIGS. 1 through 4C, the laser scanning apparatus selected as a suitable laser scanning platform for the envisioned 3-D scanning pattern, comprises three symmetrical laser scanning stations constructed about the holographic scanning disc of the present invention, each of the laser scanning stations has a laser beam production module and light collecting and detecting subsystem. The three laser scanning station architecture adopted in the illustrative embodiment, provides the best method for generating the bar-X scan pattern of the exemplary scan pattern. The symmetry of the scanning pattern dictates that all three laser scanning channels should be the same, allowing that the design for any one channel be the same as that for the other three channels. For the sake of convenience, the scan pattern created at each of the focal planes should be centered over the rotational axis of the holographic scanning disk, although it is understood that this is not a necessary condition. As will be shown hereinafter, the design method of the present invention allows one to easily change system parameters so that the axially centered scanning pattern can be changed to a non-centered location, or the scan pattern can be configured in a non-symmetrical manner, away from the axis of rotation of the holographic scanning disk.

Having specified the 3-D scanning pattern and platform architecture for a given application, the next step in the scanner design method indicated in FIG. 7 hereof involves using the scanning pattern and volume specifications and scanner housing specifications to design a particular scanning platform comprising a holographic scanning disc of the present invention and an array of beam folding mirrors configured in such a manner so the resultant system produces the specified scanning pattern. Preferred disk design methods will be described in great detail below with reference to FIGS. 8A through 12C. Also, a preferred method of constructing the designed scanning disk will be described thereafter with reference to FIG. 13.

As indicated at Block D in FIG. 7, the next step of the method involves designing a laser beam production module using the holographic scanning disk specifications acquired at Block B. Notably, the scanning disk specifications required during this step of the design method include the angle of incidence $A_i$ for each facet, the angle of diffraction $B_i$ thereof, and the central wavelength $\lambda_i$ of the laser beam produced from the VLD. As will be described in great detail hereinafter, the function of the laser production module is to produce an incident laser beam that has a circularized (or aspect-ratio controlled) beam cross-section, is free from the effects of astigmatism along its operative scanning range, and, which, in conjunction with the laser scanning disk, minimizes dispersion of spectral components thereof as the laser beam is diffractively transmitted through the facets along the rotating scanning disk. In the illustrative embodiments, two different techniques are employed in order to realize the above described functions utilizing ultra-compact structures. In the first illustrative embodiment of the present invention shown in FIGS. 14 through 21D, a VLD, an aspherical lens, a beam expanding prism, a light diffractive grating of fixed spatial frequency are used to construct the laser beam production module of the present invention. In the second illustrative embodiment of the present invention shown in FIGS. 22 through 31D, an aspherical lens, and a multi-function light diffractive grating of fixed spatial frequency are used to construct the laser beam production module hereof. In both embodiments, novel design techniques are employed which, for the first time, allow the use of conventional VLDs in a holographic code symbol reading system without sacrificing high performance characteristics.

As indicated in Block E in FIG. 7, the last step of the design method involves specifying and designing a light collecting and detecting subsystem (hereinafter "light detection subsystem") for use with the designed holographic laser scanner. As will be described in greater detail hereinafter with reference to FIGS. 32 through 43B, several different types of subsystems may be used to realize this system component in accordance with the principles of the present invention.

In the first preferred embodiment of the light collecting and detecting subsystem, a parabolic mirror is disposed beneath the light collecting area of the scanning disk and is designed to focus incoming collected light rays towards a photodetector disposed at the focal length of the parabolic mirror above the scanning disk. The focal characteristics of the parabolic mirror and its position relative to the scanning disc are chosen so that each focused light ray is transmitted through the scanning disk at an angle of incidence which minimizes the light diffraction efficiency thereof. In the second illustrative embodiment of the light collecting and detecting subsystem, a reflective-volume type holographic diffraction grating of variable spatial frequency is disposed beneath the light collecting area of the scanning disk and is designed to focus incoming collected light rays towards a photodetector disposed at the focal length of the reflection-volume type holographic grating above the scanning disk. The focal characteristics of the parabolic reflection-volume hologram and its position relative to the scanning disc are chosen such that each focused light ray is transmitted through the scanning disk at an angle of incidence which minimizes the light diffraction efficiency thereof. The third illustrative embodiment of the light collecting and detecting subsystem includes a planar mirror, light focusing optics and a photodetector disposed beneath the light collecting area of the scanning disk. Each of these embodiments will be described in detail hereinafter with reference to FIGS. 32 through 43B.

Figure 11A:
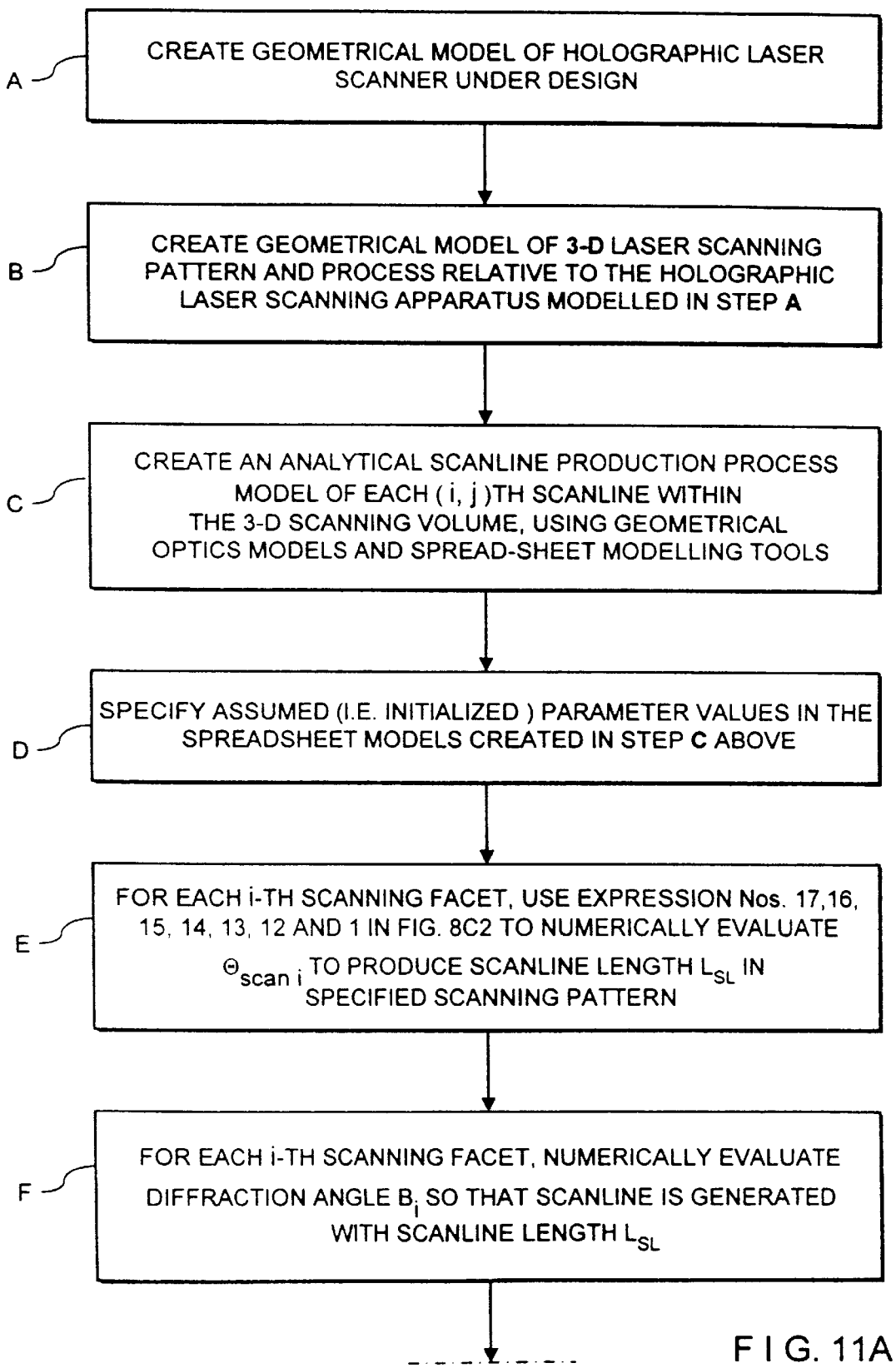
FIGS. 11A through 11C provide a flow chart describing, in detail, the steps of the method used to design the holographic scanning disc hereof according to the first illustrative embodiment of the present invention.
Figure 11B:
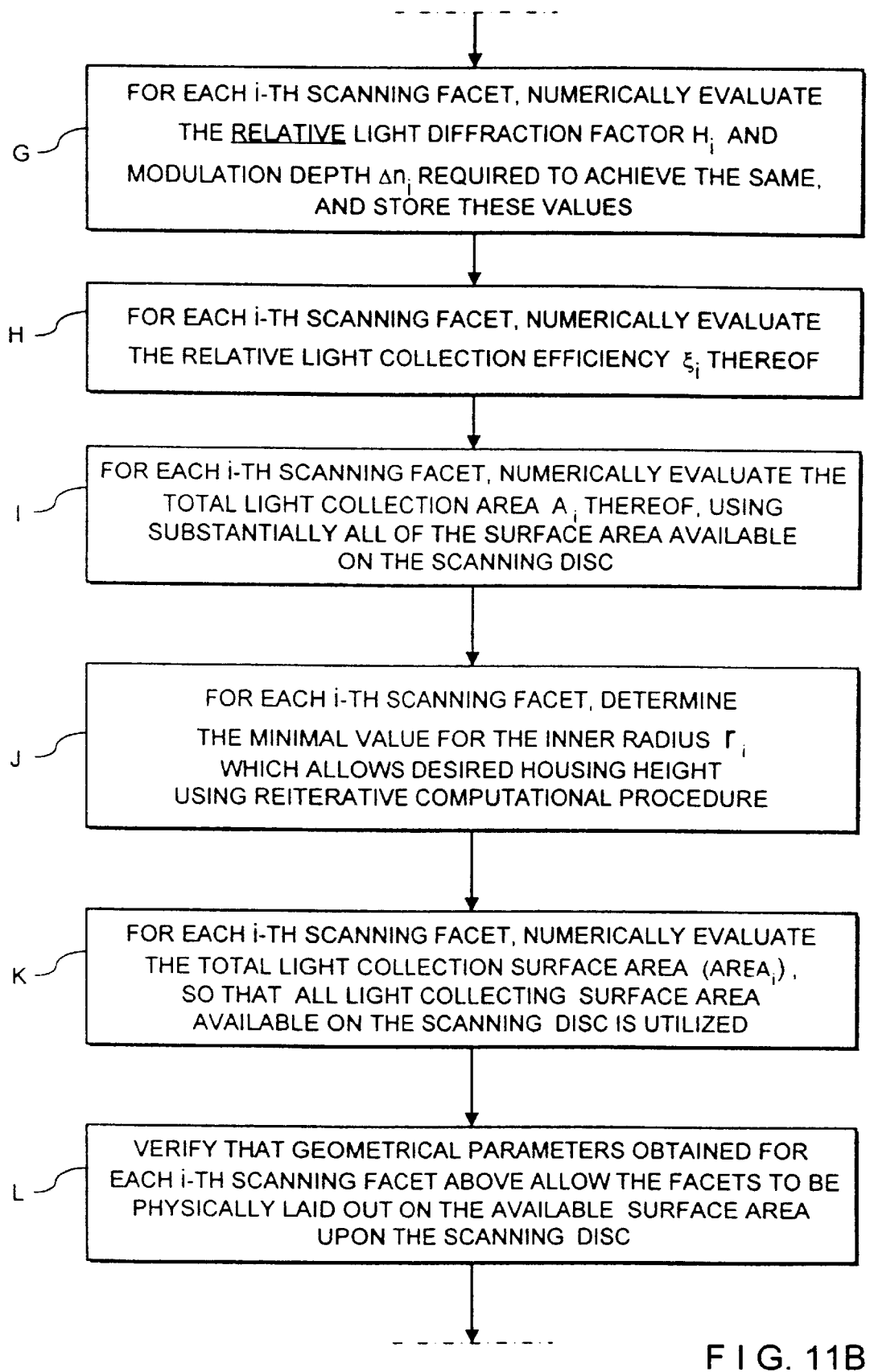
Figure 11C:
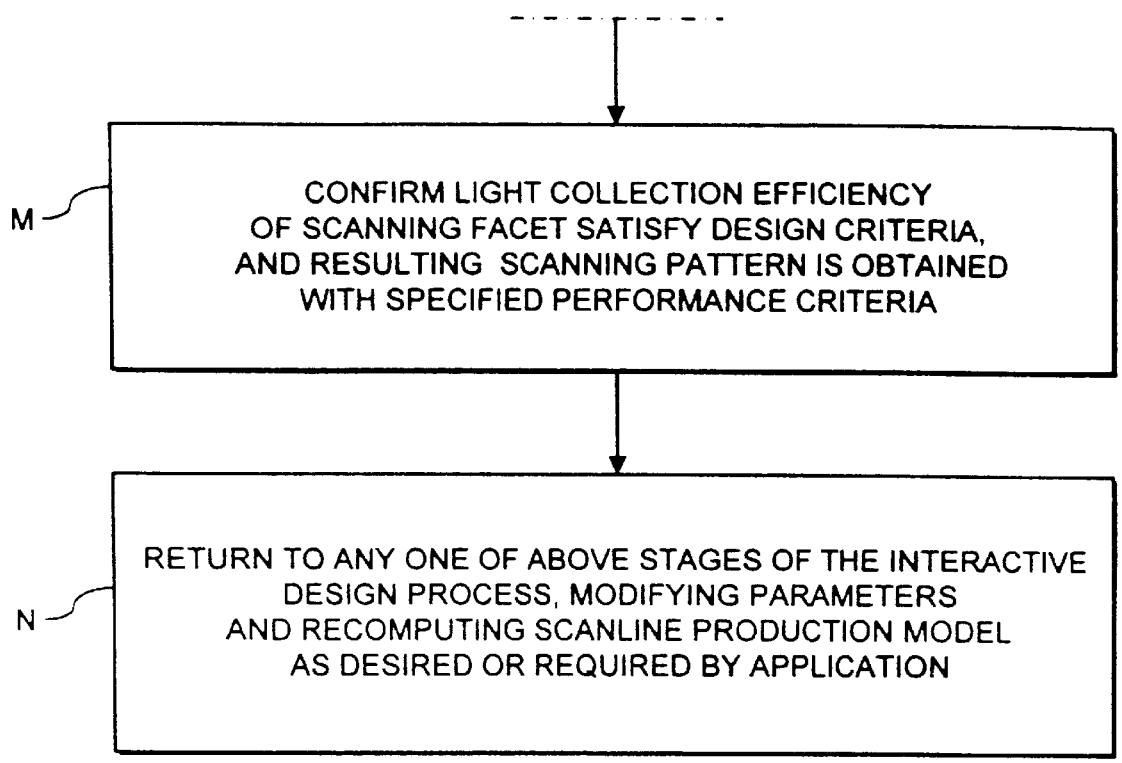

Referring to FIGS. 11A through 11C, the major steps involved in practicing the "holographic scanner" design method hereof will now be described in great detail. Notably, this term is used herein to describe the overall process used to design all of the subsystems of the holographic laser scanner including, but not limited to, the holographic scanning disc, the beam folding mirror array, the light collecting and detecting subsystem, the laser beam production modules, as well as the scanner housing within which such subsystems are contained. Thus, the holographic scanner design method hereof comprises a collection of subsystem design methods and processes which interact with each other to provide a composite method. In general, there are numerous embodiments of the holographic scanner design method of the present invention. Factors which influence the design of the scanning disc and light detection subsystem include, for example, the polarization state of the incident laser beam used during scanning operations, as well as the polarization state of the laser light rays collected, focused and detected by the light collecting and detecting subsystem used during light collecting and detecting operations.

In the illustrative embodiments of the present invention, the scanner design methods hereof are carried out on a computer-aided design (CAD) workstation which can be realized using a computer system, such as the Macintosh 8500/120 computer system. In the illustrative embodiment, the CAD-workstation supports a 3-D geometrical database for storing and retrieving information representative of 3-D models of the holographic scanning apparatus and processes under design; as well as a relational database for storing and retrieving information representative of geometrical and analytical models holographic laser scanning apparatus and processes under design. In addition, the CAD workstation includes a diverse array of computer programs which, when executed, provide a number of important design and analysis tools. Such design and analysis tools include, but are not limited to: 3-D geometrical modelling tools (e.g., AUTOCAD geometrical modelling software, by AutoDesk, Inc. for creating and modifying 3-D geometrical models of virtually every aspect of the holographic laser scanning apparatus and processes under design; robust mathematical modelling tools (e.g., MATHCAD 3.1 for Macintosh by MathSoft, Inc. of Cambridge, Mass.) for creating, modifying and analyzing mathematical models of the holographic scanning apparatus and processes under design; and spreadsheet modelling tools (e.g., EXCEL by Microsoft Corporation, or LOTUS by Lotus Development Corporation) for creating, modifying and analyzing spreadsheet-type analytical models of the holographic scanning apparatus and processes under design. For purposes of simplicity of expression, the above-described CAD workstation and all of its tools shall be collectively referred to as the "Holographic Scanner Design (HSD) workstation" of the present invention. Where necessary or otherwise appropriate, the functionalities and tools of the HSD workstation will be elaborated in greater detail hereinafter.

As indicated in Block A of FIG. 11A, the first step of the scanner design method involves the scanner designer creating within the geometrical database of the HSD workstation hereof, a geometrical model of the holographic laser scanner described above. Preferably, a 3-D geometrical model of the holographic laser scanner, including the scanning disc, is created, although a 2-D geometrical model will suffice in many applications where the symmetry of the scanning apparatus allows such simplification. A schematic diagram of the geometrical model of the holographic scanning disc under design is set forth in FIG. 9. Using this geometrical model of the scanning disc, the scanner designer then proceeds to index each i-th holographic facet on the scanning disc, as well as each j-th laser beam production module within the holographic scanning system. In the illustrative embodiment, this two-fold indexing step is carried out by assigning a unique number to each facet on the holographic scanning disc under design, and a unique number to each laser beam production module employed in the holographic laser scanning system of the present invention. The assigned facet and laser beam production module indices can then be used to identify which facets and laser beams are being referred to during the design and construction processes.

As indicated at Block B of FIG. 11A, the scanner designer then begins to create within the geometrical database of the HSD workstation, a geometrical model of the 3-D laser scanning pattern production process realized upon the multi-station laser scanning platform of the present invention. Owing to the symmetry of the laser scanning platform hereof, modelling of the complex laser scanning process of the present invention can be readily simplified by separately modelling the generation of each (i,j)th scanline within the 3-D laser scanning volume. Inasmuch as each (i,j)-th scanline is generated in substantially the same manner, except for the fact that a different (i-th) facet and a particular (j-th) laser beam are used to generate each scanline in the scanning volume, the substantially same geometrical optics model shown in FIG. 8A can be used to represent the production of each (i,j)th scanline.

Figure 8A:
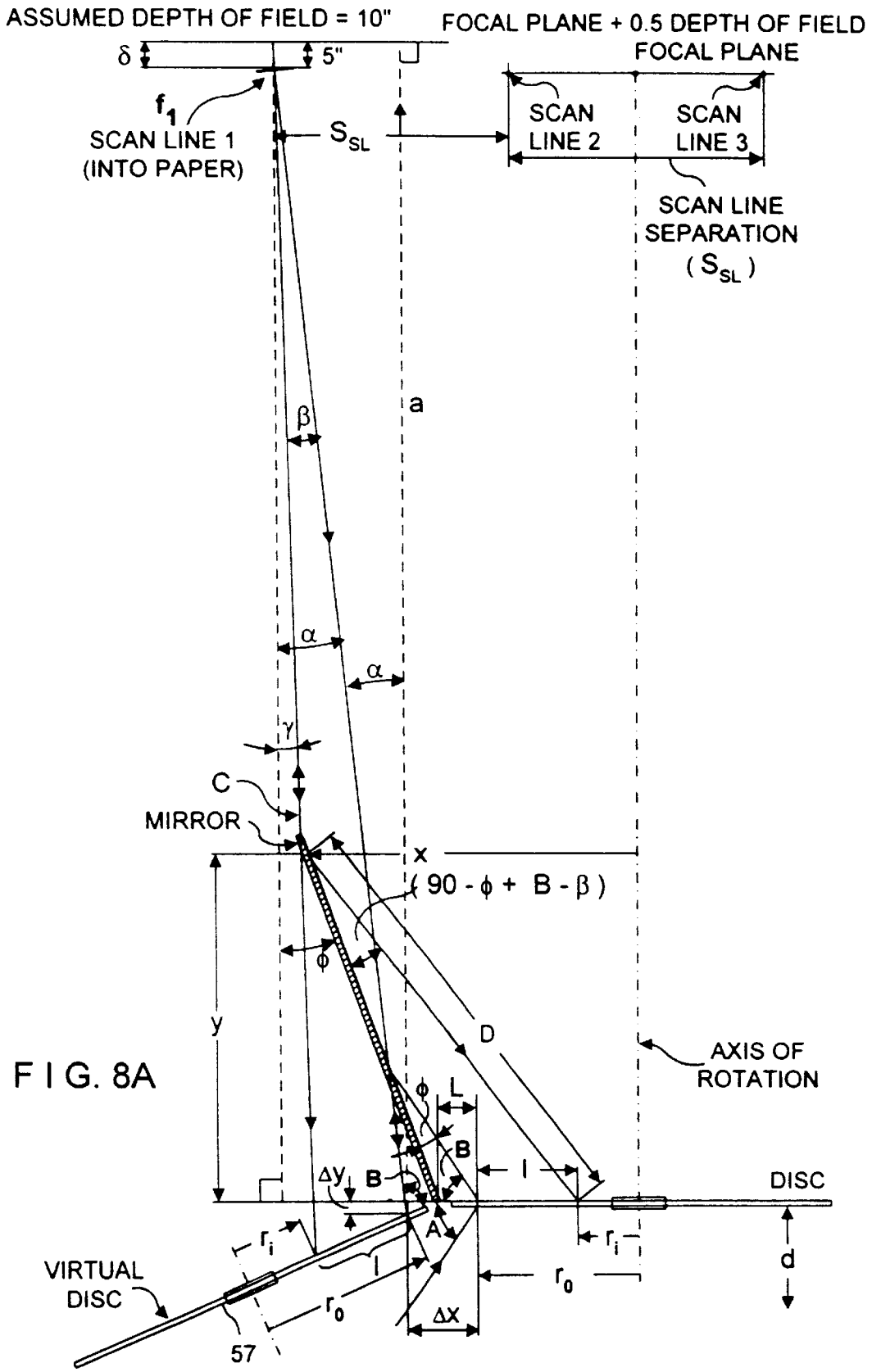
FIG. 8A is a geometrical optics model of the process of producing the P(i,j)-th laser scanning plane (i.e., P(i,j)-th laser scanline) located within the three-dimensional scanning volume of the holographic scanning system hereof, by directing the j-th laser beam through i-th holographic facet supported on the rotating holographic scanning disc thereof.
Figure 9:
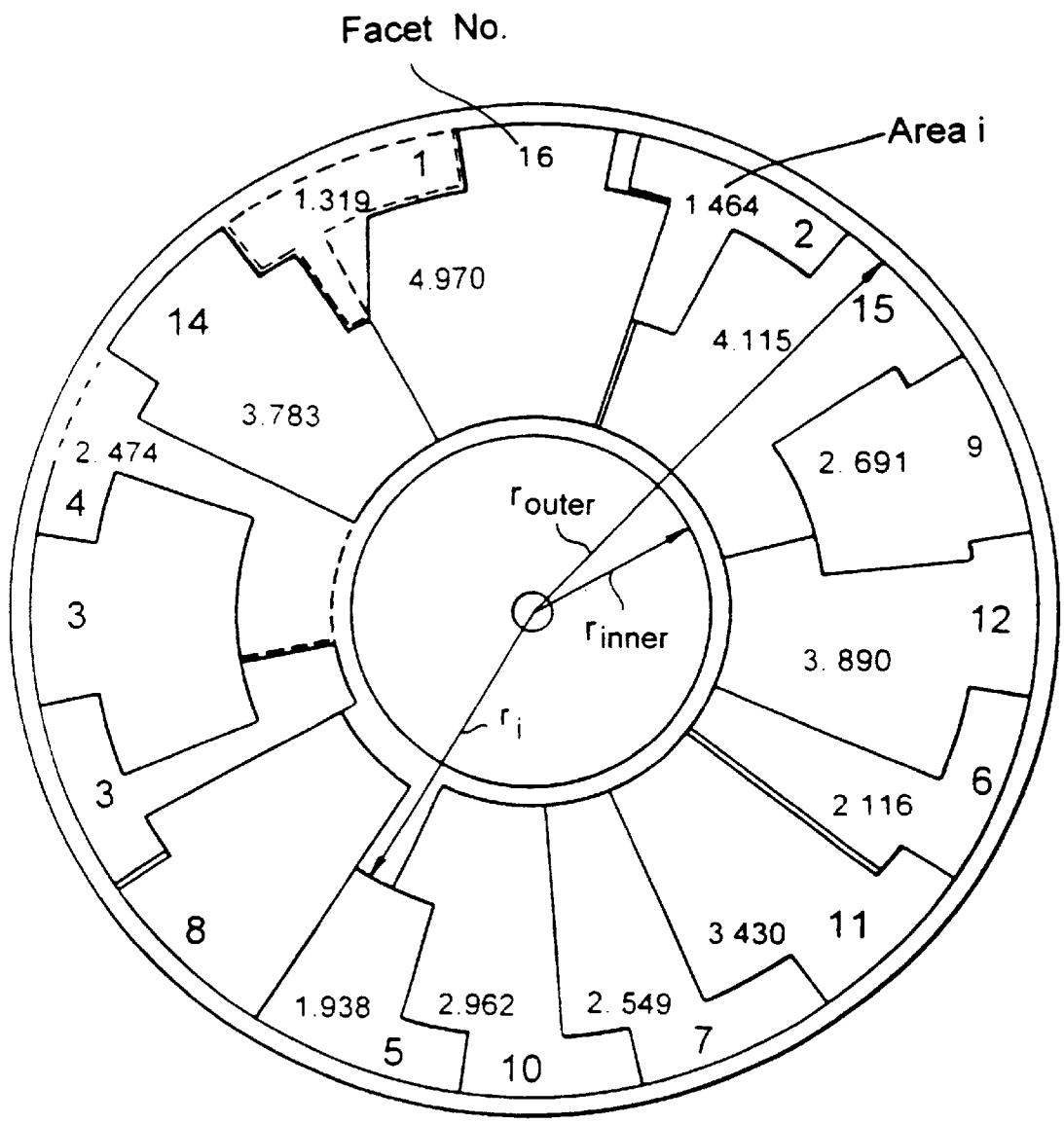
FIG. 9 is a schematic diagram of the holographic scanning disc of the illustrative embodiment designed according to the method of the present invention, and indicating the various geometrical parameters used to specify the geometrical characteristics of each i-th holographic facet thereof.

In general, the geometrical optics model used to represent each (i,j)th scanline generation process employs a geometrical specification of the following structures: (1) the (i,j)-th scanline in physical relation to the stationary laser beam production module, the corresponding facet on the rotating holographic disc, the stationary beam folding mirror, and the base and scanning window of the scanner housing; and (2) the ray diagram tracing the path of the incident j-th laser beam from the laser beam production module, through the i-th facet, off the j-th beam folding mirror, and focusing onto the focal plane along which the (i,j)-th scanline extends. In order to eliminate the need for considering the reflection of the rays at the surface of the folding mirrors, and thus simplify the disk design process, a virtual holographic scanning disk 56 is defined relative to the real holographic scanning disk, as shown in FIGS. 8A and 8A1. This modelling technique allows the subsequent calculations to be made using the locations of the Beam Incident Point $r_0$ and the Inner Radii of the facets $r_i$ in the virtual disk.

As part of the geometrical modelling process called for in Block B of FIG. 11A, numerous geometrical parameters and analytical equations defining relations therebetween need to be carefully defined by the scanner designer for use during the subsequent stages of the design process. In FIGS. 8B1 and 8B2, the parameters used to construct the geometrical model are defined. In FIGS. 8C1 and 8C2, the set of mathematical expressions used to establish important relations among certain of the parameters in the model are listed in a specified numerical order for future reference herein. The set of mathematical expressions set forth in FIGS. 8C1 and 8C2 provide an analytical model for the scanline production process of the present invention.

As indicated in FIGS. 8B1 and 8B3, the parameters used to construct the geometrical model of the (i,j)th scanline production process include:

(1) the radius to the Beam-Incident-Point on the holographic scanning disc, assigned the symbolic notated "r";

(2) Scanline Separation between adjacent scanlines at the focal plane of the (i,j)-th scanline, assigned the symbolic notated "$S_{SL}$";

(3) the Scanline Length (measured into the paper) for the (i,j)th scanline, assigned the symbolic notation "$L_{SL}$";

(4) the Distance measured from the scanning disc to the focal plane of the (i,j)th scanline, assigned the symbolic notation "$a_i$";

(5) the Distance from radius to the Beam-Incident Point $r_0$ to beam folding mirror, assigned the symbolic notated "L";

(6) the Tilt Angle of the j-th beam folding mirror associated with the generation of the (i,j)-th scanline, assigned the symbolic notation "$\phi_j$";

(7) the Tilt Angle of the virtual scanning disc, assigned the symbolic notation "$2\phi$";

(8) the Lateral Shift of the Beam Incident Point on the virtual scanning disc, assigned the symbolic notation "$\Delta x$";

(9) the Vertical Shift of the Beam Incident Point on the virtual scanning disc, assigned the symbolic notation "$\Delta y$";

(10) the Distance from the rotation axis to the Beam Incident Point on the virtual scanning disc, assigned the symbolic notation $r_o + \Delta x$;

(11) the Distance from the Beam-Incident-Point on the virtual scanning disc to the focal plane within which the (i,j)th scanline resides, assigned the symbolic notation $f_i$;

(12) the Diameter of the cross-section of the laser beam at the scanning disc, produced from the j-th laser beam scanning station, assigned the symbolic notation "$d_{beam}$";

(13) the Angular Gap between adjacent holographic scanning facets, assigned the symbolic notation "$d_{gap}$";

(14) the Outer Radius of the available light collection region on the holographic scanning disc, assigned the symbolic notation "$r_{outer}$";

(15) the Inner Radius of the available light collection region on the holographic scanning facet, assigned the symbolic notation "$r_{inner}$";

(16) one-half of the Depth of Field of the (i,j)th scanline, assigned the symbolic notation "$\delta$";

(17) the Distance from the maximum read distance ($f_i + \delta = 5''$) to the Inner Radius $r_i$ of the scanning facet, assigned the symbolic notation "C";

(18) the Outer Ray Angle measured relative to the normal to the i-th holographic facet, assigned the symbolic notation "$\alpha$";

(19) the Inner Ray Angle measured relative to the normal to the i-th holographic scanning facet, assigned the symbolic notation "$\gamma$";

(20) the Light Collection Angle, measured from the focal point $+\delta$ of the i-th facet to the light collection area of the scanning facet, assigned the symbolic notation "$\beta$";

(21) the intersection of the beam folding mirror and line C, assigned the symbolic notation "x" (x measured from rotational axis of disk);

(21) the intersection of the beam folding mirror and line C, assigned the symbolic notation "y" (y measured from plane of disk);

(22) the Distance measured from the Inner Radius to the point of mirror intersection, assigned the symbolic notation "D";

(23) the Distance measured from the base of the scanner housing to the top of the j-th beam folding mirror, assigned the symbolic notation "h";

(24) the Distance measured from the scanning disk to the base of the holographic scanner, assigned the symbolic notation "d";

(25) the Focal Length of the i-th holographic scanning facet from the scanning facet to the corresponding focal plane within the scanning volume, assigned the symbolic notation $f_i$;

(26) Incident Beam Angle measured with respect to the i-th holographic facet surface, assigned the symbolic notation "$A_i$";

(27) Diffracted Beam Angle measured with respect to the i-th holographic facet surface, assigned the symbolic notation "$B_i$";

(28) the Angle of the j-th laser beam measured from the vertical, assigned the symbolic notation "$-\alpha$";

(29) the Scan Angle of the diffracted laser beam produced by i-th facet, assigned the symbolic notation "$\theta_{si}$";

(30) the Scan Multiplication Factor for the i-th holographic facet, assigned the symbolic notation "$M_i$";

(31) the Facet Rotation Angle for the i-th holographic facet, assigned the symbolic notation "$\theta_{roti}$";

(32) Adjusted Facet Rotation Angle accounting for deadtime, assigned the symbolic notation "$\theta'_{roti}$";

(33) the Light Collection Efficiency factor for the i-th holographic facet, normalized relative to the 16th facet, assigned the symbolic notation "$\zeta_i$"

(34) the Total Light Collection Area for the i-th holographic facet, assigned the symbolic notation "Area Total$_i$";

(35) the Beam Speed at the Center of the (i,j)th Scanline, assigned the symbolic notation "$v_{center}$";

(36) the Angle of Skew of the diffracted laser beam at the center of the i-th holographic facet, assigned the symbolic notation "$\phi_{skew}$";

(37) the Maximum Beam Speed of all laser beams produced by the holographic scanning disc, assigned the symbolic notation "$v_{max}$";

(38) the Minimum Beam Speed of all laser beams produced by the holographic scanning disc, assigned the symbolic notation "$v_{min}$;

(39) the ratio of the Maximum Beam Speed to the Minimum beam speed, assigned the symbolic notation "$v_{max}/v_{min}$"; and

(40) the deviation of the light rays reflected off the parabolic light reflecting mirror beneath the scanning disc, from the Bragg angle for the facet assigned the symbolic notation "$\delta_e$".

Notably, certain of the above-defined parameters are assigned initialized (i.e., assumed) values, whereas other parameters are computed using the mathematical expressions set forth in FIGS. 8C1 and C2. Exactly which parameters are initialized, and which are computed, and in what order, will be explained hereinafter.

As indicated at Block C in FIG. 11A, the next step of the scanner design process involves using the geometrical parameters and mathematical expressions of FIGS. 8B1 through 8C2, and the "spreadsheet" modelling tool of the HSD workstation in order to create an analytically-based Scanline Production Model which describes the physical production of each (i,j)th scanline within the 3-D scanning volume of the present invention. As mentioned above, suitable spreadsheet-computer programs for carrying out this stage of the disc design process include, for example, EXCEL® from Microsoft, Inc., and LOTUS® from the Lotus Development Corporation. The function of the spreadsheet modelling/analysis tool is to provide a network-type information storage structure, within which the mathematical expressions of the spreadsheet-based Scanline Production Model can be embodied in a manner well known in the spreadsheet computing art. With functional links established among the information storage nodes within the underlying information storage network of the spreadsheet computer program, the scanner designer is thereby permitted to modify one or more parameters of the analytical model and analyze how other parameters within the model change, permitting "what if" analysis with respect to the various parameters comprising the analytical Scanline Production Model. Notably, the display format for the spreadsheet tool will vary from embodiment to embodiment, and in itself, is not an important aspect of the present invention.

As indicated at Block D of FIG. 11A, the next step of the disc design process involves the scanner designer specifying assumed (i.e.initial) values for a number of parameters in the spreadsheet-type analytical model of each (i,j)th scan line production process. In the illustrative embodiment, these assumed parameters include: the radius to Beam-Incident-Point on the holographic scanning disc $r_0$, which by design is the same for each (i,j)-th scanline (mainly determined by the size of the disk); Scanline Separation $S_{SL}$ of adjacent scanlines at the focal plane of the (i,j)-th scanline, and "ScanLine Length" for the (i,j)-th scanline $L_{SL}$ (both established by the user application requirements); Distance from the Beam-Incident-Point to the Beam Folding Mirror, L (usually chosen to be as small as possible to minimize scanner volume); Tilt Angle of Beam Folding Mirror associated with the generation of the (i,j)-th scanline, $\phi_j$; the distance from the scanning disc to the focal plane of the (i,j)-th scanline, $f_j$; the cross-sectional diameter of the laser beam $d_{beam}$ produced from the j-th laser beam scanning station (established by spot size requirements at the focal planes); the Angular Gap between adjacent holographic scanning facets, $d_{gap}$, and the width of the Home-Pulse Gap $d_{gap}$max; the Outer Radius of the light collection region on the holographic scanning disc, $r_{outer}$; one-half (½) of the Depth of Field of the (i,j)th scanline, $\delta$; the Distance from the holographic scanning disc to the Base of the holographic laser scanner, d; and the Deviation Angle $\delta_e$, from the Bragg angle. Notably, the assumed values for these parameters are selected using both heuristics and experience associated with each particular parameter. Typically, such heuristics are obtained from design criteria and scanner application requirements of the end user. Such heuristics will be briefly discussed below.

In general, the diameter of the holographic scanning disk can be initially selected on the basis of estimates of the required Lambertian light collection efficiency of the holographic scanning facets, and the useable optical power producible from commercially available VLDs. In the illustrative embodiment, a 220 mm diameter was selected for the holographic scanning disk. This assumed figure was a compromise between maximizing the diameter of the scanning disk in order to maximize the Lambertian light collection efficiency, and minimizing the diameter of the scanning disk to provide a more compact scanner housing design while minimizing mechanical problems. Then initial values were selected for the Angular Gap $d_{gap}$ between adjacent holographic facets, and the width of the Home-Pulse Gap $d_{gap\text{-}max}$.

Once assumed values have been established for the above-described parameters, the balance of the "initializable" parameters in the spreadsheet-based Scanline Production Model can be determined using fundamental geometric and/or trigonometric equations. For example, the geometrical parameters $\Delta x$, $\Delta y$, indirectly specifying the location of the virtual image of the scanning disk created by the folding mirror, can be established (i.e., initialized) by applying the Laws of Reflection. The location of the Scanline Center Points (x,y,z) can be determined from the initialized Scanline Spacings $S_{SL}$, the assumed Focal Distances for the scanning facets $f_i$, and the symmetry of the axially centered scan pattern of the illustrative embodiment. In order to allow symbol reading at the limit of the depth of field for each scanning plane, each focal distance $f_i$ to the (i,j)th specified scanline should be slightly extended (e.g., by 5 inches).

Having created at Block D of FIG. 11D, a spreadsheet model for the (i,j)th scanline production process, the scanner designer then uses the spreadsheet tool of the HSD workstation to automatically compute the value of parameters in the Scanline Production Model using dependent parameters which are known by either assumption (i.e., initialization) or numerical evaluation. While the order in which particular parameters of the analytical model are numerically evaluated (due to parametric dependency) is generally transparent to the operator of the spreadsheet tool, the scanner designer of the spreadsheet-based Scanline Production Model must know the relational dependency among the various parameters in the analytical structures thereof so that the information nodes and fields underlying the spreadsheet model can be properly structured. Thus, for purposes of clarity and completeness, the computational steps carried out within the spreadsheet-based Scanline Production Model of the present invention during the scanner design process will be described in detail below. It is understood, however, that in practice, many of these steps will be transparent to the scanner designer inasmuch as he or she will need to provide particular inputs into the spreadsheet-based Scanline Production Model, and the Model will automatically produce for display, parameters of relevance to the scanner design process.

Having assumed initial values for the above-described parameters at Block D in FIG. 11A, the next step of the design process hereof, indicated at Block E thereof, is to use Expression No. 17 in FIG. 8C2, the mathematical expressions dependent therefrom (Nos. 16,15,14,13,12, and 1) and the assumed dependent parameters within the Scanline Production Model to numerically evaluate the Scan Angle $\theta_{si}$ required to produce the specified ScanLineLength $L_{SL}$ associated with each i-th holographic facet. As reflected by this set of functionally dependent expressions, the Scan Angle $\theta_{si}$ required to produce the specified ScanLine Length $L_{SL}$ is determined solely by the selection of assumed values for the parameters indicated in Expression Nos. 17,16,15,14,13,12, and 1.

A few observations at this point will be helpful. First, for a given Scan Angle $\theta_{si}$, it is possible to adjust the Scanline Length $L_{LS}$ at the focal plane specified by focal length $f_i$ by simply increasing or decreasing the Scanline Multiplication factor $M_i$, which is dependent upon the Angle of Incidence $A_i$ and the Angle of Diffraction $B_i$. Secondly, the sum of the Adjusted Facet Rotation Angles, $\theta'_{rot}$, for all of the facets (including the sweep angle associated with dead time, $\theta_{dead} = d_{beam}/r_o + d_{gap}/r_o$) should equal approximately 358.5 degrees in an optimum design. This allows for 1.5 degrees extra for the large interfaced gap used for the home pulse. If this total is more than 358.5 degrees, the proposed design will be inadequate. If the total is less than 358.5 degrees, the beam speeds will be unnecessarily high.

As indicated at Block F in FIG. 11A, the next step of the scanner design step is to numerically evaluate, for each i-th scanning facet, the Diffraction (Outgoing) Beam Angle $B_i$ associated with the i-th scanning facet. This computation is carried out using Expression No. 13 in FIG. 8C2 and previously assumed and evaluated parameters specified by this mathematical expression. Completion of this step produces a Diffracted (Outgoing Beam) Angle $B_i$ for each of the 16 facets for the scanning disk under design. Notably, both Angles of Incidence and Diffraction $A_i$ and $B_i$ must provide the required ScanLine Length $L_{SL}$, with no excess. There is a subtle relationship between these angles and the speed of the laser beam being moved along the scanline during scanner operation. In particular, if the angle of incidence $A_i$ is increased below a particular value, then the scan pattern may not be adequate for the application at hand. On the other hand, if the angle of incidence $A_i$ were decreased, the scan pattern may be longer than necessary, resulting in higher than necessary scan beam velocities. The correct value of $A_i$ will minimize the beam velocity at the focal planes of each of the scan patterns, which in turn minimizes the required electronic-bandwidth for the signal circuitry connected to the photodetectors.

After completing this computational step, the scanner designer uses a MATHCAD-based program running on the HSD workstation to numerically evaluate at Block G, for each i-th holographic facet, the relative Light Diffraction Efficiency Factor thereof $H_i$ to light of a particular polarization state. In order to compute these parameters $\{H_i\}$, the spreadsheet-based Scanline Production Model employs a computer sub-program to perform a light diffraction efficiency analysis upon each of the scanning facets under design, and computes therefrom, the total out-and-back light diffraction efficiency of the i-th scanning facet relative to the total out-and-back light diffraction efficiency of the 16th scanning facet, to provide a normalized light diffraction efficiency measure for the i-th facet. This computational process involves theoretically deriving mathematical expressions representative of the light diffraction efficiency of each scanning facet, that is, given the polarization state and light detection scheme employed in the particular scanner embodiment at hand. The details of this analysis will be explained below.

In FIG. 10A1, a geometrical optics model is provided for relative light diffraction efficiency ($H_i$) calculations in the case where the incident laser beam is produced from a VLD generating an S polarized light beam, and no polarizing filter is provided in front of the photodetector of each scanning station. This figure drawing shows the optical paths along which the laser beam is diffracted, reflected, diffracted, focused and transmitted without substantial diffraction during the laser beam scanning and light collection process of the present invention. The transformation of polarization states during this process is described in FIG. 10A. The mathematical expression used to compute the light diffraction efficiency of each i-th scanning facet to S and P polarized light is derived from the geometrical optics model shown in FIGS. 10A2 and 10A3 and the analytical model (i.e., tool) is described in FIGS. 10B through 10E2.

In the preferred embodiment, the analytical model of FIGS. 10B through 10E2 is realized using MATHCAD 3.1 mathematical modelling program available from MathSoft, Inc, of Cambridge, Mass. The mathematical expression derived for the total out-and-back diffraction efficiency for an S-polarized outgoing beam incident on the scanning disk (including Fresnel reflection losses and other internal losses of 10%) is notated as $T_S[\Delta n_i]$ and is set forth in Expression No. 13 in FIG. 10C2. Notably, in the geometrical optics model used to support the diffraction efficiency analysis, angle of incidence $\theta_i$ and angles of diffraction $\theta_d$ are defined differently from angle of incidence $A_i$ and angle of diffraction $B_i$ used in the Scanline Production Model described above. This fact is based solely on historical reasons, and is of little significance. However, such angles are mathematically related angles. Angles $A_i$ and $B_i$ are complements of angles $\theta_i$ and $\theta_d$, respectively, and thus $A_i=90°-\theta_i$, and $B_i=90°-\theta_d$. As shown, this mathematical expression depends on the S polarization and P polarization diffraction efficiencies of the i-th holographic facets on the disk which, in general, are functions of various parameters, including the incidence angle $\theta_i$ and the modulation index (i.e., modulation depth or fringe contrast) $\Delta n_i$ of the holographic facet, assuming the thickness of the emulsion T is maintained constant across the facet. However, by fixing (assuming a value for) each of the variables in the expressions for these diffraction efficiencies, except $\Delta n_i$, the expressions for these diffraction efficiencies can be made simply a function of $\Delta n_i$. In such circumstances, the light diffraction efficiency can be set by simply controlling the modulation index $\Delta n_i$ during facet construction in a holographic laboratory. In a manner well known in the art, the modulation index $\Delta n_i$ can be controlled by properly exposing and processing the dichromated gelatin (DCG) used to record the fringe structure of the scanning facet. The necessary exposure control can be achieved by controlling the power of the construction laser beam and/or time duration that the laser beam is incident on the gelatin during the holographic recording operation.

Expression No. 14 in FIG. 10C2 sets forth how to compute the relative light diffraction efficiency factor $H_i$ for each facet as a function of the total out-and-back diffraction efficiencies $T_S[\Delta n_i]$ for each i-th and 16-th scanning facets. However, it will be appropriate to first describe techniques that can be used to derive mathematical expressions No. 11 and 12 in FIG. 10C2 for S and P polarization diffraction efficiencies in the holographic laser scanner system under design.

Foremost, it is important to be clear as to the referencing of the S and P polarization directions when deriving mathematical expressions for the S and P light diffraction efficiencies of holographic scanning facets. In accordance with convention, these polarization directions are defined with respect to the plane of incidence, namely: the "S polarization direction" is defined to reside in the direction perpendicular to the "plane of incidence"; whereas the "P polarization direction" is defined to reside in the direction parallel to the plane of incidence. The "plane of incidence" is defined as that plane containing both the normal to the facet surface, at the point of incidence of the incident ray, and the incident ray. Also, it is important to keep clear in mind that such polarization directions refer to the direction in which the Electric Field (or E-field) vector associated with the spherical wavefront of the incident laser beam acts on static electric charges during electromagnetic wave propagation.

To avoid confusion with the S&P terms introduced in a later section concerning the astigmatic sources in a VLD, the terms "S wave-Component" and P wave-component" will be introduced to define the above polarization directions of the incident laser beam. The term "S wave-component" is used to specify the component of the resultant spherical wavefront emanating from the laser beam production module and falling incident upon the scanning disc, and having an E-field vector oriented in the S polarization direction. Similarly, the term "S polarized wave-component" is used to specify the component of the resultant spherical wavefront emanating from the laser beam production module and falling incident upon the scanning disc, and having an E-field vector oriented in the P-polarization direction. According to such definitions, both the S and P cylindrical wavefronts comprising the resulting spherical wavefront of the incident laser beam will contribute to the S wave-component, whereas both the S and P cylindrical wavefronts comprising the resulting spherical wavefront of the incident laser beam will contribute to the P wave-component.

The model used herein to describe the total out-and back diffraction efficiency of S and P wave-components of the incident laser beam during scanning operations is based upon the theory of electromagnetic-wave coupling within thick holographic structures, which was originally described in the celebrated paper entitled "*Coupled Wave Theory for Thick Hologram Grating*" by Herwig Kogelnik, supra. The two basic assumptions upon which this theory requires for application are: (1) that the thickness T of the emulsion in which the holographic fringe structures are formed is substantially greater than the wavelength of the incident wavefront; and (2) that the incident wavefront can be approximated by a parallel wavefront. The first assumption holds true for our volume-transmission type holograms, from which each holographic facet on the scanning disc hereof is made. The second assumption also holds true for the case where the spherical wavefront incident the input surface of the hologram has a very large radius of curvature over the incident surface, which is true in the present invention.

In FIG. 10C1, a set of mathematical expressions are provided. These mathematical expressions are used to derive light diffraction efficiency expressions identified by Expressions 11, 12 and 13 in FIG. 10C2. Expression No. 1 through 3 in FIG. 10C1 relate internal angles to external angles through Snell's Law. Expressions 4 and 5 describe attributes of the slanted fringe structure of the holographic light diffraction facet sandwiched between the glass support plates of the scanning disc. These expressions have been derived by applying Snell's Law at the interfacial surfaces of the scanning disc, and using the well known Grating Equation to derive the variable spatial frequency fringe structure of the scanning facet. Expressions No. 6 through 10 in FIG. 10C1 relate the coupling of incident and diffracted wave to the internal angle α and fringe slant angle φ associated with the scanning facet, and are derived from the fundamental work of Kogelnik, supra. Notably, the obliquity factors set forth in Expressions No. 6 and 7 are expressed as a function of the internal angle α and fringe slant angle φ for a particular scanning facet, and determine how well optical input power is diffracted in the various diffraction orders. While the total out and back light diffraction efficiencies defined by Expressions No. 11 and 12 are functions of modulation depth, it is understood that such light diffraction efficiency expressions can be derived as a function of angle of incidence, as required in Bragg Sensitivity Analysis, by fixing the modulation index, $\Delta n$ (i.e., $\Delta n=n$, in graphical plots), and allowing δ, in Expression No. 9 to vary.

Notably, Expressions 11 and 12 in FIG. 10C2 include three terms. The first term in both of these mathematical expressions is a function of factors N(Δn) and S(Δn) defined by Expression Nos. 8 and 10 in FIG. 10C1, and relates to the transmission of light by way of the process of light diffraction, as explained in terms of the Coupled Wave Theory described by Kogelnik, supra. The second term in both of Expressions No. 11 and 12 is a Fresnel transmission term $t_S$, and relates to the transmission of S or P polarized light through the scanning facet by way of the phenomenon of Fresnel transmission. The third term in both of Expressions No. 11 and 12 is an estimated internal loss term (1–0.1), and relates to an estimate of 8% loss due to scattering and absorption in the gelatin and 2% Fresnel reflection loss at the gelatin/glass interfaces. Collectively, these three terms specify the light diffraction efficiency of the i-th scanning facet to S or P polarized light incident thereto.

Thus, by embracing the terms of Expressions 11 and 12, mathematical Expression No. 13 in FIG. 10C2 is used to calculate the total out-and-back diffraction efficiency for an S-polarized outgoing beam. In practicing the scanner design method of the present invention, this light diffraction efficiency expression (Expression No. 14) is inserted in the proper cells of the spreadsheet-based Scanline Production Model running on the HLD Workstation. While the S and P polarization diffraction efficiencies $E_S[\Delta n_i]$ and $E_P[\Delta n_i]$, and the total out-and-back diffraction efficiency for an S-polarized outgoing beam $T_S[\Delta n_i]$, are plotted for facet Nos. 1 and 16 in FIGS. 10E1 and 10E2, respectively, for different values of modulation index $\Delta n_i$, the spreadsheet Model in practice uses the value of modulation index $\Delta n_i$ which maximizes $T_S[\Delta n_i]$. Once this value of $\Delta n_i$ is found and the maximum $T_S[n_1]$ computed for each scanning facet, then the out-and-back diffraction efficiency of each i-th facet relative to facet No. 16 (i.e., the relative light diffraction efficiency, $H_i$) is computed for each i-th scanning facet and stored along with the value of $\Delta n_i$ used to compute this parameter value. $H_i$ is the relevant parameter used in the spreadsheet based Scanline Production Model of the design process.

Having described the case where no cross-polarizer is used before the photodetector, it is appropriate to now consider the case when using a cross-polarizer before the photodetector. This technique is used to combat glare from glossy substrates and/or overcoats. In such a case, the light diffraction efficiencies of the scanning facets on the scanning disc will be modified to accommodate the fact that light of one polarization is diffracted by the facets during scanning, but only the return light of the orthogonal polarization state diffracted by the facet will pass through the crossed polarizer to the detector. In this case, the light diffraction efficiency analysis to be used for computing $H_i$ is described in FIGS. 10F through 10I2. In all but a few respects, the light diffraction efficiency analysis for the cross-polarizer case is quite similar to the case without cross-polarizer. The major difference in the analysis is that the mathematical expression for total out and back light diffraction efficiency for the i-th facet does not peak at the same value of modulation index $\Delta n$ as $T_S(\Delta n)$ in the previous case. Thus, as shown in Expression No. 13 in FIG. 10H2, the mathematical expression for total out and back light diffraction efficiency for either S or P polarized outgoing light $E_i[\Delta n]$ is defined as the product of the S and P light diffraction efficiencies, rather than the product of the S diffraction efficiency and the average of the S and P diffraction efficiencies, as shown in Expression 13 in FIG. 10C2. In practicing the scanner design method of the present invention, this light diffraction efficiency expression (No. 14) is inserted in the proper cells of the spreadsheet-based Scanline Production Model running on the HLD Workstation. While the S and P polarization diffraction efficiencies $E_S[\Delta n_i]$ and $E_P[\Delta n_i]$, and the total out-and-back diffraction efficiency for an S-polarized outgoing beam $E_i[\Delta n_i]$ are plotted for facet Nos. 1 and 16 in FIGS. 10I1 and 10I2, respectively, for different values of modulation index $\Delta n_i$, the spreadsheet Model in practice uses the value of modulation index $\Delta n_i$ which maximizes $E_i[\Delta n_i]$. Once this value of $\Delta n_i$ is found and the maximum $E_i[n_1]$ computed for each i-th scanning facet, then the out-and-back diffraction efficiency of each i-th facet relative to facet No. 16 (i.e., The relative light diffraction efficiency, $H_i$) is computed for each i-th scanning facet and stored along with the value of $\Delta n_i$ used to compute this parameter value. $H_i$ is the relevant parameter used in the spreadsheet based Scanline Production Model.

At Block H in 11B, the spreadsheet-type Scanline Production Model proceeds to compute for each i-th scanning facet, the Relative Light Collection Efficiency Factor $\zeta_i$. Notably, this parameter is computed using Expression No. 18 in FIG. 8C2 and the various parameter values specified therein which have been previously assumed and evaluated. In the present invention, the Total Light Collection Efficiency of each holographic facet is substantially the same (equal) when measured from its focal point $f_i$. As indicated in Expression No. 18, the "relative" Light Collection Efficiency factor $\zeta_i$ for each i-th facet comprises three terms: the first term is a Lambertian geometrical term; the second term is a projected area term; and the third term is a relative light diffraction efficiency term ($H_i$). The Lambertian geometry term is formulated in terms of the focal length of the facet, $f_i$, and the focal length of facet No. 16, $f_{16}$. The projected area term is formulated in terms of the diffracted beam angle of the i-th scanning facet, $B_i$, and the diffracted beam angle of facet No. 16, $B_{16}$. The relative light diffraction efficiency for the i-th scanning facet, $H_i$, is formulated in terms of the total out-and-back light diffraction efficiencies for the i-th facet and the 16th facet, as described in great detail above. Notably, inasmuch as the relative light diffraction efficiency for each i-th facet $H_i$ is a function of the facet's modulation index, $\Delta n_i$, which maximizes $H_i$, the relative Light Collection Efficiency Factor for each i-th scanning facet, $\zeta_i$, is also a function of the modulation index $\Delta n_i$, a parameter which can be controllably realized during facet construction in the laboratory as well as on the production line. These three terms in Expression No. 18 of FIG. 8C2 represent three critically important design considerations necessary to construct a scanning disc, wherein each facet has substantially the same Lambertian light collection efficiency. In the next step of the design process, it remains to be taught how this objective can be carried out while using substantially all of the available surface area on the scanning disc.

Having calculated the Light Collection Efficiency Factor $\zeta_i$ for each scanning facet on the disc under design, the spreadsheet-based Scanline Production Model proceeds to Block I of FIG. 11B where it uses Expression No. 19 in FIG. 8C2 to calculate the Total Light Collection Area of each i-th scanning facet, Area$_i$, on the scanning disk under design. Notably, the first term in Expression No. 19 reflects the fact that all of the available light collecting area between the outer radius and inner radius (i.e., adjacent the disk support hub) is used in apportioning light collecting surface area to each scanning facet on the disk. The second term in Expression No. 19 of FIG. 8C2 reflects the fact that the total light collecting surface area of each facet Area$_i$ is computed by weighing the total light collecting surface area available on the scanning disk by an "equalized" light collecting efficiency factor. As indicated by Expression No. 19 of FIG. 8C2, this "equalized" light collecting efficiency factor is computed by dividing the i-th light collecting efficiency factor by the sum of all light collecting efficiency factors for all of the sixteen facets. Thus, each holographic facet on the scanning disc is capable of collecting substantially the same amount of reflected laser light and directing it onto the parabolic light focusing mirror beneath the disk, independent of the location of the scanned code symbol within the scanning volume of the system. In practical terms, this means that each facet will focus substantially the same amount of light onto a photodetector, independent of whether the scanned code symbol resided at the farthest focal plane or the closest focal plane in the scanning volume.

At Block J in FIG. 11B, the scanner design uses the spread-sheet based Scanline Production Model to determine, for each facet, the minimal value for the facet inner radius $r_i$ that allows the scanner housing height h to be equal to the desired scanner housing height $h_{desired}$, specified by customer requirements. This step of the design process involves using the optimized parameters determined above to determine the set of inner radius parameter values, $\{r_i\}$, for all facets on the scanning disk which provides the desired scanner housing height $h_{desired}$, required by the system specifications, below which the beam folding mirrors must be contained while ensuring the production of the prespecified scanning pattern. Before describing the reiterative evaluation procedure used to find the set of minimum inner radius parameter values $\{r_i\}$ which satisfy the necessary conditions to ensure that $h=h_{desired}$, it will be helpful to first describe how the inner radius $r_i$ for each facet can be found in terms of other geometrically related parameters in the system.

As illustrated in FIG. 8A, the angle (i.e., B-β) in FIG. 8A1 of the ray going to the innermost part of the light collection portion of each i-th facet is calculated using the ray projected from the maximum reading distance point at the center of each scanline to the inner radius of the i-th facet on the virtual scanning disk. The intersection of this ray and the beam folding mirror is used to establish the height of the folding mirror, $y_j$. Notably, only the ray giving the maximum mirror height is used to set the final mirror height. As described in Expression No. 11 in FIG. 8C1, this dimension $y_j$, plus the dimension d beneath the disk for the light collection optics, establishes the overall height of the scanner housing, h.

The tilt angle of the beam folding mirror $\phi_j$ is one of the parameters that can be varied (i.e., assumed) to arrive at a "best" scanner design. It has been found that a large tilt angle (away from the scan beams) results in a shorter housing size, but requires very shallow exit angles for the beams leaving the holographic scanning disk. This makes the scanning disk difficult to fabricate and lowers the overall light diffraction efficiency and thus total light collection efficiency thereof. It also results in unnecessarily high beam speeds. A small tilt angle will result in better exit angles for the beam leaving the holographic disk, but results in a taller scanner housing size and a reduction in the scan lengths of the scan lines for the 16 facet scanning disk of the illustrative embodiment. After several reiterations, an optimum tilt angle $\phi_j$ for the beam folding mirror was established at 16 degrees from the vertical.

In the reiterative evaluation procedure used to find the minimum $r_i$, the goal is essentially to minimize $r_i$ for all facets as this will ensure that the maximum amount of available light collecting space on the scanning disc is utilized for light collection. If the inner radius parameter $r_i$ for each facet is minimized while all other conditions are being satisfied, then the amount of laser light reflected off the scanned symbol and collected by the facets on the rotating scanning disc will be maximized, thereby producing strong scan data signals at the photodetectors of the system. Also, as shown by Expressions No. 11 and 10 in FIG. 8C1, minimizing $r_i$ for each scanning facet causes the height of the beam folding mirrors to be greater, necessitating a scanner housing with an increased height dimension. Thus, adjustment of the inner radius of the facets has significant effects on other important geometrical parameters in the holographic scanning system.

In general, the reiterative evaluation procedure supported by the spreadsheet-based Scanline Production Model typically comprises a number of design cycles, each of which can be identified by an assigned cycle index k=1,2,3,4,5, ... 6,7,8, etc. During the (k=1)th cycle, the disc designer uses Equations No. 4 through 11 in FIG. 8C1 to compute the beam folding mirror height, h. In order to compute an initial value for h (i.e., $h_i$) using an initial value for each $r_i$, an initial value for each $r_i$ (e.g., 1.0 inch) is selected for the first run of calculations (e.g., $r_1$=1.0, $r_2$=1.0, ... ,$r_{16}$=1.0). The result of this cycle of computations is a set of scanner housing height values, (e.g., $h_1$=12.0 inches, $h_2$=12.5 inches, ... ,$h_{15}$=15.0 inches, $h_{16}$=12.3 inches) where $h_{15}$=15.0 inches in the illustrative example is the maximum height computed for the initial value for each $r_i$.

If none of the computed height values are equal to or below $h_{desired}$, then during the (k+1) cycle each inner radius parameter $r_i$ is incremented by a very small amount (e.g., +0.2 inch) and the scanner height parameter $h_i$ is recalculated for each value of facet inner radius $r_i$. The set of scanner height values are then analyzed by the scanner designer to determine which values of $r_i$ yielded scanner housing height ($h_i$) values less than or equal to $h_{desired}$. Each value of $r_i$ that yielded a scanner housing height $h_i$ value less than or equal to $h_{desired}$, is stored in memory of the HSD workstation and fixed in subsequent computational cycles of the reiterative process. Each value of $r_i$ that did not yield a scanner housing height $h_i$ value less than or equal to $h_{desired}$, is changed in subsequent computational cycles of the reiterative process.

If all of the computed height values are equal to or above $h_{desired}$, then during the (k+1) cycle, then each inner radius parameter $r_i$ is incremented by a very small amount (e.g., +0.2 inch) and the scanner height parameter $h_i$ is recalculated for each value of facet inner radius $r_i$. The set of scanner height values are then analyzed by the disc designer to determine which values of $r_i$ yielded scanner housing height ($h_i$) values less than or equal to $h_{desired}$. Each value of $r_i$ that yielded a scanner housing height $h_i$ value less than or equal to $h_{desired}$, is stored in memory and fixed in subsequent computational cycles of the reiterative process. Each value of $r_i$ that did not yield a scanner housing height $h_i$ value less than or equal to $h_{desired}$, is changed in subsequent computational cycles of the reiterative process.

The reiterative evaluation process progresses as described above until a value for each inner radius $r_i$ is found which yields a scanner housing height $h_i$ which is less than or equal to the desired scanner housing height $h_{desired}$. When this point in the process is reached, then the spreadsheet-based Scanline Production Model will have determined a set of inner radius parameter values $\{r_i\}$ for the facets on the scanning disk under design.

At Block K in FIG. 11B, the spreadsheet-based Scanline Production Model uses the assumed value for $r_{outer}$, the optimized set of parameter values $\{r_i\}$, and the previously computed set of light collection efficiency values $\{\zeta_i\}$, to compute the net light collection surface area for each i-th scanning facet, Area$_i$, such that each and every facet collects at its photodetector substantially the same amount of light from its corresponding scanline, while substantially all of the surface area available on the scanning disc is utilized for light collection purposes. In order to ensure that such conditions are satisfied during this set of parameter computations, Expression No. 19 in FIG. 8C2 includes mathematical structure which defines a term for surface area computation which in conjunction with the proportioned hologram efficiency factor (i.e., $\zeta_i/\Sigma(\zeta_i)$), will provide light collection efficiency equalization (i.e., normalization). Upon completion of this step, a set of facet surface areas $\{\text{Area}_i\}$ is produced.

At this stage of the process, the spreadsheet-based Scanline Production Model holds for each facet a set of geometrical parameters which, in theory, would be sufficient to construct a scanning disc capable of producing the prespecified scanning pattern during the initial stage of the design process. Specifically, this proposed set of geometrical parameters comprises: a set of facet Rotation Angle values $\{\theta'_{roti}\}$ for the holographic facets; a set of inner radius values $\{r_i\}$ for the holographic facets; a set of Total Light Collection Surface Areas $\{\text{Area}_i\}$ for the holographic facets; a set of Focal Length values $\{f_i\}$ for the holographic facets; and a set of modulation index values $\{\Delta n_i\}$ for the holographic facets. Collectively, these parameters shall be referred to as "construction parameters" as they are used to construct the facets on the holographic scanning disk. Notably, the subset of construction parameters $\{\theta'_{roti}, r_i, \text{Area}_i\}$ provides a geometrical specification for the i-th scanning facet which, in general, has irregularly shaped boundary characteristics constrained by these construction parameters and the condition that all of the available surface area on the disk be utilized for light collection.

Having found a set of facet parameters which will produce the prespecified laser scanning pattern, while satisfying scanner housing design constraints, it nevertheless is essential to determine whether the set of facet construction parameters, derived from the scanner design process, can be physically laid out on the available surface area of the scanning disk whose geometry has been previously bounded by outer radius $r_{outer}$.

During the facet lay out verification stage of the design process indicated at Block L of FIG. 11B, the scanner designer tries to physically layout on the surface of the scanning disc, each of the geometrically-specified holographic facets in a facet order which allows maximum use of the disk surface area. Inasmuch as each facet has been "loosely" constrained by its construction parameters $\{\theta'_{roti}, r_i, \text{Area}_i\}$, the disk layout designer is accorded a degree of freedom in which to specify the perimetrical boundaries of each facet so that substantially all of the available surface area on the disk is occupied by the facets, while the construction parameters $\{\theta'_{roti}, r_i, \text{Area}_i\}$ for each i-th facet are satisfied. When the disk layout designer has achieved this objective, then the complete set of construction parameters $\{\theta'_{roti}, r_i, \text{Area}_i, f_i, \Delta n_i, A_i, B_i\}$ for i=1,2, . . . ,16 can be used to make the designed scanning disk.

In the preferred embodiment, a geometrical modeling tool, such as AUTOCAD, supported by the HSD workstation is used to geometrically model each scanning facet and layout the same on the scanning disk while satisfying several global constraints, namely: (1) that substantially all of the light collecting surface area available on the scanning disk is utilized; (2) that at the end of each scanline sweep, all or almost all of the light collection surface area associated with the corresponding facet is disposed immediately above the parabolic collection mirror (i.e., light collection element) to maximize light detection at the photodetector; and (3) that all incoming light rays reflected from a scanline produced by the j-th scanning station, strike its associated beam folding mirror and are collected by the same scanning facet which produced the scanline, to avoid signal clipping and thus ensuring maximal SNR at the photodetector. Notably, during this stage of the scanner design process, a set of construction parameters $\{\theta'_{roti}, r_i, \text{Area}_i\}$ for all values of i cannot be changed or altered for any of the holographic facets, but rather must be maintained as constants throughout the procedure. Specifically, the facet layout procedure is carried out by adjusting the boundary lines for each facet, while satisfying the above described constraints and facet parameters $\{\theta'_{roti}, r_i, \text{Area}_i\}$.

If the scanner designer can successfully layout the facets on the disc using the tools available within the HSD workstation, then the disc designer proceeds to the final stage of the design process indicated at Block M where designed scanner is analyzed against its design performance criteria (e.g., equalized light collection efficiency among the facets, etc.). This stage of the process is carried out using various analytical tools available in the HSD workstation. For example, the HSD workstation provides the scanner designer with a tool for computing the Lambertian light collection efficiency, $E_L$, of each facet on a designed scanning disc. The purpose of this tool is to allow the scanner designer to quickly compute the Lambertian light collection efficiency of each i-th facet on a designed scanning disc, and determine whether such light collection efficiency measures are substantially equal for each facet on the designed scanning disc. If not, then the scanner designer can return to the spreadsheet-based Scanline Production Model and modify the disc and/or scanner design until acceptable performance parameters are obtained for the application at hand. Below, the structure and function of the Lambertian light collection efficiency measuring tool will be described in greater detail.

Figure 10F:
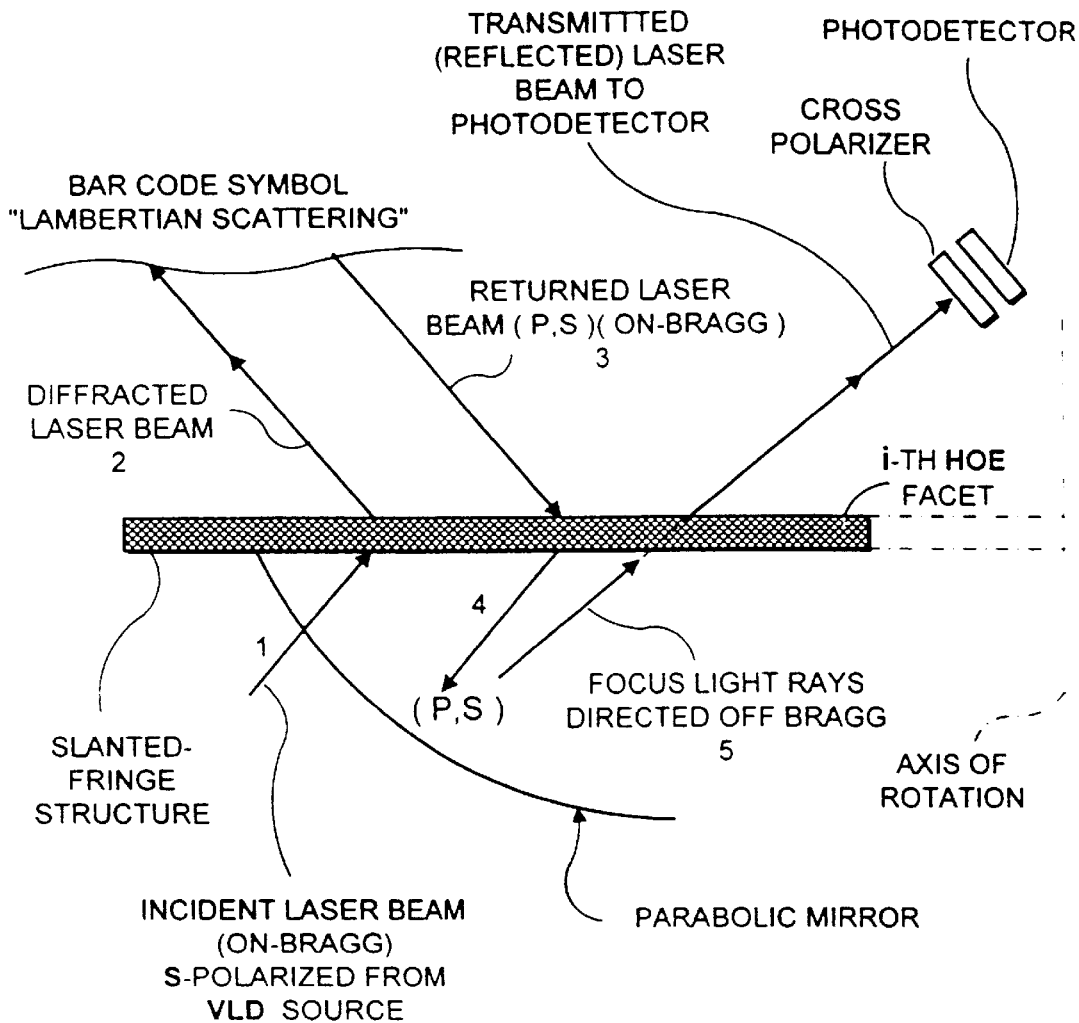
FIG. 10F is a schematic diagram illustrating the path travelled by the light rays associated with an incident laser beam being initially diffracted by a rotating holographic facet towards a bar code symbol, then returning light rays reflected therefrom being diffracted again by the same holographic facet towards the light focusing parabolic mirror, and finally the focused light rays being transmitted through the same holographic scanning facet towards the polarized photodetector without substantial diffraction.
Figure 10J:
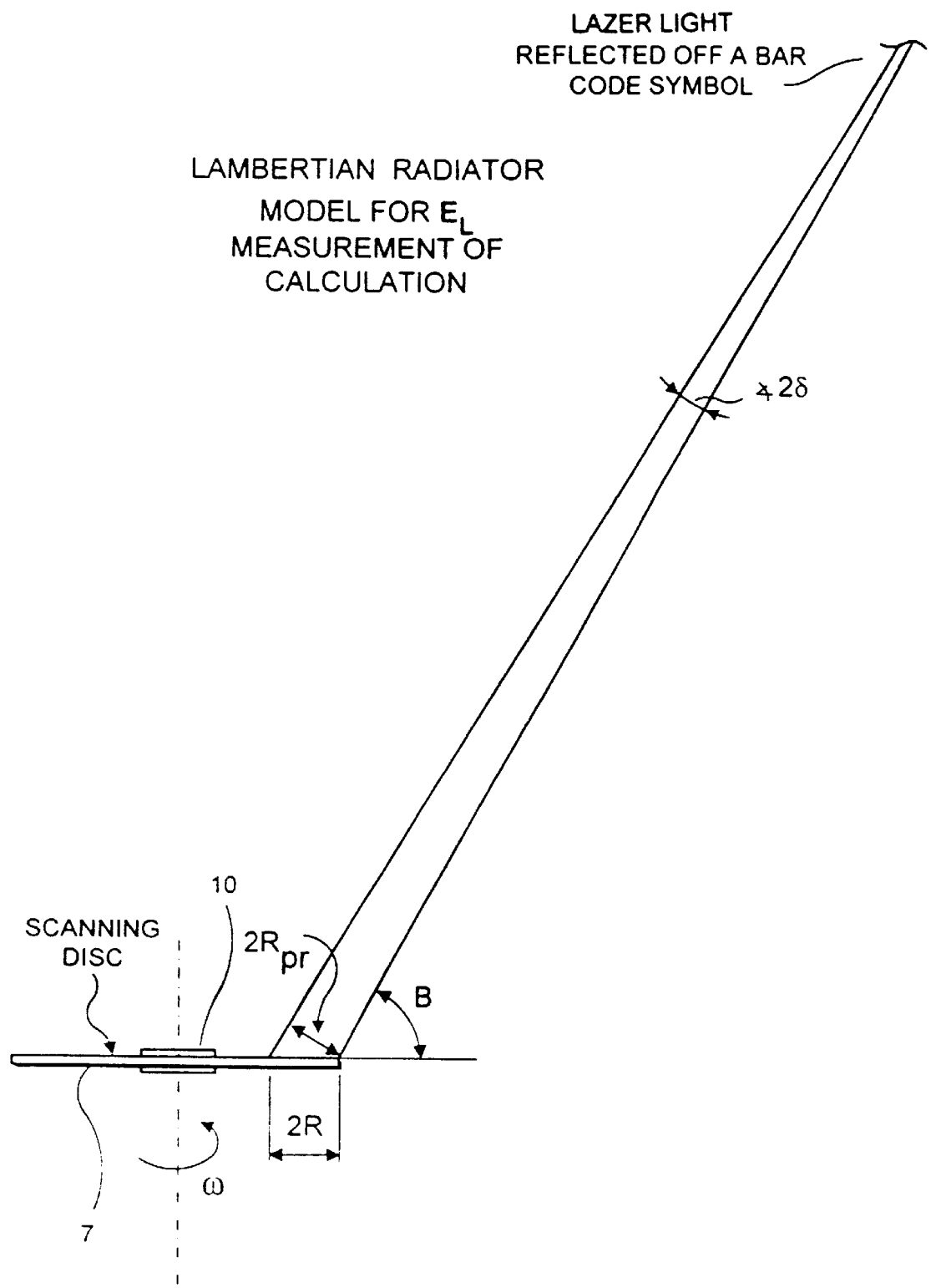
FIG. 10J is a geometrical optics model illustrating the Lambertian light collecting efficiency of the i-th holographic scanning facet on the scanning disc of the present invention.

In FIGS. 10J through 10L1, a geometrical optics model (i.e., Lambertian Radiator Model) is presented for calculating the Lambertian light collection efficiency, $E_L$, of each i-th facet on a scanning disc produced using the disc design procedures of the present invention. The parameters associated with the Lambertian Radiator Model are geometrically defined in FIG. 10K. The set of equations listed in FIG. 10L1 define relationships among certain of the parameters in the model. Notably, the $E_L$ calculation procedure described herein does not include factors related to diffraction efficiencies, holographic disk transmission characteristics for off-Bragg angles, mirror reflectances, window transmission characteristics and bar code label reflectances. It is understood that all of such parameters must be taken into account to determine the total light collection efficiency of the scanning system. As these miscellaneous factors have been previously discussed hereinabove, modifications to the present procedure to improve its degree of accuracy will readily occur to those skilled in the art.

The geometrical optics model of FIG. 10J assumes that most bar code symbol surfaces behave as Lambertian radiators, wherein the process of irradiance from such surfaces (i.e., "diffusely reflective surfaces") is governed by Lambert's Law during laser beam scanning and light collection operations. In accordance with Lambert's Law, laser light diffusely reflected off the scanned code symbol is projected over an area having a circular collection aperture (i.e., $A_{circular}$). In order to calculate the Lambertian light collection efficiency $E_L$ of each i-th facet, Lambert's Law requires that each facet have a circular geometry. In general, each facet on the scanning disc of the present invention has a non-circular geometry. To allow the use of the $E_L$-calculation procedure on such scanning disc, it is therefore necessary to first compute an effective circular aperture, $A_{\it eff}$, for each i-th facet on the scanning disc under testing. This equivalent measure can be easily computed using the previously determined surface $\text{Area}_i$ of the i-th facet and the well known circle-area formula (i.e., $\text{Area}_i = \pi R^2 = A_{\it eff}$), where R is defined as the radius of the effective circular aperture for the facet.

As shown in FIG. 10J, the Lambertian radiator model comprises a number of other geometrical parameters which factor into the calculation of $E_L$ namely: Z, the distance from the point of code scanning to the effective circular aperture defined on the scanning disc; $R_{pr}$, the radius of the projected effective circular aperture; $B_i$, the diffraction angle of the outgoing laser beam from the i-th facet; and $\delta_i$, the half-angle subtended by the effective projected circular aperture. During the measurement stage of the procedure, physical measurements are made to determine $Z_i$ (in inches), $\text{Area}_i$ (in square inches) and $B_i$ (radians) for each i-th facet. Compute $A_{\it eff}$ using the formula $A_{\it eff} = A_i \sin(B_i)$. Then $R_{pr}$ is computed using the circle area formula: $A_{\it eff} = \pi R_{pr}2$. Then using computed $R_{pr}$ and measured $Z_i$, the half-angle $\delta_i$ for the i-th facet is computed using the expression: $\delta_i = a \tan[R_{pr}/Z_i]$, wherein $\text{atan} = \tan^{-1}$. Having computed $\delta_i$, $E_L$ can be calculated using the expression $E_L = [\sin(\delta_i)]^2$ for small values of $\delta_i$ (i.e., less than 2 degrees). In FIG. 10L1, a numerical example is worked out for illustrative purposes.

Ideally, each facet should have equal Total Light Collection Efficiency which is defined as $E_{L,i} \cdot H_i$, for all values i. In most applications, one can expect the Total Light Collection Efficiency of the facets to deviate within an acceptable tolerance range, yet still consider such a scanning disc to have the total light collection efficiency of its holographic facets substantially "equalized" within the spirit of the present invention.

When the scanner designer determines that the scanning disc design satisfies its design criteria (e.g. equalized light collection efficiency among the facets, etc.), then the disc design process is completed and the facets of the scanning disc can be manufactured and thereafter assembled between the glass support plates of the disc. However, if the scanner designer cannot successfully layout the facets on the disc as described above, then as indicated at Block M in FIG. 11C, the designer may return to any of the stages in the scanner design process, and use the spreadsheet-based Scanline Production Model to recompute parameters based on newly assumed parameters in the scanner model. During this interactive design process, the scanner designer can perform "what-if" type analysis in order to arrive at a best or most suitable scanner design, given the set of system constraints presented to the designer.

DESIGNING A HOLOGRAPHIC LASER SCANNER HAVING CROSS-POLARIZING FILTERS BEFORE ITS PHOTODETECTORS

At this juncture it is appropriate to now describe how to design a holographic scanning disk for use in a holographic laser scanner employing light polarization filtering.

As shown in FIG. 10F, the S (or P) polarized laser beam produced from each VLD in the system is directed incident the scanning disk, sequentially diffracted by the rotating holographic facets, and then reflected off the beam folding mirrors towards a bar code symbol to be scanned within the scanning volume. As is well known, a portion of the S (or P) polarized laser beam incident on the code symbol is reflected off the glossy surface (i.e., substrate or overcoat) as an optical signal which retains the polarization state of the incident laser beam. The other portion of the polarized laser beam passes through the glossy coating, is intensity modulated and scattered (i.e., diffused) by the code symbol and reflects off the symbol as an unpolarized, intensity-modulated optical signal. A portion of these two signal components collectively travel back along the same optical path as the incident scanned laser beam and is diffracted by the corresponding facet towards the parabolic mirror. The parabolic mirror focuses the collected light rays of the reflected laser beam through the same facet with minimal light diffraction (i.e., off Bragg) through a P (or S) polarizing filter which attenuates (i.e., blocks) the S (or P) polarized component of the scan data signal while transmitting the P (or S) polarized component of the unpolarized component thereof to the photodetector for intensity detection. Advantageously, when using this scanning arrangement, the S (or P) polarized 0-th diffractive order of the laser beam incident the facet is also blocked by the cross-polarizing filter, thus improving the SNR of the detected scan data signal in general. As shown in FIG. 10F, and as used hereinafter, the term S-cross polarizing filter shall mean a polarized light and block P polarized light, whereas the term P-cross polarizing filter shall mean a polarizing filter oriented on a photodetector so as to pass P polarized light and block S polarized light.

While the use of an S or P cross-polarizing filter effectively solves the problems associated with glare in the holographic scanning system described above, it does require a minor modification of the scanner design process of the present invention. In particular, the light diffraction efficiencies of the scanning facets must be modified from the way taught in Expressions No. 11 through 13 of FIG. 10C2 due to the fact that light of one polarization must be efficiently diffracted by the facets during scanning, while light of the orthogonal polarization must be efficiently diffracted by the holographic facet during light collection and detection. This condition is achieved by ensuring that the product of the outgoing S (or P) polarization diffraction efficiency of each facet and the return P (or S) polarization diffraction efficiency is maximized. Thus, the total out-and-back diffraction efficiency of each i-th facet, $H_i$, is defined as the "product" of (i) the outgoing diffraction efficiency of the facet for the S (or P) polarization component of the incident laser beam and (ii) the return diffraction efficiency of the facet for the orthogonal P (or S) polarization of the laser beam.

When designing each facet on the scanning disc, all of the steps in the disc design method recited at Blocks A through F in FIG. 11A are carried out in the manner described above. The only modification to the scanner design method occurs at Block G of FIG. 11B when determining the holographic diffraction efficiency $H_i$ for each facet. At this stage of the method, Expression No. 13 set forth in FIG. 10H2 is used to compute $E_t[\Delta n_i]$, the total out-and-back diffraction efficiency of each i-th facet, $H_i$. As indicated by this mathematical expression, this parameter is defined as the product of the S and P light diffraction efficiencies, rather than the product of the S (or P) diffraction efficiency and the average of the S and P efficiencies, as shown in Expression 13 in FIG. 10C2, namely: $E_s[\Delta n_i]$, the outgoing diffraction efficiency of the facet for the S polarization component of the incident laser beam; and $E_p[\Delta n_i]$, the return diffraction efficiency of the facet for the orthogonal P polarization of the laser beam.

These individual diffraction efficiency terms are provided by Expressions No. 11 and 12, respectively, in FIG. 10H2. As indicated in FIG. 10H2, component terms $E_s[\Delta n_i]$ and $E_P[\Delta n_i]$ and product term $E_t[\Delta n_i]$ are graphically plotted as a function of modulation index $\Delta n_i$ of the recording emulsion from which the i-th holographic facet is realized.

To practice the scanner design method of the present invention, this light diffraction efficiency expression (14) is inserted in the proper cells of the spreadsheet-based Scanline Production Model running on the HLD Workstation. While the S and P polarization diffraction efficiencies $E_s[\Delta n_i]$ and $E_P[\Delta n_i]$, and the total out-and-back diffraction efficiency for an S-polarized outgoing beam $E_t[\Delta n_i]$ are plotted for facet Nos. 1 and 16 in FIGS. 10I1 and 10I2, respectively, for different values of modulation index $\Delta n_i$, the spreadsheet based Model in practice uses the value of modulation index $\Delta n_i$ which maximizes $E_t[\Delta n_i]$ for the i-th facet. Once this value of $\Delta n_i$ is found and the maximum $E_t[n_1]$ computed for each i-th scanning facet, then the out-and-back diffraction efficiency of each i-th facet relative to facet No. 16 (i.e., the relative light diffraction efficiency, $H_i$) is computed for each i-th scanning facet and stored along with the value of $\Delta n_i$ used to compute this parameter value. This computation is carried out for each of the sixteen facets on the scanning disc under design. Then, the relative holographic diffraction efficiency $H_i$ for each i-th facet is computed as the ratio of the product terms $E_t[\Delta n_i]/E_t[\Delta n_{i6}]$. After carrying out this cycle of computations, a set of relative diffraction efficiencies $\{H_i\}$ are obtained for the scanning disc that has been particularly designed for use with cross-polarization filters. Thereafter, the scanner designer returns to the spreadsheet-based Scanline Production Model to Block H and resumes the scanner design process described hereinabove until completion.

DESIGNING A HOLOGRAPHIC LASER SCANNING DISC HAVING FACETS WITH DIFFERENT FRINGE CONTRAST OVER THE BEAM SCANNING AND LIGHT COLLECTING PORTIONS THEREOF, FOR USE IN A HOLOGRAPHIC SCANNING SYSTEM WITH LIGHT POLARIZING FILTERS

In the above-described embodiment of the scanner design method hereof, cross-polarizers were used to eliminate the effects of glare during scanning. In the scanning disc design described above, the S and P diffraction efficiencies $E_s[\Delta n_i]$ and $E_P[\Delta n_i]$ were not both maximized, but rather the product of these terms, namely $E_t[\Delta n_i]$, was maximized by finding the modulation index $\Delta n_i$ at which this function "peaked" or attains its maximum value, assuming that the modulation index of the fringe structure throughout the i-th facet is uniform or the same over the entire facet. This fact is illustrated in the diffraction efficiency plots of FIG. 12. Notably, this design technique offers a compromise to the problem at hand by accepting the fact that the light diffraction efficiencies of the facets to S and P light do not attain maximum or peak values at the same value of modulation index, $\Delta n_i$.

Figure 12:
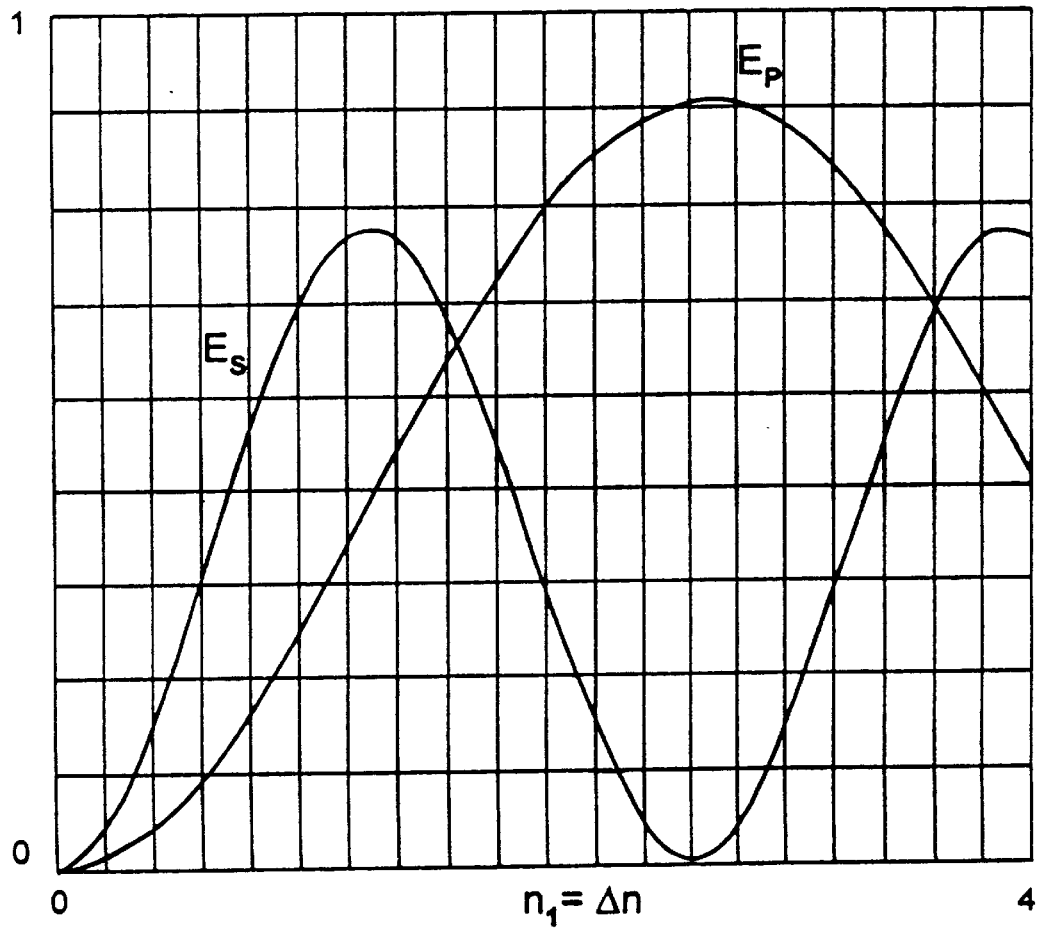
FIG. 12 is a graphical plot of the light diffraction efficiency of an exemplary holographic scanning facet of the scanning disc of FIG. 3 to S polarized light incident thereto, as a function of the refractive index modulation $\Delta n_i$ (i.e., $E_S(\Delta n_i)$), and the light diffraction efficiency of the inner light-collecting portion of the exemplary holographic scanning facet to P polarized light incident thereto, as a function of modulation index $\Delta n_i$ (i.e., $E_P(\Delta n_i)$), clearly showing that such light diffraction efficiencies $E_S(\Delta n_i)$ and $E_P(\Delta n_i)$ do not have peak values at the same value of modulation index $\Delta n_i$ and thus cannot be optimized using the same modulation index $\Delta n_i$ over the entire surface area of the scanning facet.
Figure 12A:
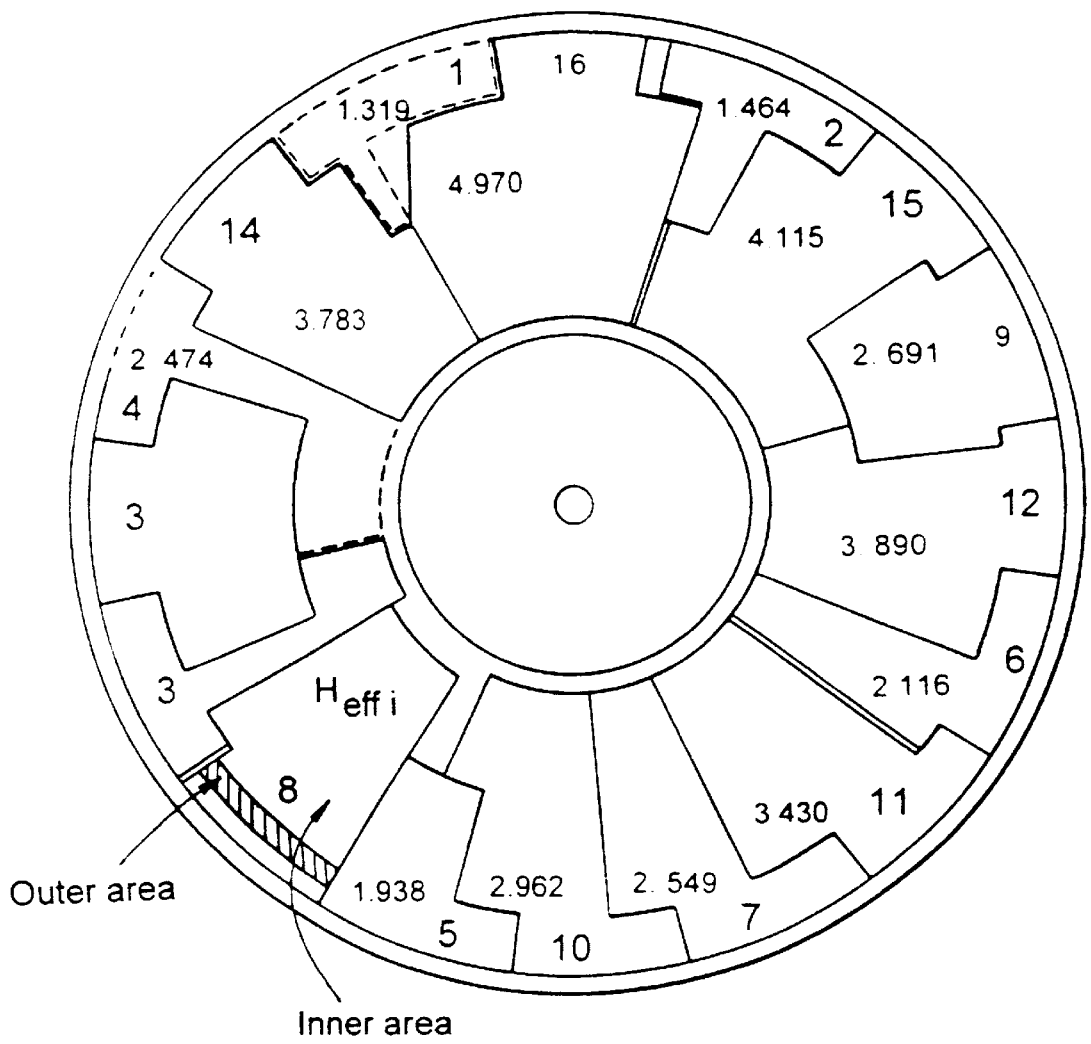
FIG. 12A is a schematic diagram of the holographic scanning disc of an alternative embodiment of the present invention hereof, in which the outer beam-steering portion of each holographic scanning facet on the scanning disc has a light diffraction efficiency $E_S(\Delta n_i)$ which is optimized for an incident laser beam of a first (e.g., S) polarization state by selection of a first optimal modulation index $\Delta n_1$, whereas the inner light-collecting portion of the holographic scanning facet has a light diffraction efficiency $E_P(\Delta n_i)$ which is optimized for reflected laser light of a second (i.e., P) polarization state orthogonal to the first polarization state by selection of a second optimal modulation index $\Delta n_2$.

In the alternative disc design described hereinbelow, this constraint is removed from the design process, and instead of finding the single modulation index value for the emulsion at which the product of the diffraction efficiencies $E_s[\Delta n_i]$ and $E_P[\Delta n_i]$ are maximized, the alternative technique finds the modulation index value $\Delta n_{i1}$ at which $E_s[\Delta n_i]$ is maximized (e.g., peaked) and the modulation index value $\Delta n_{i2}$ at which $E_P[\Delta n_i]$ is maximized. Then during the facet manufacturing process, the i-th facet is selectively exposed to achieve portions with different light diffraction deficiencies, namely: the emulsion of the facet at the outer portion of the i-th facet along which the incident laser beam is incident is exposed by the Argon laser beam so that modulation depth $\Delta n_{i1}$ is attained and thus light diffraction efficiency $E_s[\Delta n_{i1}]$ maximized; and the emulsion of the facet at the inner portion of the i-th facet along which the rays of the return laser beam pass for collection is exposed by the construction laser beam (e.g., an Argon laser) so that modulation depth $\Delta n_{i2}$ is attained and thus light diffraction efficiency $E_P[\Delta n_{i1}]$ maximized. A scanning disc of such a design is shown in FIG. 12A. During this two-step exposure process, spatial masks are used to cover the regions of the i-th facet which are not to be exposed during the particular exposure process. By carrying out this facet design and construction technique, a scanning disc is produced having facets which optimize the diffraction efficiency of the S-polarization component of the laser beam incident the rotating scanning disc during scanning operation, while optimizing the diffraction of the P-polarization component of the laser beam reflected off a scanned symbol during light collecting operations.

As will be readily apparent, the use of a scanning disc having facets with regions made from emulsions (i.e., DCG) characterized by different depths of modulation, $\Delta n_{i1}$ and $\Delta n_{i2}$, will provide the holographic laser scanner of the present invention with a better overall light collection efficiency, as the inner light collecting portion of the facet does not have to be exposed to maximize the product of the efficiencies of the S and P polarizations, but rather exposed to maximize the efficiency for the polarization of the return light rays that are passed to the photodetector by the cross-polarizer thereon. This feature of the present invention will result in a significant improvement in the light collection efficiency of facets having large diffraction angles (or small B) (i.e., Nos. 4,8,12, and 16). The improvement which can be expected when using this technique is about 50% average improvement, which is the difference between using a 30 milliwatt laser beam over a 20 milliwatt laser beam, or a 40:1 SNR versus a 30:1 SNR. This provides a markedly improved performance when reading code symbols printed on glossy substrates or having glossy overcoats, as in many stock products.

As shown in FIGS. 12B1 through 12B3, a modified procedure is provided for designing a holographic laser scanner employing a scanning disc having dual modulation-depth or fringe-contrast regions over the beam sweeping and light collecting regions thereof. As shown, the steps of the method indicated at Blocks A though F and J through N in FIGS. 12B1 through 12B3 are substantially the same as in the method described in FIGS. 11A through 11C. The points of difference between the two alternative design methods begin at Block G in FIG. 12B2 where the spreadsheet-based Scanline Production Model running on the HSD workstation computes an "effectivee" relative light diffraction efficiency factor $H_{effi}$ for each i-th split-design facet on the disc. The mathematical expression set forth in FIG. 12C is used to compute the parameter $H_{effi}$ for each scanning facet. As indicated by this expression, a number of dependent parameters are involved in this calculation, including a number of area terms which must be initially assumed to perform the calculation. Other terms, such as the light diffraction efficiencies $E_s[\Delta n_{i1}]$ and $E_P[\Delta n_{i2}]$ for each i-th facet can be computed using the expressions for light diffraction efficiency set forth in FIG. 10H2. The outer area of the i-th facet $A_{outeri}$ can be assumed using knowledge of the laser beam diameter and the facet Rotation angle $\theta_{roti}$, Expression No.

17 in FIG. 8C2 of the facet, whereas the inner area of the facet $A_{inneri}$ can be calculated by subtracting the inner area $A_{inneri}$ from the total area of the facet, $A_{totali}$. For purposes of the design method, the parameter $A_{totali}$ is assumed to be the Area$_i$ provided by the design method of FIGS. 11A through 11C.

After $H_{effi}$ is calculated, the scanner designer proceeds to Block H and uses the spreadsheet-based Scanline Production Model to compute the light collection efficiency factor $\zeta_i$ for each facet. Then at Block I, the scanner designer uses the spreadsheet-based Scanline Production Model to compute the total light collection surface area of the facet, $A_{totali}$. At Block I', the scanner designer uses the spreadsheet-based Scanline Production Model to compare the assumed values of $A'_{inneri}$ with computed values of $A_{totali}$. Then based on the differences between these parameter values, the scanner designer returns to Block G in the design method, adjusts the assumed values for $A'_{totali}$ and then repeats the steps indicated at Blocks G through I', each time yielding a different value for $H_{effi}$ required in the total area computation for the i-th scanning facet. When $A'_{totali}$ converges upon $A_{totali}$, then acceptable values for $H_{effi}$ and $A_{totali}$ have been found and the design process can then proceed to Block J and resume in the manner described in connection with FIGS. 11A through 11C. When an acceptable set of geometrical parameters have been obtained which satisfy the specified system constraints and performance criteria, the design process is completed and the scanner design can be constructed.

CONVERSION OF SCANNING DISC RECONSTRUCTION PARAMETERS

Typically, there is a great need to mass manufacture the holographic scanning disc in very large numbers. Thus, holographic mastering techniques are ideally used. While any suitable mastering technique can be used, it will be necessary in nearly all instances to holographically record the master facets at a recording wavelength $\lambda_C$ which is different than its reconstruction wavelength $\lambda_R$. The reason for this is generally well known: it is difficult to make holographic facets with high fringe-contrast at the reconstruction wavelength $\lambda_R$, which in the illustrative embodiment is about 670 nanometers. Instead, it is easier to record the facets at a spectral wavelength at which high-contrast fringes can be realized and then play back at the wavelength of the VLDs in the scanner.

Presently, the preferred recording medium for recording facets with high-contrast fringes is Dichromated Gelatin (DCG) which exhibits its greatest sensitivity near 488 nm. Thus a blue laser beam is required during recording. In order to record the i-th HOE at its construction wavelength, and then reconstruct the same at another wavelength, it is necessary to translate (i.e., convert) its construction parameters $\{f_i, A_i, B_i\}$ expressed at the reconstruction wavelength $\lambda_R$, into a complete corresponding set of parameters expressed at the specified construction wavelength $\lambda_C$. The process illustrated in FIGS. 28A1 through 28D can be used to carry out the necessary parameter conversions. In addition, non-symmetrical optical elements are introduced to eliminate, or minimize, aberrations produced by the wavelength shift between exposure and reconstruction using techniques well-known in the art. Thereafter, using the converted set of construction parameters, the HOE facets can be made using the converted set of construction parameters and the holographic recording system schematically represented in FIG. 13.

In FIGS. 28A1 and 28A2, a geometrical optics model is schematically presented for an incident laser beam being deflected by a facet holographic optical element (HOE), e.g., realized as a volume-type transmission hologram supported on the rotating scanning disc. As shown in FIG. 28A1, the incident laser beam enters the upper glass plate of the disc at incident angle $\theta_i$ (i.e., 90°−$A_i$), propagates through the upper glass plate, the gelatin, the lower glass plate, and then emerges therefrom at diffraction angle $\theta_d$ (i.e., 90°−$B_i$) towards its associated beam folding mirror. As indicated in FIG. 28A2, the laser beam being transmitted through the disc plates and gelatin of the holographic facet interacts with the high-contrast fringes recorded therein so that its direction of propagation is changed (i.e., modified) through the process of diffraction physics. As shown in these drawings, a number of parameters are required to construct a suitable geometrical optics model for this laser beam diffraction process, and the process by which the construction parameters are converted. In general, there are six input parameters to the conversion process and two output parameters. Three of the input parameters are derived from the scanning disk design process, namely: $\lambda_1$, the wavelength of the laser beam produced by the VLD during hologram reconstruction (i.e., laser beam scanning); the incident angle $\theta_{i,1}$ (i.e., 90°−) $A_i$) at which the laser beam propagates through the facet (i.e., upper glass plate, the gelatin, the lower glass plate) during reconstruction (i.e., laser scanning); and the diffraction angle $\theta_{d,1}$ (i.e., 90°−$B_i$) at which the diffracted laser beam emerges from the facet and propagates towards to its associated beam folding mirror. The other three input parameters provided to the parameter conversion process are derived from the HOE construction technique used to fabricate holographic facets, namely; $\lambda_2$, the wavelength of the laser beam used during HOE construction; no, the average (i.e., bulk) index of refraction of the recording medium before fringe development processing; and $n_2$, the average index of refraction of the recording medium after fringe development processing.

As set forth in the table of FIG. 28D, the conversion process produces two output parameters, namely: $\theta_{i,2}$, the Angle of Incidence (Reference Beam Angle) $\theta_R$ for the second (construction) wavelength $\lambda_C$, and $\theta_{d,2}$, the Angle of Diffraction (Object Beam Angle) $\theta_o$ for the second (construction) wavelength $\lambda_C$, both defined in FIG. 13. These two parameters and the aberration correcting optics are used to configure the HOE recording system shown in FIG. 13. All other parameters comprising the process model are intermediate parameters inasmuch as they establish relationships between the input and output parameters of the conversion process. In FIGS. 28B, 28C1 and 28C2, these intermediate parameters are defined as follows: the incident angle $\alpha_1$ inside the medium after development processing; the incident angle $\beta_1$ inside the medium after processing; d, the surface inter-fringe spacing of the recorded fringes; Φ, the tilt angle of the Bragg Planes; $\theta_{0,1}$, the Angle relative to the Bragg planes; L, the separation of the Bragg planes, determined by the Bragg condition equation; $\theta_{0,2}$, the Angle relative to the Bragg planes for the second (i.e., construction) wavelength satisfying the Bragg condition, before fringe development processing; $\alpha_2$, the Angle of Incidence inside the recording medium for the second wavelength, before fringe developing processing; and $\beta_2$, the Angle of Diffraction inside the recording medium for the second wavelength, before fringe developing processing.

Using the input parameters defined above, the output parameters $\theta_{i,2}=\theta_o$ and $\theta_{d,2}=\theta_R$ can be readily computed using Equations No. 10 and 11 set forth in FIGS. 28C1 and 28C2. These two computed parameters, along with the previously determined index modulation $\Delta n_i$ and the aberration correcting optics can be collectively used to construct the i-th facet of the designed scanning disc using a laser beam having wavelength $\lambda_C$ and a recording medium having average indices of refraction $n_0$ and $n_2$ before and after fringe structure development, respectively. In the illustrative embodiment, the preferred recording medium is dichromated gelatin (DCG) having its maximum light sensitivity in the blue spectral range, and thus the necessary construction wavelength for exposing this recording medium can be produced by an Argon gas laser with a peak spectral output centered at about 488 nanometers. For each designed facet, a set of construction parameters are determined using the above-described method and thereafter used to physically construct a "master" facet at the second (construction) wavelength $\lambda_C$. The master facet can then be used to make one or more facet "copies" for mass production of the holographic scanning disk.

CONSTRUCTING A HOLOGRAPHIC LASER SCANNING DISC USING WAVELENGTH-CONVERTED CONSTRUCTION PARAMETERS

Figure 13:
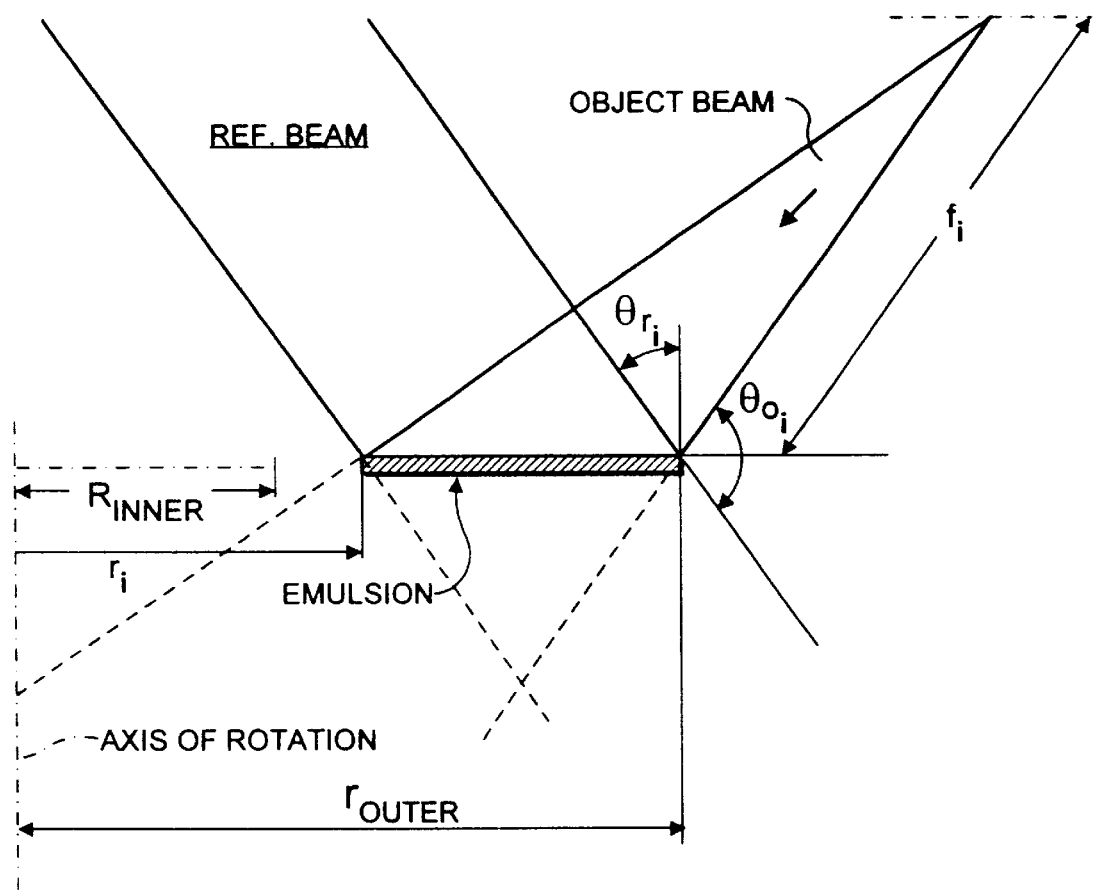
FIG. 13 is a geometrical optics model of a holographic recording system which can be used to construct each holographic scanning facet of the scanning disc of the present invention, using the construction parameters determined from the parameter conversion process illustrated in FIGS. 28A1 through 28D.

As shown in FIG. 13, each holographic facet is made by producing a reference laser beam from a laser source. By passing the reference laser beam through a beam splitter, an object laser beam is produced in a conventional manner and using anamorphic optics, an object beam is formed having beam characteristics which are specified by parameters $f_i$ and $\theta_{ri}$. Then as shown, both the reference beam and the object beam are directed incident upon a holographic recording medium (e.g., DCG) supported upon a substrate. The angle of incidence for the reference beam is specified by parameter $\theta_{i2}$, whereas the angle of incidence for the object beam is specified by the parameter $\theta_{d2}$, as shown. The geometrical configuration of this recording system is shown in FIG. 13 with all of the holographic facet recording parameters illustrated.

POST MANUFACTURE PARAMETER VERIFICATION

After constructing a holographic scanning disc in accordance with the teachings herein disclosed, it will be desired in many applications to verify that such scanning discs in fact embody the various features of the present invention. Inasmuch as the particular value of modulation index required for each facet is controlled by controlling laser power and gelatin quality during facet exposure, there is a degree of variability in facet light collection efficiency which can be expected in manufactured scanning discs. Also, inasmuch as it is impossible to maintain a perfect degree of uniformity in thickness in the emulsion layer of each facet during recording (i.e., exposure) operations, it can also be expected that the light collection efficiency of each facet may deviate slightly from its value determined during the disc design process. Consequently, there is a need during scanning disc manufacture to maintain accurate control over (i) the specified index modulation for each of the facets, as well as (ii) the uniformity of the emulsion layers of each of the facets. In order to maintain high quality control during the disc manufacturing process, it will be important to verify that the light collection efficiencies of the facets on each manufactured scanning disc are substantially equal in value, thereby allowing the use of low band-width photodetection and signal processing circuitry. The tool for computing Lambertian light collection efficiency, EL, illustrated in FIGS. 10J through 10L and described above, can be used to determine that the Total Light Collection Efficiency (i.e., $E_{Li} \cdot H_i$) of each facet on a manufactured scanning disc is substantially equal, as desired in nearly all holographic scanning applications.

LASER BEAM PRODUCTION MODULE OF THE FIRST ILLUSTRATIVE EMBODIMENT

Having described the overall system architecture of the scanner of the present invention and how to design and manufacture scanning disks for use in the same, it is appropriate at this juncture to now describe in great detail several different embodiments of the laser beam production module of the present invention, as well as different methods of designing and constructing the same.

Figure 14:
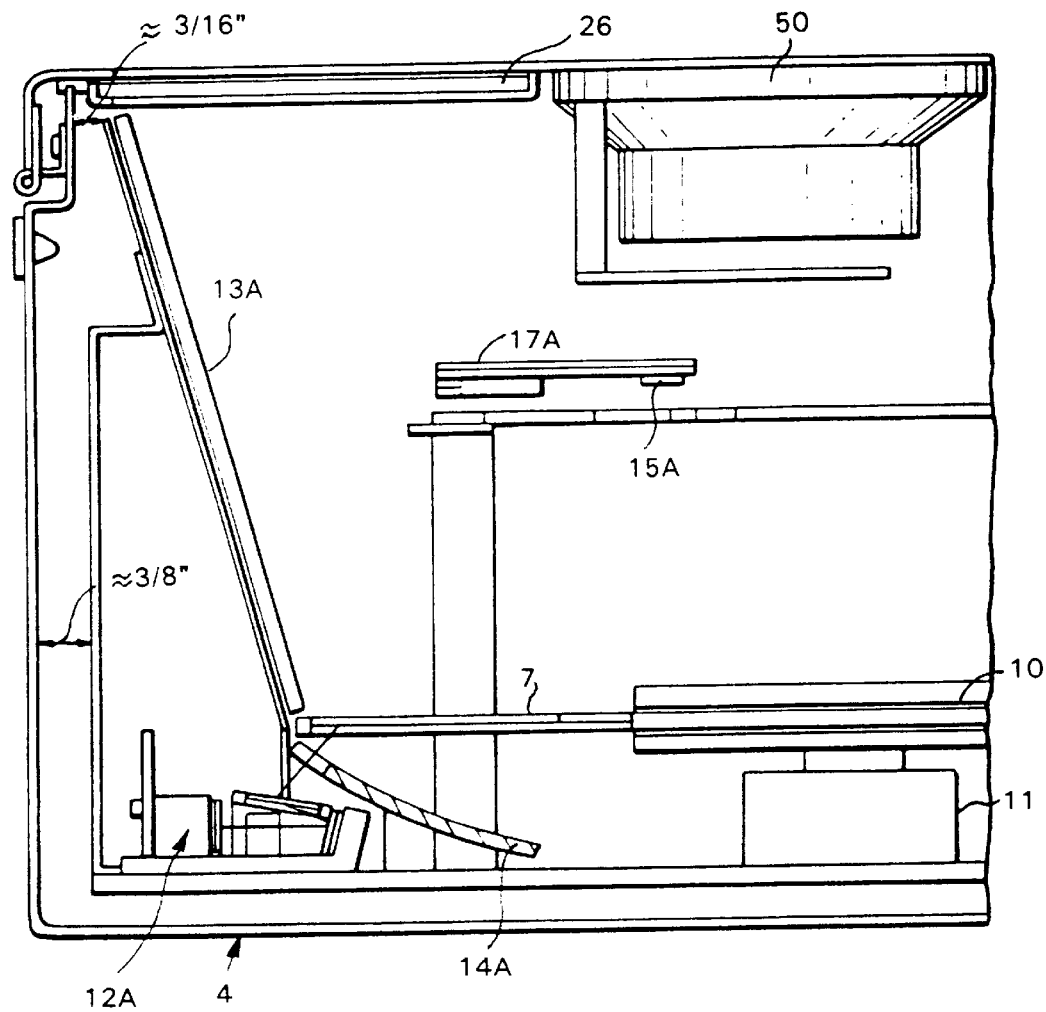
FIG. 14 is a partially cut-away, side cross-sectional view of one scanning channel of the laser scanning system of the first illustrative embodiment of the present invention, showing the scanning window of the scanner housing, the holographic scanning disc rotatably supported by the motor, the laser beam production module associated with the illustrated scanning channel, its beam folding mirror, parabolic light collecting mirror, and photodetector.

In FIG. 14, the laser beam production module of the first illustrative embodiment is shown installed within the holographic laser scanner of the present invention using a parabolic light collecting mirror disposed beneath the scanning disc at each scanning station provided therein. In FIG. 14A, the ray optics of such a scanning system are schematically illustrated. Notably, the laser beam production module has several functions. The module should produce a circularized laser beam that is directed at point $r_o$ on the rotating scanning disk, at the prespecified angle of incidence $\theta_i$ (i.e., $90°-A_i$), which, in the illustrative embodiment, is precisely the same for all facets thereon. Also, the module should produce a laser beam that is free of VLD-related astigmatism, and exhibits minimum dispersion when diffracted by the scanning disk.

In the first illustrative embodiment shown in FIGS. 15A through 15K, the module 12A comprises an optical bench 60 having several adjustable mechanisms for mounting components such as a VLD 53A (53B, 53C), an aspheric collimating lens 61, a prism 62, a mirror 63 and a light diffractive grating 64 having a fixed spatial frequency. These components are configured in such a manner so as to achieve the objects of the present invention. Prior to describing how to make and assemble the components of this module, it will be helpful to first describe the general structure of each of these basic components, including the adjustable mounting mechanisms provided by the optical bench thereof.

Figure 15:
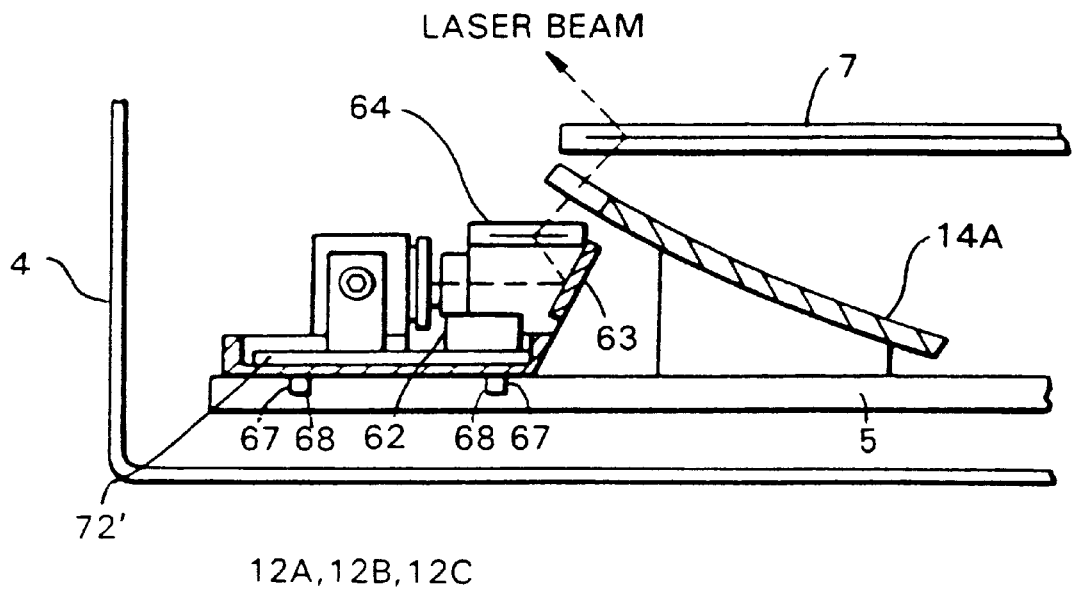
FIG. 15 is a plan view of the laser beam production module according to the first illustrative embodiment of the present invention comprising a visible laser diode (VLD), an aspherical collimating lens supported within gimbal-like adjustable mounting assembly, and a prism mounted upon a rotatably adjustable platform, and a beam direction changing mirror and a holographic light diffractive grating supported above the optical bench of module.
Figure 15A:
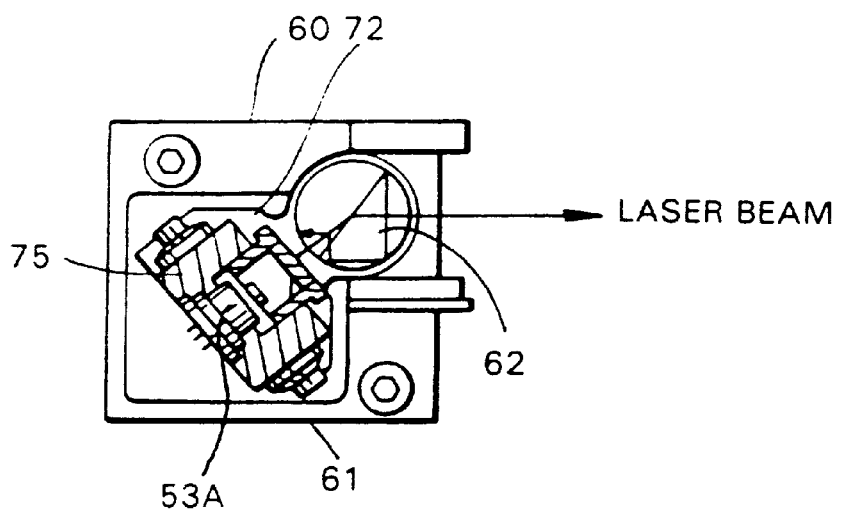
FIG. 15A is a plan view of the laser beam production module of FIG. 15, with the holographic light diffractive grating and planar mirror removed from the optical bench thereof.

As shown in FIG. 15, the laser beam production module of the first illustrative embodiment is mounted beneath the edge of the parabolic light focusing mirror, and below the associated beam folding mirror. As shown in FIG. 15A, the optical bench of the module comprises a point plate with a rotatable platform for mounting the prism and an adjustable subassembly for mounting the VLD and aspheric collimating lens as an integrated subassembly. The geometrical characteristics of prism 62 are illustrated in FIGS. 15I1 and 15I2, whereas the geometrical characteristics of mirror 63 and HOE plate 64 are shown in FIGS. 15J and 15K, respectively. As will become apparent hereinafter, the function of these adjustable platforms is to allow geometrical parameters defined among the optical components to be configured in a manner that results in beam circularization, astigmatism elimination, and beam dispersion minimization. The optical bench of the beam production module is mounted relative to the optical bench of the scanning system so that the produced laser beam is directed incident the scanning disk, at angle $A_i$ defined hereinabove.

As shown in greater detail in FIG. 15B and 15C, each module bench comprises a base portion 65, and an integrally formed grating/mirror support portion 66. As shown in FIG. 15C, the grating/mirror support portion 66 is disposed at an obtuse angle relative to the base portion so that the light diffractive grating 64 will be automatically oriented with respect to the scanning disc at a prespecified angle (determined during the module design method hereof) when the module bench 60 is mounted on scanner bench 5, such alignment is achieved by way of pins 67 on scanner bench 5 receiving alignment holes 68 formed in the underside of module bench 60, as shown in FIGS. 15 and 15A. The grating/mirror support portion 66 includes a side support surface 69 for supporting the planar mirror 63, and also a top support surface 70 for supporting the light diffractive grating (i.e., HOE plate). Grooves can be formed along these support surfaces in order to securely retain the mirror and the HOE plate.

As shown in FIG. 15B, the base portion also has a recess 71 within which pivot plate 72 is pivotally mounted from pivot point 72. As shown in FIGS. 15E1 and 15E2, pivot plate 72 has a first portion 72A upon which a cylindrical platform 73 is rotatably mounted, and a second portion 72B upon which VLD and aspheric lens mounting assembly is fixedly mounted. The function of cylindrical platform 73 is to provide a mounting surface for the prism. Any suitable adhesive can be used to secure the prism upon the top surface of platform 73. An adjustment screw can be provided adjacent to the platform so that the cylindrical disk can be secured in position when adjustment of the prism has been completed.

Subcomponents comprising the VLD and collimating lens mounting assembly are shown in FIGS. 15E1 through 15H2. As shown in FIG. 15F1 and 15F2, a VLD mounting yoke 75 is provided for pivotally supporting an optics telescopic assembly comprising the VLD block 76 shown in FIG. 15G1 and 15G2, and the lens barrel 77 shown in FIG. 15H1 and 15H2. The function of the VLD block 76 is to securely mount the VLD at one end thereof. The function of lens barrel 77 is to securely retain the aspheric collimating lens 61. A spring is located between the VLD housing and lens barrel for producing a resistive force against the threading action of the lens barrel while adjusting the VLD-to-lens distance parameter. Also, this spring functions to compensate for tolerances in the fit between the lens barrel and VLD block. This feature permits precise adjustment of d while using inexpensive, easy to manufacture components in mass production applications. The lens barrel and lens together are mounted within the other end of the VLD block, as shown. Threads 77A are provided on the exterior surface of the lens barrel, while matching threads 76A are provided on the interior surface of the bore 76B extending through the VLD block 76. The pin hole 75A in the base of VLD yoke 75 pivots about pivot pin 73C on the pivot plate. This arrangement allows the position of the aspheric collimating lens to be adjusted relative to the fixed position of the VLD, during a configuration procedure to be described in great detail hereinbelow. A spring 81 is inserted into the end of bore 76B which produces a resistive force against the lens barrel as it is threaded into the bore. When the VLD yoke, VLD, lens barrel and aspheric collimating lens are assembled together as a single adjustable subassembly, then the adjustable unit is pivotally supported in a gimbal like manner within the yoke by way of support pins 78A and 78B, shown in FIG. 15G1 which pass through bores 79A and 79B in yoke 75 and screw into thread holes 80A and 80B, respectively, in the VLD Block 76. This arrangement allows the direction of the laser beam from the lens barrel to be adjusted in the up and down direction, relative to the face of the prism and thus the planar mirror. Also, the pivotal mounting of the yoke relative to the base plate, permits the orientation of the yoke, and thus the direction of the laser beam, to be pivotally adjusted relative to the face of the prism during the configuration procedure. Additionally, the pivotal mounting of the pivotal base plate within the recess of the module optical bench allows the direction of the circularized beam emerging from the prism to be adjusted relative to the planar mirror. As will become apparent below, this adjustment mechanism permits the scanner designer to properly configure the components of the VLD so that the above objectives are satisfied in accordance with the principles of the present invention.

Figure 16:
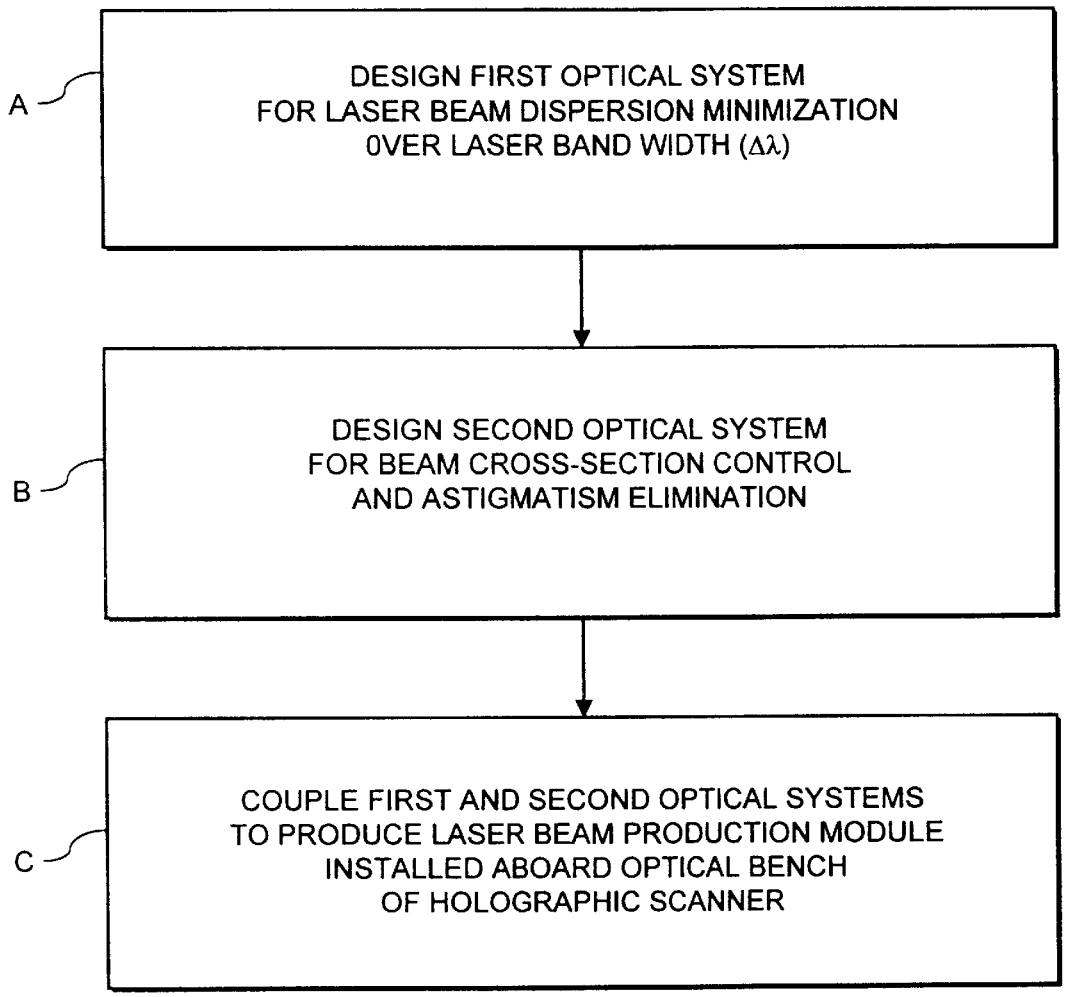
FIG. 16 is a flow chart illustrating the steps of the method used to design the laser beam production module of the first illustrative embodiment of FIG. 15A, using the module components shown in FIGS. 15B through 15K.

As shown in FIG. 16, there are three basic steps involved in the design of a laser beam production module according to the teachings of the present invention.

As indicated at Block A in FIG. 16, the first step of the module design method involves designing a first optical system comprising the i-th facet and the fixed spatial frequency diffraction grating within the laser beam production module. The sole function of this optical system is to substantially eliminate laser beam dispersion during the diffraction of the incident laser beam through the rotating scanning disc. In the first illustrative embodiment, the first optical system comprises fixed spatial-frequency diffraction grating (i.e. plate) 64 and the i-th facet previously designed using the disc design method of the present invention. As indicated at Block B, the second step of the method involves designing a second optical system comprising the VLD 53A, aspheric collimating lens 61 and prism 62, configured so as to circularize the laser beam produced from the VLD and eliminate astigmatism in the circularized beam beyond the prism. The third and final step is to couple the first and second optical systems by way of planar mirror 63 so as to form the laser beam production module of the first illustrative embodiment, shown in FIGS. 15A through 15K. Thereafter, the module can be parametrically configured and installed within the holographic laser scanner. The details of this process will be described hereinbelow.

Figure 17A:
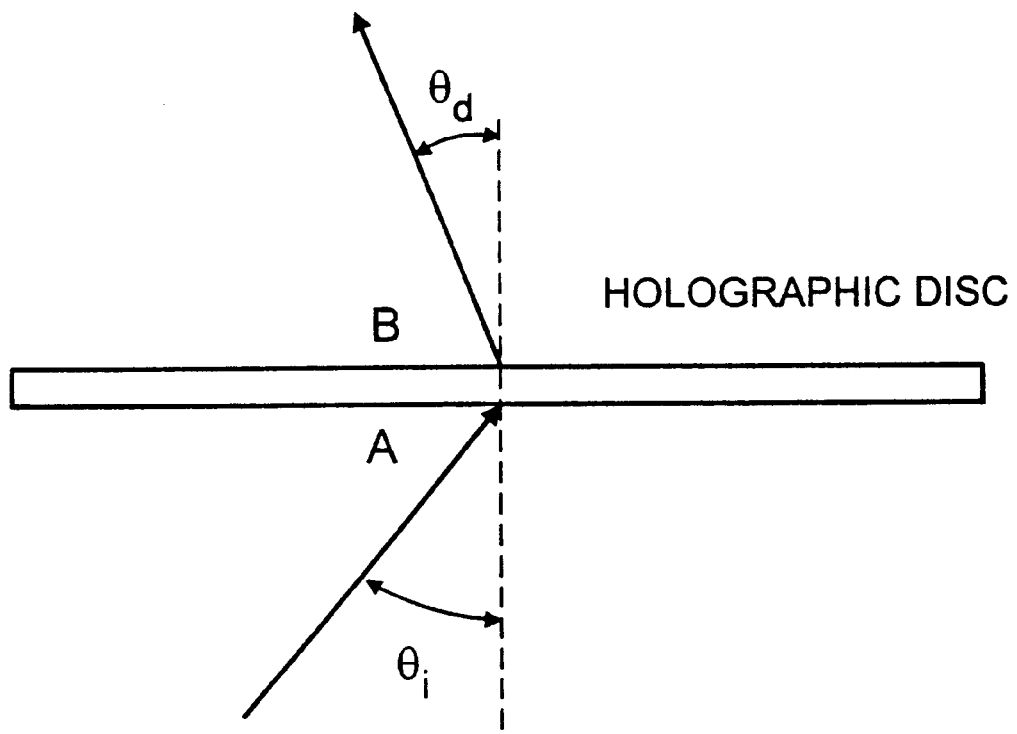
FIG. 17A is a geometrical optics model of a holographic light diffractive grating illuminated with a laser beam produced from a conventional visible laser diode (VLD)
Figure 17D:
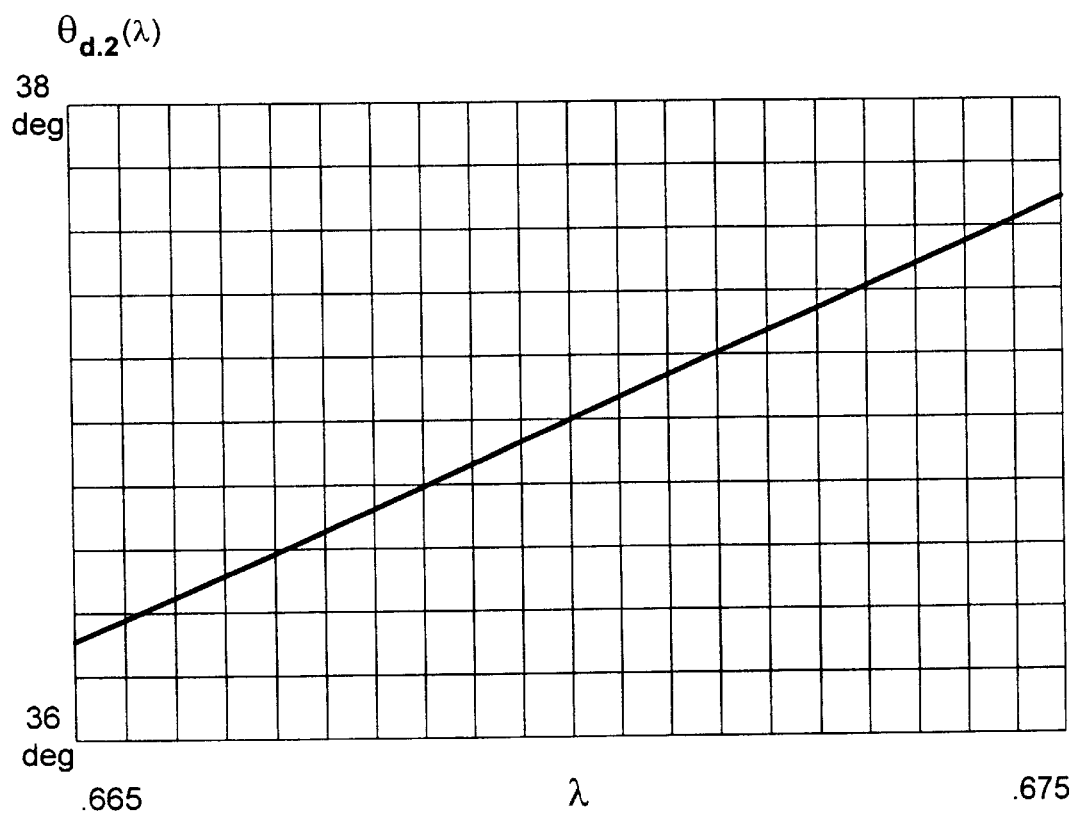
FIG. 17D is a graphical plot of the diffraction angle of an outgoing laser beam versus the wavelength of the incident laser beam, showing the strong functional dependence of the outgoing diffraction angle on the wavelength of the incident laser beam.

In FIG. 17A, the problem of beam dispersion during laser beam diffraction through the scanning disc hereof is schematically illustrated. The parameters used to construct the geometrical optics model of the beam diffraction process are shown in FIG. 17B. The relationship between the grating parameters and the diffraction angle and the diffraction angle and the wavelength of the spectral components of the laser beam are defined in FIG. 17C. The graphical plot of diffraction angle versus wavelength shown in FIG. 17D explains why an incident laser beam produced from a conventional VLD tends to disperse as it is diffracted across the scanning facet. The various spectral components associated with the VLD beam, due to superluminescence, multi-mode oscillation and mode hopping, exit the HOE facet on the scanning disc at different diffraction angles dependent on the wavelength thereof. The wavelength dependency of the diffraction angle is illustrated in 17D.

In order to minimize wavelength-dependent dispersion at each facet along the scanning disc of the present invention over the wavelength range of concern (e.g., 600 to 720 nanometers), the diffraction grating in the first optical system described above is positioned at a tilt angle ρ, defined as shown in FIG. 18A. The mathematical expression describing the relationship between the incidence angle $\theta_{i1}$, the diffraction angle $\theta_{dc1}$ at the reconstruction wavelength, the wavelength of the incident beam $\lambda_c$ and the grating spacing $d_1$ is described by Expression No. 1 in FIG. 18C. This equation is simply the grating equation which describes the behavior of fixed frequency diffraction gratings, such as the compensation plate 63 used in the first optical system. Then using algebraic techniques upon Expression No. 1, an expression for $\theta_{d1}$ ($\lambda$) can be derived as provided by Expression No. 3 in FIG. 18C. The relationship between the angle of diffraction of the diffraction grating $\theta_{dc1}$, the angle of incidence at the i-th facet $\theta_{i2}$ and the tilt angle $\eta$ is described by Expression No. 2 in FIG. 18C.

This mathematical expression is derived using a number of well known trigonometric relations. While each HOE facet on the designed scanning disc has a variable frequency fringe structure in order to realize its focal length $f_i$, the design procedure models each facet as if it were a fixed frequency grating. This assumption can be made without introducing significant error in the design as the goal of the first optical system is to minimize the beam dispersion through the HOE facets over the range of diffraction angles for which the facets have been previously designed to produce the prespecified scanning pattern. In the illustrative embodiment, the range of diffraction angles is from about 26.6° to about 47.5°, with the average diffraction angle being about 37 degrees. Thus this average diffraction angle 37° will be selected as the diffraction angle used to design the first optical system. This diffraction angle is indicated by $\theta_{dc2}$ in the geometrical optics model, and describes the average direction in which the diffracted laser beam is directed towards the beam folding mirrors in the scanning system. Using the above assumption about each HOE facet on the scanning disc allows the facet in the first optical system to be modelled by the well known diffraction equation, expressed in the form of Equation No. 3 set forth in FIG. 18C.

In order to complete the design of the first optical system, it is necessary to find a set of values for the parameters representing the first optical system which results in minimizing the deviation of the average diffraction angle $\theta_{d2}$ over the range of spectral wavelengths that can be expected to be produced from a conventional VLD used to construct the designed laser beam production module. Ideally, the deviation is zero over the wavelength range of interest; however, this is not achievable in practice. Instead, this deviation is minimized over the wavelength range of interest. Finding the set of parameters that will achieve this objective can be achieved by the following procedure.

Figure 18D:
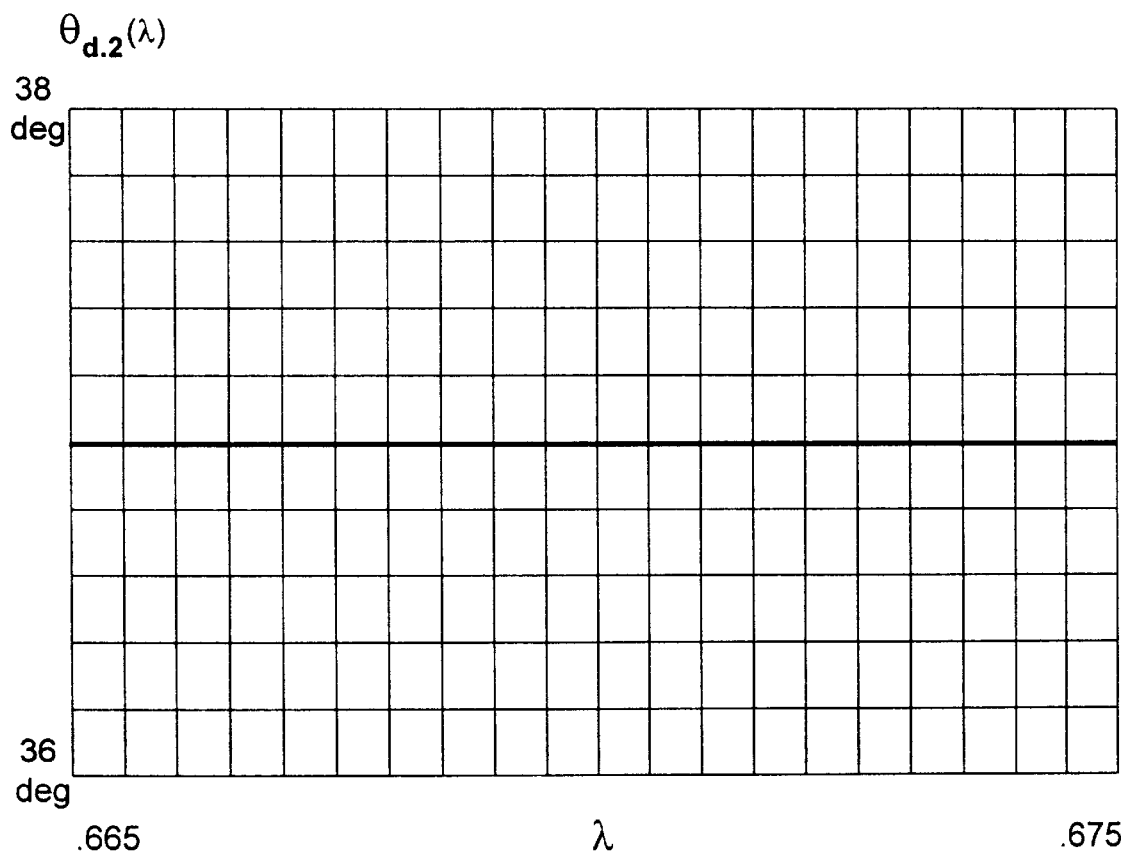
FIG. 18D is a graphical plot of diffraction angle of the outgoing laser beam versus the wavelength of the incident laser beam, for diffraction angles about the center portion of the diffraction angle range, showing the substantial independence of the angle of diffraction of the outgoing laser beam on the wavelength of the incident laser beam as a result of the optical arrangement of the present invention.
Figure 19A:
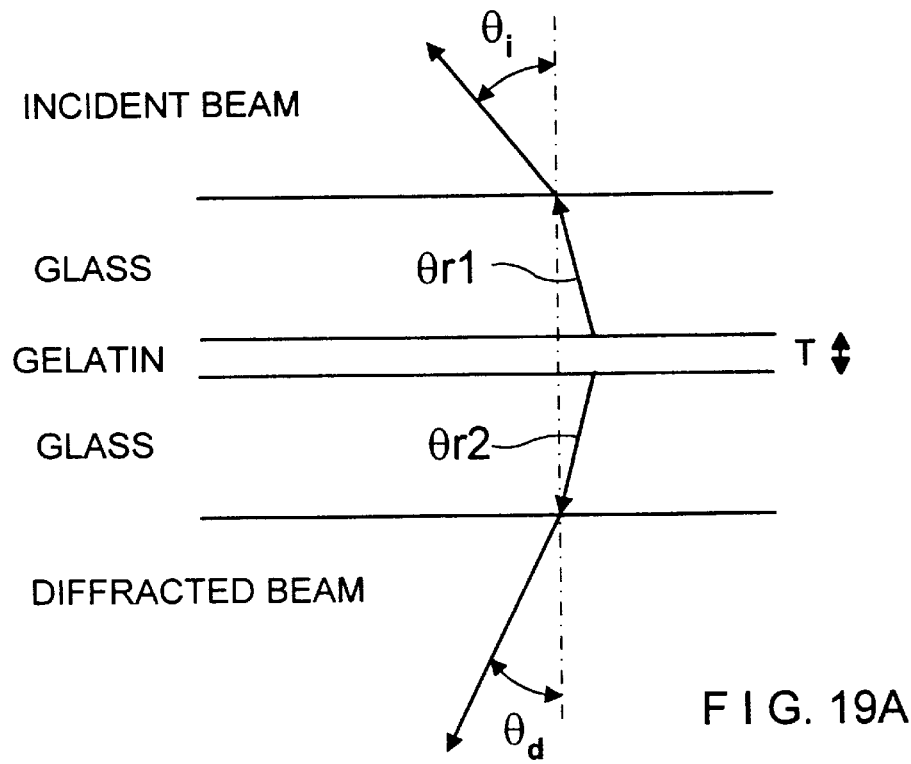
FIGS. 19A and 19B provide a geometrical optics model for an exemplary holographic scanning facet, showing the various parameters used during both construction and reconstruction processes, and conversion from the reconstruction wavelength to the construction wavelength.
Figure 19B:
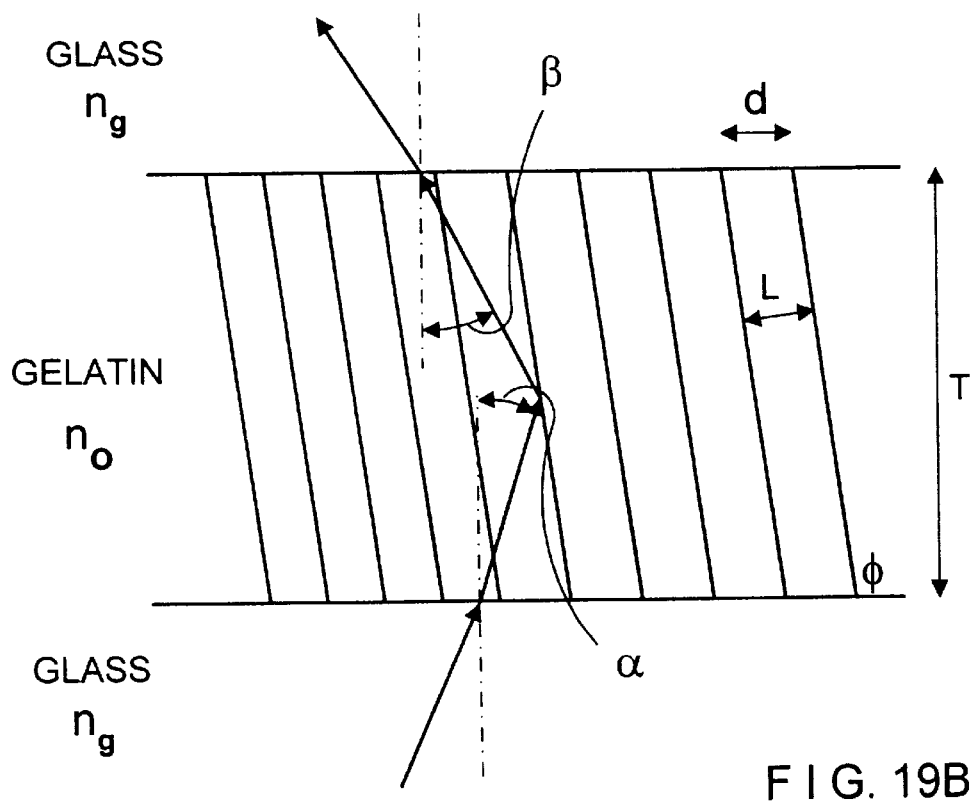
Figure 19F:
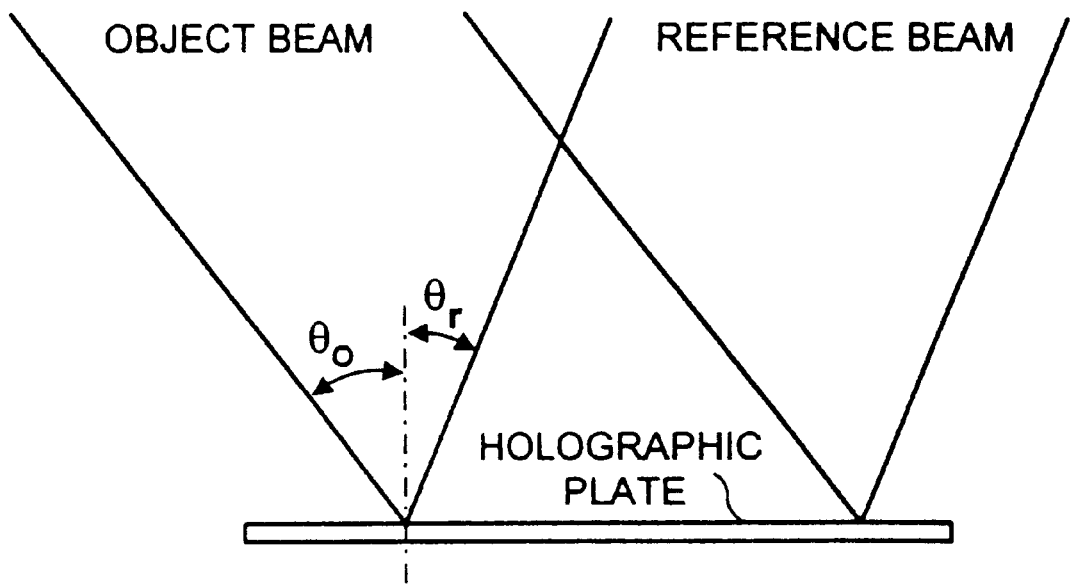
FIG. 19F is a geometrical optics model of a system used for constructing the holographic scanning facets using the construction parameters determined using the design process of the present invention.

Using Expression No. 3 in FIG. 18C, the system designer selects the value of incidence angle Oil required by scanner height and width dimension constraints, and thereafter evaluates Expression No. 3 for the range of wavelength values $\lambda$ of interest. During this evaluation step, an initial value for the tilt angle $\rho$ is selected, whereas parameters $\theta_{i2}$, $d_2$ and $\lambda_R$ indicated in Expression No. 3 are known or derivable from the previous disc design process. In particular, $d_2$ is arrived at by selecting the average fringe spacing among the numerous variable frequency holographic facets realized on the previously design scanning disc. For a large number of different wavelength values within the $\lambda$ range, the diffraction angle $\theta_{d2}$ is then calculated so that the $\theta_{d2}(\lambda)$ can be plotted as a function of wavelength $\lambda$, as shown in FIG. 18D. From this plot, the deviation can be determined and if it is not acceptable,then the above process is repeated using a different tilt angle $\rho$ until the plot $\theta_{d2}(\lambda)$ has an acceptable deviation over the wavelength range of interest. After several interactions, an acceptable parameter value for tilt angle $\rho$ will be found. At this stage of the design process, the incidence angle parameter $\theta_{i1}$, the construction angle of diffraction $\theta_{dc1}$ and the specified nominal reconstruction wavelength $\lambda_R$ provide a set of parameters sufficient to construct the diffraction grating (i.e., wavelength compensation plate) while the tilt angle $\rho$ is sufficient to mount the diffraction grating relative to incidence point $r_0$ on the scanning disc so that beam dispersion is minimized over the range of spectral wavelengths produced by the VLD during beam scanning operations. A set of parameters found to minimize beam dispersion over the output bandwidth of the VLD are set forth in FIG. 18B1. These parameters are based on the disc design parameters for the scanning disc and scanning pattern of the illustrative embodiment. As shown in FIG. 18D, these parameters result in diffraction angles $\theta_{d2}$ which are substantially the same for various spectral components within the output bandwidth of the VLD. In practical terms, this means that each of these spectral components in the incident circularized laser beam will be diffracted at substantially the same angle from the scanning disc, minimizing the dispersion of the diffracted scanning beam.

Notably, the above-described method of designing the first optical system of the laser beam production module provides the system designer with two degrees of design freedom as either the incidence angle $\theta_{i1}$ or the tilt angle $\rho$ can be used as a design variable while the other is used as a design constraint. This inventive feature allows the angle of incidence $\theta_{i1}$ to be markedly different from angle of diffraction $\theta_{d2}$, while nevertheless minimizing beam dispersion through the scanning disc over the spectral bandwidth of the laser beam produced from the VLD. The design method permits the incidence angle $\theta_{i1}$ to be any one of a large range of values which allows the constructed laser beam production module to be physically mounted on the system optical bench between the optical bench and the scanning disc, within the width dimension constraints of the scanner housing. The design method also permits the tilt angle $\rho$ to be any one of a large range of values which provides the designer great flexibility in mounting the laser beam production module relative to the scanning disc and parabolic light collecting mirror disposed therebeneath. These features of the present invention assist the system designer in designing and constructing a holographic laser scanner having a scanner housing volume which has been minimized in relation to its specified scanning volume.

Having designed the diffraction grating employed in the first optical system of the laser beam production module, it is appropriate to briefly address the construction of the same. Typically, there will be a great need to mass manufacture laser beam production modules embodying "wavelength-compensation" diffraction gratings, of the type described above. Thus, holographic mastering techniques are ideally used. While any suitable mastering technique can be used, it will be necessary in nearly all instances to holographically record the master diffraction gratings at a recording wavelength $\lambda_C$ which is different than its reconstruction wavelength $\lambda_R$. The reason for this is generally well known: it is difficult to make holographic gratings with high fringe-contrast at the reconstruction wavelength $\lambda_R$, which in the illustrative embodiment is about 670 nanometers. Instead, it is easier to record the gratings at a spectral wavelength at which high-contrast fringes can be realized and then playback at the wavelength of the VLDs in the scanner. Presently, the preferred recording medium for recording diffraction gratings with high-contrast fringes is Dichromated Gelatin (DCG)) which exhibits its greatest sensitivity near 480 nm. Thus, a blue laser beam is required during recording. In order to record the diffraction grating at its construction wavelength, and then reconstruct the same at another wavelength, it is necessary to translate (i.e., convert) its complete set of construction parameters $\{\theta_{i1}, \theta_{dc1}\}$ expressed at the reconstruction wavelength $\lambda_R$, into a complete corresponding set of parameters expressed at the specified construction wavelength $\lambda_C$. The process illustrated in FIG. 19A through 19E is virtually identical to the process shown in FIGS. 28A1 through 28D and can be used to carry out the necessary parameter conversions. Details regarding the process of 19A through 19E can be found by referring to the description of the process of FIGS. 28A1 through 28D detailed above. Thereafter, using the converted set of construction parameters, the holographic diffraction gratings can be made using the converted set of construction parameters and the holographic recording system schematically represented in FIG. 19F.

In the illustrative embodiment, the preferred recording medium for the diffraction grating of the laser beam production module is DCG having its maximum light sensitivity in the blue spectral range, and thus the necessary construction wavelength for exposing this recording medium can be produced by an Argon gas laser with a peak spectral output centered at about 488 nanometers. The set of construction parameters determined using the above-described conversion method can be used to physically construct a "master" diffraction grating at the second (construction) wavelength $\lambda_C$, and then one or more grating "copies" can be made from the master diffraction grating for mass production of the laser beam production modules.

After completing the design of the first optical system of the laser beam production module, the second step of the design method involves designing the second optical system thereof. As mentioned above, the function of the second optical system comprising the VLD, aspheric collimating lens and the beam circularizing prism, is to circularize the laser beam produced from the VLD and completely eliminate astigmatism along the circularized beam from a point beyond the second surface of the beam expanding prism. In order to design such an optical system, the present invention teaches geometrically modelling the production of the laser beam from a semiconductor VLD, while describing the phenomenon of astigmatism inherently introduced along the produced laser beam. This novel modelling technique will be described in detail below.

In FIG. 20, a geometrical model is provided for a semiconductor VLD which produces a laser beam having astigmatism inherently introduced along the laser beam. In general, it is well known that the laser beam produced from conventional VLDs has two different beam components, namely: a first beam component having a very narrow dimension which is parallel to the width dimension of the VLD junction (i.e., resonant cavity); and a second beam component having a very wide dimension which is parallel to the height of the VLD junction. For purposes of exposition, the first beam component shall be referred to as the "P external wavefront" of the produced laser beam, whereas the second beam component shall be referred to as the "S external wavefront" of the produced laser beam. These designations S and P refer to conceptual cylindrical wavefronts which spread in a direction perpendicular (S) or parallel (P) to the LVD junction and are not to be confused with the S wave-polarization and the P wave-polarization directions of the incident laser beam at the scanning disk surface, defined hereinabove. As illustrated in FIG. 20, the "S external wavefront" of the produced laser beam is deemed to originate from an "effective S source" located within the volumetric extent of the VLD junction, whereas the "P external wavefront" of the produced laser beam is deemed to originate from an "effective P source" located within the volumetric extent of the VLD junction. Inasmuch as the "effective P source" is spatially separated from the "effective S source" by some distance $\delta$, referred to as the "astigmatic difference" inherent in each VLD and statistically varying from VLD to VLD, the geometrical model predicts that the "S external wavefront" will diverge at a rate different than the "P external wavefront" along the produced laser beam and therefore the laser beam will exhibit astigmatism in the well understood sense. According to this geometrical model, nearly all of the power of these external wavefront components reside in the Electric Field vector of these electromagnetic wavefronts and the polarization thereof is parallel to the width dimension of the VLD junction, which is commonly referred to as "transverse electric" polarization, or the TE mode of oscillation of the VLD. According to the model, the S point source produces a cylindrical wavefront whose center of curvature is located at the S source, whereas the P point source produces a cylindrical wavefront whose center of curvature is located at the P source. Details concerning the physics of VLDs can be found in "Heterostructure Lasers" Parts A and B by H. C. Casey, Jr. and M. B. Panish, Academic Press 1978. Notwithstanding this fact of VLD physics, it is important to understand that the "effective S source" and the "effective P source" are constructions of the geometrical model which have been developed for the purpose of designing the second optical system of the laser beam production module of the present invention in accordance with the objects of the present invention. While there may be structural correspondence between the "effective S source" and junction geometry and between "effective P source" and junction geometry, there is no need to specify such correspondences herein for purposes of the present invention. What is important to practicing this aspect of the present invention is to employ this novel geometrical model of the VLD in order to design the second optical system as will be described hereinbelow. The advantage in doing so will become apparent hereinafter.

The method of designing the second optical system proceeds by modelling the VLD with the geometrical model of FIG. 20 in relation to a geometrical optics model of the aspheric collimating lens and the beam circularizing prism, as shown in FIG. 20A. In FIGS. 20B1, 20B2 and 20B3, the geometrical optics model of the second system of the laser beam production module is shown in greater detail. In particular, these figure drawings graphically illustrate the geometrical and optical parameters used to construct the geometrical optics model of the second system, namely: the location of the effective sources of the S and P wavefronts associated with the VLD; $\delta$, the astigmatic difference of the VLD, defined as distance between the effective sources of the S and P wavefronts; $f_1$, the focal length of the aspheric collimating lens; d, the distance between the focal point of the aspheric collimating lens and the S wavefront (i.e., Beam) source; $D_1$, the diameter of the P wavefront (i.e., Beam) leaving the aspheric collimating lens; $D_2$, the expanded diameter of the P wavefront leaving the prism; M, the beam expansion factor characteristic of the beam expanding prism, defined as $D_2/D_1$; n, the refractive index of the prism material; $\theta_{Pi1}$, the angle of incidence of the lower portion of the converging P beam at the face of the prism; $\theta_{Pi2}$, the angle of incidence of the upper portion of the converging P beam at the face of the prism; $\Phi_{P2}$, the angle of convergence of the P beam leaving the aspheric collimating lens; $\Phi_{S1}$, the angle of convergence of the S beam leaving the aspheric collimating lens; $\Phi_{P2}$, the angle of convergence of the P beam leaving the prism; $\Phi_{S2}=\Phi_{S1}$, the angle of convergence of the S beam leaving the prism; $L_{P1}$, the image distance for the P source imaged by the aspheric collimating lens; $L_{P2}$, the image distance for the P source after inserting the beam expanding prism; $L_{S1}$, the image distance for the S source imaged by the aspheric collimating lens; $L_{S2}=L_{S1}$, the image distance for the S source after inserting the beam expanding prism; $\theta_{Pr1}$ the angle of refraction of the lower portion of the converging P beam in the prism; $\theta_{Pr2}$, the angle of refraction of the upper portion of the converging P beam in the prism; $\alpha$, the prism apex angle which equals $\theta_{Pr1}$ by design for sake of convenience; $\theta_{Pi3}=\theta_{Pr1}-\theta_{Pr2}=\alpha-\theta_{Pr2}$, the angle of incidence of the upper portion of the converging P beam at the second surface of the prism; and $\theta_{Pr3}=\Phi_{P2}$ the angle of refraction of the upper portion of the converging P beam leaving the second surface of the prism. Collectively, these parameters constitute the geometrical optics model of the second optical system. Notably, the distance between the first surface of the prism and the principal plane of the collimating lens need not be considered as a parameter to the model provided that the entire cross-sectional diameter of the beam is incident (i.e., falls) upon the first surface of the prism, which is a very easy assumption to satisfy in practice.

In FIG. 20C1, a set of assumed values are presented for various parameters in the model which can remain fixed during the design process. In FIG. 20D, a set of equations are provided which define particular relationships between certain parameters in the geometrical optics model of the second optical system. The MATHCAD tool available within the HSD Workstation of the present invention can be used to realize the geometrical optics model of the second optical system. As clearly illustrated, Expressions No. 1 to 13 in FIG. 20D lead to the derivation of expressions for $L_{P2}$ and $L_{S2}$, the distances of the image of the P source and the image of the S source after being imaged through the aspheric collimating lens and the beam expanding prism. From these functions, the curvature of the S cylindrical wavefront as it immediately emerges from the second surface of the prism can be defined as $1/L_{S2}$, whereas the curvature of the P cylindrical wavefront as it immediately emerges from the second surface of the prism can be defined as $1/L_{P2}$. Expressed in other words, the radius of curvature of the S cylindrical wavefront as it immediately leaves the second surface of the prism is given by $1/L_{S2}$, whereas the radius of curvature of the P cylindrical wavefront as it immediately leaves the second surface of the prism is given by $1/L_{P2}$.

It is well known that each VLD having a non-zero astigmatic difference, defined herein as $\delta$, will produce a laser beam which exhibits astigmatic properties. However, it has been discovered that, for each non-zero value of $\delta$ and assumed values of incidence angles $\theta_{Pi1}$, and $\theta_{Pi2}$, there exists a realizable value of d, at which the S and P cylindrical wavefronts leaving the second surface of the prism have equal radii of curvature, as indicated in the plot shown in FIG. 20E. Under such optical conditions, both the S and P cylindrical wavefronts emerging from the second surface of the prism are converging along the outgoing optical axis of the prism at the same rate (by virtue of their equal radii of curvature) and the resulting wavefront is spherical and free of astigmatic aberrations associated with the non-zero inherent astigmatic difference in the VLD. Through rigorous quantitative analysis, it has also been discovered that small changes in the angles of incidence $\theta_{Pi1}$ and $\theta_{Pi2}$ have a significant effect in altering the radius of curvature of only one of the cylindrical wavefronts (P wavefront) while minimally affecting the radius of curvature of the P wavefront. Notably, this condition exists because in the geometrical optics model of the VLD, the P-source resides further away from the principal plane of the aspheric collimating lens than does the S-source. Consequently, the mathematical structure of the geometrical model for the second optical system suggests that parameters d, $\theta_{Pi1}$, and $\theta_{Pi2}$ be selected as "adjustable parameters" used during the parameter adjustment procedure hereof so that the above-described optical conditions are satisfied and the astigmatism eliminated.

In view of these discoveries, it will be helpful to briefly discuss the optical function that each of the components performs in the second optical system when its parameters are configured in the astigmatism-elimination case described above. Firstly, as stated above, the S and P sources represented within the VLD produce cylindrical wavefronts emanating from the location of these S and P sources, respectively. The function of the aspheric collimating lens is to pass the S and P wavefronts, while changing the radius of curvature for both of these wavefronts, as well as their apparent center of curvature. Notably, in the second optical system, both the S and P wavefronts are assumed to propagate on axis, and therefore off-axis aberrations will be negligible and thus need not be considered. The function of the prism is to significantly change the radius of curvature of only one of these cylindrical wavefronts, while minimally changing the radius of curvature of the other cylindrical wavefront. This significant degree of change in the radius of curvature is a strong function of the angles of incidence $\theta_{Pi1}$ and $\theta_{Pi2}$ measured with respect to the first surface of the prism. This functional relationship and the manner in which such dependency is established among the various parameters in the Mathcad model, can be readily seen by carefully examining Expressions No. 2 through 13 set forth in FIG. 20D. Most importantly, the above analysis reveals that the design method of the present invention provides the designer with two degrees of freedom when finding the set of parameters that satisfies the optical condition illustrated in the plot shown in FIG. 20E. In particular, the scanner designer may select a given value for the prism incidence angles $\theta_{Pi1}$ and $\theta_{Pi2}$ (i.e., the prism tilt angle $\theta_{Prism-tilt}$) and then find the parameter value for d (i.e., the distance from the focal length of the collimating lens to the S source), which eliminates astigmatism at the second surface of the prism. Alternatively, the scanner designer may select a given value for the distance d, (i.e., by setting the VLD-to-lens separation D to an initial value) and then find the parameter values for the prism tilt angle $\theta_{Prism-tilt}$ which eliminates astigmatism at the second surface of the prism. This is a very important fact inasmuch as it will be desirable in many applications to control the ellipticity (i.e., aspect ratio) of the spherical converging wavefront produced from the second surface of the prism. With this degree of freedom available in the second optical system of the present invention, the ellipticity of the spherical wavefront from the second surface of the prism can be easily controlled by selecting the appropriate prism incidence angles $\theta_{Pi1}$ and $\theta_{Pi2}$. This feature of the present invention is of great value in many scanning applications. In particular, when scanning dot-matrix codes on poorly printed codes, it will be desirable to produce laser beams having an aspect-ratio so that the beam height is greater than the voids present between code elements (e.g., bars). The use of such laser beams has the effect of averaging out such voids and thereby improves the first-pass read rate of such codes.

In any particular design application, the approach that will be used will depend on, for example, the physical constraints presented by the holographic scanner design. In order to find the distance d or prism tilt angle $\theta_{Prism-tilt}$ at which the optical condition of FIG. 20E is achieved, two different parameter adjustment procedures have been developed. As will be described in greater detail below, these techniques are based on the mathematical structure of the model used to find the conditions at which astigmatism is eliminated while the elliptically shaped laser beam is circularized while passing through the prism of the second optical system of the laser beam production module of the first illustrative embodiment.

In practice, it is not feasible to empirically measure the astigmatic difference δ for each VLD to be used in the construction of a laser beam production module. Consequently, it is not feasible to use Expressions 14 and 15 in FIG. 20D to compute the distance d for selected values of incidence angles $\theta_{Pi1}$ and $\theta_{Pi2}$ using the mathematical expressions for the S and P source image distances. Instead, the approach adopted by the design method of the present invention is to exploit the two degrees of freedom in the geometrical model of the second optical system and provide two different procedures which may be used to adjust (i.e., configure) the parameters of the system to eliminate astigmatism, circularize the laser beam, and optionally to adjust the focal point of the spherical converging wavefront (i.e., the resulting beam) emerging from the second surface of the prism. To avoid obfuscation of the present invention, these two techniques will be first described in general terms, with explanation of how the various steps in the procedures affect geometrical properties of the S and P cylindrical wavefronts, as well as the resulting spherical wavefront produced from the second surface of the prism. Thereafter, two illustrative embodiments of these parameter adjustment techniques will be described with reference to the parameter adjustment system according to the present invention shown in FIG. 21A, which can be used to adjust the geometrical and optical parameters of assembled laser beam production modules so that the various objects of the present invention are achieved therein.

Figure 21A:
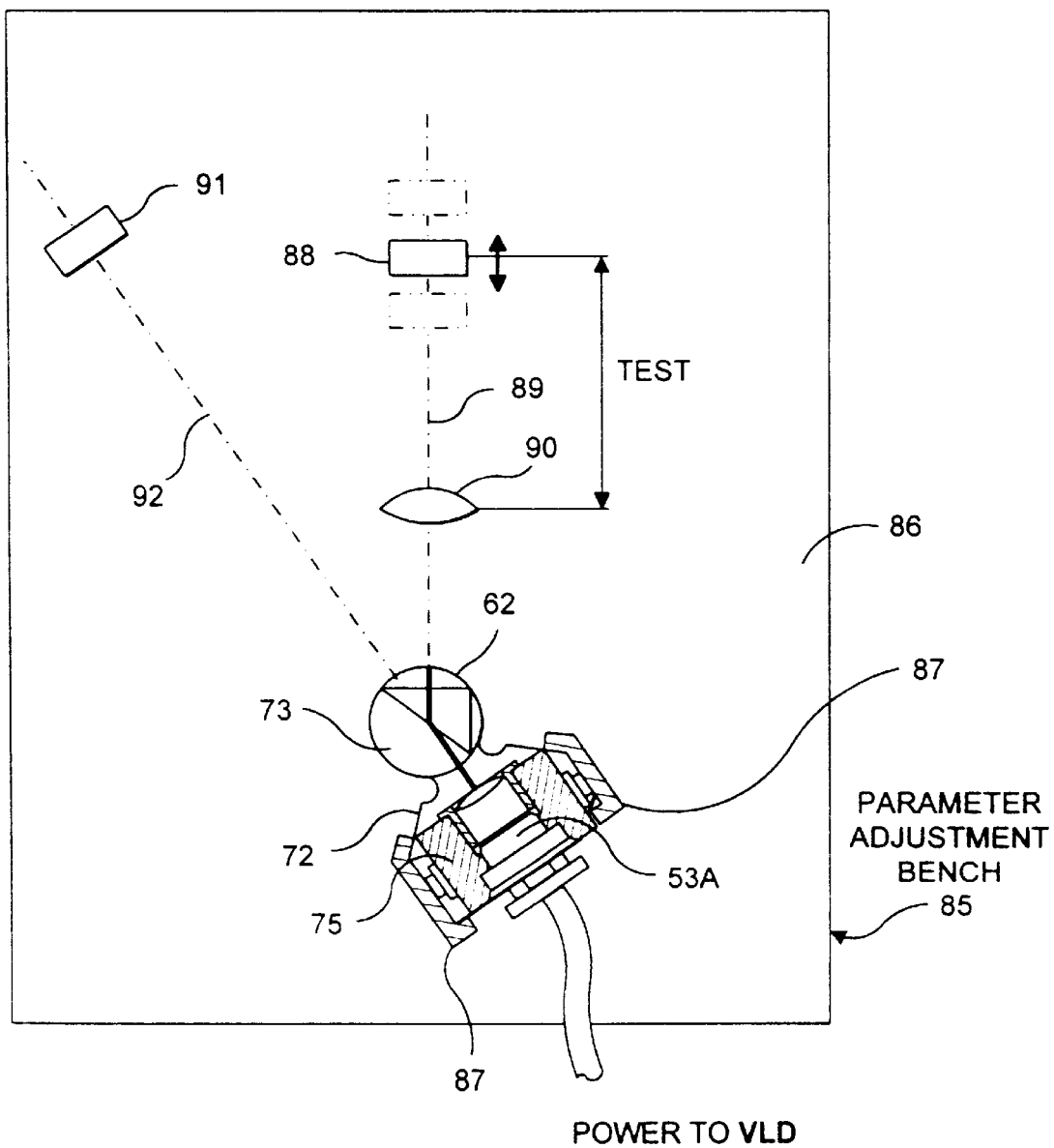
FIG. 21A is a schematic diagram of an optical system used in aligning the components of the first optical system in the laser beam production module of the first illustrative embodiment, so that astigmatism beyond the prism is reduced to zero.

In general, the function of the parameter adjustment system 85 of FIG. 21A is to allow the prism tilt angle, $\theta_{Prism-Tilt}$ and distance d, to be adjusted during the assembly/alignment procedure so that an astigmatism-free laser beam with a desired aspect-ratio is produced. Notably, by definition of parameter d in FIG. 20A, adjustment thereto can be achieved by simply adjusting the VLD-to-lens separation D. As shown, the parameter adjustment system 85 comprises an optical bench 86 upon which a pivot plate mounting fixture 87 is stationarily mounted. The function of the pivot plate mounting fixture is to mount during the parameter alignment procedure, pivot plate 72 carrying an optical subassembly comprising the VLD, the barrel, the lens mount, and the yoke. A beam scanning device 88, such as Model No. 1180-GP from Photon, Inc., is mounted on the optical bench of the parameter adjustment system along a first optical axis 89 which passes through test focusing lens 90, the optical axis of the second surface of the prism when the prism platform 73 with the prism thereon is mounted within second recess in the pivot plate. Also, a beam detector (e.g., quadrant detector) 91 is mounted on the optical bench along an optical axis 92 which passes through the center of the first surface of the prism when the prism platform with the prism thereon is mounted within the second recess in the pivot plate.

Figure 21B:
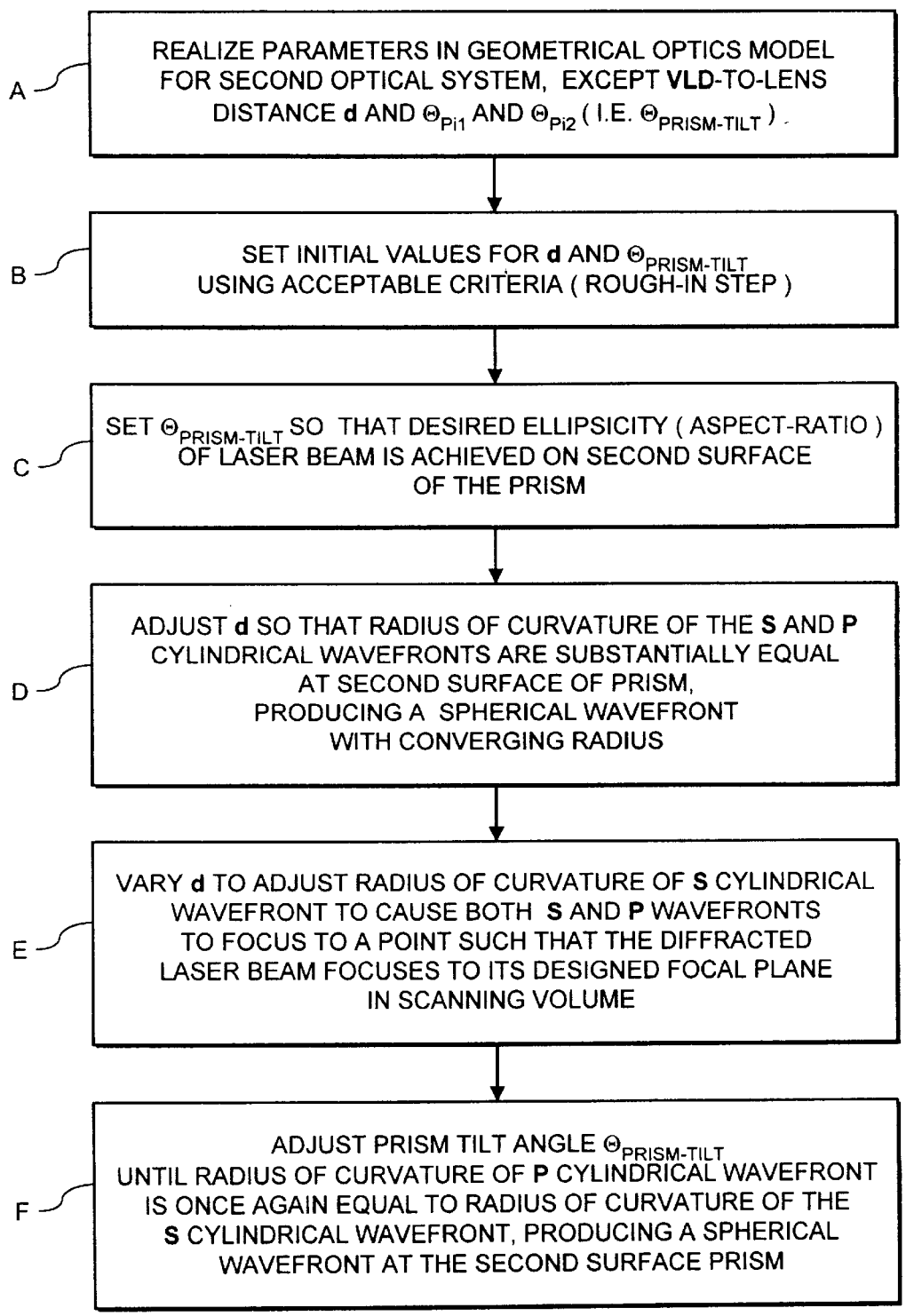
FIG. 21B is a flow chart indicating the steps of a procedure used to align the components of the first optical system in the laser beam production module of the first illustrative embodiment, so that a desired beam aspect ratio (i.e., "1" for circular beam cross-section) is achieved and astigmatism in the laser beam beyond the second surface of the prism is reduced to zero.

As indicated at Block A in FIG. 21B, the first step of the first generalized parameter adjustment technique involves selecting values for all parameters in the geometrical optics model for the second optical system except for the distance d and the incidence angles $\theta_{Pi1}$ and $\theta_{Pi2}$ (i.e., prism tilt angle $\theta_{prism-tilt}$) which are treated as variables in the process. As indicated at Block B, the second step involves selecting initial values for parameters d and θ prism-tilt which can be accomplished by virtually any criteria ($\theta_{prism-tilt}$). Then as indicated at Block C in FIG. 21B, the procedure involves setting the incidence angles $\theta_{Pi1}$ and $\theta_{Pi2}$ so that a desired beam ellipticity (i.e., aspect ratio) is achieved on the second surface of the prism. In the event that a circular beam cross-section is desired at the second surface of the prism, and as well along the scanning beam, the aspect ratio will be unity, whereas when an elliptical beam cross-section is desired the aspect ratio will be some value not equal to unity. In essence, this step presents a parameter constraint which the second system must satisfy.

As indicated at Block D in FIG. 21B, the VLD-to-lens separation D is adjusted so as to find the parameter value d at which the radius of curvature of both the S and P cylindrical wavefronts are made equal at the second surface of the prism, resulting in a spherical wavefront thereat which is converging along the optical axis of the second optical system. Under such conditions, the astigmatic difference between the S and P wavefronts is completely eliminated at and beyond the second surface of the prism. However, in some instances the rate at which the spherical wavefront of the laser beam converges is so great that the focal power of one or more of the holographic facets, working in conjunction with the focal power of the incident laser beam is so great that the beam focuses at a point in the scanning field short of or beyond its prespecified focal plane. In order to compensate for this excessive or insufficient focal power, the disc designer may perform an additional stage of parameter adjustment to increase or decrease the radius of curvature of the resulting spherical wavefront so that when the spherical wavefront of the laser beam passes through each holographic facet on the scanning disc, the radius of curvature of the spherical wavefront will cause the wavefront to converge at the prespecified focal plane of the scanning pattern.

As indicated at Block E in FIG. 21B, the first step of this optional adjustment stage involves varying d to adjust the radius of curvature of the S cylindrical wavefront not significantly affected by variations in the prism tilt angle, and thereby cause both cylindrical wavefronts to focus to a focal point which will ensure that the beam focuses onto the focal plane of concern within the scanning volume of the holographic scanner. As indicated at Block F in FIG. 21B, the second step of the optional adjustment procedure involves adjusting the prism tilt angle until the radius of curvature of the cylindrical wavefront sensitive to prism tilt $\theta_{Prism-tilt}$ (i.e., the S wavefront) is once again equal to the radius of curvature of the other cylindrical wavefront, thus producing a spherical wavefront at the second surface of the prism which is converging along its optical axis. Inasmuch as this readjustment step seeks to achieve a desired focal length (i.e., the imaging distance) and eliminate astigmatic difference along the spherical wavefront of the laser beam, it is not possible to guarantee a circularized beam. In short, it is only possible to control precisely either ellipticity or focal length of the laser beam while eliminating astigmatism, but not both, in the second optical system.

Figure 21C:
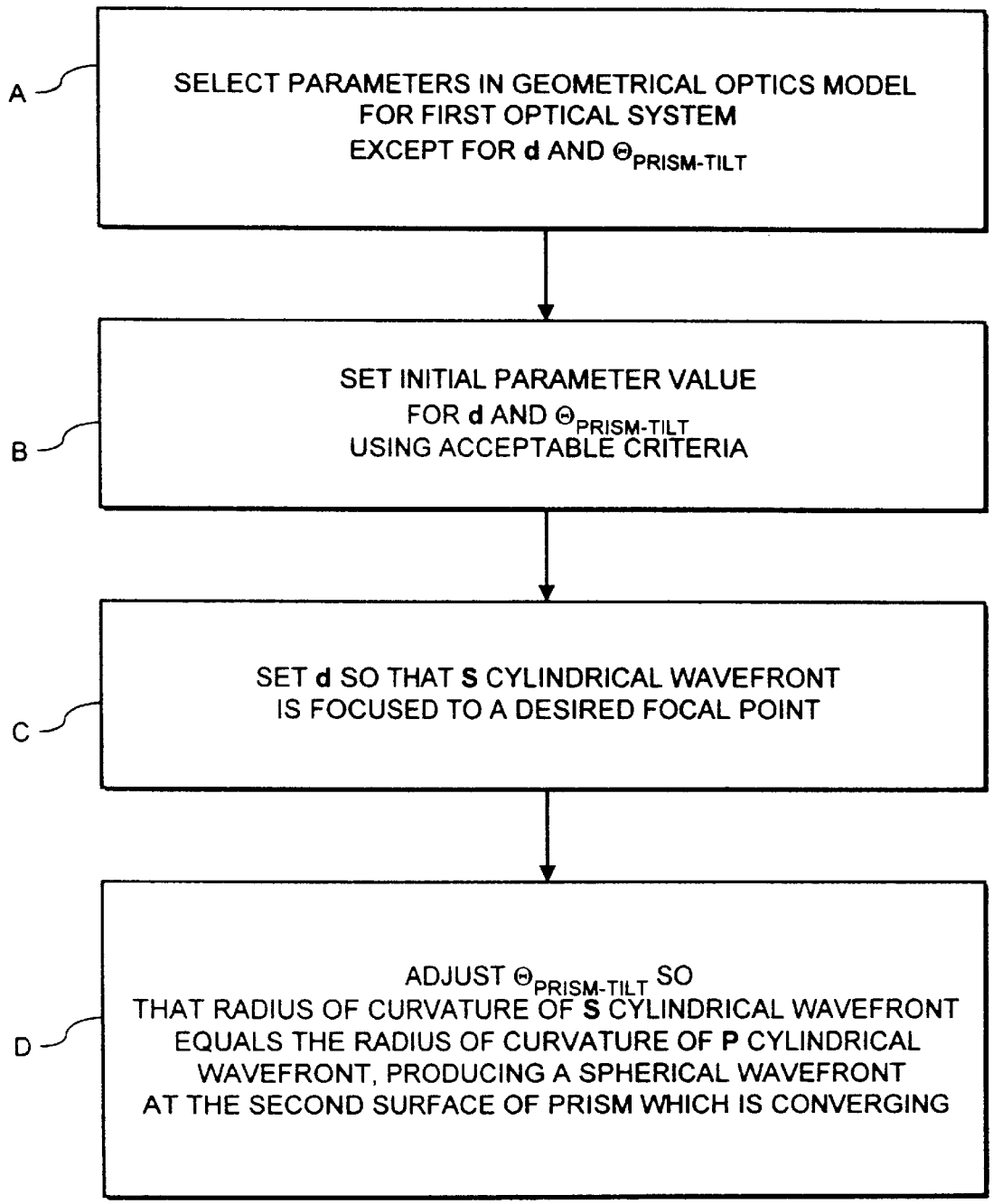
FIG. 21C is a flow chart for a generalized parameter adjustment technique of the present invention.

As indicated at Block A in FIG. 21C, the first step of the second generalized parameter adjustment technique involves realizing values for all parameters in the geometrical optics model the second optical system except for the distance d and the incidence angles $\theta_{Pi1}$ and $\theta_{Pi2}$, which are treated as variables in the process. As indicated at Block B in FIG. 21C, the second step involves selecting an initial value for parameters d and $\theta_{Pi1}$ and $\theta_{Pi2}$ $\theta_{prism-tilt}$ which can be accomplished by virtually any criteria. Then as indicated at Block C in FIG. 21C, the procedure involves setting the distance d so that the S cylindrical wavefront, which is not sensitive to variations in prism tilt angle, is focused to a desired focal length, which may or may not be necessary to compensate for the focal power of the holographic facets, in relation to the prespecified focal planes in the scanning volume. In essence, this step at Block C presents a parameter constraint which the second system must satisfy. As indicated at Block D in FIG. 21C, the prism tilt angle is then adjusted so that the radius of curvature of the S cylindrical wavefront, which is not sensitive to prism tilt angle adjustment, is made equal to the radius of curvature of the P cylindrical wavefront, which is sensitive to prism tilt angle adjustment at the second surface of the prism, resulting in a spherical wavefront thereat which is converging along the optical axis of the second optical system. Under such conditions, the astigmatic difference between the S and P wavefronts is completely eliminated at and beyond the second surface of the prism. As the beam diameter (or aspect ratio) at the second surface of the prism is substantially equal to the beam diameter (i.e., aspect ratio) at the scanning disc, there is no need to readjust this parameter using a parameter readjustment stage of the type provided in the first parameter adjustment procedure.

When the design of the first and second optical systems of the laser beam production module have been completed, the next step of the process is to couple these systems. This step is achieved using plane mirror 63 which receives the astigmatism-free beam from the second surface of the prism and directs it through the diffractive grating at the predesigned incidence angle, at which it diffracts and ultimately falls incident on the rotating scanning disc. In essence, the plane mirror simply changes the direction of the laser beam from the prism and couples it to the diffraction grating without modifying the beam cross-section or other properties of the laser beam. In the illustrative embodiment, the plane mirror functions to fold the laser beam so that the aspheric collimating lens, prism and grating can be arranged in a manner to realize necessary parameters, while minimizing the volume within which the laser beam production module is realized. While a plane mirror has been used to couple the first and second optical systems together, it is understood that in other embodiments of the present invention, these systems can be directly coupled by proximate positioning, without the interposition of an optical component therebetween.

It is appropriate at this juncture to describe a specific procedure for assembling the components of the laser beam production module of the first illustrative embodiment, and configuring the geometrical and optical parameters thereof in accordance with the principles of the present invention. This particular procedure is based on the second generalized parameter adjustment method described above using the optical bench shown in FIG. 21A. As indicated in Blocks A, B and C of FIG. 21C1, the few steps of the procedure involve assembling the above-described subassembly upon the pivot plate. Specifically, the VLD 53A (53B, 53C) is first press fitted into one end of the VLD block 76. Then the aspheric collimating lens 61 is mounted in one end of the lens barrel 77. Then the lens barrel is screw-mounted into the VLD block by turning the same 3–4 turns. This step carries out the initial setting of the parameter d. As indicated at Block D, the VLD/lens subassembly is then attached to the VLD yoke 75 by way of pins 78A and 78B pivotally supporting the VLD and lens subassembly with one degree of rotational movement relative to the VLD yoke. Thereafter, at Block E the VLD yoke 75 is rotatably mounted to pivot plate 72 by way of pivot axis 73C, as shown in FIG. 21A. At Block F of FIG. 21C1, the pivot plate and optical subassembly mounted thereon is placed within fixture plates 87 of the parameter adjustment bench.

Without the prism not yet mounted to the pivot plate, the next stage of the procedure is carried out in order that the laser beam produced from the VLD and aspheric lens assembly is directed along an axis which will intersect the prism when mounted on the pivot plate and ensure that its entire beam cross-section falls incident upon the first surface of the prism. This stage of the procedure is carried out using the beam photodetector 91 mounted along axis 92, shown in FIG. 21A. The first step of this stage indicated at Block H involves tilting the VLD/lens subassembly within the yoke so that the laser beam is directed along target axis 92 and falls upon the quadrant-type photodetector. If necessary, one may adjust the beam size on the target by rotating the lens housing barrel 77 within the VLD block 76, and thus adjust the VLD-to-lens separation D. At Block I of FIG. 21C2, the yoke assembly is then rotated until the laser beam passes through the cross-hair of the target at the beam photodetector 91. So configured, the VLD and lens subassembly and yoke assembly are both locked in the position which ensures that the laser beam crosses through the target cross-hair, and thus the first surface of the prism.

The next stage of the procedure indicated at Block J of FIG. 21C2 involves installing the prism support plate 73 (with the prism premounted thereon) within the second mounting recess within the pivot plate, so that an initial value of prism tilt angle, $\theta_{prism\ tilt}$ is set. Then at Block K of FIG. 21C2, the lens barrel is adjusted relative to the VLD block, setting d so that the cross-sectional dimension of the beam in the non-scanning direction (i.e., parallel to code elements—bars and spaces) focuses to the focal length of the test lens 90 in FIG. 21A.

At this stage, an optical subassembly is provided having all of the essential components for configuring $\theta_{prism\ tilt}$ sufficient to eliminate astigmatism while achieving a desired beam aspect ratio.

Then Block L of FIG. 21C2 involves adjusting the prism tilt angle $\theta_{prism\ tilt}$ so that astigmatism is eliminated while achieving a particular beam aspect ratio. This stage involves the use of the Photon® Beam Scanning device to measure the beam cross-section of the laser beam in x and y directions, at different points along the optical axis of the prism, along which the beam propagates away from the second surface thereof. This prism tilt angle adjustment step is carried out selecting a prism tilt angle, and then measuring the beam cross-section along the beam. When the cross-sectional measures of the beam indicate that the beam converges to its focal point at the same rate along the x and y directions, and then diverges at equal rates in these orthogonal directions as one moves the point of measurement along the length of the beam, then the value of prism tilt angle, denoted $\theta^*_{prism-tilt}$, at which such conditions are detected is the prism tilt angle at which astigmatism is completely eliminated along the laser beam. Once obtained, this parameter $\theta^*_{prism-tilt}$ is locked into position using an adjustment screw and/or adhesive, as indicated at Block M of FIG. 21C2.

Figure 21D:
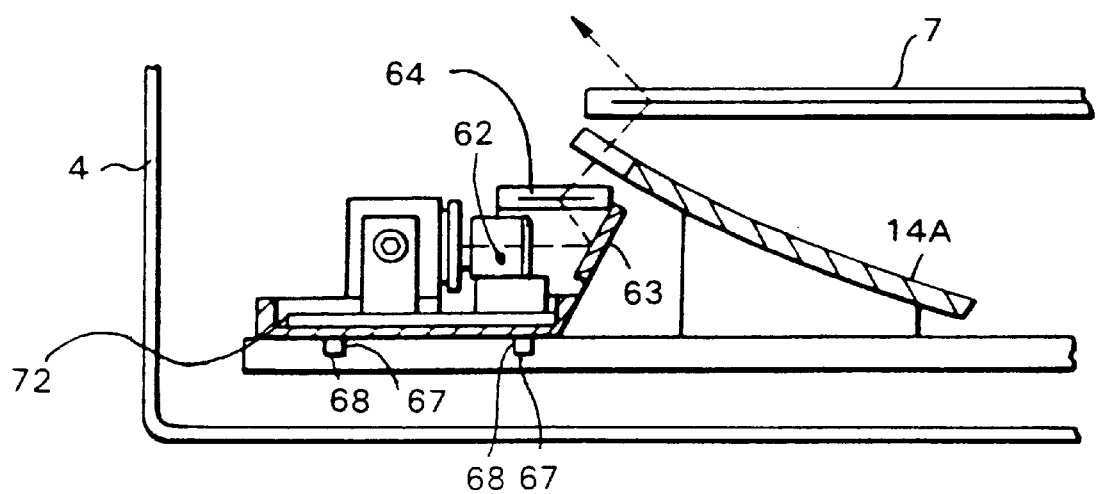
FIG. 21D is an elevated cross-sectional view of the first and second optical systems of the laser beam production module of the first illustrative embodiment shown coupled together with their geometrical and optical parameters configured to achieve beam dispersion minimization, beam aspect-ratio control, and astigmatism elimination.

When the laser beam production module has been completely assembled and its parameters configured to eliminate astigmatism, the pivot plate is then mounted within the recess of the optical bench of the laser beam production module and then the pivot plate is rotated relative to module bench until the beam is perpendicular to the mirror, as indicated at Block N of FIG. 21C2. This step involves using the quadrant detector set-up along a different test optical axis. Then at Block O of FIG. 21C3, the light diffractive grating and mirror can be mounted within the support of the optical bench. Then at Block P of FIG. 21C3, the entire laser beam production module can be mounted on the optical bench of the scanning system, using alignment pins and holes, as illustrated in FIG. 21D. At this stage, the laser beam emanating from the second surface of the prism is automatically oriented along an axis which ultimately passes through the scanner disc in the plane formed between the (i) line extending from the outer scanning disc to Beam-Incident-Point point $r_o$ and (ii) the scanning disc axis of rotation itself. At this stage of the construction process, angle of incidence $\theta_{i2}$ is automatically set so that the laser beam dispersion is minimized as the laser beam is diffracted through the scanning disc. This is achieved by physical construction of the scanner bench and module bench supporting the grating. Notably, angle of incidence $\theta_{i2}$ has been previously determined by the design process for the first optical system. Once the outgoing laser beam from the laser beam production module is aligned with respect to the scanning disc, the optical bench of the module can be fixed in place using bolts, screws or other fasteners known in the art. The above procedure is repeated for each of the other two laser beam production modules.

LASER BEAM PRODUCTION MODULE OF THE SECOND ILLUSTRATIVE EMBODIMENT

Figure 22:
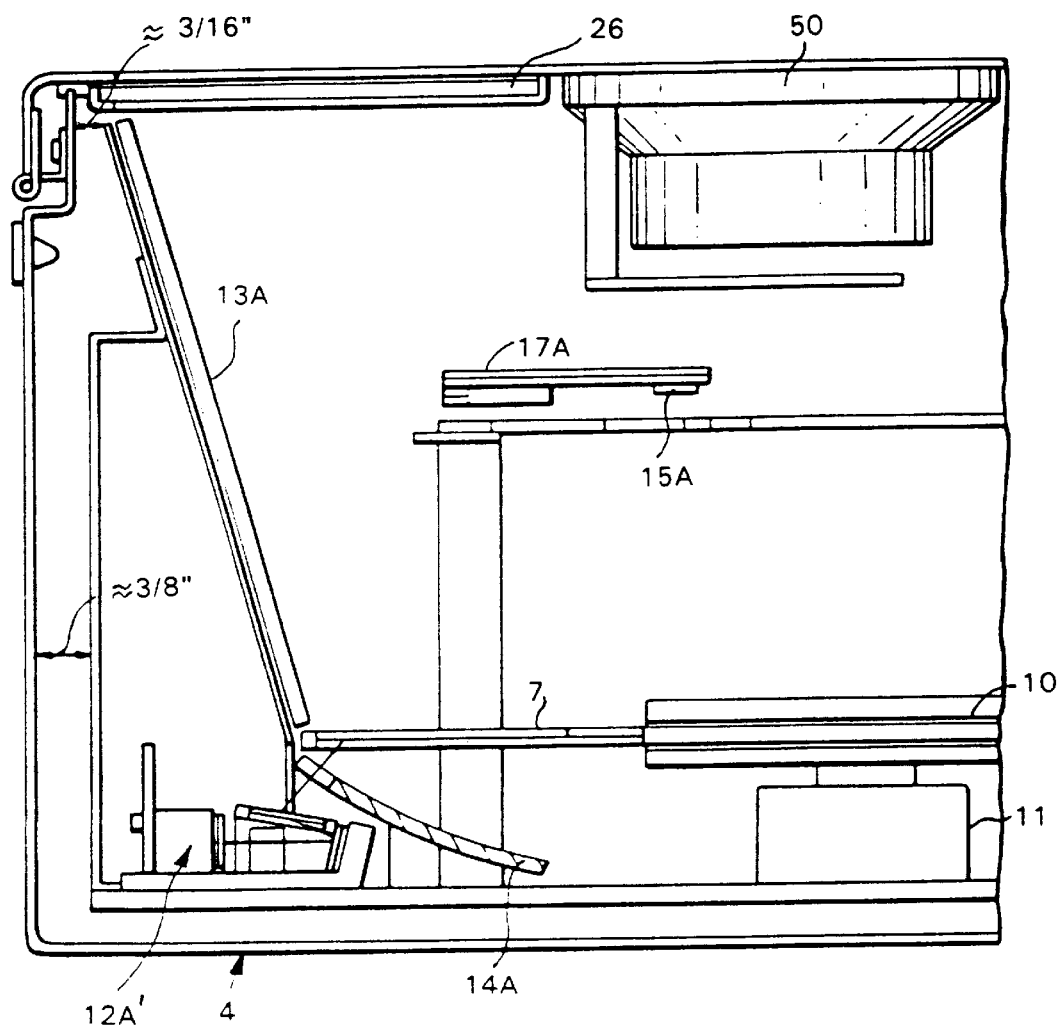
FIG. 22 is a partially cut-away, side cross-sectional view of one scanning channel of the laser scanning system of the second illustrative embodiment, showing the scanning window of the scanner housing, the holographic scanning disc rotatably supported by the motor, the laser beam production module of the second illustrative embodiment, its associated beam folding mirror, parabolic light collecting mirror, and photodetector.

In FIG. 22, an alternative embodiment of the laser beam production module of the present invention is shown. In this second embodiment of the module, the use of a prism is eliminated. Instead, only a VLD 53A, an aspheric collimating lens 61, a planar mirror 63 and a dual-function light diffraction grating 95 of fixed spatial-frequency are used to construct the module, as shown in FIG. 23. As shown in FIG. 23, all other components of the scanning system are the same.

Figure 23A:
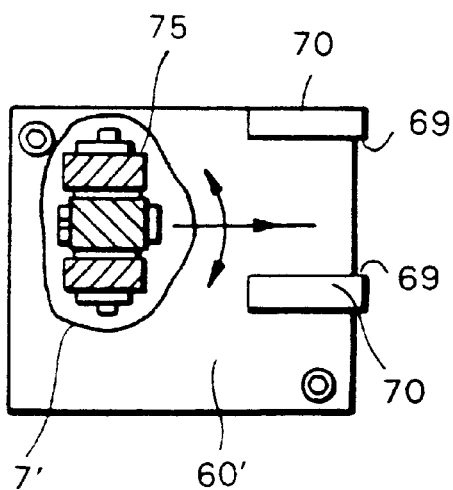
FIG. 23A is a plan view of the laser beam production module of the second illustrative embodiment of the present invention, shown with its beam folding mirror and dual-function holographic light diffractive grating removed from the optical bench of the laser beam production module.

In FIG. 23A, the components of the laser beam production module 12A' (12B', 12C') of the second illustrative embodiment are shown assembled on the optical bench of the module, removed from the scanner housing. The construction of this embodiment of the laser beam production module is similar in many respects to the first illustrative embodiment, in that it has a pivot plate 72' upon which a VLD yoke 75 is pivotally mounted for pivotally supporting VLD yolk Block 75. The VLD 53A and aspheric lens 65 are mounted with the lens barrel 77 as described above and this subassembly in turn is pivotally mounted within the VLD yoke 75. In this embodiment, there is a planar mirror 63 stationarily mounted with respect to module bench 60 by support elements. Also, the dual-function light diffraction grating 641 is stationarily mounted with respect to the planar mirror. In order to adjust the angle of incidence at which the laser beam reflected off the planar mirror strikes the dual-function light diffraction grating, pivot plate 72' is pivotally adjustable with respect to the optical bench of the laser beam production module in a manner to that provided in the first illustrative embodiment. Using this optical assembly, the laser beam production module can be realized, achieving the above-described objects of invention.

Figure 24:
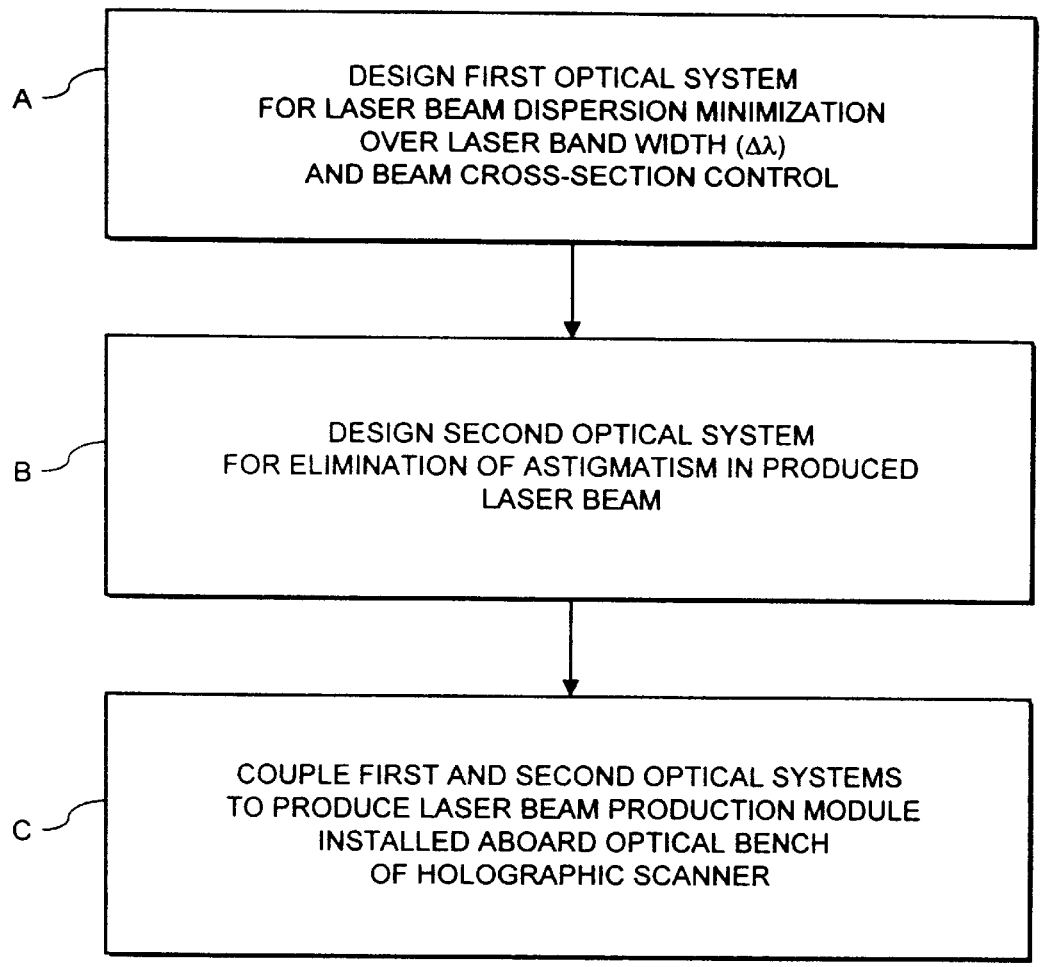
FIG. 24 is a flow chart illustrating the steps involved in designing the laser beam production module of FIG. 23 according to the design method of the present invention.

As shown in FIG. 24, the method for designing the laser beam production module of the second illustrative embodiment of the present invention involves three basic steps. As indicated at Block A in FIG. 24, the first step involves designing a first optical system which includes the dual-function light diffractive grating 641 and the holographic facets on the predesigned scanning disc. The first optical system has two principal functions, namely: to control the aspect-ratio of the incident laser beam on the scanning disc; and to minimize laser beam dispersion over the bandwidth of the VLD as the laser beam is diffracted through the rotating scanning disc. As indicated at Block B of FIG. 24, the second step of the design process involves designing a second optical system using the previously designed dual-function light diffractive grating. The principal function of the second optical system is to eliminate astigmatism along the laser beam at the second optical surface of the diffractive grating. At Block C of FIG. 24, the design process involves coupling the first and second optical systems using the planar mirror 63 to form a single unitary module which, when coupled with the scanning disc, performs the three above-described optical functions in a highly reliable manner. Each of these steps will be described in greater detail hereinafter.

Referring to FIGS. 25A through 25E and FIG. 26, the design of the first optical system of the laser beam production module of FIG. 23 will be described in detail.

Figure 25A:
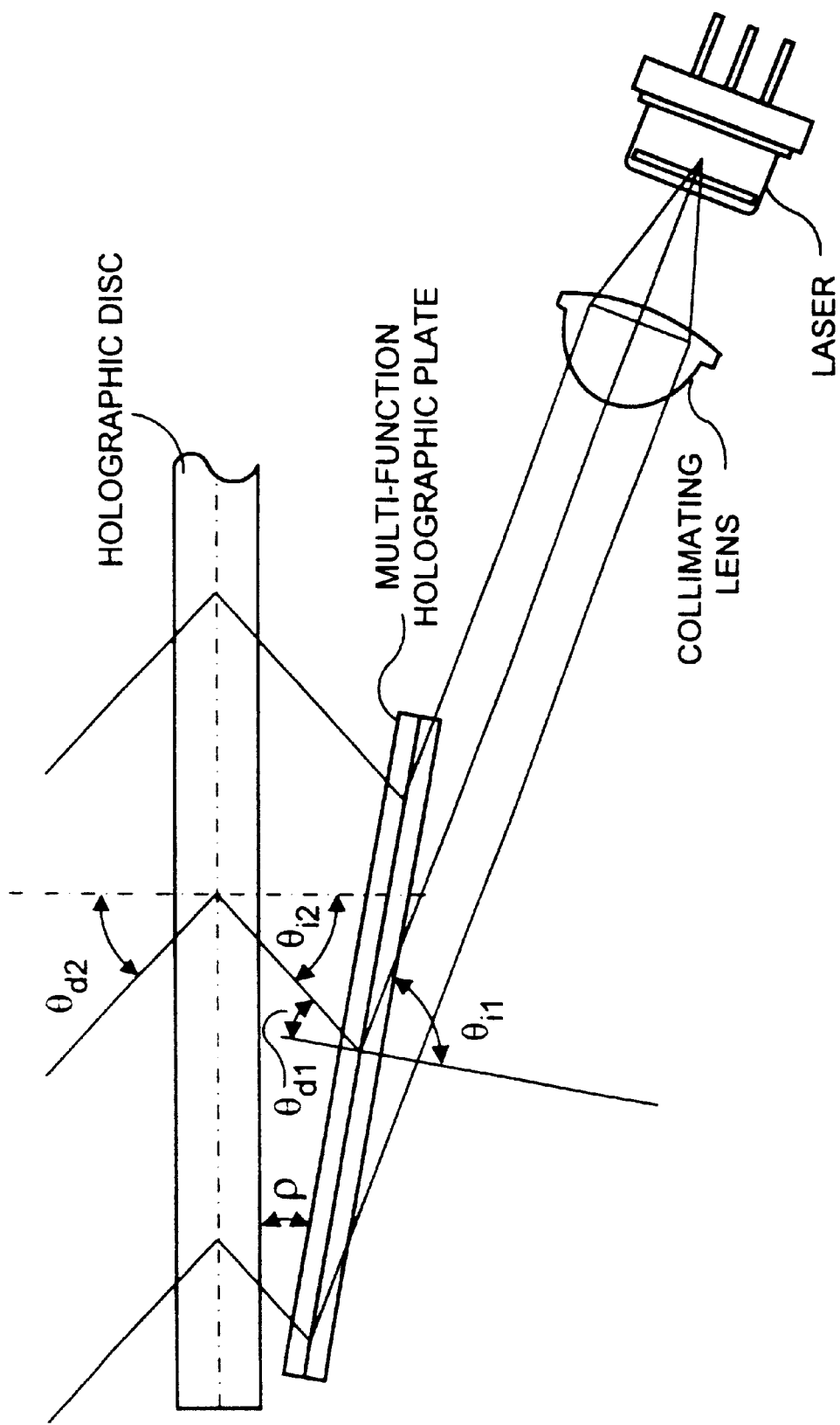
FIG. 25A is a geometrical optics model of the first optical system (i.e., a holographic scanning facet and holographic light diffraction grating) associated with the laser production module of the second illustrative embodiment.

As shown in FIG. 25A, a geometrical optics model is constructed for the first optical system, based on two assumptions, namely: (1) that the radius of curvature of the spherical wavefront incident the facet is very large relative to the surface area of the facet; and (2) that all light rays thereof are substantially collimated (i.e., the incident wavefront is substantially planar over the facet surface area). As shown in FIG. 25A and defined in the parameter description table of FIG. 25B, this model includes a number of external angles and distances, namely: $D_1$, the diameter of the laser beam leaving the aspheric collimating lens; $D_2$, the expanded diameter of the laser beam after emerging from the second surface of the dual-function diffractive grating; M, the beam diameter expansion ratio, defined as $D_2/D_1$; $d_2$, the average grating spacing of the facets on the scanning disc (in microns); $\theta_{i2}$, the incidence angle defined relative to a normal vector drawn to the first surface of an exemplary holographic facet on the scanning disc; diffraction angle $\theta_{d2}$, defined relative to a normal vector drawn to the second surface of the holographic facet; incidence angle $\theta_{i1}$, defined relative to a normal vector drawn to the first surface of the dual-function light diffraction grating; diffraction angle $\theta_{d1}$ defined relative to a normal vector drawn to the second surface of the light diffraction grating; $\theta_{i1M}$, the angle of incidence of the beam at the dual-function light diffraction grating that will provide the desired beam expansion ratio, M; $\theta_{i1D}$, the angle of incidence of the beam at the dual-function light diffraction grating that will provide zero dispersion for the beam leaving the scanning disk; $\theta_{d1M}$, the angle of diffraction of the beam leaving the dual-function light diffraction grating that will provide the desired beam expansion ratio, M; $\theta_{d1D}$, the angle of diffraction of the beam leaving the dual-function light diffraction grating that will provide zero dispersion for the beam leaving the holographic disc; the orientation (i.e.tilt) angle $\rho$ defined between the holographic disc and the multi-function light diffraction grating; and $\lambda$, the wavelength of the laser beam (in microns) produced from the VLD.

In FIG. 25C, a set of mathematical expressions are provided which define relationships between the parameters of the geometrical optics model. Expression No.1 in FIG. 25C, derived from the well known grating equation, relates $d_2$, the "average grating spacing" of the fringe structures in the scanning disc, to the reconstruction wavelength of the VLD $\lambda$, and incidence angle $\theta_{i2}$ and diffraction angle $\theta_{d2}$. Using trigonometric relations, the angle of diffraction $\theta_{d1M}$ at which the desired beam expansion ratio occurs can be defined in terms of the tilt angle $\rho$ and incidence angle $\theta_{i2}$ as defined by Expression No. 3 in FIG. 25C. Starting with the well known beam expansion ratio equation $M = \cos(\theta_{d1})/\cos(\theta_{i1})$, and applying some algebraic manipulation and Equation No. 3, a mathematical expression for the incidence angle $\theta_{i1M}$ can be derived in terms of tilt angle $\rho$, which will have the form of Expression No. 2 in FIG. 25C. Then using the grating equation, the grating spacing for the dual-function light diffraction grating can be derived as a function of the tilt angle $\rho$ and the incidence and diffraction angles $\theta_{i1M}$ and $\theta_{d1M}$, respectively. This mathematical expression is set forth as Expression No. 4 in FIG. 25C.

Then using trigonometric relations, the angle of diffraction $\theta_{d1D}$ at which zero beam dispersion occurs is defined in terms of the tilt angle $\rho$ and incidence angle $\theta_{i2}$ as defined by Expression No. 6 in FIG. 25C. Starting then with a zero dispersion equation similar to Expression No. 3 in FIG. 18C, and applying Expression No. 6 and some algebraic manipulation, an expression for the incidence angle $\theta_{i1D}$ is derived in terms of tilt angle $\rho$, incidence angle $\theta_{i2}$, reconstruction wavelength $\lambda_R$ of the VLD, and $d_2$ (the average grating spacing of a fixed-spatial frequency equivalent of the holographic facets). This form of this expression is described by Expression No. 5 in FIG. 25C. Then using the grating equation once again, the grating spacing $d_{1M}(\rho)$ associated with the dual-function light diffractive grating, is derived as a function of the tilt angle $\rho$, the incidence angle $\theta_{i1D}$ and wavelength $\lambda_R$.

Thereafter, assuming values for parameters $\lambda_R, \theta_{i2}, M$ and $\theta_{d2}$, as set forth in the table of FIG. 25B1, Expressions 3 and 5 in FIG. 25C can be expressed solely as a function of tilt angle $\rho$. Notably, diffraction angle $\theta_{d2}$ is selected to be the average of the various diffraction angles (e.g., 37 degrees) associated with the sixteen holographic facets on the designed scanning disc of the illustrative embodiment. The beam expansion factor M, on the other hand, will typically be selected as the ratio of the two beam spread angles for the VLD used in the laser beam production module (e.g., M=3.0). However, in order to ease the manufacturing of the dual-function grating, the beam expansion factor M may be chosen somewhat smaller than the ratio of these beam spread angles. In the illustrative embodiment, the wavelength of the laser is 0.670 microns, whereas the angle of incidence at the scanning disk is 43 degrees while the corresponding angle of diffraction is 37 degrees, the average value thereof falling near the middle of the range of diffraction values for the 16 holographic facets on the scanning disk.

In order to find the value of tilt angle $\rho$ at which both the conditions expressed in Expressions 2 and 5 are simultaneously satisfied, one of two solving techniques may be used. The first technique involves equating Expressions 2 and 5 in FIG. 25C equal to each other and then solving for tilt angle $\rho$. Alternatively, the second technique involves plotting the functions expressed in Expressions 2 and 5, as a function of tilt angle $\rho$, and identifying the value of tilt angle $\rho$. at which these functions intersect. Notably, by setting the tilt angle $\rho$ between the scanning disk and the dual-function diffraction grating equal to $\rho_0$, the first optical system will achieve a beam expansion ratio of M=3.0 while minimizing beam dispersion over the bandwidth of the VLD producing the incident beam. In the illustrative embodiment, the value of tilt angle $\rho_0$ is equal to $-11.1$ degrees, at which the angle of incidence yielding the desired beam expansion ratio also equals the angle of incidence that yields minimum beam dispersion over the bandwidth of the incident laser beam produced by the VLD.

In FIG. 25E, a set of construction parameters are provided for the dual-function grating of the illustrative embodiment. Notably, these parameters are expressed at the reconstruction wavelength 670 nanometers, and thus must be converted to the construction wavelength of the Argon laser when the specified light diffraction grating is to be realized in DCG. The parameter conversion system and procedure of FIGS. 28A1 through 28D described above can be used for this purpose.

Figure 26:
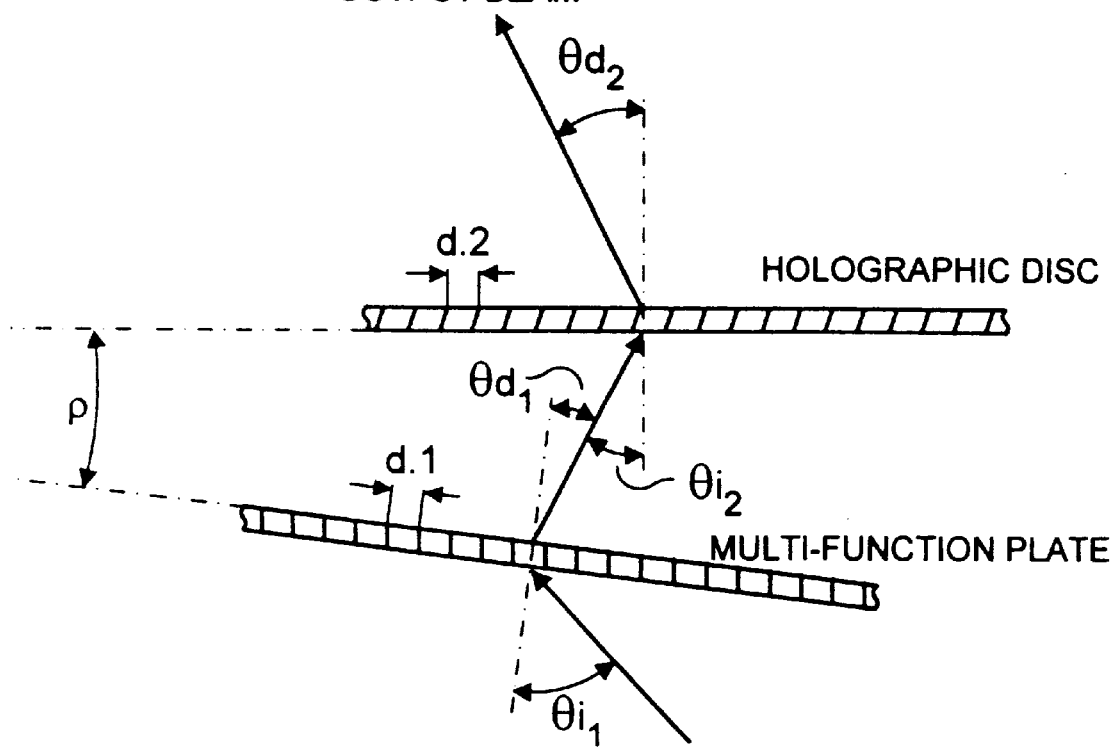
FIG. 26 is a geometrical optics model of the second optical system of the laser beam production module of the second illustrative embodiment, constructed by the Beam Dispersion Analyzer of the present invention in order to determine the performance of this system.
Figure 27D:
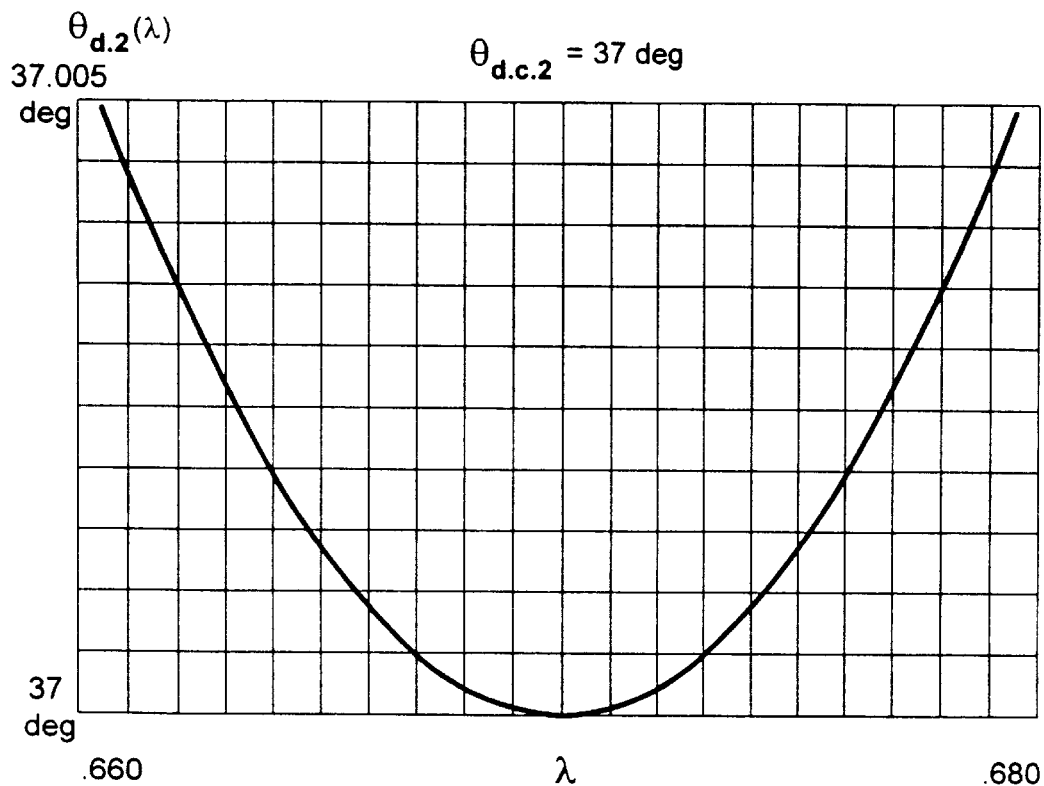
FIG. 27D is a plot showing the relationship that exists between (i) the diffraction angle at the holographic disc of an incident laser beam produced from a visible laser diode and (ii) the wavelength thereof when using the first optical system of FIG. 23 to precondition the laser beam prior to its passage through the holographic disc of the holographic scanning system hereof.
Figure 29:
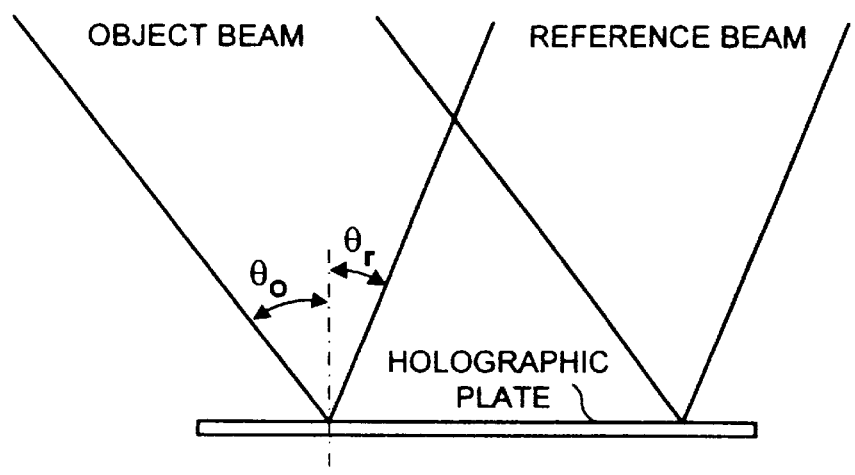
FIG. 29 is a schematic diagram of a holographic recording system for constructing the dual-function diffraction grating, using the construction parameters determined from the parameter conversion process of FIGS. 28B, 28C1 and 28C2.

A post design tool available within the HSD workstation hereof, referred to as the "Beam Dispersion Analyzer" tool, is illustrated in FIGS. 27A through 27D1. This analytical tool can be used to analyze the variations of diffraction angle $\theta_{d2}$ for the laser beam leaving a designed scanning disc, geometrical modelled in FIG. 26. This tool is of great value in measuring the degree to which beam dispersion has been reduced when using a multi-function diffraction grating and any particular set of construction parameters (including parameters for tilt angle $\rho$) specified by the above-described design process.

As shown in FIG. 26, the second optical system designed above is geometrically modelled in a manner similar to that done during the design process. Parameters used to construct the geometric optics model are described in FIG. 27A. Given (assumed) parameters are set forth in FIG. 27B for the illustrative embodiment. Mathematical expressions describing important relations among certain of the parameters are set forth in FIG. 27C. In Expression No. 4 in FIG. 27C, the angle of diffraction $\theta_{d2}$ is expressed as a function of wavelength (in air) $\lambda$, tilt angle $\rho$, grating spacing $d$,, grating spacing $d_2$, and incidence angle $\theta_{i1}$. Assuming parameter values for $\rho, d_1, d_2,$ and $\theta_{i1}$, Expression No. 4 can be reduced to a function dependent solely on wavelength. Then by evaluating this resulting function using different values of wavelength within the bandwidth of the VLD, a plot of diffraction angle $\theta_{d2}$ can be plotted, as shown in FIGS. 27D and 27D1, a measure of beam dispersion derived. Notably, the laser bandwidth or spread from commercially available VLDs will be about 0.010 microns or less, and thus this will be a sufficient domain for $\lambda$. Typically, wavelength variations due to mode hopping are on the order of 0.0003 microns. With such assumed wavelength shifts from the VLDs in the scanning system, the resulting plot from the Beam Dispersion Analyzer indicates that first optical system of the module designed above will maintain the angular deviation (i.e., beam dispersion) of its diffracted laser beam to about 0.0055 degrees.

After completing the design of the first optical system of the laser beam production module, the dual-function light diffraction grating used therein can be constructed using holographic recording techniques. Using the grating equation, this fixed spatial-frequency light diffractive grating (HOE) can be uniquely specified by its reconstruction wavelength $\lambda_R$ and the angle of incidence $\theta_{i1}$ and angle of diffraction $\theta_{i1}$ required by the design. However, as explained in connection with the design of the scanning disc and the laser beam production module of the first illustrative embodiment, it is easier to construct (i.e., fabricate) the dual-function diffraction grating at a construction wavelength $\lambda_C$ different than reconstruction wavelength $\lambda_R$, selected on the basis of the recording emulsion (e.g., DCG) used to realize the dual-function grating. The parameter conversion process illustrated in FIGS. 28A1 through 28D can be used to convert construction parameters for the dual-function grating, into a corresponding set of construction parameters expressed at the construction wavelength $\lambda_C$. When calculating the exposure angles at the construction wavelength, the Bragg plane angle within the emulsion must be maintained constant after the construction process. As this process has been described in connection with the construction of each holographic facet on the scanning disc of the present invention, the details thereof will not be repeated herein to avoid redundancy. After the parameter conversion process of FIGS. 28A1 through 28D is carried out, the dual-function diffraction grating can be fabricated using the wavelength-converted parameters and the recording system illustrated in FIG. 29.

Figure 30A:
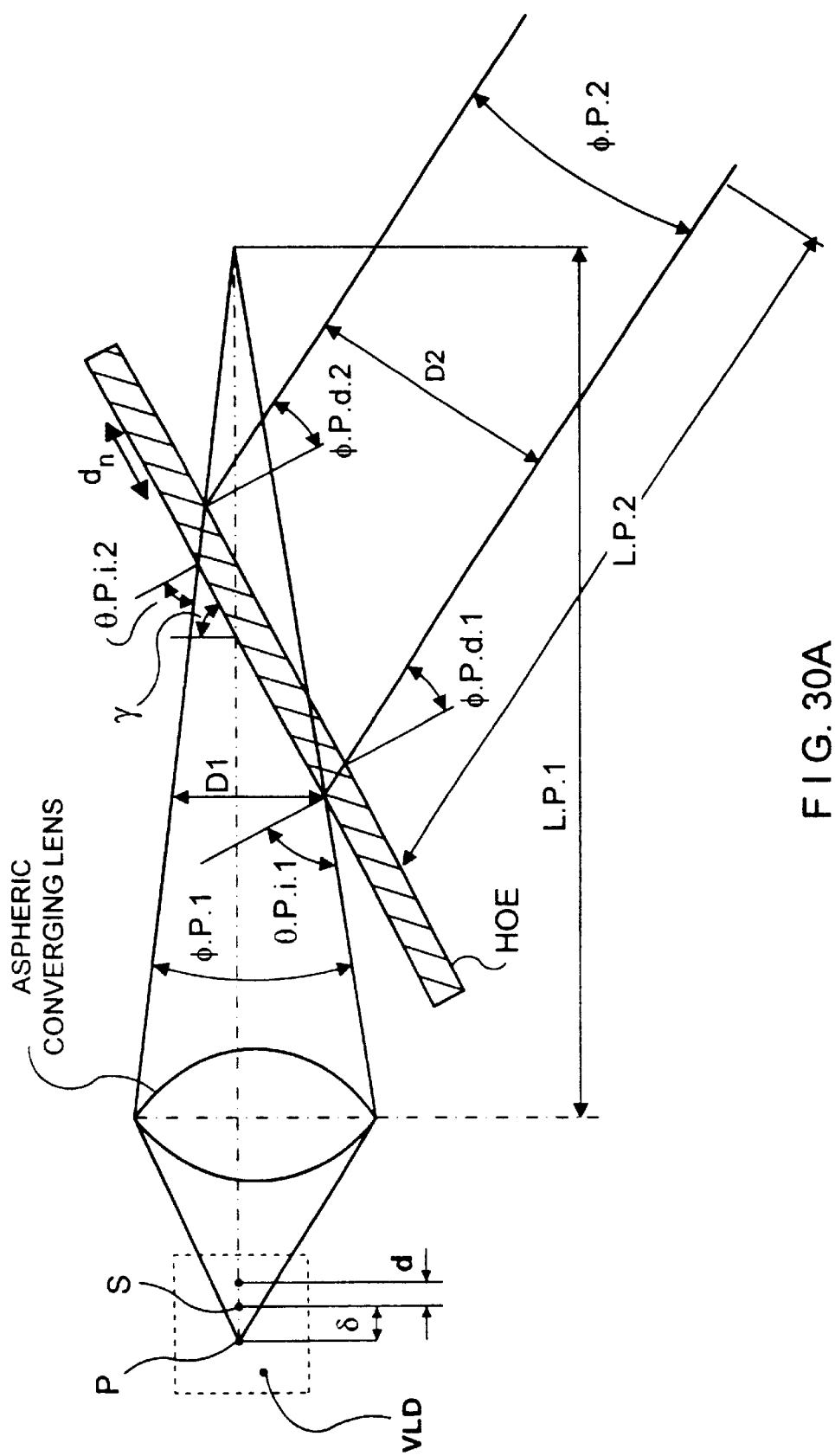

The next step in the design process entails designing the second optical system for the laser beam production module. In FIG. 30A, a geometrical optics model of the second optical system is shown. In the second illustrative embodiment, the sole function of this optical system is to eliminate astigmatism from the system. Consequently, the constraints imposed on this system design will differ from those applied in the first illustrative embodiment. As illustrated, the geometrical optics model comprises the VLD, the aspheric collimating lens, and the dual-function diffraction grating designed above as a fixed spatial-frequency holographic diffraction grating. Various geometrical and optical parameters of the geometrical optics model are indicated in FIGS. 30A, 30A1 and 30A2 and defined in detail in the table of parameters set forth in FIG. 30B. As described in FIG. 30B, the geometrical optics model of the second optical system is formed by the following parameters: $f_1$, the focal length of the aspheric collimating lens; S-source, the location of the source of the S cylindrical wavefront (i.e., S-beam source); P-source, the location of the source of the P cylindrical wavefront (i.e., P-beam source); d, the distance measured from the focal point of the collimating lens to the location of the source of the S cylindrical wavefront (i.e., S-beam source); $\delta$, the distance between the S-source and the P-source (i.e., the astigmatic difference); $D_1$, the diameter of the P wavefront leaving the aspheric collimating lens; $D_2$, the diameter of the expanded P wavefront leaving the dual-function light diffraction grating; M, the beam expansion factor, defined as $M=D_2/D_1$; $d_h$, the grating spacing of the dual-function light diffraction grating, measured in microns; $\theta_{Pi1}$, the angle of incidence of the lower portion of the converging P wavefront at the front surface of the dual-function light diffractive grating; $\theta_{Pi2}$, the angle of incidence of the upper portion of the converging P wavefront at the front surface of the dual-function light diffractive grating; $\Phi_{P1}$, the angle of convergence of the P wavefront leaving the second surface of the aspheric collimating lens; $\Phi_{S1}$, the angle of convergence of the S wavefront leaving the second surface of the aspheric collimating lens; $\Phi_{P2}$, the angle of convergence of the P wavefront leaving the second surface of the dual-function light diffractive grating; $\Phi_{S2}$, the angle of convergence of the S wavefront leaving the second surface of the dual-function light diffractive grating, which is equal to $\Phi_{S1}$; $L_{P1}$, the image distance for the P wavefront imaged by the aspheric collimating lens; $L_{P2}$, the image distance for the P wavefront imaged by the aspheric collimating lens after insertion of the dual-function light diffractive grating; $L_{S1}$, the image distance for the S wavefront imaged by the aspheric collimating lens; $L_{S2}$, the image distance for the S wavefront imaged by the aspheric collimating lens, after inserting the dual-function light diffractive grating, which is equal to $L_{S1}$; $\theta_{Pd1}$, the angle of diffraction of the lower portion of the converging P wavefront at the dual-function light diffractive element; $\theta_{Pd2}$, the angle of diffraction of the upper portion of the converging P wavefront at the dual-function light diffractive element; and $\lambda_r$, the reconstruction wavelength of the laser beam produced from the VLD. Collectively, these parameters constitute the geometrical optics model of the second optical system of the second illustrative embodiment of the laser beam production module. Notably, the distance between the first surface of the dual-function holographic light diffractive grating and the principal plane of the collimating lens need not be considered as a parameter to the model provided that the entire cross-sectional diameter of the beam is incident (i.e., falls) upon the first surface of the light diffractive grating, which is a very easy assumption to satisfy in practice.

In FIG. 30B1, a set of assumed values are presented for various parameters in the model which can remain fixed during the design process, providing various coefficients in the mathematical expressions within the geometrical optics model. In FIG. 30C1 and 30C2, a set of mathematical expressions are provided which define particular relationships between certain parameters in the geometrical optics model of the second optical system. As clearly illustrated, Expressions No. 1 to 12 lead to the derivation of equations for $L_{P2}$ and $L_{S2}$, given by Expressions Nos. 11 and 12 in FIGS. 30C1 and 30C2, the image distances of the P source and the S source after being imaged through the aspheric collimating lens and the light diffractive grating. From these functions, the curvature of the S cylindrical wavefront as it immediately emerges from the second surface of the light diffractive grating can be defined as $1/L_{S2}$, whereas the curvature of the P cylindrical wavefront as it immediately emerges from the second surface of the light diffractive grating can be defined as $1/L_{P2}$. Expressed in other words, the radius of curvature of the S cylindrical wavefront as it immediately leaves the second surface of the light diffractive grating is given by $L_{S2}$, whereas the radius of curvature of the P cylindrical wavefront as it immediately leaves the second surface of the light diffractive grating is given by $L_{P2}$. Mathcad 3.1 mathematical design program can be used to carry out geometrical optics modelling within the HSD Workstation of the present invention.

It is well known that each VLD having a non-zero astigmatic difference, defined herein as $\delta$, will produce a laser beam which exhibits astigmatic properties. However, it has been discovered that, for each non-zero value of $\delta$ and assumed value of grating tilt angle $\theta_{grating-tilt}$ (i.e.grating incidence angles $\theta_{Pi1}$ and $\theta_{Pi2}$), there exists a realizable value of d, at which the S and P cylindrical wavefronts leaving the second surface of the light diffractive grating have equal radii of curvature, as indicated in the plot shown in FIG. 30D. Under such optical conditions, both the S and P cylindrical wavefronts emerging from the second surface of the light diffractive grating are converging along the outgoing optical axis of the light diffractive grating at the same rate (by virtue of their equal radii of curvature) and the resulting wavefront is spherical and free of astigmatic aberrations associated with the non-zero inherent astigmatic difference in the VLD. The mathematical structure of the geometrical model for the second optical system suggests that, during the parameter adjustment procedure hereof, the geometrical parameter d functions as a variable or "adjustable parameter" while the grating tilt angle $\theta_{grating-tilt}$ parameter and $\theta_{Pi2}$ determined hereinabove function as constraints so that the optical conditions for astigmatism-elimination can be found during the adjustment procedure.

The optical functions performed by each of the components in the second optical system of this embodiment are similar to the functions performed by the components in the second optical system of the first illustrative embodiment. In particular, the S and P sources represented within the VLD produce cylindrical wavefronts emanating from the S and P source locations, respectively. The optical function of the aspheric collimating lens is to pass the S and P wavefronts, while changing the radii of curvature for both of these wavefronts as well as their apparent centers of curvature. In this embodiment of the second optical system, both the S and P wavefronts are assumed to propagate on axis, and therefore off-axis aberrations will be negligible and thus need not be considered. The optical function of the light diffractive grating in the second optical system is to significantly change the radius of curvature of only one of these cylindrical wavefronts, while minimally changing the radius of curvature of the other cylindrical wavefront. This significant degree of change in the radius of curvature is a strong function of the angles of incidence $\theta_{Pi1}$ and $\theta_{Pi2}$ measured with respect to the first surface of the light diffractive grating. This functional relationship and the manner in which such dependency is established among the various parameters in the analytical model of this optical system can be readily seen by carefully examining Expressions 1 through 12 set forth in FIGS. 30C1 and 30C2.

Importantly, the above analysis reveals that the design method of the second illustrative embodiment provides the designer with two degrees of freedom when finding the set of parameters that satisfies the optical condition illustrated in the plot shown in FIG. 30D. In particular, the designer may select a given value for the grating incidence angles $\theta_{Pi1}$ and $\theta_{Pi2}$, and then find the parameter value for parameters d which eliminates astigmatism at the second surface of the light diffractive grating. Alternatively, the designer may select a given value for the distance d, and then find the parameter value for grating tilt angle $\theta_{grating-tilt}$ which eliminates astigmatism at the second surface of the light. Notably, in this illustrative embodiment, the amount of tilt angle adjustment is quite small (e.g., 2–3 degrees maximum) due to the inherent Bragg angle sensitivity of the dual-function light diffractive grating of the laser beam production module.

Notably, the mathematical structure of the second optical system described above allows either (i) for the distance d to function as a system constraint in the parameter adjustment procedure, while the grating tilt angle $\theta_{grating-tilt}$ functions as the variable parameter therein, or (ii) for the grating tilt angle $\theta_{grating-tilt}$ to function as a system constraint in the parameter adjustment procedure, while the distance d functions as the variable parameter therein. Based on these two facts, two different parameter adjustment procedures have been developed to find the distance d or grating tilt angle $\theta_{grating-tilt}$ which eliminates astigmatism. While these techniques are based on the mathematical structure of the model used to find the conditions at which astigmatism is eliminated, they are not limited to laser scanning systems. In any particular design application, the procedure that will be used to configure the parameters of the optical system comprising a VLD, an aspheric collimating lens and a light diffractive grating, will depend on the physical constraints presented by the application at hand. For example, in designing the laser beam production module of the second illustrative embodiment where the grating tilt angle is predetermined when designing the first optical system thereof, the grating tilt angle $\theta_{grating-tilt}$ functions as a constraint during the design of the second optical system, whereas the distance parameter d functions as the variable parameter. In the case where a laser beam production module is being designed for a non-holographic laser scanner, and thus grating tilt angle $\theta_{grating-tilt}$ is not constrained to any particular value, then this parameter may function as a variable in the geometrical optics model of the optical system.

As mentioned in connection with the design of the laser beam production module of the first illustrative embodiment, it simply is not feasible in practice to empirically measure the astigmatic difference 6 for each VLD to be used in the construction of a laser beam production module of the second illustrative embodiment. Consequently, it is not feasible to use the mathematical expressions set forth in the table of FIGS. 30C1 and 30C2 to compute the distance d for selected parameter values. Instead, the approach adopted by the design method of the second illustrative embodiment is to exploit the structure of the geometrical module described above and provide a novel procedure and bench for adjusting (i.e., configuring) the parameters of the second optical system to eliminate astigmatism. For clarity of exposition, the parameter adjustment bench will be described first, and thereafter, a generalized version of the parameter adjustment procedure with reference to the process diagram of FIG. 31B. Finally, a particular illustrative embodiment of the procedure will be described with reference to the parameter adjustment bench of FIG. 31A and process diagram of FIGS. 31C1 and 31C2.

In FIG. 31A, a parameter adjustment system 100 of the present invention is shown for use with the above-described laser beam production module. The function of this bench is to allow the parameters grating tilt angle $\theta_{grating-tilt}$ and distance d to be adjusted during the assembly/alignment procedure so that an astigmatism-free laser beam with a desired aspect-ratio is produced. As illustrated in FIGS. 31A1 and 31A2, the parameter adjustment system comprises an optical bench 101 upon which a pivot plate mounting fixture 102 is stationarily mounted. The function of the pivot plate mounting fixture is to mount during the parameter alignment procedure, an optical subassembly comprising module bench 60' and pivot plate 72' with the VLD, barrel, lens mount, and VLD yoke assembled thereon. The pivot plate mounting fixture provides a pivot plate mounting recess designed to securely receive the module bench 60' and its associated optical subassembly.

As shown in FIGS. 31A1 and 31A2, the parameter adjustment system comprises beam scanning device 88 mounted on the optical bench along a first optical axis which, when the light diffractive grating 72' is mounted on grating platform 70, passes through the center of the second surface of the light diffractive grating 72' along an optical axis 103 passing through a scanning disc emulation hologram (H2) 104, a test lens (having length $f_{test}$) 105, and x-y beam scanner 88, as shown in FIG. 31A2. This adjustment mechanism allows the laser beam to be prealigned relative to the second surface of the light diffractive grating, without the light diffractive grating being mounted during the alignment step. The reason that scanning-disc emulation hologram 104 is required is because the dual-function diffraction grating, by itself, introduces dispersion which would affect the measurements without the use of a fixed frequency grating 104 which corresponds to an "average" holographic facet, with no focal power (e.g., $\theta_i=-43°$, $\theta_d=37°$). Notably, hologram 104 is tilted at angle $\rho$ with respect to the dual-function grating to give zero beam dispersion. If the incidence angle $\theta$ (i.e., $\theta_{grating-tilt}$) is changed during the design of the first optical system, then $\rho$ preferably should be changed in order to improve the reduction of beam dispersion.

As shown in FIG. 31A, the parameter alignment bench also comprises a beam detector (e.g., quadrant-type photodetector) 91. The beam detector 91 is mounted on the optical bench along a second optical axis 106 which, when the light diffractive grating is mounted on grating platform 70 of module bench 60', passes through the center of the first surface of the light diffractive grating 72'. As will be described below, these test instruments are used to adjust the geometrical and optical parameters of the laser beam production module during the assembly and configuration of the laser beam production module.

Generalized parameter adjustment technique, analogous to the generalized method described in FIG. 21B, will now be described with reference to FIG. 31B. Notably, this generalized technique is preferred inasmuch as it permits the dual-function grating to be fixedly mounted to the module bench, and thus predesigning the module bench and scanner bench so that automatic configuration of ρ is set upon mounting the module bench to the scanner bench via alignment pins 67 and 68. As indicated at Block A thereof, the first step of the technique involves realizing values for all parameters in the geometrical optics model of the second optical system except for (i) the distance d which is treated as a variable in the process and (ii) the grating angle $\theta_{grating\text{-}tilt}$ which is treated as a constraint in the design process. As indicated at Block B of FIG. 31B, the second step involves setting parameter $\theta_{grating\text{-}tilt}$ which is obtained from the design process of the first optical system of the laser beam production module of the second illustrative embodiment. Upon setting this parameter, the specified aspect ratio should be obtained. If the specified aspect ratio is not obtained upon setting parameter $\theta_{grating\text{-}tilt}$ to the value determined in the design process of the first optical system, the grating tilt angle should be adjusted until the desired aspect ratio is obtained. Then as indicated at Block C of FIG. 31B, the distance d is adjusted so that the radius of curvature of both the S and P cylindrical wavefronts are made equal at the second surface of the light diffractive grating, resulting in a spherical wavefront thereat which is converging along the optical axis of the second optical system. Under such conditions, the astigmatic difference between the S and P cylindrical wavefronts is completely eliminated at and beyond the second surface of the dual-function light diffractive grating.

Upon completing the design of the constituent optical systems of the laser beam production module of the second illustrative embodiment, the next step of the process, indicated at Block D of FIG. 31B, involves coupling together the first and second optical systems to provide a laser beam production module mounted on the scanner bench with precomputed incidence angle $\theta_{pi1}$ (i.e., $\theta_{grating\text{-}tilt}$) and precomputed grating tilt angle $\rho_o$ set, minimizing laser beam dispersion over the bandwidth of the VLD. In this illustrative embodiment, the first and second optical systems of the laser beam production module are directly coupled without the use of an intermediate optical element, such as a planar mirror. However, in an alternative embodiment, a plane mirror may be used to fold the laser beam between the aspheric collimating lens and the light diffractive grating. This system coupling technique may be desirable in particular applications, where the aspheric collimating lens, and grating must be arranged in a manner relative to the scanning disc to realize a laser beam production module with miniature volumetric dimensions which must satisfy particular physical constraints.

It is appropriate at this juncture to describe a particular procedure for assembling the components of the laser beam production module of the second illustrative embodiment, and configuring the geometrical and optical parameters thereof in accordance with the principles of the present invention.

As indicated at Blocks A, B, C and D of FIG. 31C1, the first stage of the particular procedure involves assembling the above-described subassembly upon the pivot plate. Specifically, at Block A, the VLD is first press-fitted into one end of the VLD block 76. At Block B the aspheric collimating lens 61 is mounted in one end of the lens barrel 77. At Block C, the lens barrel is then screw mounted into the VLD block by turning the same 3–4 turns or so to set the distance parameter d to some initial value. At Block D, the VLD/lens subassembly is then attached to the VLD yoke 75 by way of pins 78A and 78B to pivotally support the VLD and lens subassembly with one degree of rotational movement relative to the VLD yoke. Thereafter, at Block E of FIG. 31C1, the VLD yoke is rotatably mounted to pivot plate 721 shown in FIG. 23A. At Block F, the pivot plate and optical subassembly mounted thereon is then mounted on module bench 60'. At Block G, module bench 60' with its subassembly shown in FIG. 23A, is then placed within the recess of the mounting fixture 102 of the parameter adjustment bench of FIGS. 31A1 and 31A2. At this stage of the assembly/adjustment procedure, indicated at Block H, electrical power is applied to the VLD so that it produces laser beam output.

The next stage of the procedure uses the beam photodetector 91 of the parameter adjustment system to align the produced laser beam with the first optical axis of the light diffraction grating. Without the dual-function light diffractive grating mounted to include bench 60' and with the parameter adjustment bench arranged as shown in FIG. 31C1, the first step of this stage, indicated at Block I of FIG. 31C', involves tilting the VLD/lens subassembly within the yoke so that the laser beam is directed along target axis 106 (i.e., to the first optical axis of the light diffractive grating) and falls upon the target (i.e., quadrant-type photodetector 91). At Block J at FIG. 31C2, the VLD yoke assembly is then rotated until the laser beam passes through the crosshair of the target at the beam photodetector 91. Notably, the target position is selected so that when the grating and mirror are installed the laser beam strikes the mirror at a position which reflects the beam on Bragg through the dual function grating, as well as on an optical axis which is coplanar with the axis of rotation of the holographic scanning disc. When so configured, the VLD and lens subassembly and yoke assembly are both locked in the position.

The next stage of the procedure indicated at Block K of FIG. 31C2 involves installing the mirror 63 and dual function grating 72' in module bench 601 as shown in FIG. 31A2, using any suitable adhesive or equivalent means. With the diffraction grating and mirror mounted to the module bench, an optical subassembly is now provided having all of the essential components for configuring parameter d sufficient to eliminate astigmatism while achieving predetermined beam aspect-ratio.

As indicated at Block L of FIG. 31C2, the next stage of the procedure involves adjusting parameter d by rotating lens barrel relative to VLD block so that astigmatism is eliminated. This stage is carried out using the Photon® Beam Scanning device 88, volume hologram (H2) 103, and test lens 105 arranged in the manner illustrated in FIG. 31A2. While the VLD is actively driven and a laser beam emanating from the second surface of the light diffractive grating, parameter d is incrementally adjusted by rotating the lens barrel relative to the VLD Block C until astigmatism is eliminated. During this incremental adjustment process, the Photon® Beam Scanning device is used to measure the beam cross-section of the laser beam in x and y directions, at different points along the optical axis of the grating and colliminating lens along which the beam propagates. Specifically, this adjustment step is carried out by selecting a value for d, and then measuring the beam cross-section along the beam. When the cross-sectional measures of the beam indicate that the beam converges to its focal point at the same rate along the x and y directions, and then diverges at equal rates in these orthogonal directions as one moves the point of measurement along the length of the beam, then the value of distance d, denoted $d^*$, at which such conditions are detected, is the value of d at which astigmatism is completely eliminated along the laser beam. When this parameter value for d is found by the above adjustment procedure, astigmatism is eliminated at the second surface of the light diffractive grating and therebeyond. This value of parameter $d^*$ can then be locked with adhesive or other suitable means.

When the laser beam production module has been completely assembled and its parameters configured to eliminate astigmatism, then, as indicated at Block M in FIG. 31C2, the entire laser beam production module, preconfigured in the manner described above, is mounted on the optical bench of the scanning system as illustrated in FIG. 31D, so that alignment pins 68 on module bench 60' fit into alignment holes 69 in scanner bench 5. At this stage of the assembly process, the grating tilt angle $\rho_0$ is automatically configured (i.e., set) so that laser beam dispersion is minimized as the laser beam is diffracted through the scanning disc. Notably, grating tilt angle $\rho_0$, previously determined by the design process for the first optical system, is set by the predesigned angle at which grating 72 is mounted on module bench 60', relative to the geometry of scanner bench 5 and module bench 60'. Once the laser beam production module is aligned as described above, it is then fixed in place using bolts, screws or other fasteners known in the art. The above described procedure is repeated for each laser beam production module at each scanning station within the holographic laser scanner.

DESIGN OF THE LIGHT COLLECTING AND DETECTING SUBSYSTEM OF THE PRESENT INVENTION

Having described in great detail various procedures for designing and making holographic scanning discs and laser beam production modules according to the present invention, it is appropriate at this juncture to describe various light collection/detection subsystems for use in the holographic laser scanner of the present invention, and methods of designing the same.

As shown in FIGS. 14 and 22, the laser scanning system of the illustrative embodiment employs a light collecting/detecting subsystem which comprises three major subcomponents, namely: the holographic facet of the scanning disc 7 used to produce the P(i,j)th scanning plane from which reflected laser light being collected originated; a parabolic light focusing element (e.g., a parabolic focusing mirror) 14A (14B, 14C) mounted beneath the scanning disc adjacent each laser scanning station, and a photodetector 15A (15B, 15C) mounted above the scanning disc, along the focal axis of the parabolic light focusing mirror. As mentioned hereinabove, this subsystem design allows the scanner designer to minimize the height dimension of the scanner housing beneath the scanning disc, while the height of the beam folding mirrors determines the height of the scanner housing above the scanning disc.

The constraints which must be satisfied by an acceptable design for the light collection/detection subsystem of the present invention are specified as follows: (1) substantially all of the reflected light rays collected by any particular holographic facet during a light collection operation and focused by the parabolic light focusing mirror, pass through the particular holographic facet at an angle in which the light diffraction efficiency is minimal in order that maximal optical power is transmitted through the holographic facet towards the photodetector located at the focal point of the parabolic light focusing mirror; (2) the light rays reflected from a scanned code symbol falling incident on the inner and outer (i.e., extreme) portions of the holographic scanning disc during light collection operations (i.e., indicated as $R_1$ and $R_2$ in FIG. 34) are strongly diffracted by the scanning disc in a direction anti-parallel to the angle of incidence of the outgoing laser beam upon the scanning disc during laser beam scanning operations; and (3) the surface area of the parabolic focusing mirror is of such spatial extent and arranged relative to the scanning disc and photodetector that substantially all light rays collected by a particular holographic facet during a light scanning operation are received by the parabolic light focusing mirror as the holographic scanning disc rotates about its axis within the holographic laser scanner of the present invention. These constraints are important to the design and operation of the light collection subsystem shown in FIGS. 14 and 22, and as such, are embodied within the steps of the method for designing the light collection subsystem of the present invention described below. While possible, analytical expressions could be formulated for the geometrical optics model of the subsystem as shown in FIG. 32, and thereafter, optimal design parameters obtained through a rigorous mathematical analysis, as was employed with regard to the other subsystems of the holographic scanner hereof. However, the approach adopted below is to use the above-described subsystem constraints to provide a procedure for designing a suitable light collection subsystem for use with the previously designed scanning disc and laser beam production module of the present invention.

As indicted at Block A in FIG. 33A, the first step of the design method involves light diffraction efficiency analysis (i.e., Bragg sensitivity analysis) for each holographic facet in the previously designed scanning disc. The goal of this analysis is to determine, in the outgoing direction of the scanning disc, the angle of incidence relative to the Bragg angle of the facet (i.e., off Bragg), at which the light diffraction efficiency of the facets drops below a predetermined minimal threshold. Alternatively stated, the goal is to determine the angular range of incidence angles (e.g., from $\theta_A$ to $\theta_B$) outside of which the diffraction efficiency of the holographic facet drops below the predetermined minimal threshold. This angular range is schematically illustrated in the geometrical model FIG. 34. As will be described below, this information is theoretically derived from an analysis of the diffraction efficiency of the facets with respect to particular polarization states of the light focused by the parabolic mirror. The mathematical expressions used to analyze such light diffraction efficiency as a function of incidence angle $\theta_i$ will differ for the different illustrative embodiments of the scanning disc hereof. In general, three types of holographic scanning disc may be used in any particular scanner design, namely: a scanning disc designed for use without cross-polarizers before the photodetectors; a scanning disc for use with P polarizers before the photodetectors; and a scanning disc for use with S polarizer before the scanning disc, as described above. Thus, Bragg sensitivity analysis for each of these three cases will be described below. In each case, a precise 3-D geometrical model of the holographic laser scanner under design is created, using the parameter values for the various subcomponents thereof determined in prior stages of the scanner design process hereof. Preferably, the 3-D geometrical model produced at this stage should not represent the parabolic light focusing mirrors 14A, 14B, 14C, nor the photodetectors 15A, 15B, 15C, as the precise geometry and relative position of the parabolic mirrors have not been specified at this stage of the design process, nor have the precise locations of the photodetectors been specified. The partial nature of the geometrical model is illustrated in FIG. 34. As will become apparent hereinafter, several critical design stages, involving light diffraction efficiency and ray tracing analysis, must first be performed before such specifications can be accurately obtained in accordance with the principles of the present invention.

As indicated at Block B of FIG. 33A, the next stage of the design process involves using the HSD workstation to perform a Bragg Sensitivity Analysis on each facet of the holographic scanning disc to determine the range of incident angles off Bragg, at which light rays reflected off the parabolic mirror will be transmitted through the facets with minimal diffraction towards the photodetector. The geometrical optics model shown in FIGS. 35A and 35B is used to represent the relevant geometrical and optical parameters used in the construction of a Bragg Light Diffraction Sensitivity Model of the holographic facets, based upon the original theoretical foundations laid down in Kogelnik's paper, supra. As the geometrical optics model of FIG. 35A1 is virtually identical to the model described in FIGS. 10A2 through 10B, it will not be necessary to repeat here the description of the geometrical and optical parameters comprising this model.

In FIGS. 35B1 and 35B2, a Bragg Light Diffraction Sensitivity Model is provided for the scanning disc designed for use without cross-polarizers before the photodetectors, shown in FIG. 10A1. This model contemplates that light of both S and P polarization states is reflected from a scanned code symbol, collected by the holographic facet, focused by the parabolic mirror and eventually transmitted through the holographic facet onto the photodetector for detection. Consequently, Expression No. 14 in FIG. 35C2 provides an expression for the "average" diffraction efficiency for light of S and P polarization states transmitted through each particular facet on the scanning disc, as a function of the angular deviation from the Bragg angle $\delta_e$. The constituent S and P diffraction efficiencies described by Expressions 12 and 13 of FIG. 35C2, respectively, are formulated using the assumed parameter values listed in the table of FIG. 35B1. The mathematical expressions set forth in Expressions No. 1 through 11 in FIG. 35C1 are derived by application of Snell's Law to the geometrical optics model of FIGS. 35A1 and 35A2, and principles of the Coupled Wave Theory in volume-type holographic light diffraction gratings, described in great detail in Herwig Kogelnik's paper, supra. Notably, while the "obliquity factors" $C_S$ and $C_R$ defined in Equations 6 and 7 are expressed in terms of the internal incidence angle $\alpha$ and the fringe slant angle $\Phi$, these parameters can be expressed in terms of $\theta_i$ and $\theta_d$, as discussed in Kogelnik's paper.

The functions plotted in FIGS. 35D1 and 35D2 show the "normalized" average light diffraction efficiency for the first and sixteenth holographic facet, expressed as a function of the angular deviation from the Bragg angle, $\delta_e$. Expression No. 14 is used to produce such graphical plots. For $\delta_e=0$, which is the case where the angle of incidence is equal to the Bragg angle of the holographic facet, the theoretical average light diffraction efficiency is maximum (i.e., $E_{norm./avg.}=1$) as one would expect. For angles of incidence away from the Bragg angle of the facet, the light diffraction efficiency generally decreases, with some oscillatory behavior. By evaluating and plotting the "normalized" average light diffraction efficiency for each holographic facet, the subsystem designer can identify, for each holographic facet, at which angle off Bragg $\delta_e$ the normalized light diffraction efficiency is below a minimal threshold (e.g., 0.09). Using such angular information, the designer can determine at which angles focused light rays from the parabolic mirror must be transmitted through the holographic facets with minimal diffraction, and thus maximum power transfer for detection. Notably, it has been found during such analysis that in order to reflect the collected light rays back through the scanning disk toward the photodetector without significant diffraction losses, the angle of incidence of each and every one of the light rays from the complete bundle of light rays from the parabolic mirror, must be at least 20 degrees away from the outgoing beam angle of incidence (i.e., the outgoing Bragg angle).

Referring to FIGS. 37A through 37C2, and the geometrical optics model of the scanning disc shown in FIGS. 28A1 and 28A2, a Bragg Light Diffraction Sensitivity Model will be described for analyzing the scanning disc designed with an S polarizer placed before the photodetectors, as shown in FIG. 36 i.e., when using the laser beam production module of the second illustrative embodiment. This model contemplates that light of P polarization state is used to scan a code symbol, and light of S polarization state is reflected from a scanned code symbol, collected by the holographic facet, focused by the parabolic mirror and eventually transmitted through the holographic facet onto the photodetector for detection. The S polarizer allows light rays of S polarization to pass onto the photodetector, whereas light rays of P polarization state are filtered out by the polarizer. Consequently, Expression No. 12 in FIG. 37B provides a general expression for the diffraction efficiency of each particular facet on the scanning disc to light of S polarization state transmitted therethrough. Notably, this characteristic of each facet is expressed as a function of the angular deviation from the Bragg angle $\delta_e$ and has been formulated using the assumed parameter values listed in the table of FIG. 37A1. The mathematical expressions set forth in Expressions No. 1 through 11 are derived by application of Snell's Law to the geometrical optics model of the volume-type holographic facets on the scanning disc, as shown in FIGS. 35B1 and 35B2. The "obliquity factors" $C_S$ and $C_R$ defined in Expressions No. 6 and 7 of FIG. 37B are derived using the well known principles of the Coupled Wave Theory in volume-type holographic gratings. The functions plotted in FIGS. 37C1 and 37C2 show the "normalized" light diffraction efficiency for the holographic facets No. 1 and 16 to S polarized light, expressed as a function of the angular deviation from the Bragg angle, $\delta_e$. Expression No. 12 in FIG. 37B is used, in FIG. 37B is used to produce such graphical plots. For $\delta_e=0$, which is the case where the angle of incidence is equal to the Bragg angle of the holographic facet, the theoretical light diffraction efficiency of each facet to S polarized light is maximum (i.e., $E_{norm.}=1$) as one would expect. For angles of incidence away from the Bragg angle of the facet, the light diffraction efficiency generally decreases, with some oscillatory behavior. By evaluating and plotting the "normalized" light diffraction efficiency for each holographic facet, the subsystem designer can identify, for each holographic facet, at which angle off Bragg $\delta_e$ the normalized light diffraction efficiency is below a minimal threshold (e.g., 0.09). By analyzing such plots, the designer can then determine at which angles focused light rays from the parabolic mirror must be transmitted through the holographic facets with minimal diffraction, and thus maximum power transfer for detection.

Referring to FIGS. 38C2 and the geometrical optics model of the scanning disc shown in FIGS. 28A1 and 28A2, a Bragg Light Diffraction Sensitivity Model is provided for the scanning disc designed for use with a P state polarizer placed before the photodetectors, as shown in FIG. 36 i.e., when using the laser beam production module of the first illustrative embodiment hereof. This model contemplates that light of S polarization state is used to scan a code symbol, and light of P polarization state is reflected from a scanned code symbol, collected by the holographic facet, focused by the parabolic mirror and eventually transmitted through the holographic facet onto the photodetector for detection. The P polarizer allows light rays of P polarization state to pass onto the photodetector, whereas light rays of S polarization state are filtered out by the polarizer. Consequently, Expression No. 12 in FIG. 38B2 provides a general expression for the diffraction efficiency of each particular facet on the scanning disc to light of P polarization state transmitted therethrough. Notably, this characteristic of each facet is expressed as a function of the angular deviation from the Bragg angle $\delta_e$ and has been formulated using the assumed parameter values listed in the table of FIG. 38A1. The mathematical expressions set forth in Expression Nos. 1 through 11 of FIG. 38B1 are derived by application of Snell's Law to the geometrical optics model of the volume-type holographic facets on the scanning disc, as shown in FIGS. 35A1 and 35A2. The "obliquity factors" $C_S$ and $C_R$ defined in Expressions 6 and 7 of FIG. 38B1 are derived using the well known principles of the Coupled Wave Theory in volume-type holographic gratings. The functions plotted in FIGS. 38C1 through 38C2 show the "normalized" light diffraction efficiency for holographic facet Nos. 1 and 16 to P polarized light, expressed as a function of the angular deviation from the Bragg angle, $\delta_e$. Expression No. 12 is used to produce such a family of graphical plots. For $\delta_e=0$, which is the case where the angle of incidence is equal to the Bragg angle of the holographic facet, the theoretical light diffraction efficiency of each facet to P polarized light is maximum (i.e., $E_{norm.}=1$) as one would expect. For angles of incidence away from the Bragg angle of the facet, the light diffraction efficiency generally decreases, with some oscillatory behavior. By evaluating and plotting the "normalized" light diffraction efficiency for each holographic facet, the subsystem designer can identify, for each holographic facet, at which angle off Bragg $\delta_e$ the normalized light diffraction efficiency is below a minimal threshold (e.g., 0.09). By analyzing such plots, the designer can then determine at which angles focused light rays from the parabolic mirror must be transmitted through the holographic facets with minimal diffraction, and thus maximum power transfer for detection.

Having completed the Bragg Sensitivity Analysis required for the type of scanning disc employed in the scanner under design, the subsystem designer can then locate the position (e.g., center and optical axis orientation) of the photodetectors above the scanning disc. As indicated at Block C in FIG. 33A, this step involves using the HSD workstation to conduct an accurate ray training analysis of all incoming light rays reflected from a code symbol anywhere in the scanning volume onto the facets of the scanning disc, and based on this analysis, identifying a point above the scanning disc (but below the top edge of the beam folding mirrors) which is free of incoming light rays. At Block D, use the ray free points to locate the position of the photodetectors.

As indicated at Block E in FIG. 33A, the next step in the subsystem design method involves selecting a generalized parabolic surface function $S_{parabolic}$ (x,y,z) for use in specifying the light collection/focusing mirror of each light collection subsystem. As will be described below, the balance of the subsystem design method then involves specifying the parameters of the parabolic surface patch, from which the parabolic mirror can be constructed.

As indicated at step F in FIG. 33B, the next step of the subsystem design process involves extending the geometrical optics model of the subsystem by adding to the geometrical optics model of FIG. 34, a line which extends from the center location of the photodetector, parallel to and preferably above the line of laser beam incidence to the scanning disc, as shown in FIG. 39. The function of this line is to establish the position and orientation of the optical axis of the yet, unspecified parabolic surface path representative of the parabolic mirror to be constructed and installed beneath the scanning disc, adjacent to the laser beam production module.

As indicated at Block G of FIG. 33B, the next step of the design method involves specifying the focal length of the parabolic surface patch. The focal length of the parabolic surface patch will typically be determined primarily by spatial restrictions beneath the scanning disc. In the holographic laser scanner of the illustrative embodiment, the focal length for the parabolic surface was chosen to be 3.0 inches as this provided sufficient space below the scanning disc to mount the parabolic mirror. It is understood, however, this parameter will typically vary from embodiment to embodiment.

As indicated at Block H in FIG. 33B, the next step of the design method involves determining which holographic facet on the scanning disc has the smallest inner radius, $r_i$. By its very geometry, this facet will collect light rays closest to the center (i.e., hub) of the scanning disc, and thus will diffract light rays closest to the axis of rotation thereof. Thereafter, use this facet to determine the lengthwise dimension of the parabolic surface patch, as shown in FIG. 39. Notably, for purposes of design, the extreme (i.e., inner and outer) light rays falling on this facet are assumed to strike the surface thereof at the Bragg angle of the facet, and thus by design, the diffracted light rays are transmitted towards the parabolic surface patch in a direction parallel to the optical axis of the parabolic surface patch. In this way, when the parabolic mirror is realized according to the specification of the parabolic surface patch, collected light rays falling incident on a facet close to the Bragg Angle thereof will be focused to the focal point of the parabolic light focusing surface, at which the photodetector is located.

As indicated at Block I of FIG. 33C, the next step of the design method involves determining which holographic facet on the scanning disc has the greatest angular rotation, $\theta_{rot}$. As will be described below, this facet will be used to specify the widthwise dimension of the parabolic surface patch. The lower bound set on the widthwise dimension of the parabolic surface patch is the design constraint requiring that substantially all light rays collected by a particular holographic facet during a light scanning operation are received by the parabolic mirror as the holographic scanning disc rotates about its axis of rotation. The upper bound on the widthwise dimension of the parabolic surface patch is the available space beneath the scanning disc, within the spatially-constrained housing.

At Block J of FIG. 33C, the subsystem designer uses the 3-D geometrical optics model of the scanner developed heretofore on the HSD workstation and the facet with the greatest angular sweep to determine the minimal left and right surface boundaries that may be imposed upon the widthwise dimensions of the parabolic surface patch. Below is a technique for determining these surface boundaries.

As shown in FIG. 40A, the minimal left surface boundary is determined by computer modelling in 3-D, the situation where the incident laser beam has just begun to illuminate the rightmost edge of the above-identified holographic facet. Ideally, at this stage of the scanline generation process, all of the reflected light rays reflected off the beam folding mirror are collected by the holographic facet. However, to ensure that all such light rays collected by the facet at this stage of the scanning operation are collected by the parabolic light focusing mirror for focusing, the designer extends outwardly the leftmost surface boundary of the parabolic surface patch just so that the entire facet is disposed beneath the parabolic surface patch.

Then as shown in FIG. 40B, the minimal right surface boundary is determined by computer modelling in 3-D, the situation where the incident laser beam is just about finished illuminating the leftmost edge of the above-identified holographic facet. Ideally, at this stage of the scanline generation process as well as at other instances thereof, all of the reflected light rays reflected off the beam folding mirror are collected by the holographic facet. To ensure that all such light rays collected by the facet at this stage of the scanning operation are collected by the parabolic light focusing mirror for focusing, the designer extends outwardly only the rightmost surface boundary of the parabolic surface patch just so that the entire facet is disposed beneath the parabolic surface patch.

Having completed the above steps, the widthwise surface dimensions can be determined by projecting the boundaries determined at the scanning disc plane, onto the 3-D parabolic surface patch. Collectively, the lengthwise and projected widthwise dimensions of the parabolic surface patch provide "patch cutting parameters" that can be used to construct a parabolic mirror for the light collection subsystem under design. A preferred way of constructing the parabolic mirror is to use the patch cutting parameters to cut out a parabolic patch from a parabolic mirror having the focal distance specified at Block G of the design procedure. Notably, the resulting parabolic mirror designed above, will cover the entire area of the light collecting portion of the largest facet over the entire sweep width as the scanning disc rotates.

Then at Block K of FIG. 33C, the 3-D geometrical model of the light collection/detection subsystem is revised on the HSD workstation using the complete set of specifications for the parabolic surface patch (i.e., parabolic mirror). Then as indicated at Block L of FIG. 33C, the updated geometrical model is carefully analyzed on the HSD workstation to confirm that all light rays reflected off the parabolic mirror are transmitted through the respective holographic facets off Bragg, to ensure that maximum optical power is transmitted to the photodetector at the focal point of the parabolic mirror of the light detection subsystem. If this ray tracing analysis proves that the subsystem design satisfies the specified criteria, then the design process is completed and the subsystem design can then be realized according to the final geometrical model. If, however, the ray tracing analysis indicates the design falls short of satisfying its criteria, the designer can return to any one or more of the above-described steps in the procedure, modify the parameters thereat, and proceed through the design process until the desired performance criteria is satisfied. Typically, one run through this design procedure is all that will be required to achieve a satisfactory subsystem design which satisfies the system constraints presented at this stage of the overall scanner design process.

In FIG. 41, the holographic laser scanner hereof is shown with an alternative embodiment of the light detection subsystem of the present invention. Instead of using a parabolic mirror to focus collected light rays towards a photodetector located at the focal point of the parabolic mirror, this scanning system employs a reflection-volume hologram 108 to perform such an optical function. In all other respects, the light detection subsystem of FIG. 41 is similar to the illustrative embodiment described in detail hereinabove. Notably, the design techniques described above can be used to design the reflection-volume hologram 108 of the light detection subsystem. Using the complete specifications for the parabolic surface patch, from which the parabolic mirror was designed and constructed, the reflection-volume hologram can be constructed in a manner which will now be readily apparent in view of the disclosure hereof.

As shown in FIGS. 42 through 43B, two alternative embodiments of the holographic laser scanner of the present invention are shown. These holographic scanning systems are similar to the illustrative embodiments described hereinabove, except for the structure of the light detection subsystems employed therein.

The light detection subsystem of the embodiment shown in FIG. 42 comprises photodetector 15A and a system of light collection and focusing optics 110 which avoids folding light rays collected and focused beneath the scanning disc. The light collecting and focusing optics comprise a planar light collecting mirror 111 and a condenser-type focusing lens 112. As shown, the light collecting mirror 111 is disposed beneath the outer portion of the scanning disc, for receiving parallel light rays falling incident upon and collected by the holographic facet at its Bragg angle. The parallel light rays collected by the planar mirror are directed substantially parallel to the plane of the scanning disc, and are focused by focusing lens 112 to its focal point at which the photodetector 15A is located. One disadvantage of using this light detection subsystem design is that it requires a greater volume of space beneath the scanning disc to accommodate mirror 111, and focusing lens 112 which will typically require a relatively short focal length, at which the photodetector is placed. From a practical point of view, this can often require the placement of the scanning disc motor above, rather than below, the scanning disc, as shown in FIG. 42.

The light detection subsystem of the embodiment shown in FIGS. 43A and 43B comprises a photodetector 15A and a system of light collection and focusing optics 113 which folds and focuses collected light rays beneath the scanning disc. The light collecting and focusing optics comprise a first planar ray-folding mirror 114, a second planar ray-folding mirror 115, and a condenser-type focusing lens 116. As shown, the planar light collecting mirror is disposed beneath the outer portion of the scanning disc, for receiving parallel light rays falling incident upon and collected by the holographic facet at its Bragg angle. The parallel light rays collected by the planar mirror 114 are directed substantially parallel to the plane of the scanning disc onto folding mirror 115. The ray folding mirror 115 in turn redirects the collected light rays towards focusing lens 116, located under the scanning disc. The focusing lens 15A focuses the folded light rays to its focal point at which the photodetector 15A is located. As shown, each photodetector is realized on the analog signal processing board of the associated scanning station. As with the above-described embodiment, a major disadvantage of using this light detection subsystem design is that it requires much space beneath the scanning disc, often requiring the placement of the scanning disc motor above, rather than below, the scanning disc as shown.

While the holographic scanner of the present invention and its numerous methods of system design have been described in great detail with reference to the use of volume-transmission holograms, it is understood that volume-reflective holograms can be used to construct the holographic scanning disc of the present invention employed in the various embodiments of the holographic scanning system hereof. In FIG. 44, such an alternative embodiment of the scanning system of the present invention is shown constructed using a scanning disc realized from a plurality of volume-reflective type holographic facets. As shown, this system design requires a somewhat different optical design in order to accommodate the physics of such a volume-reflection scanning disc. It will be helpful to briefly describe the ray optics associated with the illustrative embodiment of such an alternative laser scanning system design.

As shown in FIG. 44, each ray folding mirror 13A is provided with an aperture 120 and a first beam folding mirror 121. The function of the first beam folding mirror 121 is to direct the j-th aspect-ratio controlled laser beam from laser production module 12A, through the aperture 120, towards a second beam folding mirror 122 positioned in a "light ray free" region above the scanning disc. The function of the second beam folding mirror 122 is to direct the laser beam (1) towards the outer edge of the scanning disc to an incident point analogous to $r_0$ in the design of scanning disc 7', described above. As the scanning disc rotates, the j-th laser beam enters the volumetric depth of each i-th scanning facet, and as it reflects therefrom, it is diffracted in a manner determined by the fringe structure of the holographic designed therein during the scanner design process. As the holographic facet rotates, the diffracted laser beam is reflected off its associated beam folding mirror 13A so that the corresponding scanline P(i,j) is produced within the scanning volume of the scanner. Upon reflecting off a scanned code symbol (or scanned textual character characters in holographic OCR applications), the laser light scatters and a portion of the scattered laser beam reflects back along an incoming path that is spatially coincident with the outgoing path, as shown. As shown incoming light rays A and B striking both the inner end outer edges of the scanning disc at angles very close to the Bragg angle of the holographic scanning facet, are strongly diffracted along optical paths (2) and (3) which are substantially parallel to the optical path (1) of the incident laser beam. Consequently, a substantial portion of the optical power in these incoming light rays is reflected from the scanning facet towards a volume-transmission hologram 123 which is supported above the scanning disc adjacent the second beam folding mirror 122. The function of the volume-transmission hologram 123 is to focus the collected light rays towards its focal point, at which the photodetector 15A is located. Notably, the size of hologram 123 is selected to collect all of the light rays reflected off the holographic scanning facet, and its position is located within the light ray free region above the scanning disc. All of the methods and procedures described above with regard to the design and construction of volume-transmission scanning disc 7 are generally applicable to the design and construction of the holographic scanner of FIG. 44. In view of the above described teachings of the present invention, the HSD workstation of the present invention can be readily modified for use in designing the holographic scanner of FIG. 44 or any other holographic scanner of the present invention.

As can be imagined, the holographic laser scanner of the present invention can be used in diverse applications. While holographic laser scanner 1 has been described as a stand-alone, compact holographic laser bar code symbol reading system, it may in some applications be used as a subsystem within a larger scanning system, to simply detect the presence of a code symbol within its robust scanning volume. As shown in FIGS. 45A and 45B, holographic laser scanner 1 is used in just this way. Its function is to simply detect the presence of a code symbol within its robust scanning volume and produce, as output, information specifying the position of the detected code symbol within the scanning volume $V_{scanning}$. Such information can be as simple as P(i,j) which, in essence, encodes (i.e., embodies) information regarding the focal plane and scanline within the focal plane along which a code symbol 130 moving along conveyor belt 129 has been detected. In the example of FIG. 45A, the code symbol position information produced by holographic scanner 1 is P(15,3), which specifies the scanline within the scanning volume which detected the code symbol. FIG. 5 shows which region within the scanning volume this particular scanline occupies. In the illustrative embodiment of FIG. 45A, high-speed laser scanning system 131 has a translation table stored within its on-board control computer which uses the code symbol position information P(i,j) to produce information which identifies generally where the detected code symbol resides, i.e., in terms of volumetrically-quantized regions of the scanning volume $V_{scanning}$. Laser scanning system 131 also comprises a high-speed laser scanning mechanism which is capable of producing a laser beam having a variable depth of focus within the scanning volume $V_{scanning}$, and steering the laser beam to a specific region therewithin for aggressive scanning.

The exact sequence of steps undertaken during the operation of the scanning system shown in FIGS. 45A and 45B will be described below. When code symbol 130 is present in the scanning volume $V_{scanning}$, holographic scanner 1 automatically detects this symbol and produces position information P(15,3) which is provided to scanner 131. After translating this information to scanning region information, laser scanning system 131 uses the translated information to (i) set the focal length of the laser beam to the focal plane within which the detected code symbol has been detected (i.e., focal plane DF4), (ii) steer the laser beam to the corresponding region within $V_{scanning}$, and (iii) generate an X-bar or other scanning pattern within this region in order to collect lines of high-resolution scan data within this region. The collected scan data is stored in a scan-data video buffer 131A and a high-speed decode processor 131B(i.e., microcomputer) decode processes each frame of video data using stitching or other suitable symbol decoding techniques in order to read the scanned code symbol with this region of the scanning volume $V_{scanning}$. Output symbol character data produced by processor 131B is then provided to the host computer system 132. Then as the conveyor belt moves forward as shown in FIG. 45B, the next package on the conveyor is brought through the scanning volume at a high speed. When code symbol 134 on this package is detected within the scanning volume, the above-described sequence of operations is carried out once again. In this instance, however, the laser beam will be automatically focused to the first depth of field (i.e., DF1), as this is where the detected code symbol resides as it passes through the scanning volume. As such, the focused laser beam is automatically scanned within the small region defined by P(4,3) shown in FIG. 5. All other steps are the same as described above. For each new package entering the scanning volume, the code symbol(s) thereon is automatically detected and position information related thereto provided to scanning system 131 to cause its scanning pattern to be directed to the region where the detected code symbol momentarily resides for high-resolution scanning of this region.

As shown in FIG. 46, the holographic laser scanning system of the present invention can be easily scaled down in size and embodied within a fully-automatic, portable hand-supportable housing, a hand-mounted housing, or body-wearable housing 141, having one-way RF signal transmission capabilities, while retaining all of its essential features, namely: multiple focal planes within its scanning volume; non-astigmatic focal zones; and omni-directional scanning. In this illustrative embodiment, the portable scanner of FIG. 46 embodies the following functionalities: the spatially overlapping object detection and laser scan fields taught in U.S. Pat. No. 5,468,951; the long-range/short-range modes of programmable scanning operation taught in U.S. Pat. No. 5,340,971; the power-conserving system-control architecture taught in U.S. Pat. No. 5,424,525; and the RF signal transmission functionalities and acoustical acknowledgement signalling taught in copending U.S. patent application Ser. No. 08/292,237, each of which is commonly owned by Metrologic instruments, Inc. of Blackwood, N.J., and is incorporated herein by reference in its entirety.

As shown in FIG. 47 and 48, the holographic laser scanning system of the present invention can be easily modify, scaled down in size, and embodied within a fully-automatic, portable hand-supportable housing 145, a hand-mounted housing 146, or body-wearable housing, having one-way RF signal transmission capabilities. Notably, the primary difference between the scanners shown in FIGS. 47 and 48 is that the scanner shown in FIG. 47 is hand-supportable, whereas the scanner shown in FIG. 48 is hand-mounted on the back-of-the hand using a fingerless glove, as taught in copending application Ser. No. 08/489, 305 incorporated herein by reference.

In the illustrative embodiments shown in FIGS. 47 and 48, the holographic scanning apparatus of the present invention is used to produce a 2-D raster-type of scanning pattern, with a depth of field extending from about 2" to about 10" from the scanning window of the scanner. As illustrated in FIG. 47, the scanner comprises a volume-transmission scanning disc 147 rotated by a small battery-operated motor 148 supported within the interior of the scanner housing. The scanning disc has about twenty holographic facets, each designed to produce one of the twenty scanlines (i.e., scanplanes) in the 2-D raster scanning pattern within the 3-D scanning volume $V_{scanning}$. As shown, a miniaturized laser beam production module 12A', as hereinbefore described, is used to produce an incident laser beam free of astigmatism and having a circularized or aspect-ratio controlled beam cross section. This laser beam is transmitted through a piezo-electric controlled Bragg cell 149 which directs the laser beam incident onto the underside of the holographic scanning disc at any one of a very small range of incident angles $\Delta\theta_i$ determined by the scanning disc design process of the present invention described in great detail hereinabove. The function of the Bragg cell is thus to modulate the incidence angle of the laser beam about a center, or nominal angle of incidence $\theta_i$. The microprocessor based system controller (not shown) aboard the scanner generates control signals for the Bragg Cell during scanner operation. When the laser beam is directed at the scanning disc at the nominal incidence angle $\theta_i$, it produces each one of the twenty principal scanning lines in the twenty-line raster scanning pattern as the laser beam is diffracted by the twenty different holographic scanning facets. However, when the incidence angle is modulated about the nominal incidence angle $\theta_i$, the diffracted laser beam is swept about an infinite, but small range of scanlines about its principal scanline causing "inter-scanline dithering". If the deviation about the nominal incidence angle $\theta_i$ is symmetric, then the deviation in the diffracted scanlines will also be symmetric within the resulting raster scanning pattern. Similarly, if the deviation about the nominal incidence angle $\theta_i$ is asymmetric, then the deviation in the diffracted scanlines will also be asymmetric within the resulting raster scanning pattern.

In a manner similar to the facets in scanning discs 7 and 7' described above, each scanning facet along scanning disc 147 also functions to collect reflected laser light towards a small parabolic mirror 150 having a focal point above the scanning disc near the motor, at which photodetector 151 is located. Intensity signals produced by the photodetector 151 are provided to the microprocessor for decode-processing in a conventional manner. An infrared light based object detection transceiver 152 is mounted adjacent the scanning window to produce the object detection field which spatially overlaps the scanning volume over its operative scanning range, as shown. In this particular illustrative embodiment, the portable scanner of FIGS. 4A through 4C and 48 both embody the following functionalities: the spatially overlapping object detection and laser scan fields taught in U.S. Pat. No. 5,468,951; the long-range/short-range modes of programmable scanning operation taught in U.S. Pat. No. 5,340,971; the power-conserving system-control architecture taught in U.S. Pat. No. 5,424,525; and the RF signal transmission functionalities and acoustical acknowledgement signalling taught in copending U.S. patent application Ser. No. 08/292,237, each of which is commonly owned by Metrologic instruments, Inc. of Blackwood, New Jersey, and is incorporated herein by reference in its entirety.

Using the detailed design procedures described hereinabove, one with ordinary skill in the art will be able to readily design a variety of other different types of holographic laser scanning systems for use in diverse fields of utility.

In many embodiments of the present invention, it will be desirable to produce customized holographic laser scanners having 3-d scanning volumes and scanning patterns particularly tailored to a particular customers needs. The needs of such customers can be quickly meet in a highly cost-effective manner, using the holographic laser scanner of modular construction shown in FIG. 49. As will be described in great detail below, this holographic laser scanner can be designed using a highly flexible method of scanner design, in which a number of predesigned modules (e.g., available in the Inventory Library or Design Library of the system) are selected to construct a basic scanner architecture. From this basic architecture, with certain parameters being fixed by design, from which the holographic laser scanner of modular construction is then designed using end-user specifications of the 3-D scanning volume and pattern, and fixed and variable parameters of selected modules, and the scanner design methods of the present invention described in detail above.

As shown in FIG. 49, the holographic laser scanner of modular construction 200 is similar in many respects to the scanner embodiment shown in FIGS. 2A through 2D and described hereinabove in great detail. As shown more clearly in FIG. 49, holographic laser scanner 200 includes a number of predesigned (preassembled) modules, namely: an optical-bench/housing module M1 comprising, as subcomponents, an optical bench 201, a wrap-around case 202 and a housing cover 203 with output scanning window 204, speaker 205 and LEDs 206 and 207; a holographic scanningdisc/photodetector module M2 comprising, as subcomponents, a holographic laser scanning disc 208, a scanning motor 209, photodetector/signal processing boards 210A through 210E, and a motor/board mounting assembly 211; a plurality of scanning station modules M3 comprising, as subcomponents, a laser beam production module 212A through 212E (for scan data channels A through E, respectively), base plate therefor 213A through 213E, output beam folding mirror 214A through 214E and adjustable support bracket 215A through 215E, and parabolic light collection mirror 216A through 216E, for mounting onto optical bench 201, adjacent the corresponding base plate using a pair of screws or light fasteners; a digital signal processing and I/O module M4 comprising, as subcomponents, a CPU motherboard 217 with power supply, five CPUs for decode processing, I/O circuitry and the like.

In the illustrative embodiment, optical-bench 201 has a first set of preformed holes 218 for receiving the ends of support posts 219 associated with the motor/board mounting assembly 211, and a second set of preformed holes 220 for jointly mounting base plate 213 and adjustable support bracket 215. The size and dimensions of the optical bench will typically be selected to accommodate a holographic scanning disc having a maximum diameter (e.g., 8.66 inches). In such embodiments, scanning discs of smaller diameter (e.g,. 6.0 inches or smaller) could be accommodated on such an optical bench, although the rational for doing so when a smaller size optical bench is available, is not certain. The size and dimensions of support bracket 215 is designed so that any one of a variety of output beam folding mirrors 214 can be mounted thereto using adhesive or the like in order to meet the specifications and performance characteristics of the holographic laser scanner under design. Optionally, optical bench 201 can have several sets of preformed mounting holes so that a different number of scanningdisc/photodetector modules M2 can be easily mounted to the optical bench, in order to provide the scanner designer with the option of designing various types of scanners having different number of output scan data channels, while using the same optical bench.

In the illustrative embodiment, a wrap-around case 202 can be made of metal, plastic or fiberglass and be available in a variety of heights (e.g., 4.0 inches, 5.0 inches, etc) depending on the design at hand. The housing cover 203 is generally matched with the optical bench, and is designed to be used with a variety of cases of different height, as described above.

In some design applications, the holographic laser scanning disc 208 can be treated as a modularized component which is predesigned, premanufactured and available out of inventory for use in the design and construction of any particular scanner. In such instances, a number of predesigned/premanufactured scanning discs can be stored in inventory and used to construct various types of holographic scanner designs. While the laser beam scanning and light collection properties of each such inventoried scanning disc will remain substantially the same in each scanner it is employed, the resulting scanning volume and scanning pattern can be changed from design to design by using different modules and subcomponents, as will be explained in greater detail hereinafter.

It is also understood that in many applications, it will be desired or necessary to custom design the holographic scanning disc using the fixed and variable parameters associated with the selected modules, subcomponents and end-user design specifications. In such instances, the disc design methods and procedures described hereinabove can be used to design scanning systems having minimized height dimensions, omnidirectional scanning volumes, and the like.

Depending upon the design requirements, different scanning motors 209 (having different rotational speeds—RPMs—) can be selected for use in designing different types of holographic laser scanners. Photodetector/signal processing boards 210 (having different bandwidth characteristics, different analog signal processing thresholds, different signal gain constants, different SNR levels, etc.) can also be selected for use in designing different types of holographic laser scanners. The motor/board mounting assembly 211 atched to the optical bench selected (e.g., 8.66 or 6.00 inch scanning disc) like the casing 202 and housing cover 203.

In general, the adjustable support bracket 215 and base plate 214 upon which the laser beam production module is mounted, can be realized as a universal bracket subassembly that is utilizable in a very broad range of scanner designs, independent of the diameter of the scanning discs employed. It is understood, however, that it will be desirable to design, make and inventory many different laser beam production module designs for use in different kinds of holographic scanning systems under design. Such laser beam production modules can be designed to produce stigmatic laser beams having different aspect ratios, and focal distances for use in different scanner designs in order to meet the operational and performance characteristics thereof, including, for example: (1) scanning distance; (2) scanning volume characteristics; (3) scanning beam aspect ratio; (4) scanning beam polarization-state; (5) specified code symbol resolution at a specified scanning distance(s); (6) bar code substrate characteristics and print quality characteristics; (7) bar code symbol (e.g., package) velocity; and the like Preferably, the parabolic mirror 216 associated with each scanning station module M3 is directly mounted to the optical bench by a pair of screws or like fasteners. This component will be designed to satisfy the light collection requirements of the widest holographic facet on the largest diameter scanning disc accommodatable by the selected housing, and yet utilize the minimum about of space possible thereneath. Once designed and manufactured, the focal length of the parabolic mirror will be fixed, determining where the corresponding photodetector board must be positioned above the scanning disc. While it is possible to design, make and inventory a number of parabolic mirrors having different light collection surface areas and focal lengths, it may be desirable in many applications to stock a single parabolic mirror design. In such a case, the parabolic mirror subcomponent will be matched to the motor/board mounting assembly 211 and the support posts 219 which depend therefrom.

From the point of design flexibility, it would be desirable to use a single output mirror design having the largest possible width and height dimensions. However, this approach certainly has its drawbacks. Thus, in many instances, it will make good sense to elect an output mirror having different height and width characteristics for use in particular scanner design. By doing so, the scanner designer will be able to minimize manufacturing costs and overall scanner weight, while increasing the total available volume within the scanner housing for the internal mounting of auxiliary components.

An important feature of the mirror support bracket 215 is that it is provided within a hinge or like mechanism that allows the plane of the mirror to be adjusted with respect to the optical bench. As shown in FIG. 49, the adjustable mirror support bracket allows the scanner design parameter Φ to be a variable in the custom disc design process of the present invention. In geometrical terms, this support bracket assembly allows the output mirrors to be reconfigured (e.g., tilted) in any given system design so as to achieve 3-D scanning pattern and light collection characteristics required by the scanning system specified by the end user.

Preferably, a number of different digital signal processing and decode boards 217 would be designed, manufactured and inventoried in order to satisfy the scanner design requirements for a wide range of applications. Certain boards would support three CPUs, while other boards support five or more CPUs. Some boards could be provided with special decoding algorithms, I/O interfaces, low-speed scanner input options, and the like.

In accordance with another aspect of the present invention, these basic modules and subcomponents can be used in conjunction with the computer-integrated design and manufacturing system shown in FIG. 50 in order to efficiently design and inexpensively manufacture a wide range of holographic laser scanners having performance characteristics uniquely tailored to the needs of particular end-users.

As shown in FIG. 50, the system of the present invention is realized as a network of computer systems comprising: a first database management system (BDBMS1) 230 for storing and managing information model relating to the inventory of modules, submodules (subcomponents) available within the system; one or more holographic scanner design (HSD) computer workstations 231 for designing holographic laser scanners, subsystems and subcomponents thereof according to the principles of the present invention; a second database management system (DBMS2) 232 for storing and managing information models (e.g., , 2-D, 3-D geometrical models, geometrical optics models, analytical models, etc.) about modules and subcomponent designs obtained from the HSD workstations; an network information server (computer system) 233 for storing and serving the database information models maintained by DBMS1 and DBMS2 so that other computer systems within network can access such models whenever needed; and a system 234 for manufacturing holographic laser scanners using the designs and models stored in the network information server 233. Holographic laser scanners manufactured using the CIM system hereof are then sold and distributed using a sales, marketing and distribution system 235 of the manufacturers choice. Each of these computer-based systems can be located at different locations throughout the world, and thus could be interconnected by way of a wide area network (WAN). If the systems are located in close proximity, then they could be interconnected by a local area network (LAN), depending on the needs of the manufacturer. In the illustrative embodiment, each of the computer systems in the network supports the Windows NT Operating System (OS) by MicroSoft Corporation, of Redmond, Calif.

The relational database management systems DBMS1 and DBMS2 can be realized using an commercially available relational database system development program such as, for example, 4D Version 6.0 from ACI US, Inc., Access™ from MicroSoft, Corporation, SQL from Sybase, Inc., etc. The function of DBMS1 is to maintain an "Inventory Library" that tracks and manages the inventory of manufactured modules and subcomponents that have been either placed into inventory or removed therefrom to satisfy production requirements. Bar code indexing/tracking techniques can be used to carry out this subsystem in a manner well known in the part inventory management art. The function of DBMS2 is to store and manage module and subcomponent designs that have been previously designed in connection with other holographic scanner designs that have or may not have ever been manufactured.

The HSD workstations 231 can be realized in the manner described in great detail hereinabove. In connection therewith, it should be noted that HSD workstations used in the design of the mechanical components of the holographic scanners will have 3-D CAD modelling tools (e.g., AUTOCAD) well known in the art.

The manufacturing system 234 will typically include CNC machine tools, robots, pick-and-place machines, assembly fixtures, assembly lines, and the like are generally well known in the art and vary from embodiment to embodiment of the system hereof. Notwithstanding this fact, the subsystems thereof will be generally configured in accordance with the requirements of the designs provided by the HSD workstations described above.

In FIG. 51, a generalized method of designing and manufacturing holographic laser scanners using the CIM system of the present invention is illustrated. As indicated at Block A, the first stage of the method involves using DBMS1 to create a relational database model (i.e., DBM1) for constructed modules and subcomponents of holographic laser scanners available in inventory. The second stage of the method involves using DSMS2 to create a relational database model (i.e., DBM2) for modules and subcomponent designs that have been previously created during the design of other holographic laser scanners. Notably, DBM2 provides the Design Library with geometrical models, geometrical-optical models, and/or analytical models of modules and subcomponents of holographic laser scanners of modular construction. The third stage of the method involves maintaining mirror images of the relational database models DBM1 and DBM2 on the Information Network Server 233. By doing so, each HSD workstation and manufacturing workstation and computer system within the manufacturing system is provided access to the information stored therein over the network, as needed or desired.

As indicated at Block D, the next stage of the method involves designing a holographic laser scanner on one or more HSD workstations using inventory and design information stored on the Information Network Server. In this alternative embodiment of the design process of the present invention, each HSD workstation is preferably provided with several computer-software "tools" that facilitate the design of holographic laser scanners of modular construction, namely: an Inventory Display Tool (e.g., client program) for displaying which modules and subcomponents are available in the Inventory Library, in what quantities, at what cost, etc.; a Design Display Tool (e.g., client program) for displaying which module designs and subcomponent designs have been previously created and are available for downloading from the Information Network Server; and a Module/Subcomponent Selection Tool (e.g., client program) for selecting which modules and subcomponents in Inventory Library (DBM1) or from the Design Library (DBM2) will be used in designing a holographic laser scanner of modular construction.

When the designer uses the Module/Subcomponent Selection Tool, a Holographic Scanner Design Tree Structure as shown in FIG. 52 is displayed on the graphical user interface (GUI) of the HSD workstation. Underlying this graphical tree structure is an information structure (e.g., relational database model) that stores the various information files associated with each of the modules and submodules (i.e., subcomponents) of the "modularized" holographic laser scanner under design. This structure can be viewed as a "System Model" for the holographic scanner under design. While each holographic laser scanner will have generally the same system architecture, the particular modules and subcomponent structure thereof can and will vary from scanner design to scanner design. The subcomponent structure of a given design will depend on which modules and subcomponents the designer has selected during the design process. Using the HSD workstation, the holographic scanner designer can access the Network Information Server 233 and use the Inventory Display Tool to determine which particular modules and submodules (subcomponents) are in the manufacturer's inventory, what the present cost of their manufacture is, and their availability etc. Using the HSD workstation, the holographic scanner designer can access the Network Information Server and use the Design Display Tool to determine which particular modules and subcomponents have been previously designed during previous scanner design projects, that may be useful in the present design.

When the Design Display Tool is launched from HSD workstation, information models of the modules and subcomponents in the DBM2 can be reviewed. An exemplary display screen is set forth in FIG. 53. In this display screen, the modules of a previous scanner design ("Design A") are indicated by M1A, M2A, M3A and M4A. The subcomponents of module M1A are indicated by M1A1, M1A2, M1A3, and M1A4. The subcomponents of module M2A are indicated by M2A1, M2A2, M2A3, M2A4, and M2A5. The subcomponents of module M3A are indicated by M3A1, M3A2, M3A3, M3A4, and M3A5. The subcomponents of module M4A are indicated by and M4A1, M4A2, M4A3, and M4A4. While not shown in this display screen, each subcomponent contains detailed information about its design, specifications and performance characteristics which can be readily displayed by simply clicking on the display cell associated with the subcomponent. Understandably, the graphical user interface of this design tool (i.e., program) will vary from embodiment to embodiment of the present invention.

Based on the specifications and expected cost of the module designs displayed using the Design Display Tool, the scanner designer can determine which designs are best suited for use in the present scanner design project. When the designer finds a certain module or subcomponent satisfactory to his or her design requirements, he or she can then select the module or subcomponent as follows: (1) use the Design Display Tool to select the module or subcomponent design from the Design Library (e.g., by "clicking on" the graphical icon thereof); (2) launch the Holographic Scanner Design Tree Structure on the HSD workstation; (3) "drag" the selected icon of the module or subcomponent design over to the Holographic Scanner Design Tree Structure; and (4) "drop" it onto the module or subcomponent location of the Tree Structure where the selection is to be achieved. Each time such a drag and drop operation is carried out, the diverse information files associated with the selected module or subcomponent are automatically transferred from the Internet Network Server 233 to the information structure underlying the Holographic Scanner Design Tree Structure (stored on the HSD workstation).

When the Inventory Display Tool is launched from HSD workstation, information models of the modules and sub-components in the DBM1 can be reviewed. Preferably, to provide a unified approach to the scanner design process, the display screen shown in FIG. 53 is also used to display inventoried modules and subcomponents. However, to distinguish between module and subcomponent designs in the Design Library from manufactured modules and subcomponents in Inventory Library, graphical indications (or color coding techniques) should be employed to make clear what modules and subcomponents are in the Inventory Library and what modules and subcomponents are only in the Display Library (and not manufactured). Alternative techniques for displaying such models will occur to those skilled in the art upon having the benefit of the present disclosure.

Based on specifications, availability, and actual cost figures for the modules and subcomponents displayed using the Inventory Display Tool, the scanner designer can determine which designs are best suited for use in the present scanner design project, in a manner described hereinabove. When the designer finds a certain module or subcomponent satisfactory to his or her design requirements, he or she can then select the module or subcomponent as follows: (1) use the Inventory Display Tool to select the module or subcomponent design from Inventory database system DBMS1 (e.g., by "licking on" the graphical icon thereof); (2) launch the Holographic Scanner Design Tree Structure on the HSD workstation; (3) "drag" the selected icon of the module or subcomponent design over to the Holographic Scanner Design Tree Structure; and (4) "drop" it onto the module or subcomponent location of the Tree Structure where the selection is to be achieved. Each time such a drag and drop operation is carried out, the diverse information files associated with the selected module or subcomponent are automatically transferred from the Internet Network Server to the information structure underlying the Holographic Scanner Design Tree Structure (stored on the HSD workstation).

Using the Design and Inventory Display Tools, in conjunction with the Holographic Scanner Design Tree Structure of the present invention, a basic model for the holographic laser scanner under design can be arrived at will minimum effort. Notably, however, not all of the subcomponents can be selected during this stage of design if one desires to optimize the scanner design in the various ways described in connection with illustrative embodiments shown in FIGS. 1 through 48. In such cases where optimization is desired, it will be necessary to defer the selection of particular subcomponents (e.g., the housing casing which determines the height of the scanner; the beam folding mirrors which also determine the height of the scanner housing; etc.) until the design process is completed. The basic model would have a number of fixed scanner parameters set by the selection of the particular modules and subcomponents. Other parameters will be set by the designer based on heuristics and experience. The variables in the system design can be determined by employing the geometrical and analytical modelling techniques hereinbefore described to arrive at optimized values for such system variables. Once these parameters have been determined, the designer can go back to the Information Network Server 233 and select subcomponents that satisfy the optimized parameters. Thereafter the designer can update the Holographic Scanner Design Tree Structure (i.e., scanner system model) and thus, the model of the scanner under design. At the end of the design process, the designer will also have a complete set of construction parameters for use in manufacturing "optimized" holographic scanning discs in a manner described hereinabove.

As indicated at Block E, after the holographic scanner design has been finalized, the information modelks comprising the same can be used to updpate the Design Library (DBM2) as required, thereby increasing the design capabilities of the system.

At Block F, the modules and subcomponents (e.g., scanning disc) are manufactured according to the finalized holographic scanner design. Then based on production activity, the module and subcomponent Inventory Library (DBM1) is periodically updated to track the status of the manufacturer's inventory.

As indicated at Block G, the finalized holographic laser scanner design is assembled, its parameters configured, and its performance tested as described hereinabove.

In the design process described above, the holographic scanning disc was considered a subcomponent characterized by having several variables that are determined by application of the design procedures of the present invention. It might be desirable, however in some applications, to pre-design and inventory a number of scanning disc designs for selection during the design process, much like the parabolic light collection mirror, subcomponent M3A3, in the display screen of FIG. 53. In other embodiments, it will be preferred to custom design the HOEs on the holographic scanning disc, in order to exploit the advantages of the various design optimization procedures disclosed herein. However, even in such embodiments, the size of the scanning disc plates (e.g., 8.66 or 6.00 inches in diameter) will be a subcomponent that the designer will necessarily select during the preliminary design stage of the design process for modularized holographic scanners using the Inventory and Design Library databases described above.

In other embodiments, it will be preferred to custom design the entire holographic scanning system in order to meet the specifications and requirements of a particular end user.

While the various embodiments of the holographic laser scanner hereof have been described in connection with linear (1-D) and 2-D code symbol scanning applications, it should be clear, however, that the scanning apparatus and methods of the present invention are equally suited for scanning alphanumeric characters (e.g., textual information) in optical character recognition (OCR) applications, as well as scanning graphical images in graphical scanning arts.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A holographic laser scanner of modular construction comprising:
   an optical-bench/housing module including as subcomponents, an optical bench, and a housing cover with an output scanning window;
   a holographic scanning-disc/photodetector module including as subcomponents, a holographic laser scanning disc, a scanning motor, one or more photodetector/signal processing boards and a motor/board mounting assembly;
   a plurality of scanning station modules each including, as subcomponents, a laser beam production module, a base plate for mounting said laser beam production module, an output beam folding mirror and an adjustable support bracket; and
   a digital signal processing and I/O module including, as subcomponents, a CPU motherboard with one or more CPUs and I/O circuitry.

2. The holographic laser scanner of claim 1, wherein said optical-bench has a first set of preformed holes of receiving the ends of support posts associated with said motor/board mounting assembly, and a second set of preformed holes for jointly mounting said base plate and said adjustable support bracket with respect to said optical bench.

3. The holographic laser scanner of claim 1, wherein said housing cover comprises a wrap around housing portion and a housing cover which is generally matched with said optical bench housing module, and is designed to be used with a variety of wrap-around cases of different heights.

4. The holographic laser scanner of claim 1, wherein said adjustable support bracket allows the tilt angle of said output beam folding mirror to be adjusted over a range of angles so as to achieve a desired laser scanning pattern to be projected through said output scanning window.

5. A system for designing and manufacturing holographic laser scanners of modular construction, comprising:
   a first database management system for storing and managing information models relating to the inventory of the modules and subcomponents of said holographic laser scanners;
   a holographic scanner design computer (HSD) workstation for designing holographic laser scanners of modular construction, and producing information models for the modules and subcomponents thereof;
   a second database management system for storing and managing said information models for the designs of said modules and subcomponents obtained from said (HSD) workstations;
   a manufacturing system for manufacturing said holographic laser scanners of modular construction; and
   an information server for storing and serving the information models maintained by said first and second database management systems so that said HSD workstation and said manufacturing system can access such information models as needed.

6. A method of designing and manufacturing holographic laser scanners comprising the steps of:
   (a) creating a first relational database model for constructed modules and subcomponents of holographic laser scanners available in inventory;
   (b) creating a second relational database model for modules and subcomponent designs that have been previously created during the design of other holographic laser scanners;
   (c) storing said first an second relational database models in an information server;
   (d) designing a laser scanner using inventory and design information stored in the information server;
   (e) updating said second relational database model using the information produced during step (d);
   (f) manufacturing modules and subcomponents using the information produced during step (d);
   (g) updating said inventory; and
   (h) constructing a laser scanner according to the laser scanning design produced during step (d).

7. A method of designing and manufacturing a holographic laser scanning system employing modularized subcomponents and subassemblies comprising the steps:
   (a) providing end-user specified laser scanning system specifications to a scanner design workstation operably connected to an information network;
   (b) using said scanner design workstation to access a relational database management system over said information network, wherein said relational database management system contains a library of design specifications for predesigned modules and subcomponents of one or more previously designed holographic laser scanning systems;

(c) at said scanner design workstation, using said end-user specified laser scanning system specifications and said library of design specifications contained in said relational database management system, in order to create a finalized laser scanner design for a holographic laser scanning system to be constructed from modules and subcomponents;

(d) updating said library of design specifications using said finalized laser scanner design;

(e) manufacturing the modules and subcomponents for said holographic laser scanning system to be constructed; and (f) assembling said manufactured modules and subcomponents to construct one or more production units of said holographic laser scanning system in accordance with said finalized laser scanner design.

* * * * *